US012538012B2

(12) United States Patent
Liu et al.

(10) Patent No.: US 12,538,012 B2
(45) Date of Patent: Jan. 27, 2026

(54) VIDEO PROCESSING METHOD AND TERMINAL

(71) Applicant: HONOR DEVICE CO., LTD., Shenzhen (CN)

(72) Inventors: Zhenyi Liu, Shenzhen (CN); Jianyong Xuan, Shenzhen (CN); Guozhi Cao, Shenzhen (CN)

(73) Assignee: Honor Device Co., Ltd., Shenzhen (CN)

(*) Notice: Subject to any disclaimer, the term of this patent is extended or adjusted under 35 U.S.C. 154(b) by 0 days.

(21) Appl. No.: 18/691,747

(22) PCT Filed: May 4, 2023

(86) PCT No.: PCT/CN2023/092044
§ 371 (c)(1),
(2) Date: Mar. 13, 2024

(87) PCT Pub. No.: WO2023/231686
PCT Pub. Date: Dec. 7, 2023

(65) Prior Publication Data
US 2025/0088729 A1 Mar. 13, 2025

(30) Foreign Application Priority Data
May 30, 2022 (CN) .......................... 202210603631.7

(51) Int. Cl.
*H04N 23/63* (2023.01)
*G10L 21/0208* (2013.01)
*H04N 5/77* (2006.01)

(52) U.S. Cl.
CPC ....... *H04N 23/631* (2023.01); *G10L 21/0208* (2013.01); *H04N 5/772* (2013.01); *H04N 23/635* (2023.01)

(58) Field of Classification Search
None
See application file for complete search history.

(56) References Cited

U.S. PATENT DOCUMENTS 9,274,744 B2 * 3/2016 Hart ...................... G06F 1/1686
10,062,393 B2 8/2018 Kang
(Continued)

FOREIGN PATENT DOCUMENTS

CN 104699445 A * 6/2015 ............. H04N 23/90
CN 106504280 A 3/2017
(Continued)

OTHER PUBLICATIONS

English translation of CN-104699445-A, Li, Hai-ting, 2015 (Year: 2015).*
(Continued)

*Primary Examiner* — James M Hannett
(74) *Attorney, Agent, or Firm* — Fish & Richardson P.C.

(57) ABSTRACT

A video processing method and a terminal are provided. In the method, when the terminal records a video, the terminal may shoot (acquire) an image by using a camera (the image shot by using the camera is referred to as an original image below), and determine a focus of the shooting based on the original image. Then, the terminal may implement image focus tracking on a photographed object displayed in a first image region in which the focus is located, and implement audio focus tracking on a photographed object displayed in a second image region in which the focus is located. A focus tracking video is obtained through the image focus tracking and the audio focus tracking.

20 Claims, 59 Drawing Sheets

(56) References Cited

U.S. PATENT DOCUMENTS

| | | | |
|---|---|---|---|
| 2011/0050944 A1* | 3/2011 | Nakamura | H04N 9/8211 348/222.1 |
| 2012/0076316 A1 | 3/2012 | Zhu et al. | |
| 2015/0163587 A1 | 6/2015 | Li | |
| 2021/0051274 A1 | 2/2021 | Shanmugam | |
| 2023/0115929 A1 | 4/2023 | Bian et al. | |
| 2023/0199421 A1 | 6/2023 | Qing et al. | |
| 2023/0328429 A1* | 10/2023 | Bian | H04N 21/4788 |

FOREIGN PATENT DOCUMENTS

| | | | | |
|---|---|---|---|---|
| CN | 110248197 A | | 9/2019 | |
| CN | 110557566 A | | 12/2019 | |
| CN | 109413563 B | * | 7/2020 | G06V 40/171 |
| CN | 113556501 A | * | 10/2021 | H04N 23/632 |
| CN | 113676592 A | | 11/2021 | |
| CN | 113727021 A | | 11/2021 | |
| CN | 113766130 A | | 12/2021 | |
| CN | 114286274 A | | 4/2022 | |
| CN | 114363512 A | | 4/2022 | |
| CN | 114554004 A | | 5/2022 | |
| CN | 114556958 A | | 5/2022 | |
| CN | 116055869 A | | 5/2023 | |
| JP | 2011050009 A | * | 3/2011 | H04N 9/8211 |
| WO | 2016082199 A1 | | 6/2016 | |
| WO | 2021175165 A1 | | 9/2021 | |
| WO | 2022042168 A1 | | 3/2022 | |

OTHER PUBLICATIONS

English translation of CN-109413563-B, Zhu, Ke-zhi, 2020 (Year: 2020).*

English translation of CN-113556501-A, Bian, Chao, 2021 (Year: 2021).*

English translation of JP-2011050009-A,, Nakamura Satoshi, 2011 (Year: 2011).*

* cited by examiner

User interface 12

User interface 51

User interface 63

User interface 64

(a)

(b)

User interface 21

User interface 81

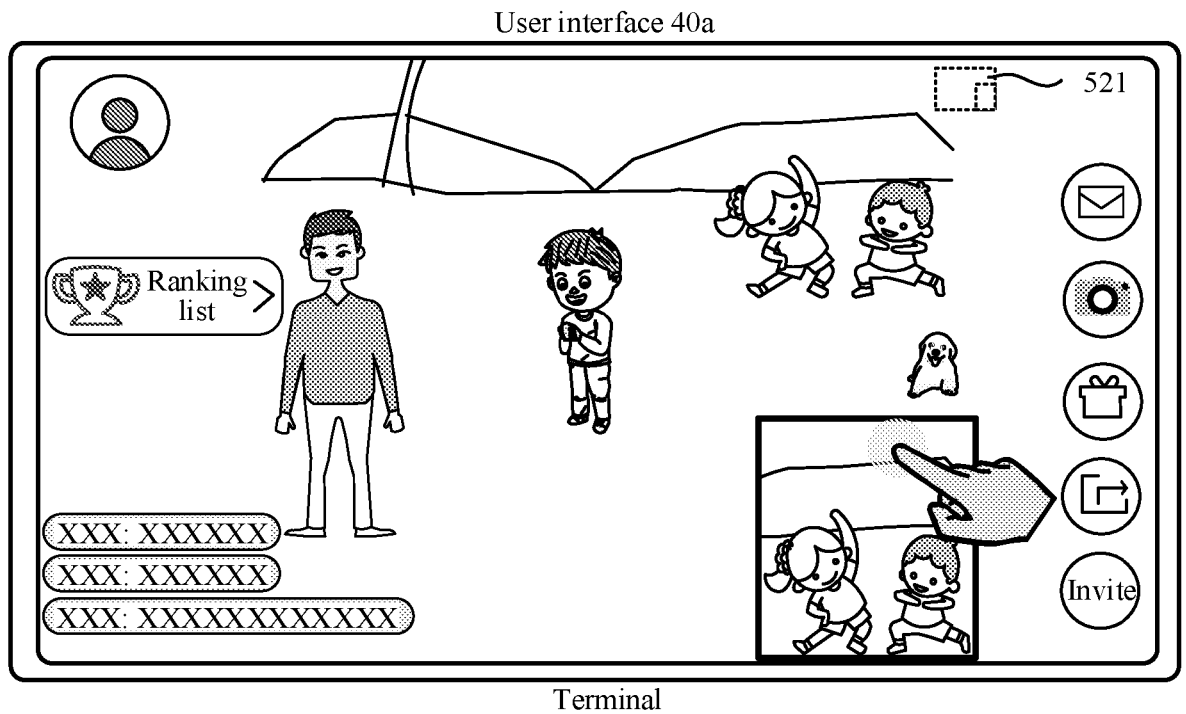
FIG. 25A
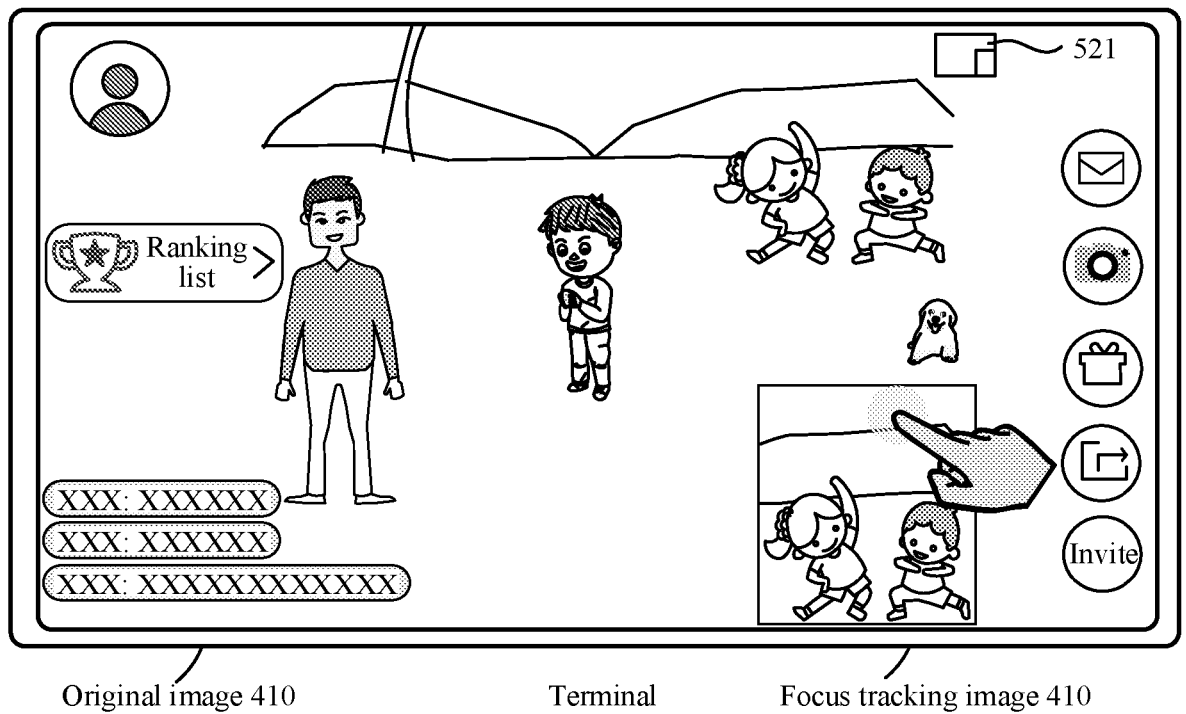
FIG. 25B(1)

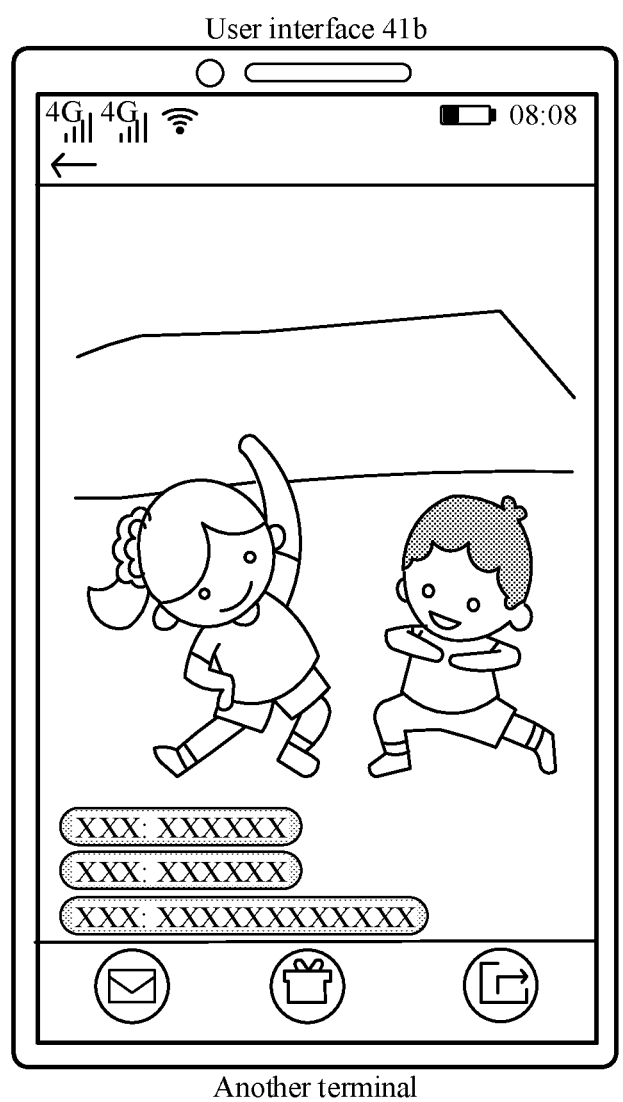
FIG. 25B(2)

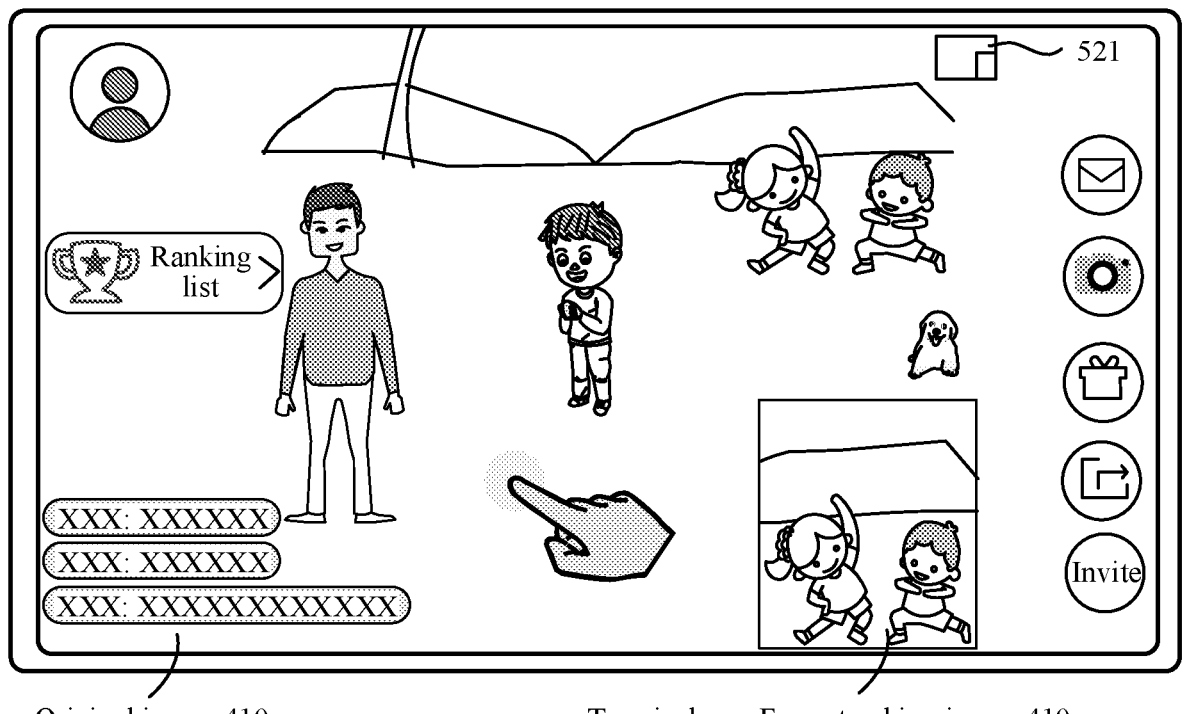
FIG. 25C(1)

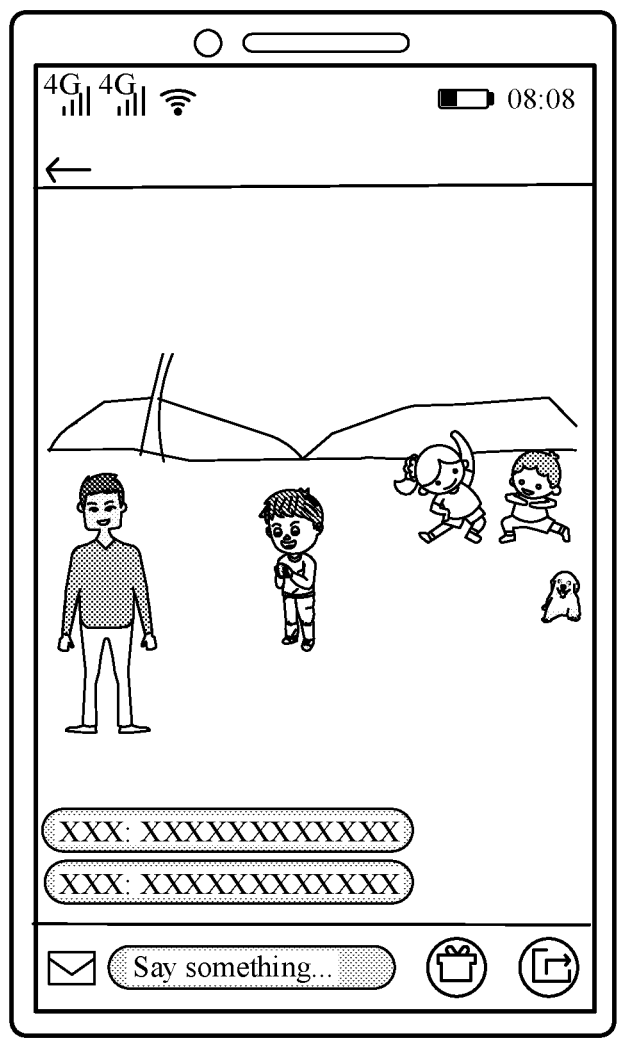
FIG. 25C(2)

VIDEO PROCESSING METHOD AND TERMINAL

CROSS-REFERENCE TO RELATED APPLICATIONS

This application is a national stage of International Application No. PCT/CN2023/092044, filed on May 4, 2023, which claims priority to Chinese Patent Application No. 202210603631.7, filed on May 30, 2022, The disclosures of the aforementioned applications are hereby incorporated by reference in their entireties.

TECHNICAL FIELD

This application relates to the field of terminals and communications technologies, and in particular, to a video processing method and a terminal.

BACKGROUND

With development of terminals, the terminals have increasing functions. For example, a terminal has image zooming and audio zooming functions when recording a video. The image zooming means that when the terminal records the video, a size of a photographed object in an obtained image may be changed by changing a zoom magnification, which may be specifically manifested as follows: Even though a position of the photographed object relative to the terminal does not change, if the zoom magnification becomes larger, in the video, when the terminal displays the photographed object, the photographed object becomes larger, making a user feel that the photographed object is closer to the terminal. If the zoom magnification becomes smaller, in the video, when the terminal displays the photographed object, the photographed object becomes smaller, making the user feel that the photographed object is farther away from the terminal. The audio zooming means that when the terminal records the video, a volume of sound of the photographed object in the obtained image may be changed by changing the zoom magnification, which may be specifically manifested as follows: When the zoom magnification becomes larger, and in the video, the photographed object displayed on the terminal becomes larger, the user feels that the photographed object is closer to the terminal. In this case, the sound of the photographed object displayed on the terminal correspondingly becomes louder. When the zoom magnification becomes smaller, and in the video, the photographed object displayed on the terminal becomes smaller, the user feels that the photographed object is farther away from the terminal. In this case, the sound of the photographed object may correspondingly become lower. In this way, both the image and corresponding audio can be zoomed, and the audio and the image can be zoomed simultaneously, to enhance sensory experience of the user.

However, when the terminal implements simultaneous zooming of the audio and the image, the zoom magnification needs to be adjusted. Usually, the user operates a zoom magnification control to enable the terminal to adjust the zoom magnification. In addition, if the position of the photographed object relative to the terminal changes, when image zooming and audio zooming are performed on the photographed object, the user needs to have good shooting skills to achieve a good effect and obtain a high-quality video.

Therefore, how the terminal further improves video quality to enhance sensory experience of the user when recording the video is a direction of research.

SUMMARY

This application provides a video processing method and a terminal, so that simultaneous focus tracking of audio and an image can be implemented in a video recorded by the terminal.

According to a first aspect, this application provides a video processing method, applied to a terminal. The terminal includes a camera. The method includes: The terminal starts the camera; displays a preview interface, where the preview interface includes a viewfinder frame and a first control; displays, in the viewfinder frame, a first image acquired by the camera, where a first region of the first image includes a first object; detects a first operation on the first control; starts recording and displays a recording interface in response to the first operation, where the recording interface includes the viewfinder frame and a second control; displays a second image in the viewfinder frame, where the second image includes a first region and a second region, and the first region includes a first photographed object; determines the first region as a focus region based on a third operation on the first region; displays a first window, where the first window displays a third image including the first photographed object; at a first moment, displays a fourth image in the viewfinder frame, displays a fifth image in the first window, and obtains first input audio, where both the fourth image and the fifth image include the first photographed object, and the first input audio includes sound corresponding to a first region of the fourth image and sound corresponding to a second region of the fourth image; and detects a fourth operation on the second control, and stops recording and saves a first video and a second video in response to the fourth operation. The first video is a video corresponding to the viewfinder frame, and the second video is a video corresponding to the first window. The second video includes the fifth image and first audio at the first moment, the first audio is audio obtained after the first input audio is processed, and the first audio includes sound obtained by enhancing the sound corresponding to the first region of the fourth image and sound obtained by suppressing the sound corresponding to the second region of the fourth image.

In the foregoing embodiment, if a focus region is determined, when recording a video, the terminal may obtain a focus tracking image based on an image (an original image) acquired by the camera, and implement image focus tracking and audio focus tracking on a photographed object (a target object) on which a focus is located. The image focus tracking on the target object means that an image of a generated first video (a focus tracking video) includes the target object. The audio focus tracking means that sound of the target object in the generated first video is enhanced. When the first video is played, a user can see an image about the target object, and clearly hear the sound of the target object, while other sound is suppressed, and cannot be heard or sounds low. In this way, during video shooting, a close-up video about the target object may be shot for the target object, and during video recording, the user can always preview, on the terminal, the original image and the focus tracking image corresponding to the original image. For an implementation of the images, refer to a description of the specification. The images are displayed in a "picture-in-picture" form, which can improve user experience. In one recording process, when a first video (a focus tracking video) is generated, an original video can also be generated. The original video may be considered as a video obtained in an existing shooting manner. In this way, a plurality of pieces of content can be obtained through one recording process.

With reference to the first aspect, the first window further includes a third control, and the method further includes: when the second operation is not detected, if an operation on the third control is detected, saving the second video in response to the operation on the third control.

In the foregoing embodiment, recording of a focus tracking video may be stopped by using the focus tracking pause control, in addition to the end recording control. In this way, when an original video is recorded, recording of a focus tracking video may be stopped anytime.

With reference to the first aspect, the preview interface further includes a fourth control, and before the detecting a first operation on the first control, the method further includes: when an operation on the fourth control is detected, changing a display status of the fourth control in response to the operation on the fourth control; or when an operation on the fourth control is detected, displaying the fifth control in response to the operation on the fourth control. The fifth control is configured to prompt that the terminal can record the first video, and the fifth control is further configured to detect an operation of controlling the terminal not to start recording of the first video.

In the foregoing embodiment, when a form of the focus tracking control changes, the user may determine that the terminal in this case enters a mode in which a focus tracking video can be recorded (that is, a special recording mode in the specification).

With reference to the first aspect, the fourth control is further included in the recording interface, and when the fourth operation is not detected, after the displaying a first image, and before the displaying the first image and a second image, the method further includes: detecting an operation on the fourth control; and changing the display status of the fourth control in response to the operation on the fourth control.

In the foregoing embodiment, if the mode of recording a focus tracking video is not started before video recording starts, after video recording starts, recording of a focus tracking video can still be started by using the focus tracking control. In this way, a plurality of manners are available for the terminal to trigger shooting of a focus tracking video, thereby improving user experience.

With reference to the first aspect, the determining the first region as a focus region based on a third operation on the first region includes: detecting a sixth operation on the first region in the first image, where the sixth operation acts on a first position in the first region; and setting a pixel at the first position as a focus in response to the sixth operation, and determining the first region in which the focus is located as the focus region.

In the foregoing embodiment, the user may tap a position (the first position) in the original image to determine a focus. For example, if the user wants to perform focus tracking on the first object, the user may tap the first object.

With reference to the first aspect, the terminal processes the first input audio based on the focus region to obtain first target audio and a first noise set, where the first noise set includes T channels of noise, T is an integer greater than or equal to 1, the first target audio includes target sound, and further includes a part of noise, and the target sound is sound corresponding to a region in which the focus is located; performs filtering based on the first target audio and the first noise set, to filter out noise in the first target audio and obtain second target audio; when third target audio is obtained through signal separation based on the input audio, performs audio mixing based on the second target audio and the third target audio, to obtain fourth target audio, where the third target audio includes the target sound; when the third target audio is not obtained through signal separation based on the input audio, uses the second target audio as the fourth target audio; and obtains the first audio based on the fourth target audio.

In the foregoing embodiment, in the process, the terminal may enhance sound of the first object in the focus tracking video, and suppress other sound. N channels of candidate target audio signals obtained through signal separation by using a signal separation algorithm may include M channels of candidate target audio signals that include the target sound but do not include noise or whose noise is suppressed (noise is low), audio mixing may be performed on the M channels of candidate audio signals and a processed target audio signal to obtain an audio-mixed target audio signal, and the audio-mixed target audio signal still includes the target sound but does not include noise or noise is suppressed (noise is low).

With reference to the first aspect, that the terminal processes the first input audio based on the focus region to obtain first target audio and a first noise set specifically includes: The terminal determines, based on the region in which the focus is located, a target sound direction and T noise directions corresponding to the target sound direction, where the target sound direction is a direction corresponding to the target sound, and the noise direction is a direction corresponding to noise; obtains a filter coefficient corresponding to the target sound direction and a filter coefficient corresponding to each noise direction; and obtains the first target audio based on the filter coefficient corresponding to the target sound direction and the input audio, obtains the T channels of noise respectively based on filter coefficients corresponding to the T noise directions and the input audio, and uses the T channels of noise as the first noise set.

With reference to the first aspect, the performing filtering based on the first target audio and the first noise set, to filter out noise in the first target audio and obtain second target audio specifically includes: The terminal filters the first noise set by using the first target audio as a reference, to filter out a part of the target sound included in the first noise set and obtain a second noise set; and filters the first target audio by using the second noise set as a reference, to filter out noise included in the first target audio and obtain the second target audio.

In the foregoing embodiment, in this way, the noise in the first target audio may be filtered out, and the obtained second target audio includes the sound of the first user as much as possible.

With reference to the first aspect, the performing filtering based on the first target audio and the first noise set, to filter out noise in the first target audio and obtain second target audio specifically includes: The terminal filters the first noise set by using the first target audio as a reference, to filter out the target sound included in the first noise set and obtain a second noise set; and filters the first target audio by using the second noise set as a reference, to filter out noise included in the first target audio and obtain a filtered first target audio. The terminal further filters the filtered first target audio based on a filtered first noise set, to filter out noise included in the filtered first target audio and obtain the second target audio. The filtered first noise set includes at least one channel of filtered noise, including a filtered first channel of noise, the filtered first channel of noise is obtained by filtering a first channel of noise based on the first target audio and filtering out the target sound included in the first channel of noise, and the first channel of noise is a channel of noise in the first noise set.

In the foregoing embodiment, in this way, the noise in the first target audio may be filtered out, and the obtained second target audio includes the sound of the first user as much as possible. Filtering is performed twice in different manners, so that in different dimensions, the second target audio can include the sound of the first user as much as possible, and a calculation result is more accurate.

With reference to the first aspect, when the third target audio is obtained through signal separation based on the input audio, the method specifically includes: The terminal performs signal separation on the input audio, to obtain N channels of candidate audio, where N is a quantity of microphones of the terminal; respectively determines correlations between the second target audio and different candidate audio, and determines M channels of candidate audio whose correlations are greater than a correlation threshold, where M is an integer less than or equal to N and greater than 0; and when M is greater than or equal to 2, performs audio mixing on the M channels of candidate audio to obtain the third target audio; or when M is equal to 1, uses the M channel of candidate audio as the third target audio.

In the foregoing embodiment, an error may occur when the terminal obtains the processed target audio signal. For example, noise is used as the target sound, or the target sound is filtered out as noise. In this case, audio mixing may be performed on the M channels of candidate target audio signals and the processed target audio signal, to correct a result caused by the error.

With reference to the first aspect, the performing audio mixing based on the second target audio and the third target audio, to obtain fourth target audio specifically includes: The terminal determines a correlation between the second target audio and the third target audio; determines an audio mixing ratio based on the correlation between the second target audio and the third target audio; and performs audio mixing on the second target audio and the third target audio based on the audio mixing ratio, to obtain the fourth target audio.

In the foregoing embodiment, the correlation is determined to ensure that both the second target audio and the third target audio are audio from a direction in which the target object is located, which can improve accuracy of audio in a final obtained focus tracking video. In this way, sound in the audio has a higher probability of being sounded as audio from the direction in which the target object is located.

With reference to the first aspect, the obtaining the first audio based on the fourth target audio specifically includes: using the fourth target audio as the first audio.

With reference to the first aspect, the obtaining the first audio based on the fourth target audio specifically includes: enhancing the fourth target audio to obtain an enhanced fourth target audio, and using the enhanced fourth target audio as the first audio.

In the foregoing embodiment, the audio in the focus tracking video is further enhanced herein, because an image in the focus tracking video may be manifested as that the photographed object is closer to the terminal when the image is played than when the image is recorded, so that the audio in the focus tracking video may be enhanced to adapt to the image change.

With reference to the first aspect, the first target audio includes a first frame of target audio, the first frame of target audio is a $k^{th}$ frame of target audio in the first target audio, the first noise set includes a first frame of noise set, each frame of noise in the first frame of noise set is a $k^{th}$ frame of noise in a different channel of noise in the first noise set, and the first frame of noise set includes a $k^{th}$ frame of noise in each channel of noise in the first noise set. That the terminal filters the first noise set by using the first target audio as a reference, to filter out the target sound included in the first noise set includes: The terminal obtains a first filter; when the first frame of target audio includes the target sound, updates the first filter, and uses an updated first filter as the first filter; and filters out, based on the first filter by using the first frame of target audio as a reference, the target sound included in each frame of noise in the first frame of noise set. The filtering the first target audio by using the second noise set as a reference, to filter out noise included in the first target audio includes: The terminal obtains a second filter; when the first frame of target audio does not include the target sound, updates the second filter, and uses an updated second filter as the second filter; and filters out noise in the first frame of target audio based on the second filter by using the first frame of noise set as a reference.

In the foregoing embodiment, a purpose of filtering out, by the terminal by using the to-be-processed target audio signal as a reference, the target sound included in the to-be-processed noise signal set to obtain the reference noise signal set is to filter out the target sound in the reference noise signal set, which may be understood as reducing the target sound or not including the target sound but including only noise. In this way, when a to-be-processed target audio signal is filtered by using the reference noise signal set as a reference, to filter out noise included in the to-be-processed target audio signal, a probability of the following error may be reduced: the target sound in the to-be-processed target audio signal is recognized as noise and is filtered out, resulting in that not only the noise in the to-be-processed target audio signal is filtered out, but the target sound is also filtered out. Because the target sound in the reference noise signal set has been filtered out herein, which may be understood as that the target sound is reduced or the target sound is not included but only noise is included, when the noise in the to-be-processed target audio signal is filtered out by using the reference noise signal set as a reference, a probability that the target sound in the to-be-processed target audio signal is also filtered out can be reduced, and filtering accuracy can be improved.

With reference to the first aspect, the filter coefficient corresponding to the target sound direction and the filter coefficient corresponding to each noise direction are preset in the terminal. In the filter coefficient corresponding to the target sound direction, a coefficient corresponding to sound in the target sound direction is 1, indicating that the sound in the target sound direction in the input audio is not suppressed. A coefficient corresponding to sound closer to the target sound direction is closer to 1, and a suppression level decreases gradually. The filter coefficients corresponding to the noise directions include a filter coefficient corresponding to a first noise direction, and the first noise direction is one of the T noise directions corresponding to the target sound direction. In the filter coefficient corresponding to the first noise direction, a coefficient corresponding to sound in the first noise direction is 1, indicating that the sound in the first noise direction in the input audio is not suppressed. A coefficient corresponding to sound closer to the first noise direction is closer to 1, and a suppression level decreases gradually.

With reference to the first aspect, after the saving a first video, the method further includes:

The terminal displays a first interface. The first interface includes a first display frame, where the first display frame includes a part of or all content of a frame of image in the first video; and further includes a first indicator, where the first indicator is configured to indicate that the first video is a focus tracking video.

With reference to the first aspect, the first video includes the fourth image and the first input audio at the first moment.

According to a second aspect, this application provides an electronic device. The electronic device includes: one or more processors and a memory. The memory is coupled to the one or more processors, the memory is configured to store computer program code, the computer program code includes computer instructions, and the one or more processors invoke the computer instructions to enable the electronic device to perform:

In the foregoing embodiment, if a focus is determined, when recording a video, the terminal may obtain a focus tracking image based on an image (an original image) acquired by the camera, and implement image focus tracking and audio focus tracking on a photographed object (a target object) on which a focus is located. The image focus tracking on the target object means that an image of a generated first video (a focus tracking video) includes the target object. The audio focus tracking means that sound of the target object in the generated first video is enhanced. When the first video is played, a user can see an image about the target object, and clearly hear the sound of the target object, while other sound is suppressed, and cannot be heard or sounds low. In this way, during video shooting, a close-up video about the target object may be shot for the target object, and during video recording, the user can always preview, on the terminal, the original image and the focus tracking image corresponding to the original image. For an implementation of the images, refer to a description of the specification. The images are displayed in a "picture-in-picture" form, which can improve user experience. In one recording process, when a first video (a focus tracking video) is generated, an original video can also be generated. The original video may be considered as a video obtained in an existing shooting manner. In this way, a plurality of pieces of content can be obtained through one recording process.

According to a third aspect, this application provides an electronic device. The electronic device includes: one or more processors and a memory. The memory is coupled to the one or more processors, the memory is configured to store computer program code, the computer program code includes computer instructions, and the one or more processors invoke the computer instructions to enable the electronic device to perform the method described in the first aspect or any implementation of the first aspect.

In the foregoing embodiment, if a focus is determined, when recording a video, the terminal may obtain a focus tracking image based on an image (an original image) acquired by the camera, and implement image focus tracking and audio focus tracking on a photographed object (a target object) on which a focus is located. The image focus tracking on the target object means that an image of a generated first video (a focus tracking video) includes the target object. The audio focus tracking means that sound of the target object in the generated first video is enhanced. When the first video is played, a user can see an image about the target object, and clearly hear the sound of the target object, while other sound is suppressed, and cannot be heard or sounds low. In this way, during video shooting, a close-up video about the target object may be shot for the target object, and during video recording, the user can always preview, on the terminal, the original image and the focus tracking image corresponding to the original image. For an implementation of the images, refer to a description of the specification. The images are displayed in a "picture-in-picture" form, which can improve user experience. In one recording process, when a first video (a focus tracking video) is generated, an original video can also be generated. The original video may be considered as a video obtained in an existing shooting manner. In this way, a plurality of pieces of content can be obtained through one recording process.

According to a fourth aspect, this application provides a chip system. The chip system is applied to an electronic device, the chip system includes one or more processors, and the processor is configured to invoke computer instructions to enable the electronic device to perform the method described in the first aspect or any implementation of the first aspect.

In the foregoing embodiment, if a focus is determined, when recording a video, the terminal may obtain a focus tracking image based on an image (an original image) acquired by the camera, and implement image focus tracking and audio focus tracking on a photographed object (a target object) on which a focus is located. The image focus tracking on the target object means that an image of a generated first video (a focus tracking video) includes the target object. The audio focus tracking means that sound of the target object in the generated first video is enhanced. When the first video is played, a user can see an image about the target object, and clearly hear the sound of the target object, while other sound is suppressed, and cannot be heard or sounds low. In this way, during video shooting, a close-up video about the target object may be shot for the target object, and during video recording, the user can always preview, on the terminal, the original image and the focus tracking image corresponding to the original image. For an implementation of the images, refer to a description of the specification. The images are displayed in a "picture-in-picture" form, which can improve user experience. In one recording process, when a first video (a focus tracking video) is generated, an original video can also be generated. The original video may be considered as a video obtained in an existing shooting manner. In this way, a plurality of pieces of content can be obtained through one recording process.

According to a fifth aspect, this application provides a computer program product including instructions. When the computer program product runs on an electronic device, the electronic device is enabled to perform the method described in the first aspect or any implementation of the first aspect.

In the foregoing embodiment, if a focus is determined, when recording a video, the terminal may obtain a focus tracking image based on an image (an original image) acquired by the camera, and implement image focus tracking and audio focus tracking on a photographed object (a target object) on which a focus is located. The image focus tracking on the target object means that an image of a generated first video (a focus tracking video) includes the target object. The audio focus tracking means that sound of the target object in the generated first video is enhanced. When the first video is played, a user can see an image about the target object, and clearly hear the sound of the target object, while other sound is suppressed, and cannot be heard or sounds low. In this way, during video shooting, a close-up video about the target object may be shot for the target object, and during video recording, the user can always preview, on the terminal, the original image and the focus tracking image corresponding to the original image. For an implementation of the images, refer to a description of the specification. The images are displayed in a "picture-in-picture" form, which can improve user experience. In one recording process, when a first video (a focus tracking video) is generated, an original video can also be generated. The original video may be considered as a video obtained in an existing shooting manner. In this way, a plurality of pieces of content can be obtained through one recording process.

According to a sixth aspect, this application provides a computer-readable storage medium, includes instructions. When the instructions are run on an electronic device, the electronic device is enabled to perform the method described in the first aspect or any implementation of the first aspect.

In the foregoing embodiment, if a focus is determined, when recording a video, the terminal may obtain a focus tracking image based on an image (an original image) acquired by the camera, and implement image focus tracking and audio focus tracking on a photographed object (a target object) on which a focus is located. The image focus tracking on the target object means that an image of a generated first video (a focus tracking video) includes the target object. The audio focus tracking means that sound of the target object in the generated first video is enhanced. When the first video is played, a user can see an image about the target object, and clearly hear the sound of the target object, while other sound is suppressed, and cannot be heard or sounds low. In this way, during video shooting, a close-up video about the target object may be shot for the target object, and during video recording, the user can always preview, on the terminal, the original image and the focus tracking image corresponding to the original image. For an implementation of the images, refer to a description of the specification. The images are displayed in a "picture-in-picture" form, which can improve user experience. In one recording process, when a first video (a focus tracking video) is generated, an original video can also be generated. The original video may be considered as a video obtained in an existing shooting manner. In this way, a plurality of pieces of content can be obtained through one recording process.

BRIEF DESCRIPTION OF DRAWINGS

FIG. 25A to FIG. 25C(2) show example user interfaces in Scenario 3; and

DESCRIPTION OF EMBODIMENTS

Terms used in the following embodiments of this application are merely for a purpose of describing specific embodiments, but are not intended to limit this application. As used in the specification and appended claims of this application, singular expressions "a", "an", "the", "said", and "this" are intended to also include plural expressions unless a context clearly indicates otherwise. It should be further understood that the term "and/or" used in this application refers to and includes any or all possible combinations of one or more items listed.

In the following description, the terms "first" and "second" are merely intended for a purpose of description, and shall not be interpreted as indicating or implying relative importance or implying a quantity of indicated technical features. Therefore, a feature defined with "first" or "second" may explicitly or implicitly include one or more such features. In descriptions of embodiments of this application, unless otherwise stated, "a plurality of" means two or more than two.

In a solution, when recording a video, a terminal may implement image zooming and audio zooming by increasing a zoom magnification, so that in the recorded video, a photographed object stands out in an image, and sound of the photographed object becomes louder in audio.

FIG. 1A to FIG. 1D show a group of example user interfaces when a terminal implements image zooming and audio zooming.

Figure 1A:
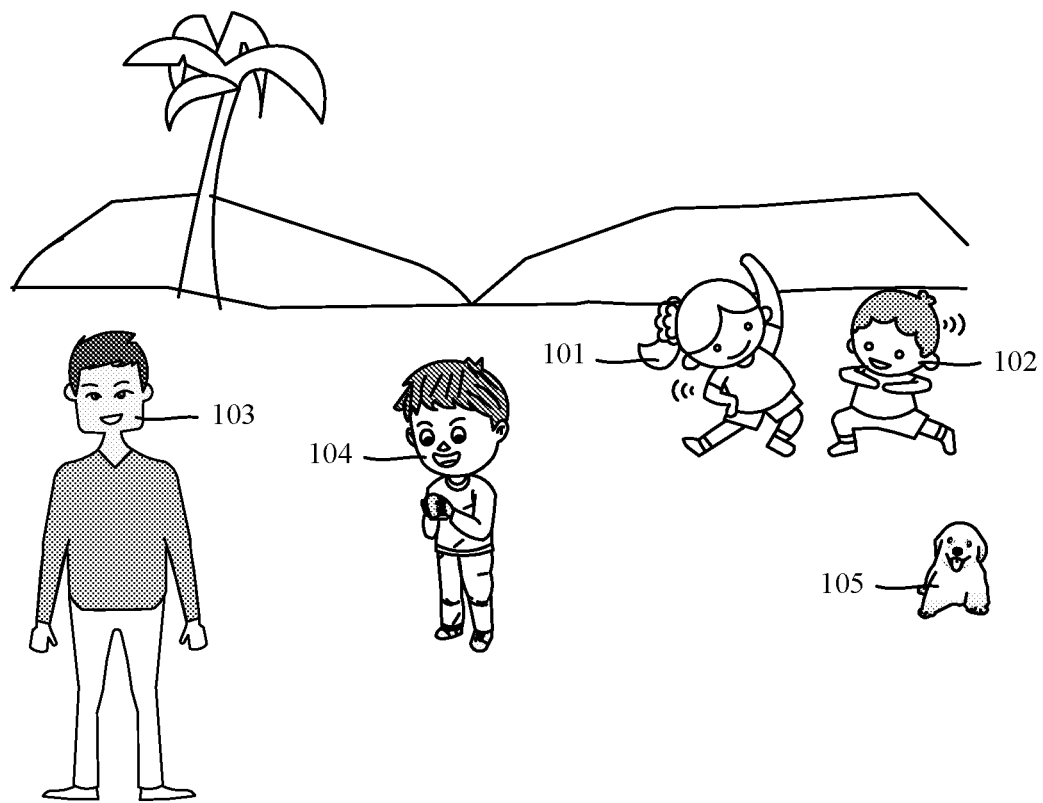
FIG. 1A to FIG. 1D show a group of example user interfaces when a terminal implements image zooming and audio zooming.
Figure 1A:
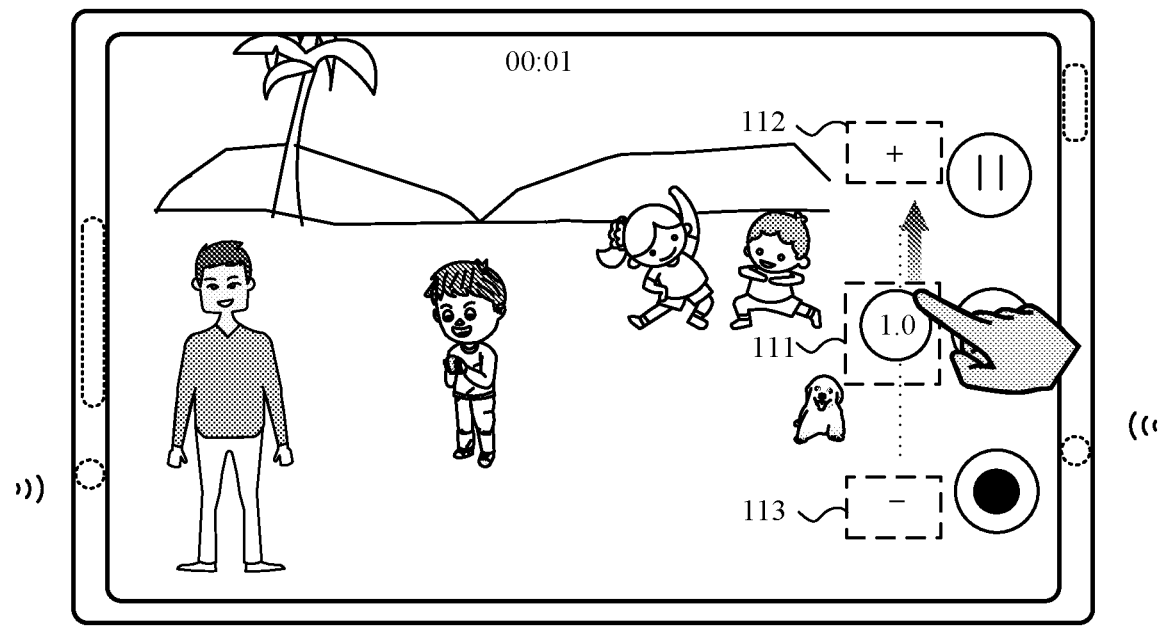
Figure 1B:
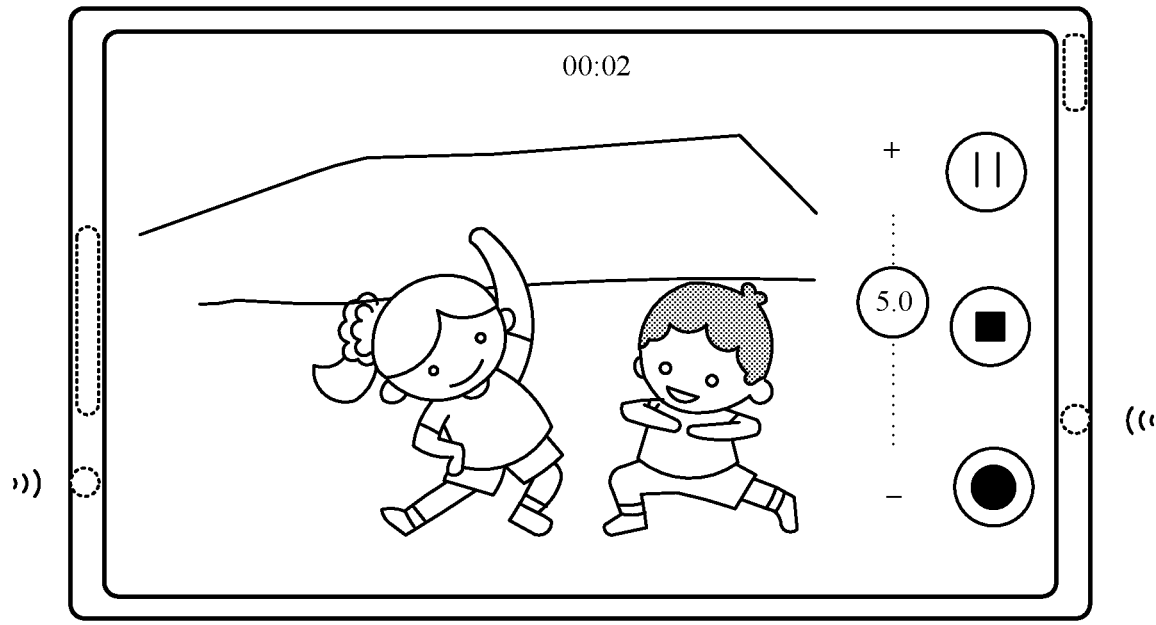
Figure 1C:
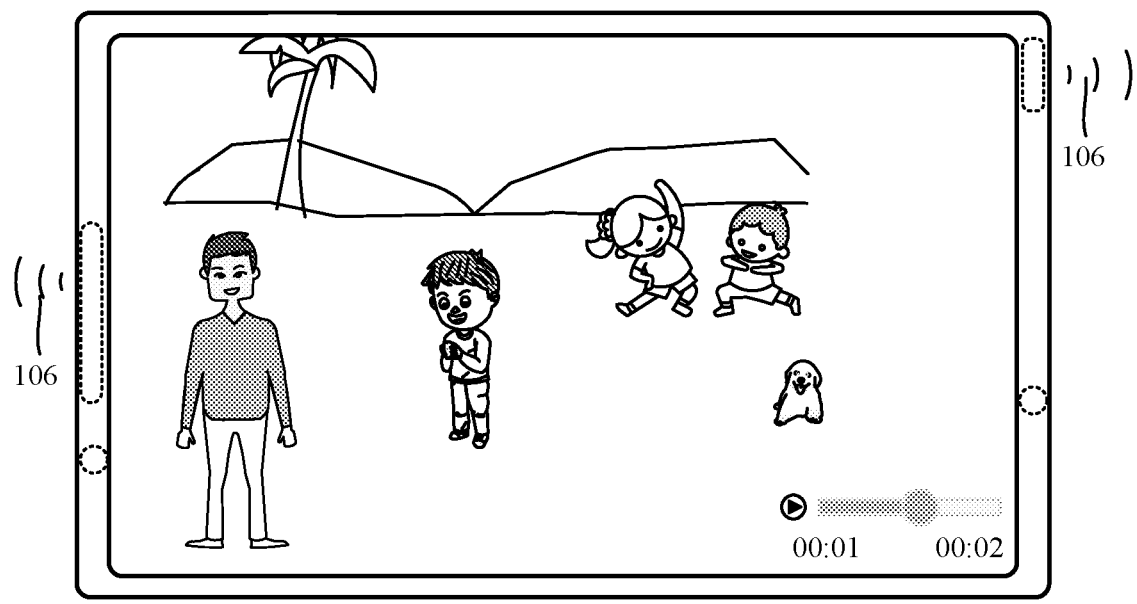
Figure 1D:
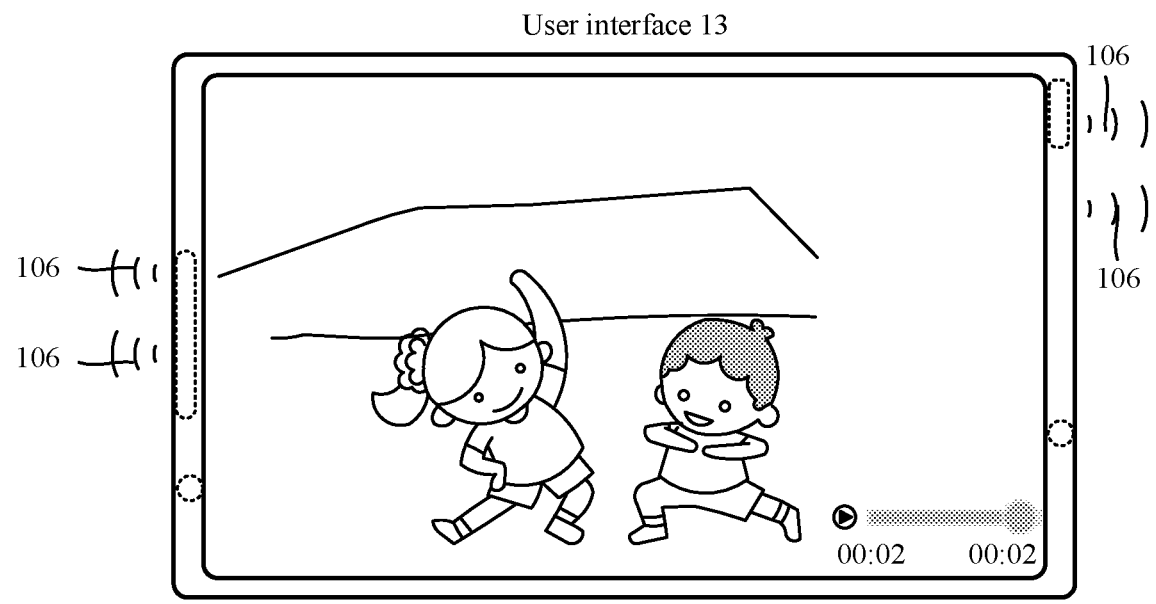

FIG. 1A and FIG. 1B show parts of a process in which the terminal shoots a video. FIG. 1C and FIG. 1D show parts of a process in which the terminal plays the video. Image zooming and audio zooming may be reflected in the video.

In FIG. 1A to FIG. 1D, the terminal records the video by using a rear-facing camera. In this case, photographed objects may include a photographed object 101 (a little girl), a photographed object 102 (a little boy A, a little boy in FIG. 1A who is closer to the little girl), a photographed object 103 (a man), a photographed object 104 (a little boy B, a little boy in FIG. 1A who is closer to the man), a photographed object 105 (a puppy), and the like.

As shown in FIG. 1A, a user interface 10 is a recording interface when the terminal records the video. In this case, the terminal obtains an image corresponding to a first second and an audio signal corresponding to the first second in the video. The user interface 10 may include a zoom magnification control 111, a zoom magnification increase control 112, and a zoom magnification decrease control 113. The zoom magnification control 111 is configured to receive a zoom magnification change instruction and prompt a user of a current zoom magnification of the terminal. For example, 1.0 indicates that the zoom magnification is a 1× zoom magnification, and 5.0 indicates that the zoom magnification is a 5× zoom magnification. The 5× zoom magnification is greater than the 1× zoom magnification. In this case, it can be learned from the zoom magnification control 111 that, when the video is recorded, the image corresponding to the first second is shot at the 1× zoom magnification, and the image includes the photographed object 101 to the photographed object 105. In response to an operation of sliding upward the zoom magnification control 111 by the user, the terminal may increase the zoom magnification when recording the video, for example, increase the zoom magnification from the 1× zoom magnification to the 5× zoom magnification. When the zoom magnification is the 5× zoom magnification, the terminal may display a user interface 11 shown in FIG. 1B.

As shown in FIG. 1B, the user interface 11 is another recording interface when the terminal records the video. In this case, the terminal obtains an image corresponding to a second and an audio signal corresponding to the second second in the video. In this case, positions of all the photographed objects relative to the terminal do not change. However, because the zoom magnification increases from the 1× zoom magnification to the 5× zoom magnification, the terminal may perform image zooming. Compared with the image in FIG. 1A that is shot by the terminal at the 1× zoom magnification, it can be learned that, the image displayed in the user interface 11 includes only the photographed object 101 (the little girl) and the photographed object 102 (the little boy A), and the photographed object 101 and the photographed object 102 become larger in the image, presenting a feeling of being closer to the terminal. After the zoom magnification increases, the terminal may further perform audio zooming, for example, perform audio zooming on the audio signal corresponding to the second. In this way, both the image corresponding to the second and the audio signal corresponding to the second in the video can be zoomed.

It should be understood that, FIG. TA and FIG. 1B show parts of the video shooting process, and in this case, the terminal shoots a video whose duration is two seconds. Then, the terminal may play the video. In the played video, both an image and a corresponding audio signal can be zoomed, thereby bringing an effect of simultaneous zooming of the audio signal and the image, and enhancing sensory experience of the user. For a playing process, refer to the following description.

In FIG. 1C and FIG. 1D, icons 106 represent sound of the photographed object 101 (the little girl) and the photographed object 102 (the little boy A) in the video played on the terminal. More icons 106 indicate louder sound of the photographed object 101 (the little girl) and the photographed object 102 (the little boy A) in the video played on the terminal.

As shown in FIG. 1C and FIG. 1D, a user interface 12 and a user interface 13 are play interfaces when the terminal respectively plays the video shot in FIG. TA and FIG. 1B. The user interface 12 displays the image shot at the 1× zoom magnification, and the user interface 13 displays the image shot at the 5× zoom magnification. It can be learned that, although the positions of the photographed object 101 (the little girl) and the photographed object 102 (the little boy A) relative to the terminal do not change, in the played video, the photographed object 101 (the little girl) and the photographed object 102 (the little boy A) may present a feeling of being closer to the terminal, and the sound of the photographed object 101 (the little girl) and the photographed object 102 (the little boy A) correspondingly becomes louder.

However, when the terminal implements simultaneous zooming of the audio and the image, the zoom magnification needs to be adjusted. Usually, the user operates the zoom magnification control to enable the terminal to adjust the zoom magnification. It may be understood that, if a position of a photographed object relative to the terminal changes, when image zooming and audio zooming are performed on the photographed object, the user needs to have good shooting skills to obtain a high-quality video in which an image of the photographed object and corresponding sound stand out.

Embodiments of this application provide a video processing method. When recording a video, a terminal may shoot (acquire) an image by using a camera (the image shot by using the camera is referred to as an original image below), and determine a focus of the shooting based on the original image. Then, the terminal may implement image focus tracking on a photographed object displayed in a first image region in which the focus is located, and implement audio focus tracking on a photographed object displayed in a second image region in which the focus is located. The original image may also be understood as an image obtained when the terminal records a video based on a conventional processing procedure. In a video obtained by the terminal by using the method, image focus tracking and audio focus tracking may be implemented. The video in which image focus tracking and audio focus tracking are implemented may be referred to as a focus tracking video below. The first image region in which the focus is located may be the same as or different from the second image region in which the focus is located. Content in the first image region and the second image region is less than content in the original image. For a process in which the terminal generates the focus tracking video through image focus tracking and audio focus tracking, refer to the following descriptions of FIG. 5A to FIG. 5M. Details are not described herein.

The following provides related descriptions on image focus tracking and audio focus tracking.

Image focus tracking: A terminal generates a frame of focus tracking image based on a focus. Content displayed in the focus tracking image is content displayed in a first image region in which the focus in a frame of original image is located (which may be described below as that the frame of original image corresponds to the frame of focus tracking image). When a position of the focus in a next frame of original image changes, content displayed in a next frame of focus tracking image generated by the terminal still includes content displayed in a first image region in which the focus in the next frame of original image is located. That is, for an $i^{th}$ frame of original image shot by the terminal, the terminal may determine a focus based on the $i^{th}$ frame of original image, and then determine, based on the focus, a first image region in which the focus in the $i^{th}$ frame of original image is located. Then, a frame of focus tracking image (a focus tracking image corresponding to the $i^{th}$ frame of original image) is generated based on content in the first image region in the $i^{th}$ frame of original image, and the frame of focus tracking image includes the content in the first image region in the $i^{th}$ frame of original image. For a frame of original image (denoted as a $j^{th}$ frame of original image) shot after the $i^{th}$ frame of original image, the terminal may continue to determine a first image region in which the focus in the $j^{th}$ frame of original image is located, and then generate a frame of focus tracking image (a focus tracking image corresponding to the $j^{th}$ frame of original image) based on content in the first image region in the $j^{th}$ frame of original image. The frame of focus tracking image includes the content in the first image region in the $j^{th}$ frame of original image. The $j^{th}$ frame of original image is any frame of original image that is shot after the $i^{th}$ frame of original image and in which the focus does not change. The "focus does not change" means that when shooting the $j^{th}$ frame of original image, the terminal does not redetermine a focus. It should be understood that, in the $i^{th}$ frame of original image and the $j^{th}$ frame of original image, the focus may have different positions, but the focus indicates same content. Then, the terminal may generate an original video based on a plurality of frames of original images, and generate a focus tracking video based on a plurality of frames of focus tracking images. Any frame of focus tracking image in the focus tracking video includes content displayed in a first image region in which the focus is located. An audio signal corresponding to each frame of focus tracking image in the focus tracking video may be obtained through audio focus tracking. For a detailed description of audio focus tracking, refer to the following content. Details are not described herein.

A manner in which the terminal determines, based on the focus, the first image region in which the focus in the original image is located is as follows: After determining a position of the focus in the original image, the terminal determines the first image region by using the position of the focus as a reference. The first image region includes the focus, and distances between the focus and four sides of the first image region may be the same or may be different. The first image region is a part of the original image.

The focus may be understood as a focal point (for example, a focus B below) selected by a user in an original image after a camera application enters a focus tracking mode, or a focal point or a focusing point determined by the terminal according to a preset rule (for example, obtained after semantic analysis in a conventional technology, or based on a proportion of an area of an object in an image).

Figure 2:
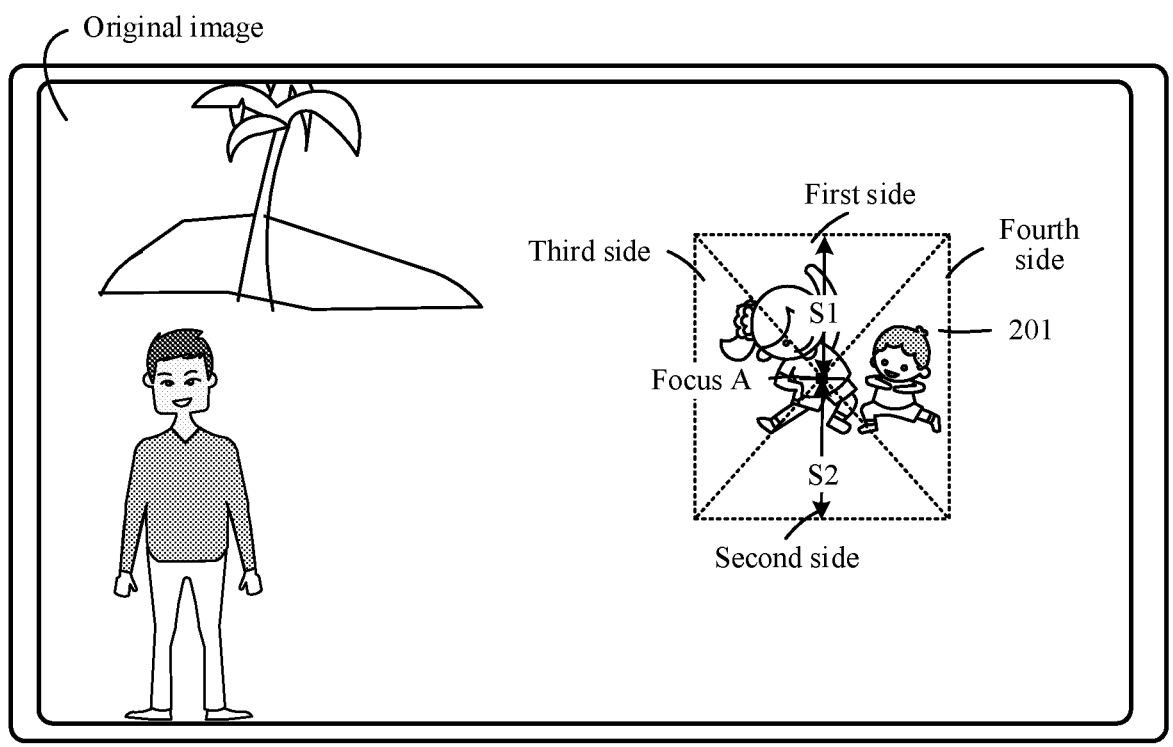
FIG. 2 is a schematic diagram of a focus and a first image region in a case.

FIG. 2 is a schematic diagram of a focus and a first image region in a case.

As shown in FIG. 2, the focus may be a focus A in an original image. The terminal may determine the first image region by using the focus A as a center. For example, the first image region may be a region 201. The first image region includes a first side, a second side, a third side, and a fourth side, and is an image region bounded by the first side, the second side, the third side, and the fourth side. Distances from the focus A to the first side and the second side are equal, and distances from the focus A to the third side and the fourth side are equal. For example, the distance from the focus to the first side is S1, and the distance from the focus to the second side is S2.

In some possible cases, a size of the first image region may change with a focal length used when the terminal shoots the original image. For example, a larger focal length indicates a larger first image region, and a smaller focal length indicates a smaller first image region.

Audio focus tracking: When generating a frame of focus tracking image based on a frame of original image and a focus, the terminal may also generate an audio signal corresponding to the frame of focus tracking image. The audio signal includes sound of a photographed object displayed in a second image region in which the focus in the frame of original image is located, sound of another photographed object in the audio signal corresponding to the frame of focus tracking image is filtered out, and when the filtering is completed, it may be understood as not including the sound of the another photographed object. When a position of the focus in a next frame of original image changes, an audio signal corresponding to a next frame of focus tracking image still includes sound of a photographed object displayed in a second image region in which the focus in the next frame of original image is located, sound of another photographed object in the audio signal corresponding to the next frame of focus tracking image is filtered out, and when the filtering is completed, it may be understood as not including the sound of the another photographed object. The another photographed object is a photographed object included in another region other than the second image region in the original image, and the another photographed object is not included in the second image region.

Figure 3:
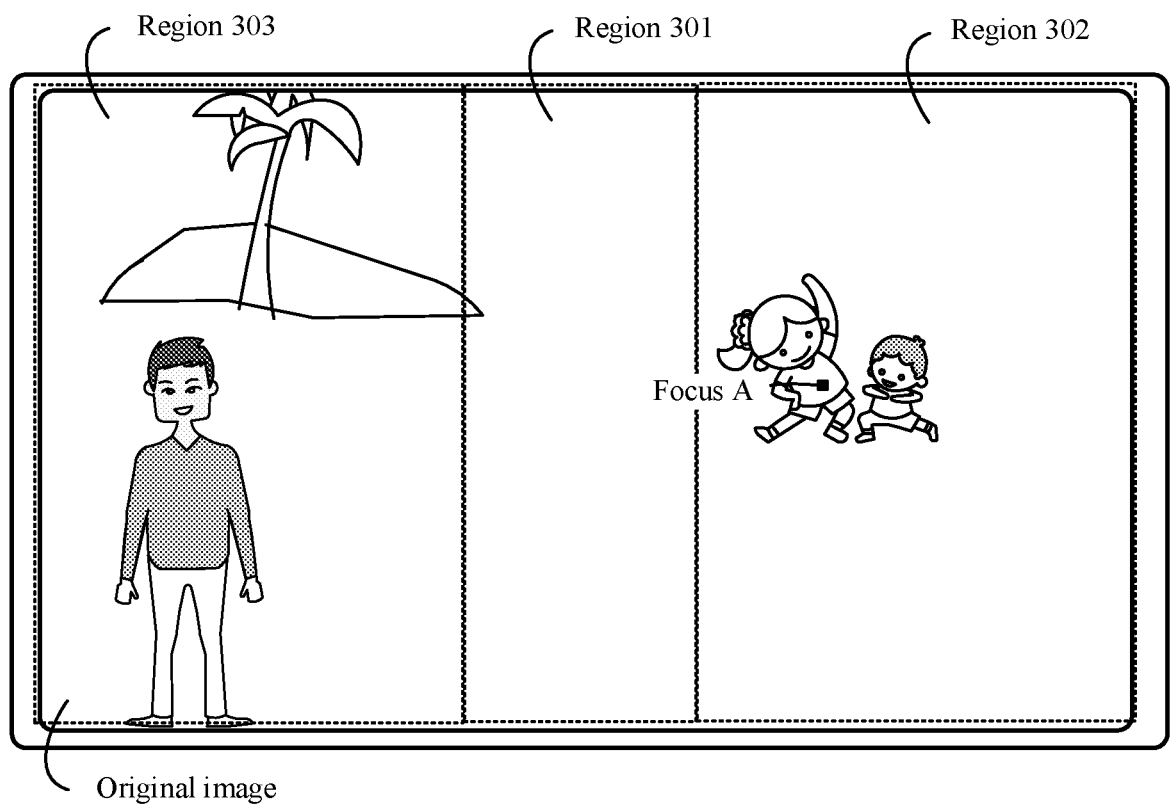
FIG. 3 is a schematic diagram of a middle region, a rightward region, and a leftward region of an original image.

Optionally, a scenario of FIG. 3 is used as an example. During focus tracking on a focus A, when the focus A moves from a region 302 to a region 301, and then moves to a region 303, real-time sound is acquired during shooting, and saved audio in a video may be processed audio, to implement an audio focus tracking effect. When the focus A is in the region 302, sound in the regions 301 and 303 is suppressed, and sound in the region 302 is enhanced. When the focus A moves to the region 301, sound in the regions 302 and 303 is suppressed, and sound in the region 301 is enhanced. When the focus A moves to the region 303, sound in the regions 301 and 302 is suppressed, and sound in the region 303 is enhanced.

The suppression includes filtering out sound energy, reducing sound energy, or reducing sound energy ratio (for example, keeping specific sound energy unchanged while enhancing other sound energy, to present a suppression effect). The enhancement includes increasing sound energy or increasing sound energy ratio (for example, increasing specific sound energy while keeping other sound energy unchanged, to present an enhancement effect).

It can be learned based on the foregoing content that, the terminal may generate a plurality of frames of focus tracking images through image focus tracking, and may generate, through audio focus tracking, audio signals corresponding to the plurality of frames of focus tracking images. In some possible cases, the terminal may generate a focus tracking video based on the plurality of frames of focus tracking images and the audio signals corresponding to the plurality of frames of focus tracking images. An audio signal corresponding to any frame of focus tracking image in the focus tracking video may include sound of a photographed object displayed in a second image region in which a focus is located, sound of another photographed object is filtered out, and when the filtering is completed, it may be understood as not including the sound of the another photographed object. In addition, the terminal may further generate an original video based on a plurality of frames of original images and audio signals corresponding to the plurality of frames of original images. An audio signal corresponding to any frame of original image in the original video may include sound of a photographed object displayed in the original image. The original video may be understood as a video recorded based on a conventional processing procedure.

Sound included in an audio signal corresponding to any frame of focus tracking image may be referred to as target sound. A direction in which a photographed object generating the target sound is located is referred to as a target sound direction. The target sound direction is used to indicate whether a direction of the photographed object emitting the target sound is a leftward direction, a rightward direction, or a middle direction in front of the terminal. The target sound direction corresponds to the second image region. If the second image region is a middle region of the original image, the target sound direction is a middle direction in front of the terminal. If the second image region is a rightward region in the original image, the target sound direction is a rightward direction in front of the terminal. If the second image region is a leftward region in the original image, the target sound direction is a leftward direction in front of the terminal.

It should be understood that, the "leftward", "rightward", or "middle" mentioned in this application is merely a relative position relationship, rather than an absolute definition. For example, if the "leftward" is a side in a clockwise direction in right front of the terminal, the "rightward" is a side in a counterclockwise direction in right front of the terminal. If the "leftward" is a side in a counterclockwise direction in right front of the terminal, the "rightward" is a side in a clockwise direction in right front of the terminal.

The following describes the middle region, the rightward region, and the leftward region of the original image and the correspondence between the second image region and the target sound direction.

FIG. 3 is a schematic diagram of the middle region, the rightward region, and the leftward region of the original image.

As shown in FIG. 3, the terminal may divide the original image into three regions: a region 301, a region 302, and a region 303. The region 301 is the middle region of the original image, the region 302 is the rightward region in the original image, and the region 303 is the leftward region in the original image. The focus A is in the region 302 (the rightward region). In this case, the region 302 is the second image region in which the focus in the original image is located.

It can be learned based on the foregoing content that, if the focus is in the middle region of the original image, the second image region is the middle region of the original image. If the focus is in the rightward region in the original image, the second image region is the rightward region in the original image. If the focus is in the leftward region in the original image, the second image region is the leftward region in the original image.

Figure 4:
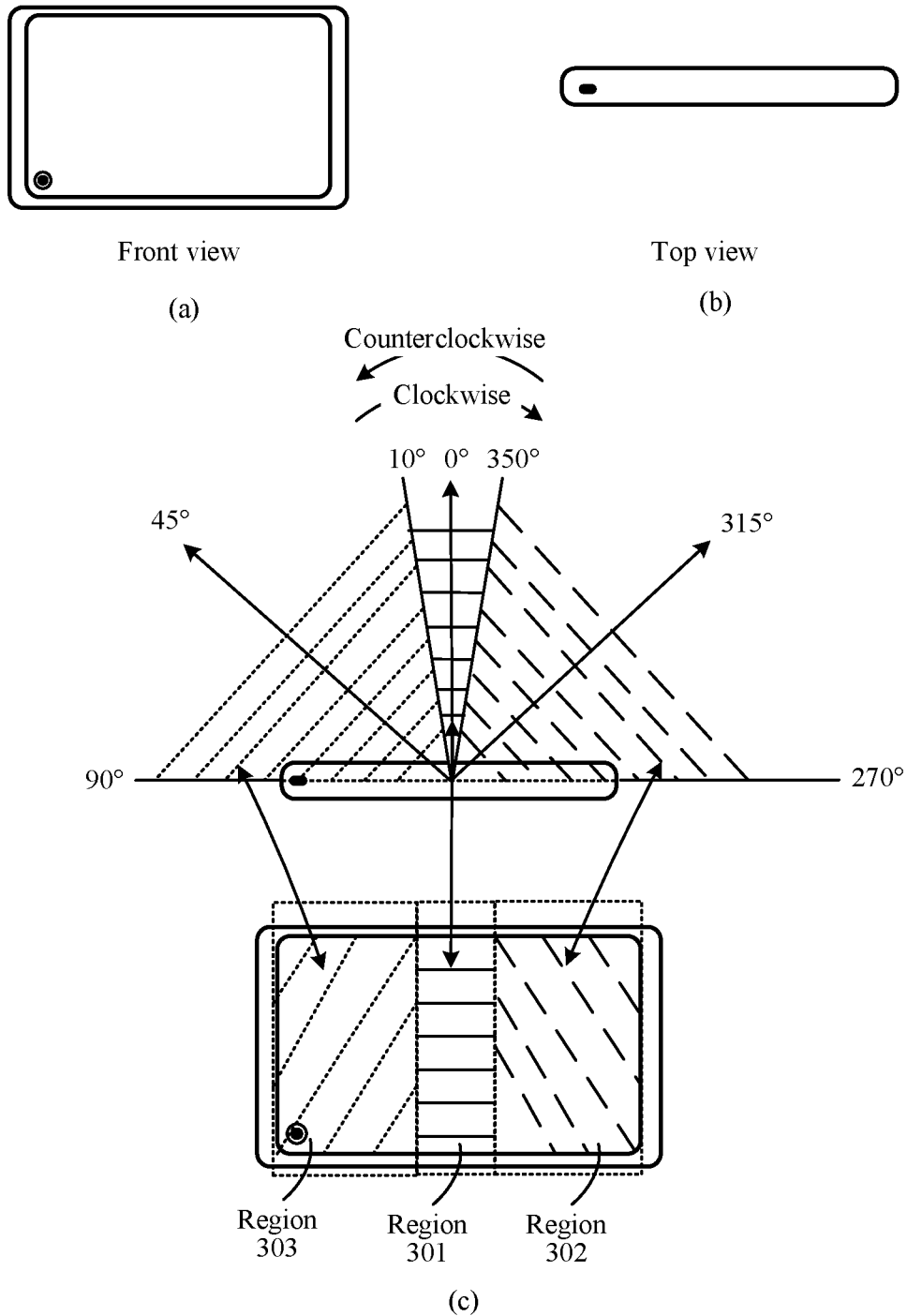
FIG. 4 is a schematic diagram of a correspondence between a second image region and a target sound direction in a case.

FIG. 4 is a schematic diagram of the correspondence between the second image region and the target sound direction in a case.

With reference to a front view (including a front-facing camera) of the terminal shown in (a) in FIG. 4 and a top view of the terminal shown in (b) in FIG. 4, it can be learned from (c) in FIG. 4 that, a direction that the rear-facing camera faces is used as the front of the terminal, that is, the front of the terminal is a range clockwise from a 90° direction to a 270° direction, and the front of the terminal is a shooting region of the terminal. A non-shooting region of the terminal is in rear of the terminal, that is, a range counterclockwise from the 90° direction to the 270° direction in the figure.

The right front of the terminal is a 0° direction in the figure, 10° from the right front of the terminal in the counterclockwise direction is a 100 direction in the figure, 45° from the right front of the terminal in the counterclockwise direction is a 450 direction in the figure, 90° from the right front of the terminal in the counterclockwise direction is the 90° direction in the figure, 10° from the right front of the terminal in the clockwise direction is a 350° direction in the figure, 45° from the right front of the terminal in the clockwise direction is a 315° direction in the figure, and 90° from the right front of the terminal in the clockwise direction is the 270° direction in the figure. The middle direction in front of the terminal may be any direction in a middle shooting region (within a range clockwise from the 10° direction to the 350° direction in the figure) in front of the terminal, for example, the right front of the terminal, that is, the 0° direction. The leftward direction in front of the terminal may be any direction in a leftward shooting region (within a range counterclockwise from the 10° direction in the figure to the 90° direction in the figure) in front of the terminal, for example, the 45° direction in the figure. The rightward direction in front of the terminal may be any direction in a rightward shooting region (within a range clockwise from the 350° direction in the figure to the 270° direction in the figure) in front of the terminal, for example, the 315° direction in the figure. A photographed object in the shooting region may be photographed by the camera of the terminal into the original image.

The correspondence between the second image region and the target sound direction is as follows: If the second image region is the middle region (the region 301 in the figure) in the original image, the photographed object displayed in the second image region is a photographed object in the middle shooting region (within the range clockwise from the 10° direction to the 350° direction in the figure) in front of the terminal, and the target sound direction may be represented as the middle direction in front of the terminal. If the second image region is the rightward region (the region 302 in the figure) in the original image, the photographed object displayed in the second image region is a photographed object in the rightward shooting region (within the range clockwise from the 350° direction in the figure to the 270° direction in the figure) in front of the terminal, and the target sound direction may be represented as the rightward direction in front of the terminal. If the second image region is the leftward region (the region 303 in the figure) in the original image, the photographed object displayed in the second image region is a photographed object in the leftward shooting region (within the range counterclockwise from the 10° direction in the figure to the 90° direction in the figure) in front of the terminal, and the target sound direction may be represented as the leftward direction in front of the terminal.

It can be learned based on the foregoing description that, the second image region corresponds to a shooting region, and the correspondence is manifested as follows: When the second image region is the middle region of the original image, the second image region corresponds to the middle shooting region in front of the terminal, and in this case, the photographed object displayed in the second image region is the photographed object displayed in the middle shooting region in front of the terminal. When the second image region is the leftward region in the original image, the second image region corresponds to the leftward shooting region in front of the terminal, and in this case, the photographed object displayed in the second image region is the photographed object displayed in the leftward shooting region in front of the terminal. When the second image region is the rightward region in the original image, the second image region corresponds to the rightward shooting region in front of the terminal, and in this case, the photographed object displayed in the second image region is the photographed object displayed in the rightward shooting region in front of the terminal.

It may be understood that, the foregoing metric values such as 10°, 350°, 45°, 0°, and 315° are merely examples, and may be adjusted to other angles as required. This is not limited in this application.

The following describes a plurality of embodiments of this application.

A terminal may trigger image focus tracking and audio focus tracking in different cases, including but not limited to the following two cases:

Case 1: The terminal may trigger image focus tracking and audio focus tracking in a preview process or an original video recording process, and generate an original video and a focus tracking video when video recording ends. The original video is a video recorded based on a conventional processing procedure. The focus tracking video is a video obtained after audio focus tracking and image focus tracking are performed according to the video processing method in this application. For a detailed description of Case 1, specifically refer to the following detailed descriptions of Embodiment 1 to Embodiment 4. For a process in which the terminal obtains the focus tracking video in Case 1, refer to the following descriptions of step S101 to step S111.

Case 2: The terminal may trigger image focus tracking and audio focus tracking to generate a focus tracking video after recording of an original video is completed. For a detailed description of Case 2, specifically refer to the following detailed description of Embodiment 5. Details are not described herein. For a process in which the terminal obtains the focus tracking video in Case 2, refer to the following descriptions of step S801 to step S811.

In different embodiments, the terminal specifically triggers image focus tracking and audio focus tracking on different occasions. In embodiments of this application, several example trigger occasions are described. For details, refer to the following related descriptions of embodiments.

Embodiment 1: An occasion (which may be referred to as an occasion 1 below) on which the terminal triggers image focus tracking and audio focus tracking is as follows: In a preview process, the terminal first detects an operation on a focus tracking control. Then, after detecting an operation of a user on a start recording control and detecting an operation of determining a focus for an original image by the user, the terminal may trigger image focus tracking and audio focus tracking. The focus tracking control is a control configured to enable the terminal to perform image focus tracking and audio focus tracking. The start recording control is a control provided by the terminal for the user to start to record an original video and a focus tracking video.

A sequence in which the terminal detects the operation of the user on the start recording control and detects the operation of determining the focus for the original image by the user does not affect triggering of the terminal to perform image focus tracking and audio focus tracking. In some possible cases, the terminal may first detect the operation of the user on the start recording control, and in response to the operation, the terminal starts to record a video. When recording the video, after the terminal detects the operation of determining the focus for the original image by the user, in response to the operation, the terminal performs image focus tracking and audio focus tracking based on the focus. In some other possible cases, alternatively, the terminal may first detect the operation of determining the focus for the original image by the user, and in response to the operation, the terminal determines the focus. Then, after the terminal detects the operation of the user on the start recording control, in response to the operation, the terminal starts to record a video and performs image focus tracking and audio focus tracking.

The following description is provided by using an example in which the terminal may first detect the operation of the user on the start recording control and then detect the operation of determining the focus for the original image by the user, and then the terminal is triggered to perform image focus tracking and audio focus tracking.

For example user interfaces in Embodiment 1, refer to the following descriptions of FIG. 5A to FIG. 5M.

Figure 5A:
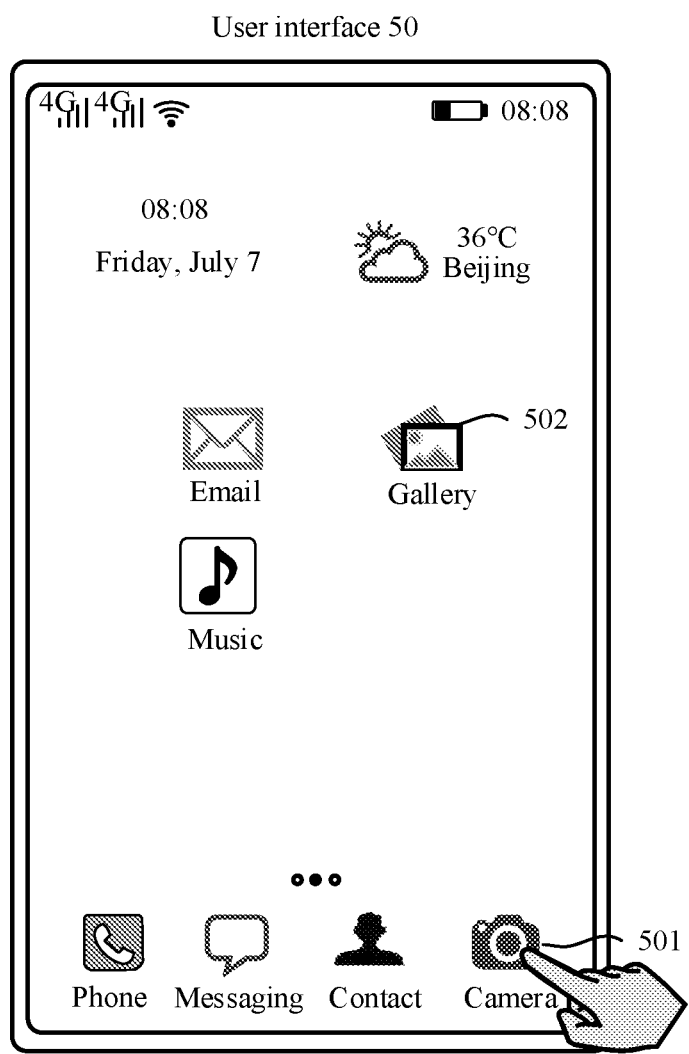
FIG. 5A to FIG. 5M show a group of example user interfaces when a terminal previews a video recorded by the terminal according to Embodiment 1.
Figure 5B:
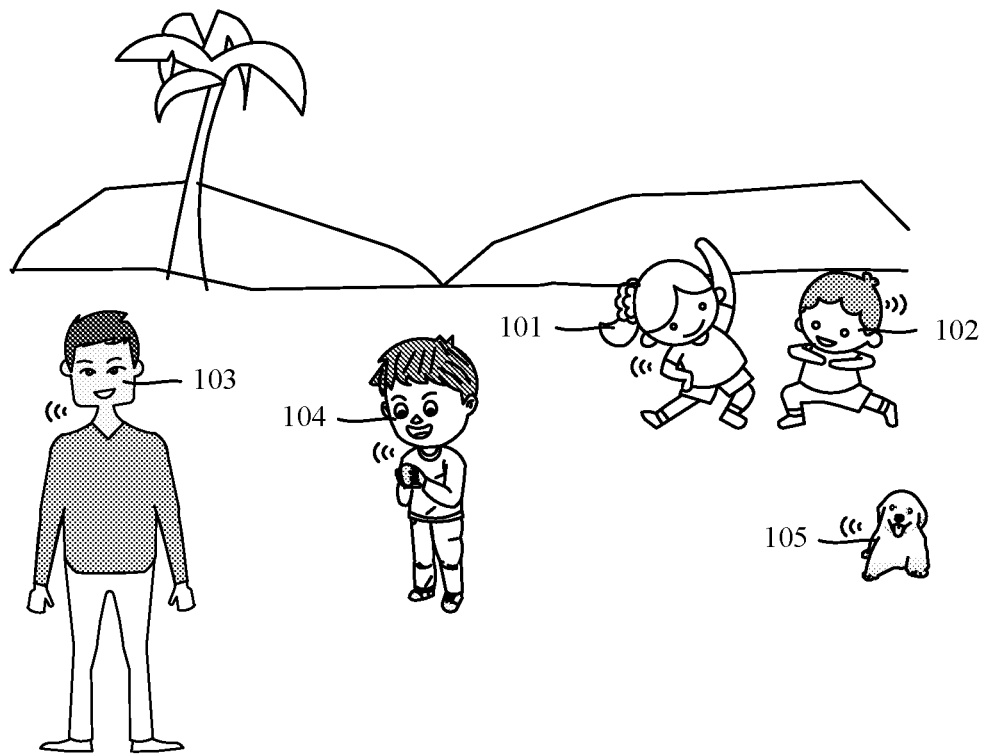
Figure 5B:
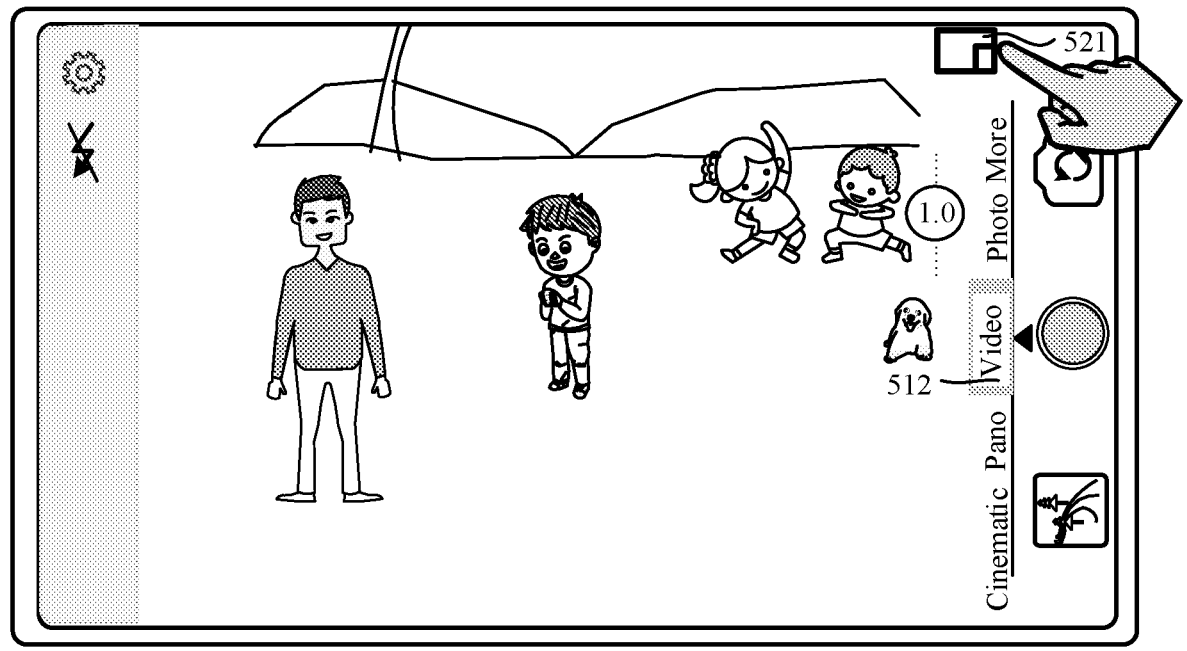
Figure 5C:
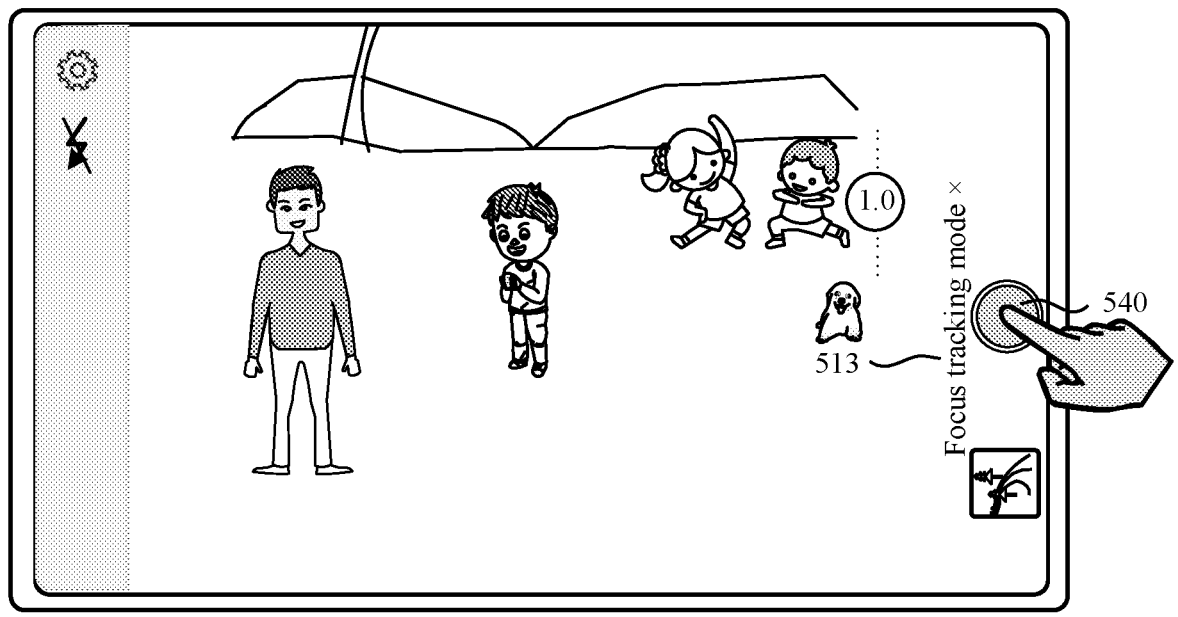
Figure 5D:
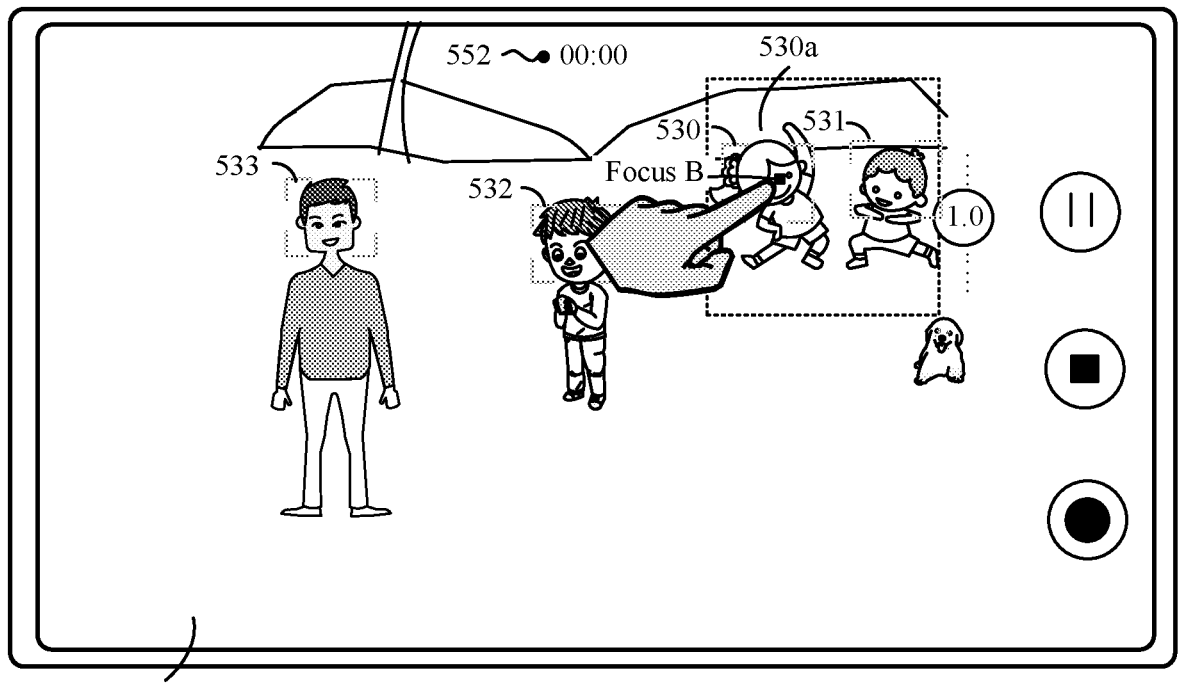
Figure 5E:
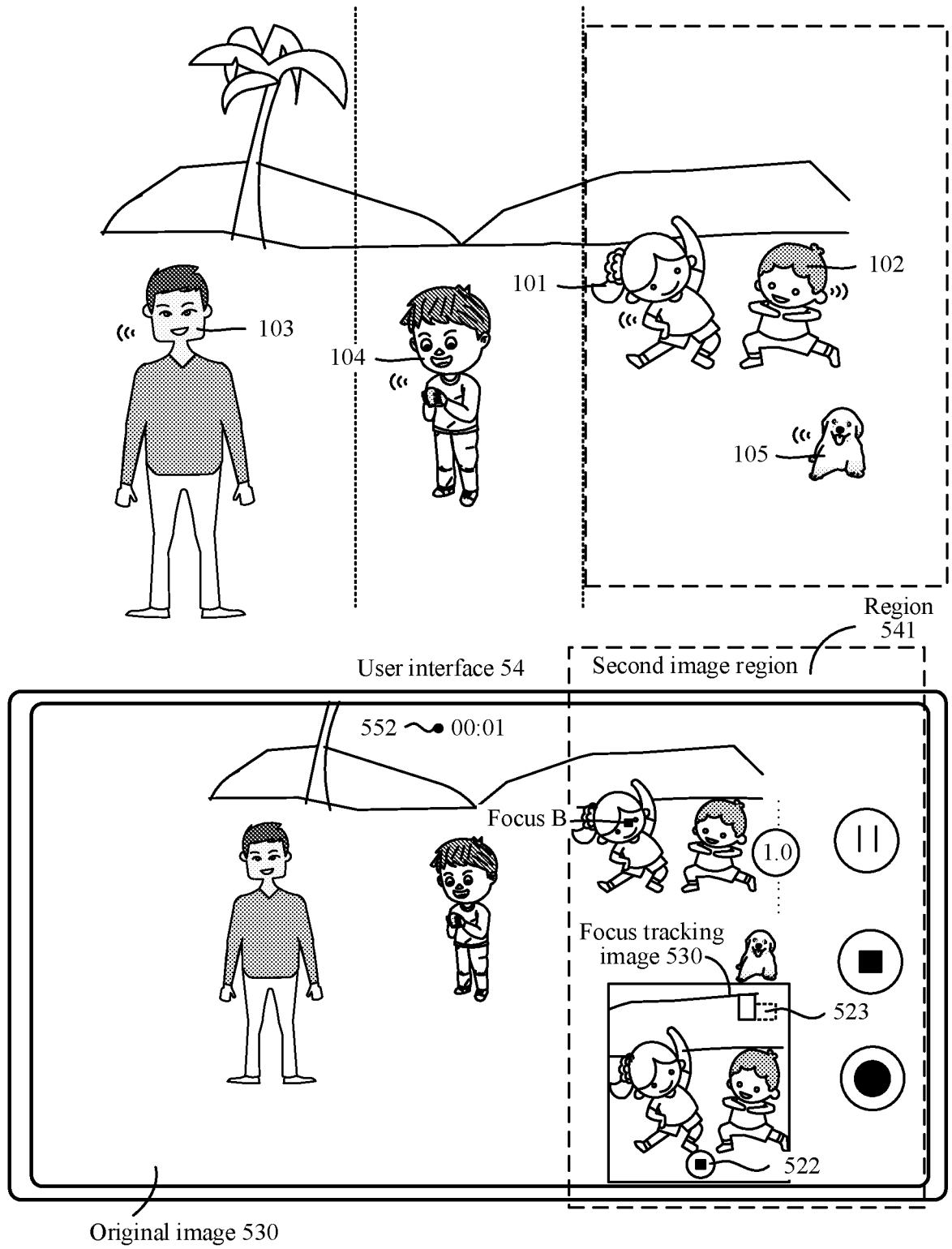
Figure 5F:
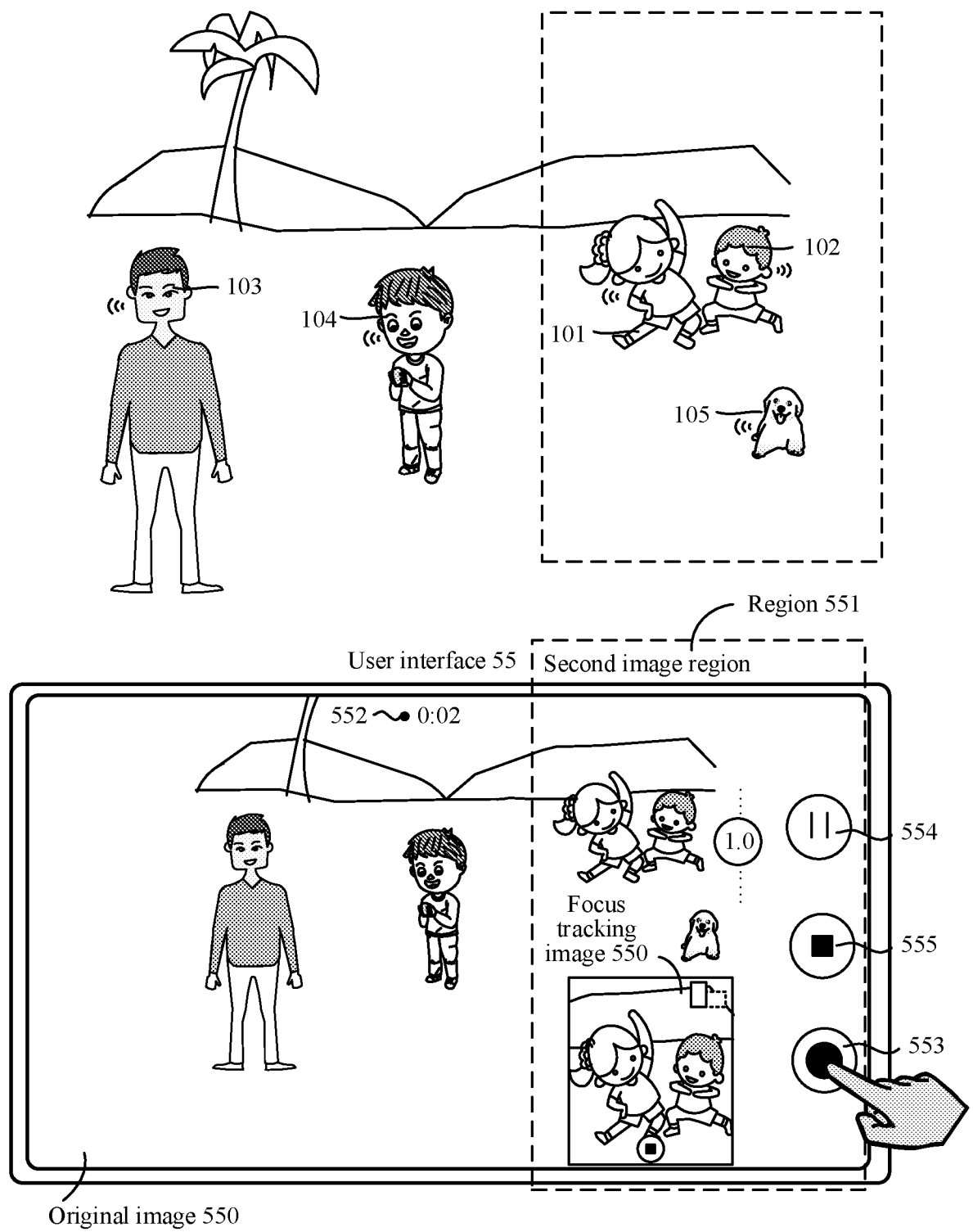
Figure 5G:
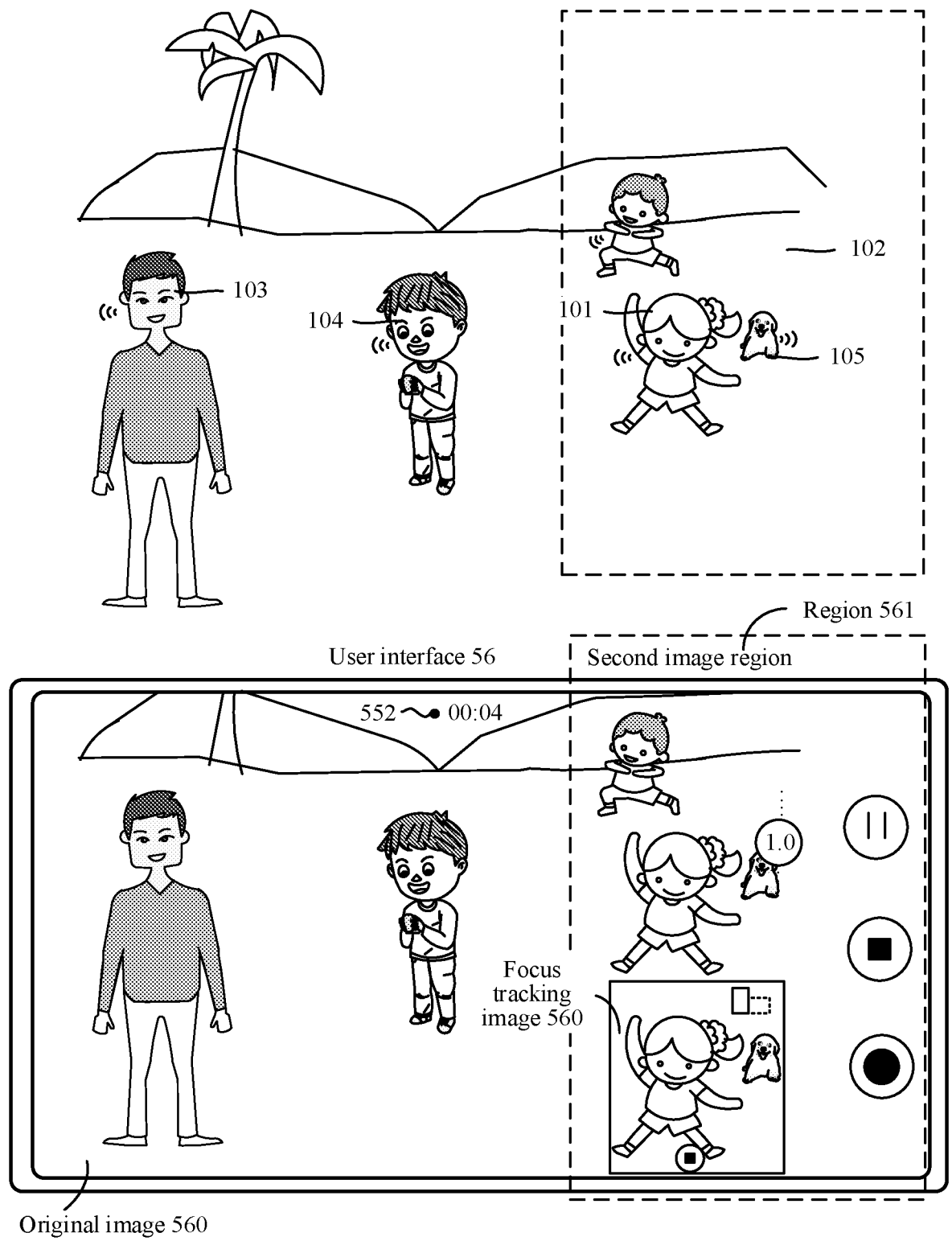
Figure 5H:
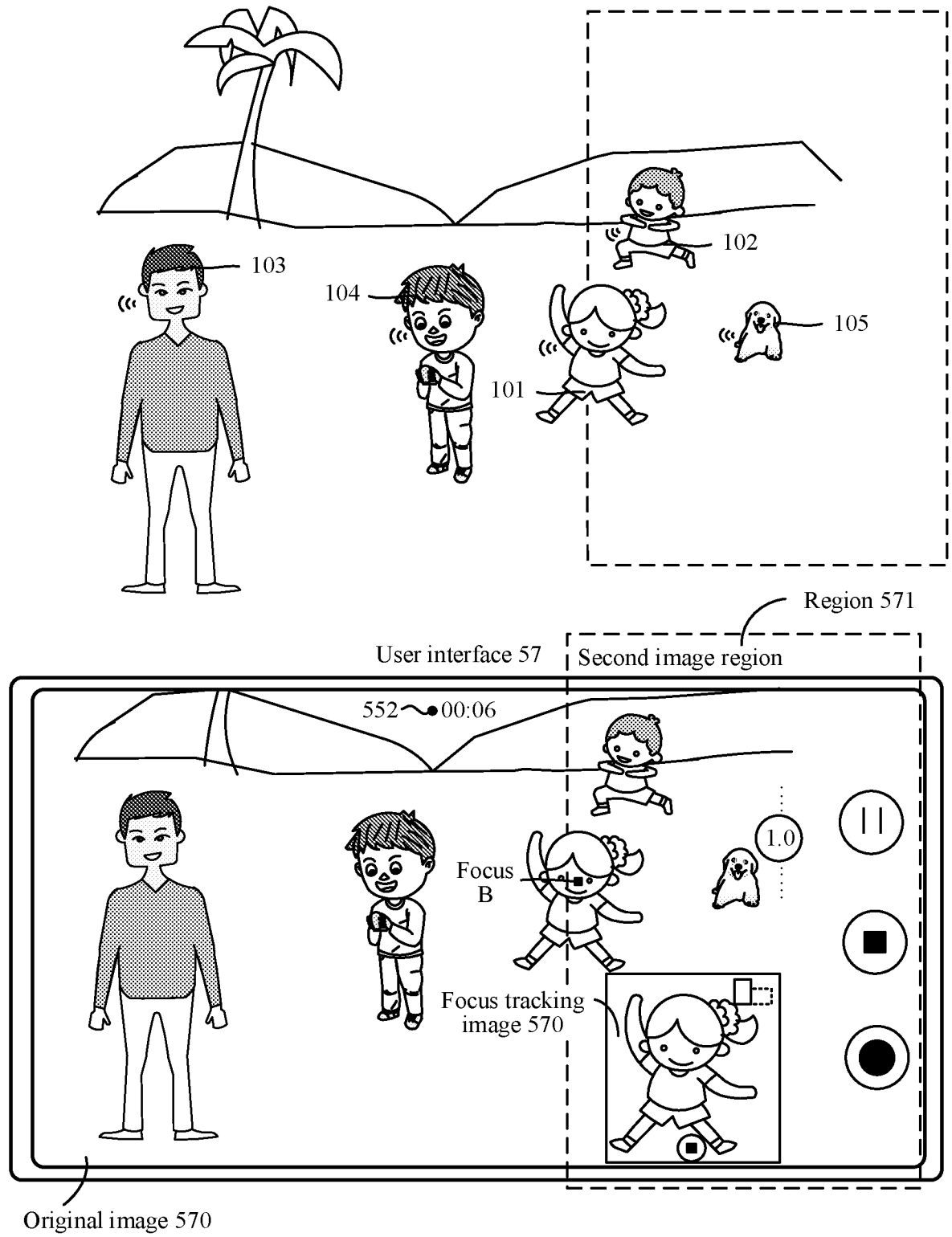
Figure 5I:
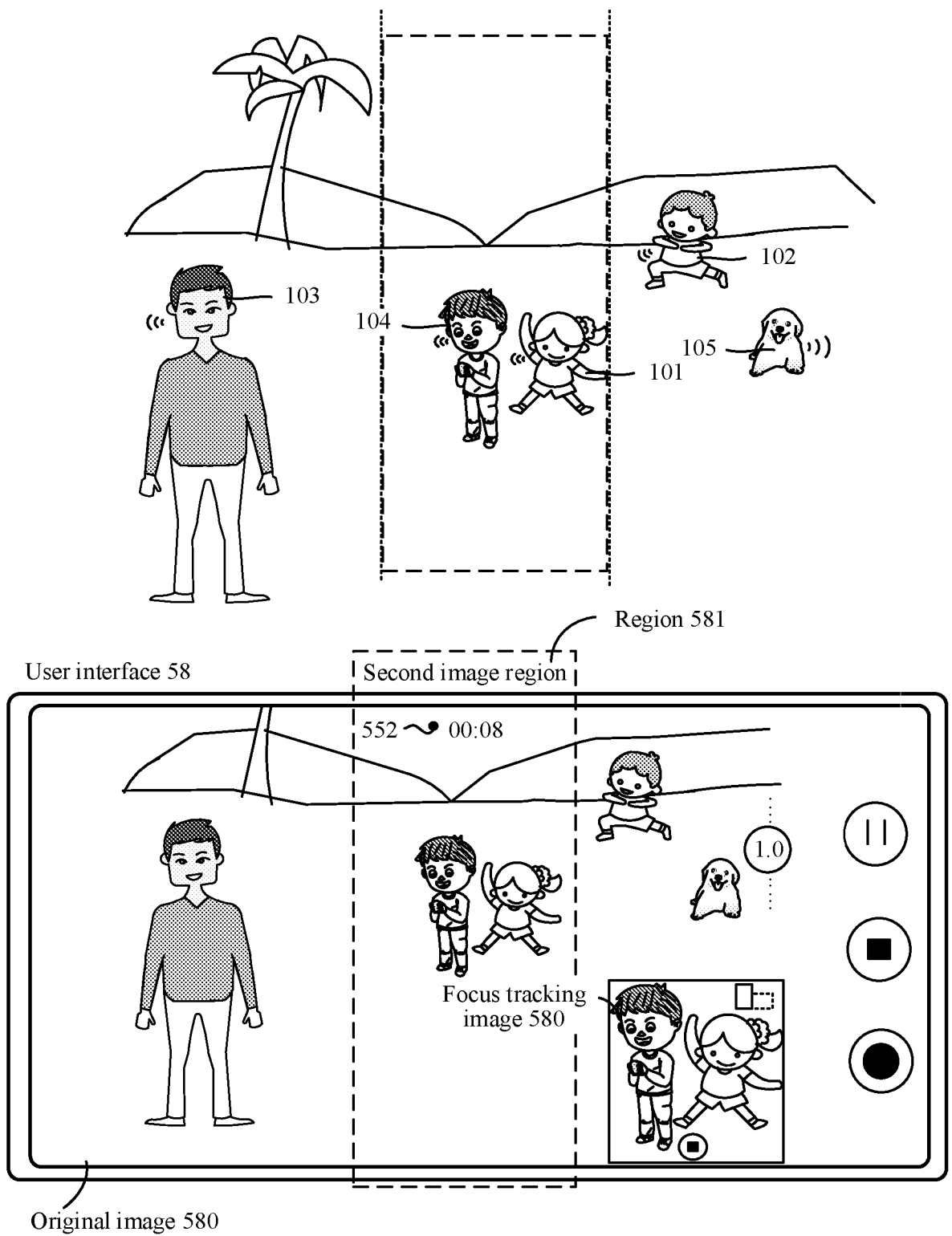
Figure 5J:
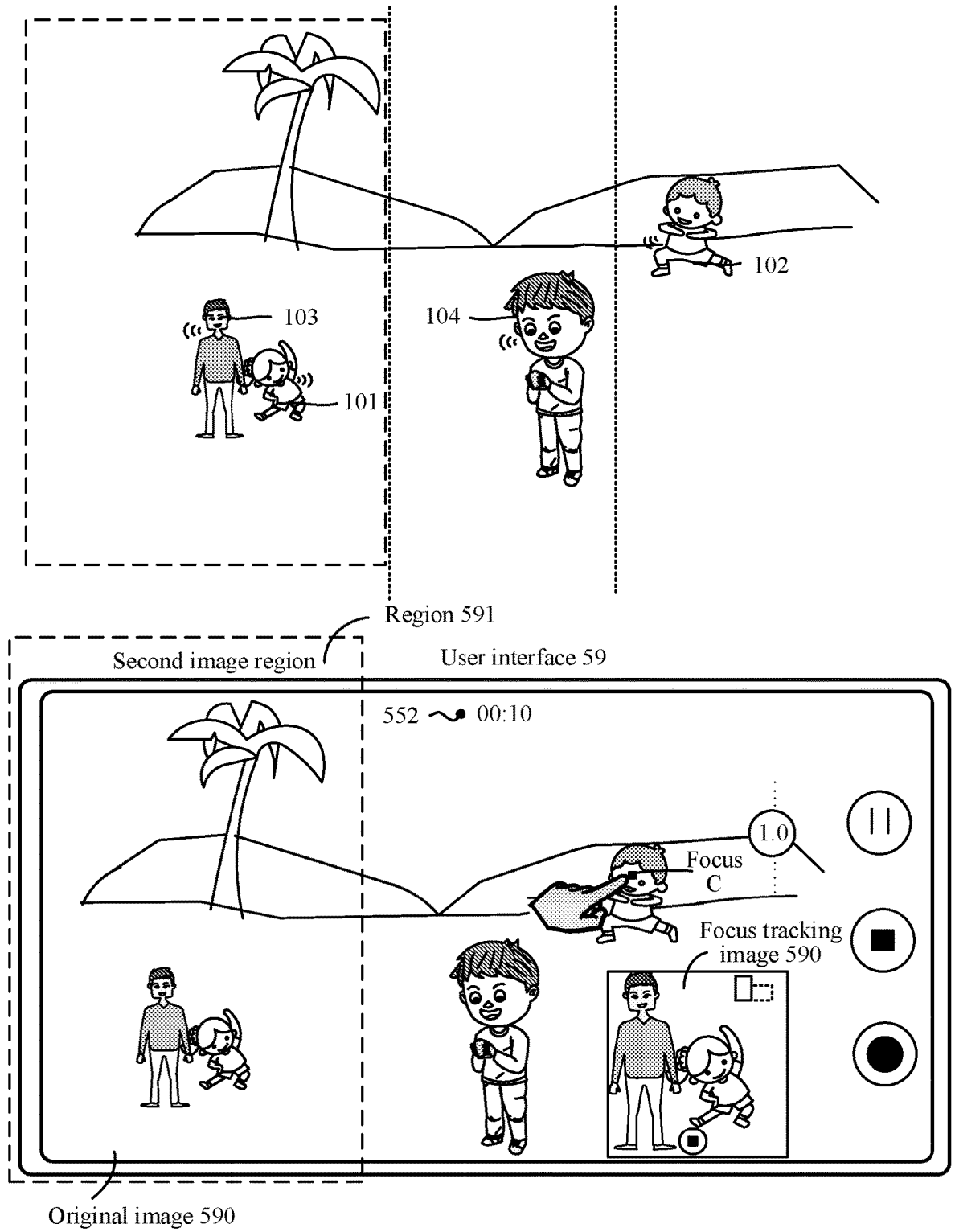
Figure 5K:
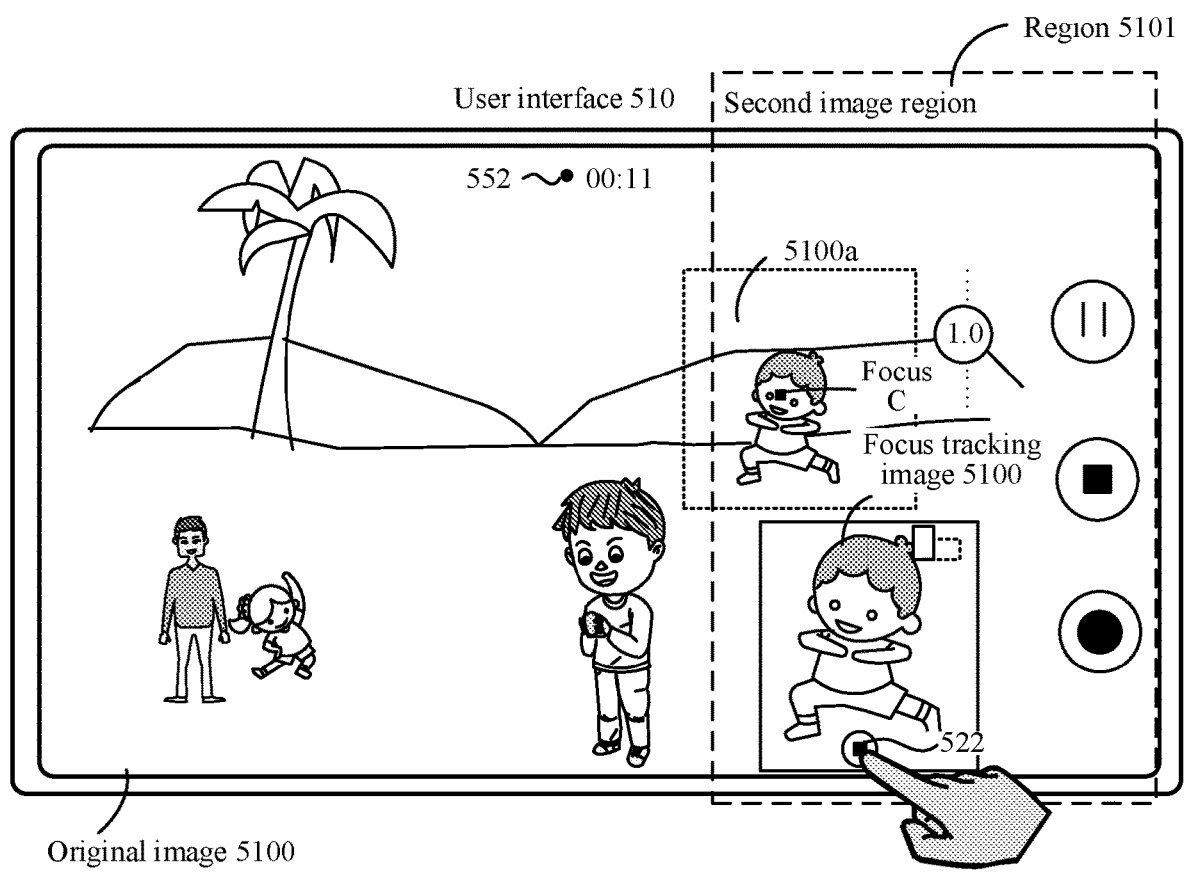
Figure 5L:
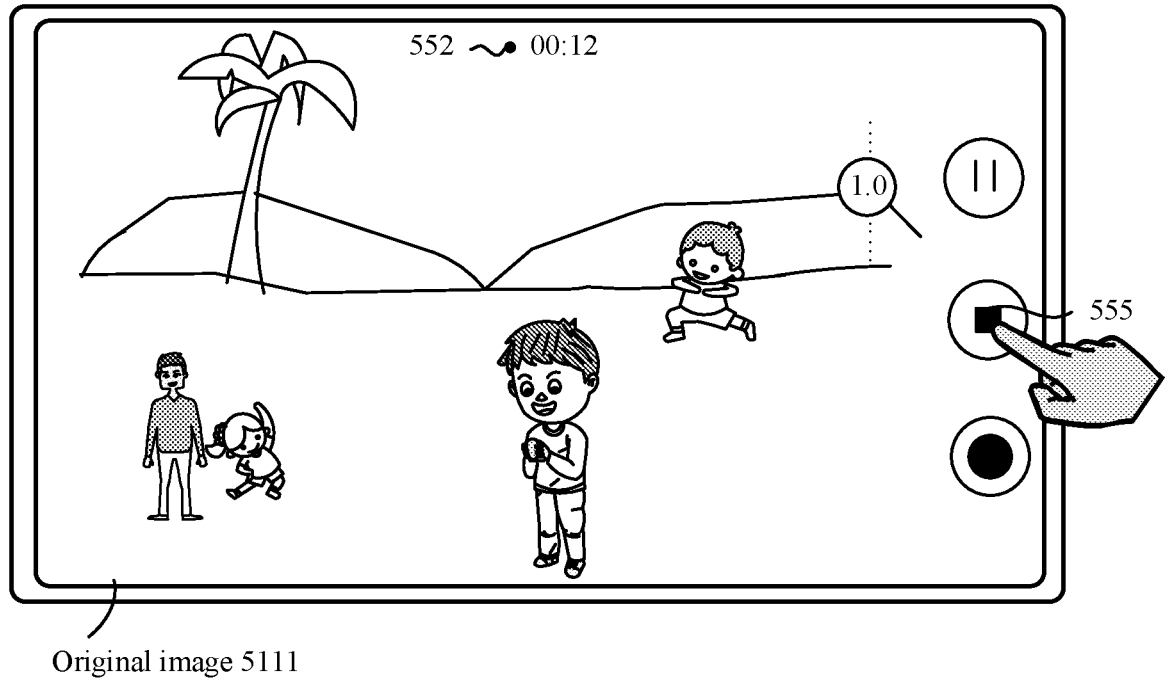
Figure 5M:
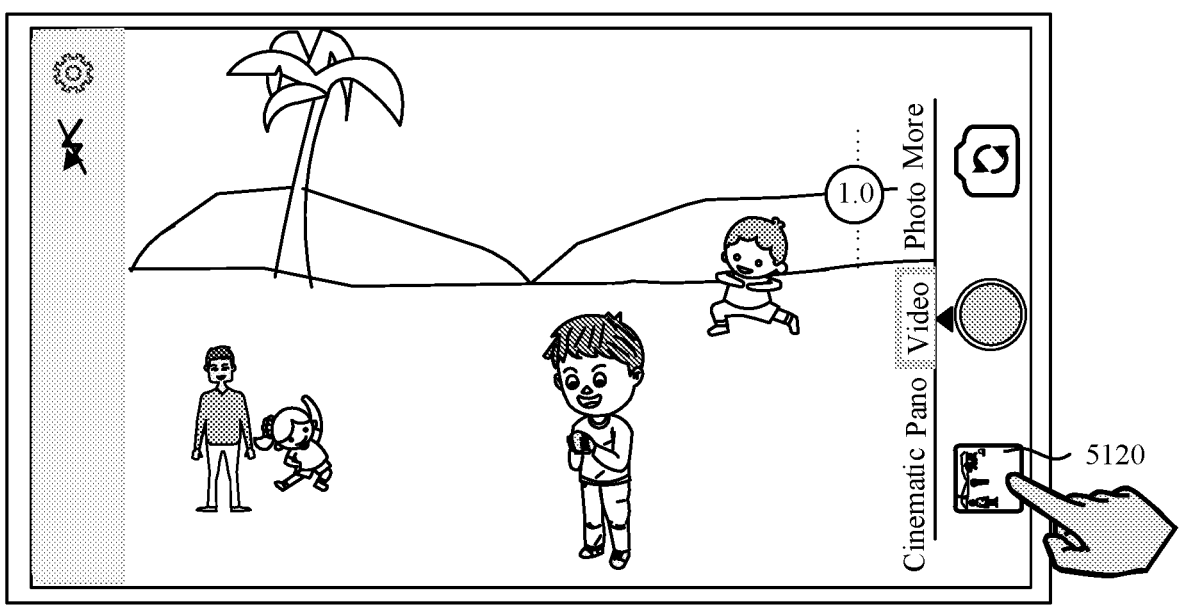

In FIG. 5B to FIG. 5M, the terminal records a video by using a rear-facing camera. In this case, photographed objects may include a photographed object 101 (a little girl), a photographed object 102 (a little boy A), a photographed object 103 (a man), a photographed object 104 (a little boy B), a photographed object 105 (a puppy), and the like. FIG. 5B and FIG. 5C show a group of example user interfaces in a preview process of the terminal. In the preview process, the terminal has not started to record a video. FIG. 5D to FIG. 5L show a group of example user interfaces when the terminal records a video. In this case, in addition to recording an original video, the terminal may further record a focus tracking video by using the video processing method in this application. FIG. 5M shows an example user interface when the terminal completes recording.

As shown in FIG. 5A, the terminal may display a user interface 50. The user interface 50 is a home screen of the terminal. The user interface 50 displays a camera application icon 501 and a gallery application icon 502. The terminal may detect an operation (for example, a single-tap operation) of the user on the camera application icon 501, and in response to the operation, the terminal starts the camera and may display a user interface 51 shown in FIG. 5B.

As shown in FIG. 5B, the user interface 51 is an example preview interface before the terminal starts to record a video, and the user interface 51 may include controls such as a "recording mode" control 512 and a focus tracking control 521. The "recording mode" control 512 may be configured to trigger the terminal to enter a recording mode. In the recording mode, the terminal may record a video.

The user interface 51 further includes the focus tracking control 521, the focus tracking control 521 may switch the terminal from a common recording mode to a special recording mode, and in the special recording mode, the terminal may record two videos, one is an original video, and the other is a focus tracking video. In some embodiments, the special recording mode may be referred to as a "focus tracking mode", a "protagonist mode", or the like. In the special recording mode, the terminal may record a focus tracking video.

After detecting an operation (for example, a tap operation) on the focus tracking control 521, in response to the operation, the terminal may notify, in a first manner, the user that the terminal enters the special recording mode. In the first manner, the terminal may display a "focus tracking mode" control. For example, in response to the operation (for example, the tap operation) on the focus tracking control 521, the terminal may display a user interface 52 shown in FIG. 5C.

It should be understood that, other than the first manner, the terminal may alternatively notify, in a second manner, the user that the terminal enters the special recording mode (the focus tracking mode). In the second manner, the terminal may notify, by changing a display status of the focus tracking control 521, the user that the terminal enters the special recording mode. For a description of the second manner, refer to the following descriptions of FIG. 6C and FIG. 6D. Details are not described herein.

As shown in FIG. 5C, the user interface 52 is an example preview interface after the terminal enters the special recording mode (the focus tracking mode). The user interface 52 includes a "focus tracking mode" control 513, and the "focus tracking mode" control 513 may be configured to prompt the user that the terminal enters the focus tracking mode.

The user interface 52 may further include a start recording control 540. When the terminal detects an operation on the start recording control 540, in response to the operation, the terminal starts to record an original video, and displays a user interface 53 shown in FIG. 5D.

As shown in FIG. 5D, the user interface 53 may include a recording duration prompt 552. In FIG. 5D, the terminal records a video of a zeroth second. In this case, the terminal may obtain an original image 530.

In some possible cases, the terminal may display a plurality of recognition frames in the user interface 53. As shown in FIG. 5D, the user interface 53 may include a recognition frame 530 to a recognition frame 533. The recognition frame 530 to the recognition frame 533 may include content from which the user is most likely to determine a focus. For example, the content may be a face of a photographed object.

In some other possible cases, the terminal may not display a recognition frame in the user interface 53.

When the terminal enters the focus tracking mode, after the terminal detects an operation of determining a focus (a focus B in the figure) for the original image 530 by the user, in response to the operation, the terminal may determine, in the original image 530, a first image region 530*a* including the focus B, and generate, based on content in the first image region 530*a*, a focus tracking image corresponding to the original image 530. Then, the terminal may display the focus tracking image, and present a user interface 54 shown in FIG. 5E.

As shown in FIG. 5E, the user interface 54 is a recording interface when the terminal records a video. In this case, the user interface 54 may include the recording duration prompt 552. In FIG. 5E, the terminal records a video of a first second. The user interface 54 may include the original image 530 and the focus tracking image corresponding to the original image 530, that is, a focus tracking image 530 in the figure.

It should be understood that, a size of a display region of the focus tracking image 530 in FIG. 5E is not fixed, and may be adjusted as required. For example, in some examples, content that is included in the focus tracking image 530 and that belongs to the first image region may be larger than the content in the first image region included in the original image 530, so that the user can clearly see the content in the focus tracking image more easily. Herein, only the focus tracking image 530 is used as an example for description, and the description also applies to another focus tracking image and an original image corresponding to the another focus tracking image in this application.

In this case, the terminal may start image focus tracking and audio focus tracking. The terminal may determine, based on the focus, a second image region (a region 541 in the original image 530) in which the focus is located. In this case, the focus (the focus B in the figure) is in a rightward region in the original image 530, and the second image region (the region 541) is also the rightward region in the original image 530. An audio signal corresponding to the focus tracking image 530 includes sound of a photographed object displayed in the region 541.

In some examples, the region displaying the focus tracking image 530 may further include a focus tracking pause control 522 and a recording state switching control 523. The focus tracking pause control 522 is configured to trigger the terminal to stop image focus tracking and audio focus tracking, and save a recorded focus tracking video. However, in this case, the terminal does not exit the focus tracking mode, and after redetermining a focus, the terminal may continue image focus tracking and audio focus tracking, and start to record a new focus tracking video. For a description of the focus tracking pause control 522, further refer to the following description of FIG. 5K. Details are not described herein. The recording state switching control 523 is configured to trigger the terminal to change a display status of a focus tracking image when recording a focus tracking video. The display status includes a portrait state and a landscape state. In the portrait state, a long side (for example, the third side or the fourth side in FIG. 2) of the focus tracking image is in a vertical state. For example, the focus tracking image 530 is in the portrait state. In the landscape state, the long side (for example, the third side or the fourth side in FIG. 2) of the focus tracking image is in a horizontal state.

In subsequent user interfaces, regions displaying a focus tracking image all may include the focus tracking pause control 522 and the recording state switching control 523. The focus tracking pause control 522 may provide the user a function of controlling the terminal to stop recording a focus tracking video and saving the focus tracking video. The recording state switching control 523 may trigger the terminal to change a display status of a focus tracking image when the focus tracking video is recorded.

It should be understood that, a process of determining the focus by the user is a process of determining a focus tracking object by the user. Herein, the focus (the focus B in the figure) determined by the user is at the photographed object 101 (the little girl), which may be understood as that the user determines that the focus tracking object is the photographed object 101 (the little girl). Usually, in subsequent content, a movement direction of the focus (the focus B in the figure) is the same as that of the photographed object 101 (the little girl). Movement of the photographed object 101 (the little girl) shown in the figure may be understood as movement of the focus. For ease of observation, subsequent schematic diagrams may not display the focus (the focus B), and for movement of the focus (the focus B), refer to movement of the photographed object 101 (the little girl).

For a process in which the terminal performs image focus tracking and audio focus tracking subsequently, refer to the following descriptions of FIG. 5F to FIG. 5M. FIG. 5F to FIG. 5M show a group of example user interfaces when the terminal records a video (an original video and a focus tracking video). In this case, in addition to recording the original video, the terminal may further record the focus tracking video by using the video processing method in this application. For explanation, FIG. 5F to FIG. 5M show an example in which the terminal records a 12s original video and a 11s focus tracking video (during recording at an eleventh second, an operation on the focus tracking pause control 522 is detected, and recording of the focus tracking video ends). Recording of the 11s focus tracking video is described by using an example in which a focus moves from a rightward region in an original image to a middle region of the original image, and then moves to a leftward region in the original image. It should be understood that, the movement of the focus herein is movement of a focus tracking object (for example, the photographed object 101) in the image. Usually, a region (for example, one of the leftward region, the rightward region, and the middle region) in which the photographed object 101 in the original image is located is a region in which the focus is located. For ease of observation and understanding, in the following content, movement of the photographed object 101 (the little girl) is described to represent movement of the focus, and the focus (the focus B) may not be displayed in schematic diagrams. However, in a special case, when the photographed object (for example, the photographed object 101) simultaneously belongs to two regions (for example, two of the leftward region, the rightward region, and the middle region) in the original image, the region in which the photographed object is located cannot represent the region in which the focus is located. Therefore, the region in which the photographed object is located cannot be used as a second image region. In this case, the region in which the focus is located further needs to be described, and the region in which the focus is located is used as a second image region.

As shown in FIG. 5F, a user interface 55 is a recording interface when the terminal records a video. The user interface 55 may include the recording duration prompt 552. In FIG. 5F, the terminal records a video of a second (a process of recording the video of the first second is not described herein). The user interface 55 includes an original image 550 and a focus tracking image corresponding to the original image 550, that is, a focus tracking image 550 in the figure. The focus tracking image 550 may include the photographed object 101 (the little girl) and the photographed object 102 (the little boy A).

As shown in FIG. 5F, the photographed object 101 (the little girl) is in a rightward region in the original image 550, indicating that the focus (not shown in the figure) is in the rightward region in the original image 550. In this case, a second image region is also the rightward region in the original image 550, that is, a region 551 in the figure. In this case, an audio signal corresponding to the focus tracking image 550 includes sound of a photographed object displayed in the region 551, including the photographed object 101 (the little girl), the photographed object 102 (the little boy A), and the photographed object 105 (a puppy).

It can be learned based on the related description of FIG. 5F that, the focus tracking image 550 includes a focus tracking object, that is, the photographed object 101 (the little girl), and the audio signal corresponding to the focus tracking image 550 includes sound of the focus tracking object.

The user interface 55 may further include a snapshot control 553, a pause recording control 554, and an end recording control 555. The snapshot control 553 is configured for the terminal to shoot an image during video recording, and save the image in a picture form for view of the user. The image may include at least one of an original image and a focus tracking image. For example, after the terminal detects an operation (for example, a tap operation) on the snapshot control 553, the terminal may shoot the original image 550, and then save the original image 550 in the picture form for view of the user. For the saved original image 550, refer to the following description of FIG. 6B. Details are not described herein. The pause recording control 554 may be configured to trigger the terminal to pause recording of the original video. When the terminal detects an operation (for example, a single-tap operation) on the pause recording control 554, in response to the operation, the terminal may pause recording of the original video. In this case, a region that is in the user interface and that displays the pause recording control 554 may display a restart recording control (not shown in the figure). The restart recording control may be configured for the terminal to restart to record the original video. The end recording control 555 is configured to trigger the terminal to end recording of the original video. When the terminal detects an operation (for example, a single-tap operation) on the end recording control 555, in response to the operation, the terminal may end recording of the original video.

Then, the photographed object 101 moves, a position of the photographed object 101 relative to the terminal changes, and a position of the photographed object 101 in the original image obtained by the terminal also changes. The terminal may display a user interface 56 shown in FIG. 5G.

As shown in FIG. 5G, the user interface 56 is a recording interface when the terminal records a video. The user interface 56 may include the recording duration prompt 552. In FIG. 5G, the terminal records a video of a fourth second (a process of recording a video of a third second is not described herein). The user interface 56 includes an original image 560 and a focus tracking image corresponding to the original image 560, that is, a focus tracking image 560 in the figure. The focus tracking image 560 may include the photographed object 101 (the little girl) and the photographed object 105 (the puppy).

Compared with the content shown in FIG. 5F, it can be learned that, although the position of the photographed object 101 (the little girl) changes, the photographed object 101 is still in a rightward region in the original image 560. In this case, a second image region is also the rightward region in the original image 560, that is, a region 561 in the figure. In this case, an audio signal corresponding to the focus tracking image 560 includes sound of a photographed object displayed in the region 561, including the photographed object 101 (the little girl), the photographed object 102 (the little boy A), and the photographed object 105 (the puppy).

It can be learned based on the related description of FIG. 5G that, although the position of the focus tracking object, that is, the photographed object 101 (the little girl), relative to the terminal changes (the position of the photographed object 101 in the original image 560 also changes), the focus tracking image 560 still includes the focus tracking object, that is, the photographed object 101 (the little girl), and the audio signal corresponding to the focus tracking image 560 still includes the sound of the focus tracking object.

It should be understood that, in addition to the position of the photographed object 101 relative to the terminal, a position of another photographed object relative to the terminal may also change, but in Embodiment 1, only movement of the photographed object (for example, the photographed object 101) on which the focus is located is described. For movement of the another photographed object, refer to content in the figure, which is not described in words.

Then, the photographed object 101 further moves, the position of the photographed object 101 relative to the terminal changes, and the position of the photographed object 101 in the original image obtained by the terminal also changes. The terminal may display a user interface 57 shown in FIG. 5H.

As shown in FIG. 5H, the user interface 57 is a recording interface when the terminal records a video. The user interface 57 may include the recording duration prompt 552. In FIG. 5H, the terminal records a video of a sixth second (a process of recording a video of a fifth second is not described herein). The user interface 57 includes an original image 570 and a focus tracking image corresponding to the original image 570, that is, a focus tracking image 570 in the figure. The focus tracking image 570 may include the photographed object 101 (the little girl).

As shown in FIG. 5H, the photographed object 101 is included in a rightward region in the original image 570 and a middle region of the original image 570. However, in this case, the focus is in the rightward region in the original image 570, and a second image region is also the rightward region in the original image 570, that is, a region 571 in the figure. In this case, an audio signal corresponding to the focus tracking image 570 includes sound of a photographed object displayed in the region 571, including the photographed object 101 (the little girl), the photographed object 102 (the little boy A), and the photographed object 105 (the puppy).

It can be learned based on the related description of FIG. 5H that, although the position of the focus tracking object, that is, the photographed object 101 (the little girl), relative to the terminal changes (the position of the photographed object 101 in the original image 570 also changes), the focus tracking image 570 still includes the focus tracking object, that is, the photographed object 101 (the little girl), and the audio signal corresponding to the focus tracking image 570 still includes the sound of the focus tracking object.

Then, the photographed object 101 moves, the position of the photographed object 101 relative to the terminal changes, and the position of the photographed object 101 in the original image obtained by the terminal also changes. The terminal may display a user interface 58 shown in FIG. 5I.

As shown in FIG. 5I, the user interface 58 is a recording interface when the terminal starts to record a video. The user interface 58 may include the recording duration prompt 552.

In FIG. 5I, the terminal records a video of an eighth second (a process of recording a video of a seventh second is not described herein). The user interface 58 includes an original image 580 and a focus tracking image corresponding to the original image 580, that is, a focus tracking image 580 in the figure. The focus tracking image 580 may include the photographed object 101 (the little girl) and the photographed object 104 (the little boy B).

Compared with the content shown in FIG. 5H, it can be learned that, the photographed object 101 (the little girl) is in a middle region of the original image 580. In this case, a second image region is also the middle region of the original image 550, that is, a region 581 in the figure. In this case, an audio signal corresponding to the focus tracking image 580 includes sound of a photographed object displayed in the region 581, including the photographed object 101 (the little girl) and the photographed object 104 (the little boy A).

It can be learned based on the related description of FIG. 5I that, although the position of the focus tracking object, that is, the photographed object 101 (the little girl), relative to the terminal changes (the position of the photographed object 101 in the original image 580 also changes), the focus tracking image 580 still includes the focus tracking object, that is, the photographed object 101 (the little girl), and the audio signal corresponding to the focus tracking image 580 still includes the sound of the focus tracking object.

Then, the photographed object 101 moves, the position of the photographed object 101 relative to the terminal changes, and the position of the photographed object 101 in the original image obtained by the terminal also changes. The terminal may display a user interface 59 shown in FIG. 5J.

As shown in FIG. 5J, the user interface 59 is a recording interface when the terminal starts to record a video. The user interface 59 may include the recording duration prompt 552. In FIG. 5J, the terminal records a video of a tenth second (a process of recording a video of a ninth second is not described herein). The user interface 59 includes an original image 590 and a focus tracking image corresponding to the original image 590, that is, a focus tracking image 590 in the figure. The focus tracking image 590 may include the photographed object 101 (the little girl) and the photographed object 103 (the man).

Compared with the content shown in FIG. 5I, it can be learned that, the photographed object 101 (the little girl) is in a leftward region in the original image 590. In this case, a second image region is also the middle region of the original image 590, that is, a region 591 in the figure. In this case, an audio signal corresponding to the focus tracking image 590 includes sound of a photographed object displayed in the region 591, including the photographed object 101 (the little girl) and the photographed object 103 (the man).

It can be learned based on the related description of FIG. 5J that, although the position of the focus tracking object, that is, the photographed object 101 (the little girl), relative to the terminal changes (the position of the photographed object 101 in the original image 590 also changes), the focus tracking image 590 still includes the focus tracking object, that is, the photographed object 101 (the little girl), and the audio signal corresponding to the focus tracking image 580 still includes the sound of the focus tracking object.

It should be understood that, after the terminal detects, in the user interface 53, the operation of determining the focus (the focus B in the figure) for the original image 530, in the subsequent user interface 54 to user interface 58, the terminal does not detect an operation of determining a focus for an original image (because the user does not redetermine a focus for the original image). Therefore, in all of the user interface 54 to the user interface 58, during video recording, the terminal determines, based on the focus B, a focus tracking image and an audio signal corresponding to the focus tracking image.

In an actual video recording process, the user may change the focus for the original image. After detecting the operation of redetermining a focus (a new focus) for the original image, the terminal may determine, based on the new focus, a focus tracking image and an audio signal corresponding to the focus tracking image. For example, as shown in FIG. 5J, after the terminal detects an operation of determining a focus (a focus C in the figure) for the original image 590 by the user, in response to the operation, the terminal may determine a first image region and a second image region based on the focus C, and display a user interface 510 shown in FIG. 5K.

As shown in FIG. 5K, the user interface 510 is a recording interface when the terminal records a video. In this case, the user interface 510 may include the recording duration prompt 552. In FIG. 5K, the terminal records content corresponding to an eleventh second in the original video, and content corresponding to an eleventh second in the focus tracking video. In response to the operation of determining the focus C by the user, the terminal may determine, in an original image 5100, a first image region 5100a including the focus C and generate, based on content in the first image region 5100a, a focus tracking image corresponding to the original image 5100. Then, the terminal may display the focus tracking image, that is, a focus tracking image 5100 in the figure. The focus tracking image 5100 may include the photographed object 102 (the little boy A).

In this case, the terminal performs audio focus tracking based on the focus C. The terminal may determine, based on the focus C, a second image region (a region 5101 in the original image 510) in which the focus C is located. In this case, the focus (the focus C in the figure) is in a rightward region in the original image 5100, and the second image region (the region 5101) is also the rightward region in the original image 5100. An audio signal corresponding to the focus tracking image 5100 includes sound of a photographed object displayed in the region 5101, including the photographed object 102 (the little boy A).

It should be understood that, in the user interface 510 shown in FIG. 5K, the focus tracking object changes from the photographed object 101 (the little girl) to the photographed object 102 (the little boy A). Subsequently, when an operation of determining a focus is not detected, the terminal keeps generating a focus tracking image based on the focus C, to generate a focus tracking video.

As shown in FIG. 5K, the user may use the focus tracking pause control 522 to enable the terminal to stop recording the focus tracking video and save the focus tracking video. For example, an operation (for example, a single-tap operation) on the focus tracking pause control 522 is detected, and in response to the operation, the terminal may end recording of the focus tracking video. In this case, the terminal obtains the 11s focus tracking video. After ending recording of the focus tracking video, the terminal may display a user interface 511 shown in FIG. 5L. However, in this case, the terminal does not exit the focus tracking mode, and after redetermining a focus, the terminal may start to record a new focus tracking video.

As shown in FIG. 5L, the user interface 511 is an example preview interface when the terminal ends recording of the focus tracking video, but still records the original video. The user interface 511 may include the recording duration prompt 552. In FIG. 5L, the terminal records an original video of a twelfth second.

When an operation (for example, a single-tap operation) on the end recording control 555 is detected, in response to the operation, the terminal may end recording of the original video. In this case, the terminal obtains the 12s focus tracking video. After ending recording of the original video, the terminal may display a user interface 512 shown in FIG. 5M.

As shown in FIG. 5M, the user interface 512 is an example user interface when the terminal ends video recording. The user interface 512 may include a playback control 5120. The playback control 5120 may be configured to display a thumbnail of an image shot by the terminal.

In some possible cases, the terminal may view, by using the playback control 5120 displayed in the user interface 512, the recorded original video (referred to as an original video 1 below) and focus tracking video (referred to as a focus tracking video 1 below) and the shot image (referred to as an image 1 below) in FIG. 5D to FIG. 5L and other content. The image 1 may be an original image (the original image 550) shot when the terminal records the original image corresponding to the second in the original video. For a process of obtaining the image 1, refer to the description of FIG. 5F.

Figure 6A:
FIG. 6A and FIG. 6B show example user interfaces when a terminal completes video recording.

In this case, the terminal detects an operation on the playback control 5120, and in response to the operation, the terminal may display a user interface 60 shown in FIG. 6A.

As shown in FIG. 6A, the user interface 60 is a user interface when the terminal displays a latest recorded video. The user interface may include a gallery application shortcut control 601, and the gallery application shortcut control 601 may be configured to trigger the terminal to open a gallery application. When detecting an operation on the gallery application shortcut control 601, the terminal may open the gallery application, and display more shot images and recorded videos, for example, may display a user interface 61 shown in FIG. 6B.

Figure 6B:
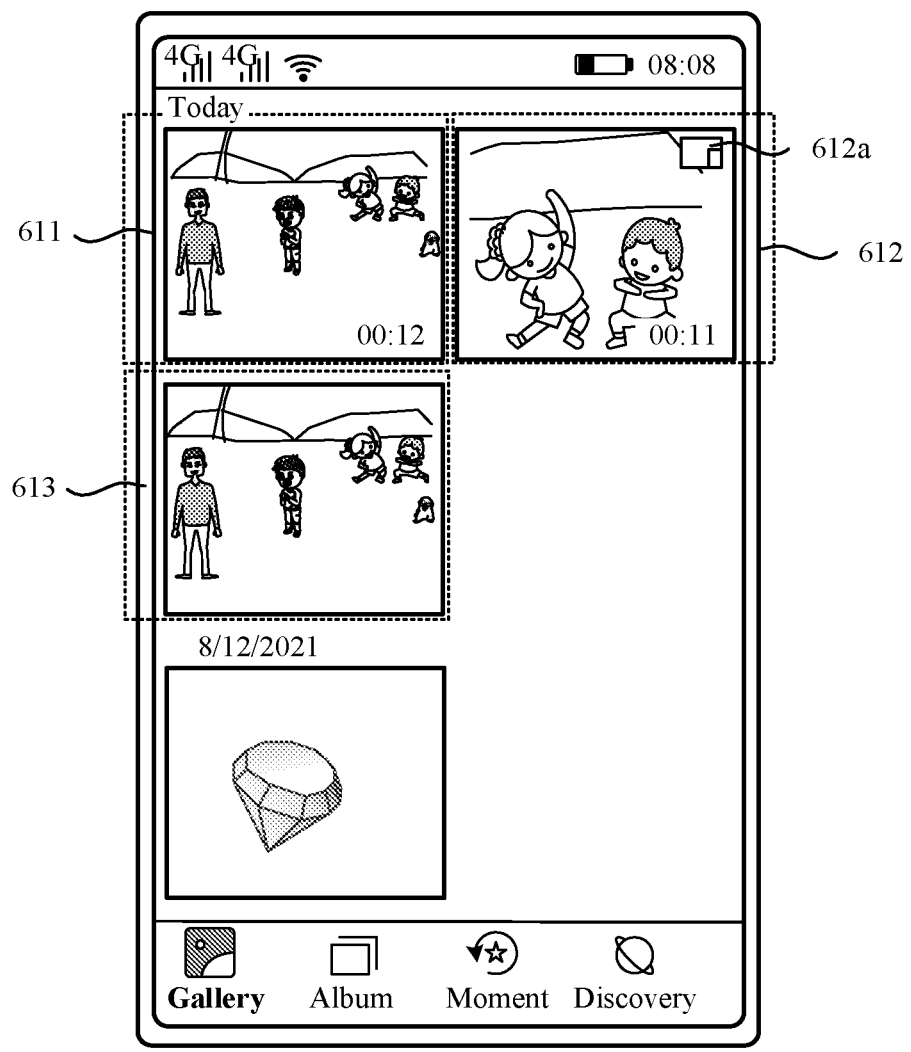

As shown in FIG. 6B, the user interface 61 is an example user interface when the terminal displays an image and a video. A display frame 611 corresponding to the original video 1 may be displayed, and the display frame 611 may display a part of or all content of a frame of original image (for example, a first frame of original image) in the original video 1. A display frame 612 corresponding to the focus tracking video 1 that is obtained when the original video 1 is recorded may be displayed, the display frame 612 may further include a focus tracking video indicator 612a, and the focus tracking video indicator 612a may be configured to indicate that the focus tracking video 1 is a focus tracking video. A display frame 613 may be further displayed, content displayed in the display frame 613 is the image 1 obtained when the original video 1 is recorded. For example, the image 1 may be the original image 550 included in FIG. 5F. The original video 1, the focus tracking video 1, and the image 1 are all obtained by the terminal in one video recording process. The process may also be referred to as "obtaining a plurality of pieces of content through one recording process".

In some other possible cases, alternatively, the terminal may directly open, through the gallery application, the user interface 61 shown in FIG. 6B. For example, an operation (for example, a single-tap operation) on the gallery application icon 502 shown in FIG. 5A is detected, and in response to the operation, the terminal may display the user interface 61 shown in FIG. 6B, so that the user may view the original video 1, the focus tracking video 1, and the image 1 in the user interface 61.

It should be understood that, the "focus tracking mode" control 513 included in FIG. 5C may be further configured for the terminal to exit the focus tracking mode, so that when recording an original video, the terminal may not perform image focus tracking and audio focus tracking to record a focus tracking video. In this case, a recording mode may be considered as the common recording mode. For example, an operation (for example, a tap operation) on the "focus tracking mode" control 513 is detected, in response to the operation, the terminal may exit the focus tracking mode, and then when detecting an operation on the start recording control 540, in response to the operation, the terminal may enter the common recording mode. In the common recording mode, the terminal may record an original video, but cannot record a focus tracking video.

It should be understood that, in some possible cases, when an operation (for example, a single-tap operation) on the end recording control 555 is detected, if the terminal further records a focus tracking video in addition to recording an original video, in response to the operation, the terminal may end recording of the original video and the focus tracking video.

It can be learned based on FIG. 5F to FIG. 5K that, each frame of focus tracking image includes the focus tracking object, that is, the photographed object 101 (the little girl), and an audio signal corresponding to each frame of focus tracking image includes the focus tracking object. Therefore, in other words, the terminal implements image focus tracking and audio focus tracking on the focus tracking object.

In Embodiment 1, after the terminal detects the operation on the focus tracking control 521, a recording mode may be understood as a special recording mode, and during video recording in the "recording mode", the terminal may generate two videos, one is an original video, and the other is a focus tracking video. In some possible cases, the terminal may generate an original video and a focus tracking video during video recording in the recording mode. In some other possible cases, in the recording mode provided on the terminal, a video can be recorded only based on a conventional processing procedure (a recording mode in a conventional technology). In this case, the terminal may provide another mode in which an original video and a focus tracking video can be generated during video recording. For example, the mode may be referred to as a "multi-video recording mode".

For Embodiment 1, in some possible cases, if the terminal does not detect the operation (for example, the single-tap operation) on the focus tracking control 521 in the user interface 51, in the user interface 52, after detecting the operation on the start recording control 540, the terminal may not display the focus tracking control 521, so that the user interface in the recording process is clearer. In this case, the terminal can record only an original video in the recording mode, and cannot record a focus tracking video.

It should be understood that, an original video and a focus tracking video that are recorded before the operation on the start recording control 540 is detected may not be saved, and cannot be viewed in the gallery, but an original video and a focus tracking video that are recorded after the operation on the start recording control 540 is detected may be saved and viewed in the gallery application.

For a manner of notifying the user that the terminal enters the special recording mode (the focus tracking mode), other than the first manner in FIG. 5B and FIG. 5C, the terminal may alternatively notify, in the second manner, the user that the terminal enters the special recording mode (the focus tracking mode). In the second manner, the terminal may notify, by changing a display status of the focus tracking control 521, the user that the terminal enters the special recording mode. For a description of the second manner, refer to the following descriptions of FIG. 6C and FIG. 6D. That is, the foregoing descriptions of FIG. 5B and FIG. 5C may be respectively replaced with the following descriptions of FIG. 6C and FIG. 6D.

Figure 6C:
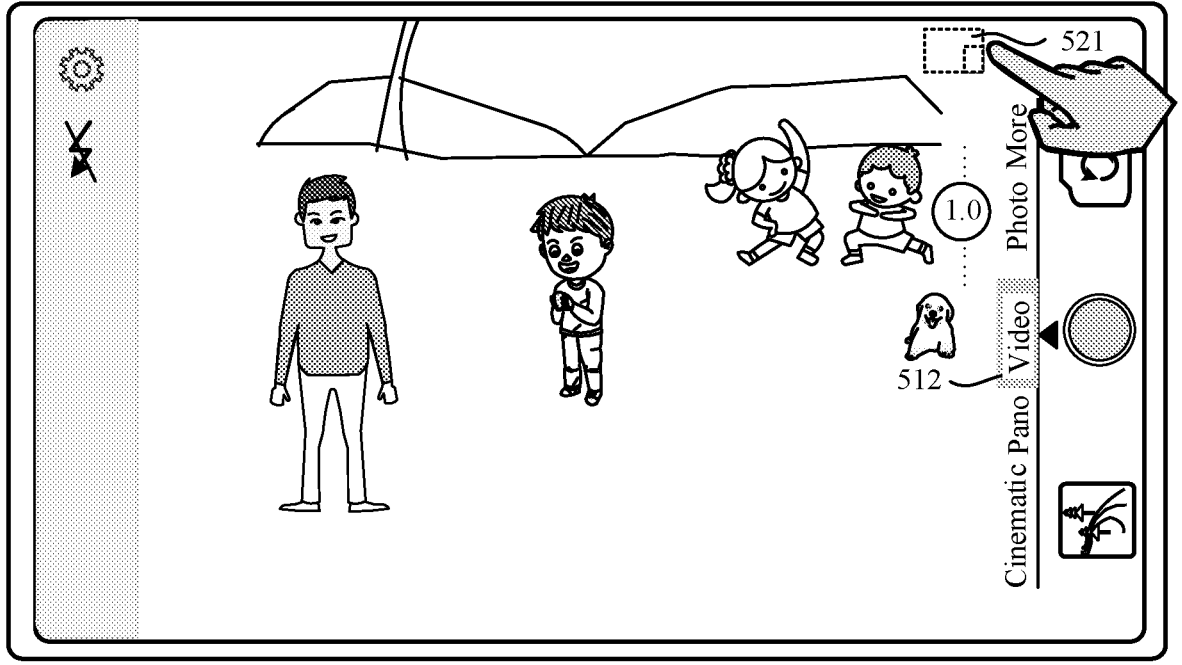
FIG. 6C and FIG. 6D are schematic diagrams for describing a second manner.

As shown in FIG. 5A, the terminal may detect an operation (for example, a single-tap operation) of the user on the camera application icon 501, and in response to the operation, the terminal may display a user interface 63 shown in FIG. 6C instead of the user interface 51 shown in FIG. 5B.

As shown in FIG. 6C, the user interface 63 may include the focus tracking control 521. In this case, a display status of the focus tracking control 521 is a first state. In the first state, the focus tracking control 521 is presented in a dashed line form.

When the display status of the focus tracking control 521 is the first state, if an operation (for example, a single-tap operation) on the focus tracking control 521 is detected, the display status of the focus tracking control 521 may switch from the first state to a second state, to prompt the user that the terminal enters the focus tracking mode, and after a focus is determined, image focus tracking and audio focus tracking may be performed to obtain a focus tracking video. In this case, the terminal may display a user interface 64 shown in FIG. 6D instead of the user interface 52.

Figure 6D:
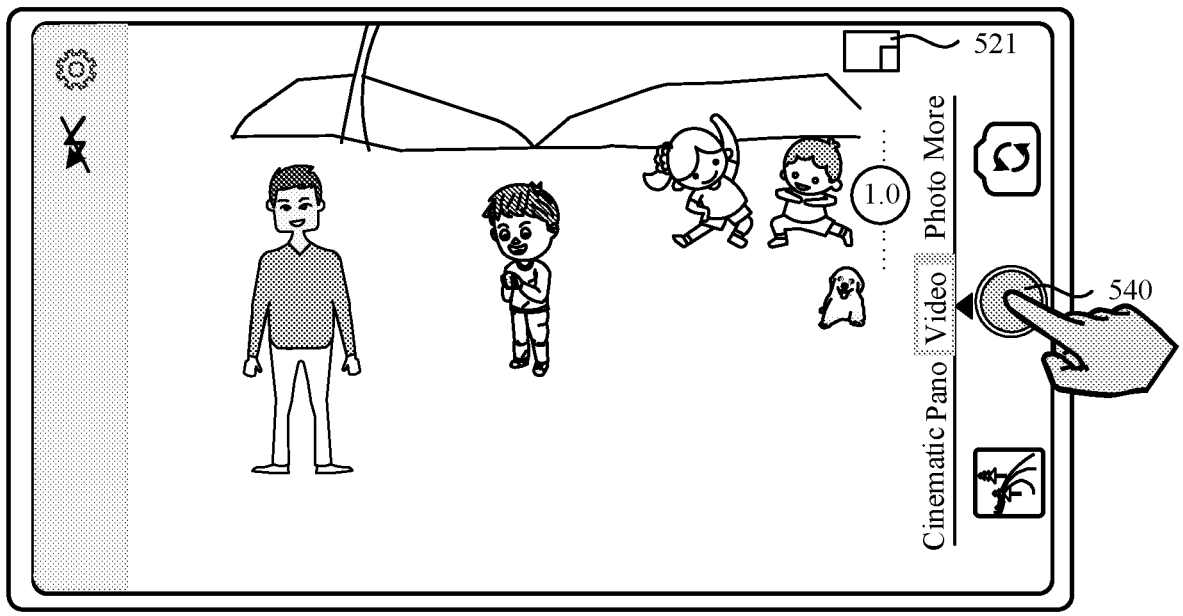

As shown in FIG. 6D, the user interface 64 is an example preview interface after the terminal enters the focus tracking mode. In the user interface 52, the display status of the focus tracking control 521 may be the second state. In the second state, the focus tracking control 521 is presented in a solid line form.

The user interface 64 may further include the start recording control 540. When the terminal detects an operation on the start recording control 540, in response to the operation, the terminal starts to record an original video, and displays the user interface 53 shown in FIG. 5D. For user interfaces when the terminal determines a focus and records a focus tracking video subsequently, refer to the descriptions of FIG. 5D to FIG. 5M. Details are not described herein again.

It should be understood that, in some possible cases, when the second manner is used to prompt the user that the terminal enters the special recording mode (the focus tracking mode), a user interface when a video starts to be recorded may display the focus tracking control 521 in the second state to prompt the user that the terminal currently can record a focus tracking video. That is, the user interface 53 to the user interface 511 may include the focus tracking control in the second state.

It should be further understood that, the form of the focus tracking control 521 and the display status (the dashed line or the solid line) of the focus tracking control 521 herein are merely examples, and should not constitute a limitation on embodiments of this application. For example, the form of the focus tracking control 521 may alternatively be a text, an animation, or another shape, the first state of the focus tracking control 521 may be a first color (for example, gray), and the second state of the focus tracking control 521 may be a second color (for example, black). A display position of the focus tracking control in the user interface may also change, for example, may be at an upper right corner of the user interface, as shown above, or may be at a lower left corner (not shown) of the user interface, or the position may be adjusted as required, which should not constitute a limitation on embodiments of this application.

In some possible cases, a condition for the terminal to start image focus tracking and audio focus tracking to obtain a focus tracking video includes as follows: an operation on the focus tracking control 521 is detected, a focus is determined, and an operation on the start recording control 540 is detected. A manner of determining a focus includes determining by the user on the terminal and automatic determining by the terminal. In embodiments of this application, several example embodiments are provided for a time sequence between when the terminal detects the operation on the focus tracking control 521, when the focus is determined, and when the operation on the start recording control 540 is detected. The time sequence is actually not limited. For example, the operation on the start recording control 540 may be detected first, then the operation on the focus tracking control 521 is detected, and finally, the focus is determined, and then a focus tracking video starts to be recorded. Alternatively, the operation on the focus tracking control 521 may be detected first, then the operation on the start recording control 540 is detected, and finally, the focus is determined, and then a focus tracking video starts to be recorded. Alternatively, the focus may be determined first, then the operation on the start recording control 540 is detected, and finally, the operation on the focus tracking control 521 is detected, and then a focus tracking video starts to be recorded. Different sequences have respective advantages and disadvantages in actual application, and should not constitute a limitation on embodiments of this application.

In some other possible cases, for example, in the following Scenario 2, the terminal may play a video when recording the video. In this case, a condition for the terminal to start image focus tracking and audio focus tracking to obtain a focus tracking video includes as follows: an operation on the focus tracking control 521 is detected, and a focus is determined. Alternatively, in the following Embodiment 5, a condition for the terminal to start image focus tracking and audio focus tracking to obtain a focus tracking video is also as follows: an operation on the focus tracking control 521 is detected, and a focus is determined.

The following describes in detail an example process of the video processing method in embodiments of this application.

The video processing method in this application is applicable to a terminal having N microphones. N is an integer greater than or equal to 2. The following describes in detail an example process of the video processing method in this application with reference to Embodiment 1 by using an example in which the terminal has three microphones.

In the foregoing Embodiment 1, the terminal may perform real-time processing (for example, noise reduction or white balance) based on each acquired frame of first image to obtain a frame of original image, perform real-time processing based on each acquired frame of second image to obtain a frame of original image, determine a first image region in the original image based on a focus, crop the original image to obtain content in the first image region, and generate a frame of focus tracking image based on the content in the first image region. The first image and the second image may be the same or different. When the first image and the second image are different, a focal length used when the terminal acquires the second image may be greater than a focal length used for the first image. In this way, the focus tracking image can have better imaging quality.

It should be understood that, Embodiment 1 is described by using an example in which the first image and the second image are the same, and the following content is also described by using an example in which the first image and the second image are the same. When the first image and the second image are the same, the first image and the second image may be collectively referred to as an image.

It is assumed that, from starting video recording to ending video recording, the terminal may obtain X frames of images and a frame of input audio signal set corresponding to each frame of image (X frames of input audio signal sets in total). In this case, the terminal may respectively perform conventional processing (for example, noise reduction or white balance) on the X frames of images to obtain an original image stream, perform conventional processing (noise reduction or the like) based on the X frames of input audio signal sets to obtain an original audio stream, and then mix the original image stream and the original audio stream, to obtain a recorded original video. In addition, for Y of the X frames of images, the terminal may perform image focus tracking processing based on the Y frames of images to obtain a focus tracking image stream, perform audio focus tracking processing based on Y frames of input audio signal sets corresponding to the Y frames of images to obtain a focus tracking audio stream, and then mix the focus tracking image stream and the focus tracking audio stream, to obtain a recorded focus tracking video. X is an integer greater than or equal to 2. Y is an integer greater than or equal to 2, and Y is less than or equal to X. For example, in Embodiment 1, Y is less than X. One frame of input audio signal set may include one or more frames of input audio signals. The following content is described by using an example in which Y is equal to X.

The terminal may perform the following image focus tracking processing based on the Y frames of images: performing conventional processing on each frame of image to obtain a frame of original image, determining a first image region in the original image based on a focus, cropping the original image to obtain content in the first image region, and generating a frame of focus tracking image based on the content in the first image region.

The terminal performs the following audio focus tracking processing based on the Y frames of input audio signal sets corresponding to the Y frames of images: processing each of the Y frames of input audio signal sets according to an audio focus tracking method in embodiments of this application, to obtain a focus tracking audio signal. The focus tracking audio signal is an audio signal corresponding to the focus tracking image. For detailed descriptions of the processes, refer to the following descriptions of step S101 to step S111. Details are not described herein.

Figure 7:
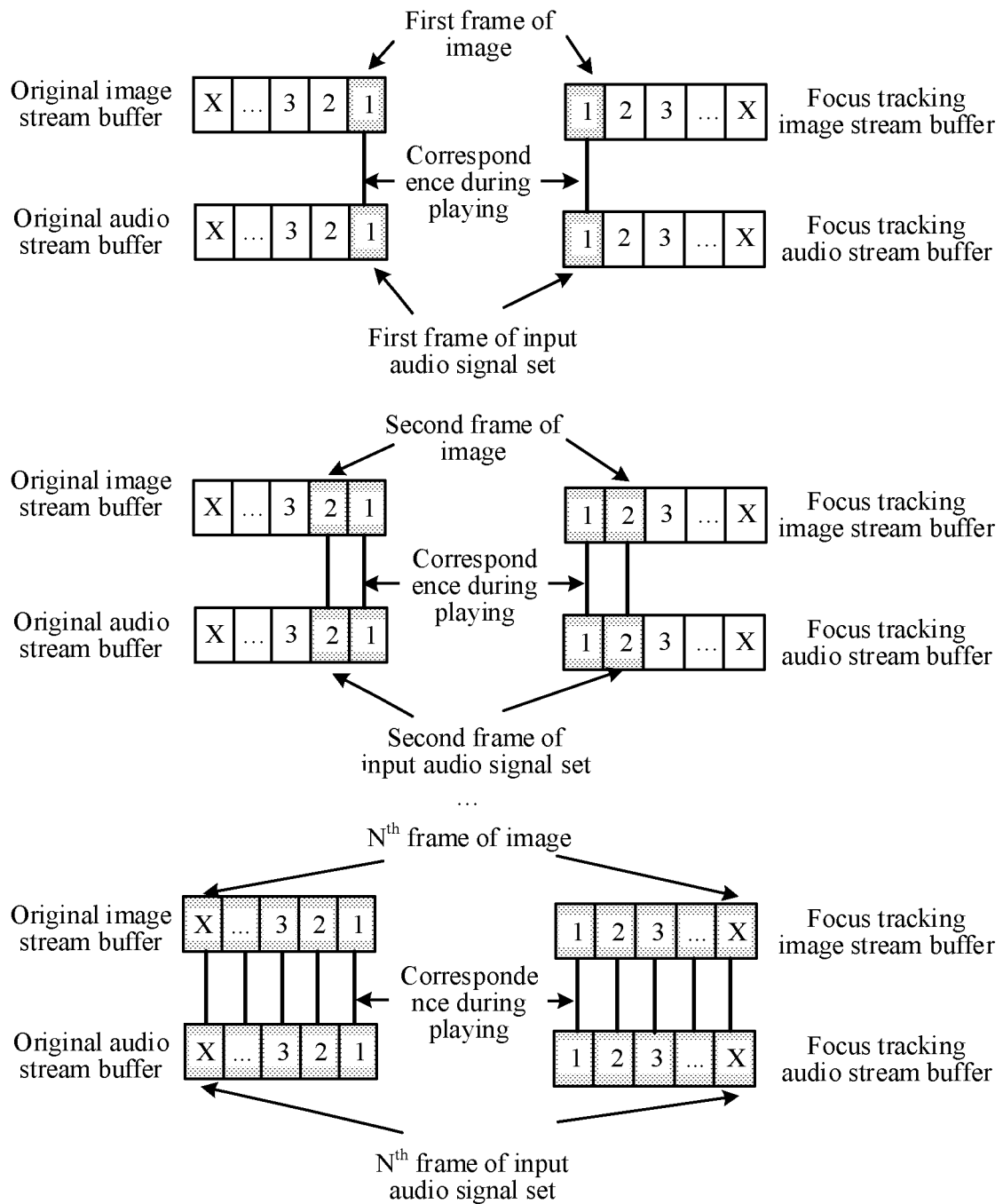
FIG. 7 is a schematic diagram of processing, in real time, each frame of image and an input audio signal set corresponding to each frame of image to obtain an original video and a focus tracking video.

FIG. 7 is a schematic diagram of processing, in real time, each frame of image and an input audio signal set corresponding to each frame of image to obtain an original video and a focus tracking video.

A process of FIG. 7 is a process of the terminal from starting video recording to ending video recording. When generating an image stream (an original image stream and a focus tracking image stream) and an audio stream (an original audio stream and a focus tracking audio stream), the terminal sequentially performs conventional processing on an acquired current frame of image in an acquisition sequence to obtain an original image, and saves the original image into an original image stream buffer; and sequentially performs image focus tracking processing on an acquired current frame of image in an acquisition sequence to obtain a focus tracking image, and saves the focus tracking image into a focus tracking image stream buffer. In addition, the terminal sequentially performs conventional processing on an acquired current frame of input audio signal set in an acquisition sequence, and then saves a processed frame of input audio signal set into an original audio stream buffer; and sequentially performs audio focus tracking processing on an acquired current frame of input audio signal set in an acquisition sequence, and then saves a processed frame of input audio signal set into an original audio stream buffer. Then, the terminal performs processing such as encoding on the original image in the original image stream buffer to generate an original image stream, performs processing such as encoding on the focus tracking image in the focus tracking image stream buffer to generate a focus tracking image stream, performs processing such as encoding on an original audio signal (an audio signal corresponding to the original image) in the original audio stream buffer to generate an original audio stream, and performs processing such as encoding on a focus tracking audio signal in the focus tracking audio stream buffer to generate a focus tracking audio stream.

For processes of generating the original image based on the current frame of image and generating the original audio signal based on the current frame of input audio signal set, refer to conventional processing technologies. Details are not described in this application. For a process of generating the focus tracking image based on the current frame of image, refer to the foregoing content. Details are not described herein again.

For the current frame of input audio signal set, the terminal may process the current frame of input audio signal set by using the audio focus tracking method in this application to obtain the focus tracking audio signal. The process is described in detail in the following step S101 to step S111 in FIG. 8. Details are not described herein.

The following describes processes in which the terminal obtains the focus tracking image stream based on the current frame of image and obtains the focus tracking audio stream based on the current frame of input audio signal set. For processes in which the terminal obtains the original image stream based on the current frame of image and obtains the original audio stream based on the current frame of input audio signal set, refer to the following description. Details are not described herein again.

Specifically, first, the terminal starts to record a video, and acquires a first frame of image and a first frame of input audio signal set. Then, the terminal performs image focus tracking processing on the first frame of image to obtain a first frame of focus tracking image, and buffers the first frame of focus tracking image into a region 1 of the focus tracking image stream buffer. In addition, the terminal performs audio focus tracking processing on the first frame of input audio signal set to obtain a focus tracking audio signal corresponding to the first frame of focus tracking image, and buffers the processed first frame of input audio signal set into a region 1 of the focus tracking audio stream buffer. During playing, when playing the processed first frame of focus tracking image, the terminal may play the focus tracking audio signal corresponding to the first frame of focus tracking image.

Then, after acquiring the first frame of image and the first frame of input audio signal set, when processing the first frame of image and the first frame of input audio signal set, the terminal may continue to acquire a second frame of image and a second frame of input audio signal set. A processing process is similar to that of the first frame of image and the first frame of input audio signal set. The terminal may buffer, into a region 2 of the focus tracking image stream buffer, a second frame of focus tracking image obtained after the second frame of image is processed, and buffers, into a region 2 of the focus tracking audio stream buffer, a focus tracking audio signal that corresponds to the second frame of focus tracking image and that is obtained after the second frame of input audio signal set is processed. During playing, when playing the processed second frame of image, the terminal may play the processed second frame of input audio signal set.

By analogy, after acquiring an $(X-1)^{th}$ frame of image and an $(X-1)^{th}$ frame of input audio signal set, when processing the $(X-1)^{th}$ frame of image and the $(X-1)^{th}$ frame of input audio signal set, the terminal may continue to acquire an $X^{th}$ frame of image and an $X^{th}$ frame of input audio signal set. A processing process is similar to that of the first frame of image and the first frame of input audio signal set.

In some possible cases, if a corresponding time for the terminal to play one frame of image is 30 ms, and a corresponding time for the terminal to play one frame of audio signal is 10 ms, in FIG. 7, when the terminal play one frame of image, a focus tracking audio signal corresponding to the frame of focus tracking image includes three frames of audio signals. 30 ms and 10 ms are merely examples for description, and should not constitute a limitation on embodiments of this application. Alternatively, there may be other values. For example, the corresponding time for the terminal to play one frame of image is 30 ms, and the corresponding time for the terminal to play one frame of audio signal is 30 ms.

Figure 8:
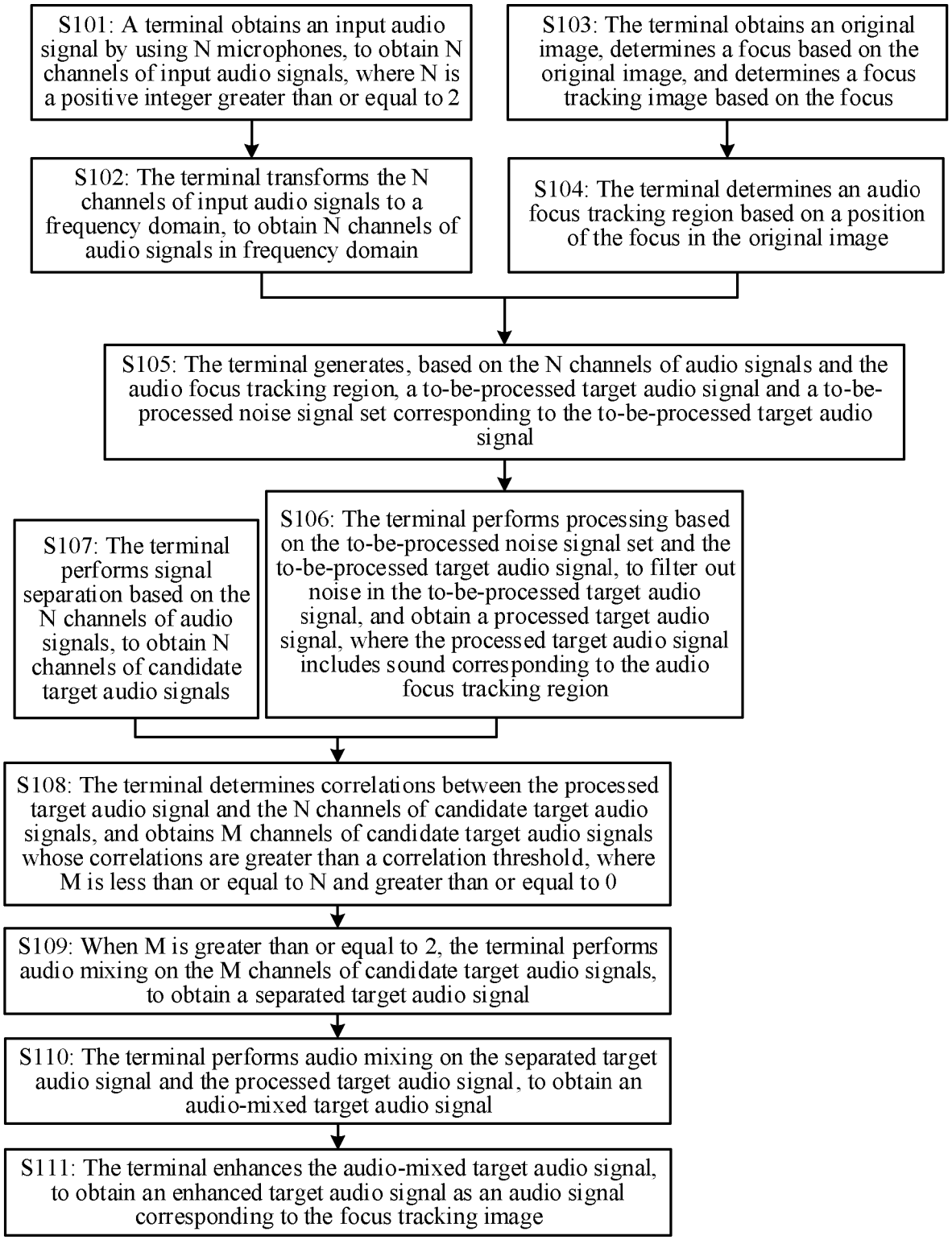
FIG. 8 is an example flowchart of image focus tracking and audio focus tracking according to an embodiment of this application.

FIG. 8 is an example flowchart of image focus tracking and audio focus tracking according to an embodiment of this application.

For a detailed description of the process, refer to the following descriptions of step S101 to step S111.

S101: A terminal obtains an input audio signal by using N microphones, to obtain N channels of input audio signals, where N is a positive integer greater than or equal to 2.

In step S101, example user interfaces when the terminal obtains the input audio signal may be the user interfaces in FIG. 5D to FIG. 5L.

The microphones of the terminal may respectively acquire a sound signal of a photographed object, to obtain channels of input audio signals. One of the channels of input audio signals may be referred to as a first input audio signal, and one of the N microphones may be referred to as a first microphone. In some possible cases, the input audio signal obtained by the terminal may also be referred to as first input audio, and the first input audio is audio signals included in at least two of the N channels of input audio signals.

The first input audio signal is an audio signal converted from a sound signal that is acquired by the first microphone of the terminal within a first time range. The first input audio signal may include H frames of audio signals. H is an integer greater than or equal to 1. For example, the first input audio signal may be any frame of input audio signal set in FIG. 7.

Specifically, within the first time range, the first microphone of the terminal may acquire a sound signal, and then convert the sound signal into an analog electrical signal. Then, the terminal samples the analog electrical signal, and converts the analog electrical signal into an audio signal in time domain. The audio signal in time domain is a digital audio signal, and is W sampling points of the analog electrical signal. The terminal may represent the first input audio signal by using an array, any element in the array is used to represent a sampling point, any element includes two values, one value represents a time, the other value represents an amplitude of an audio signal corresponding to the time, and the amplitude is used to represent a voltage magnitude corresponding to the audio signal.

S102: The terminal transforms the N channels of input audio signals to a frequency domain, to obtain N channels of audio signals in frequency domain.

The first input audio signal in step S101 is an audio signal in time domain. For ease of processing, the terminal may transform the first input audio signal to the frequency domain, to obtain a first audio signal. The first audio signal is one of the N channels of audio signals.

Specifically, the terminal may transform the first input audio signal in time domain to the frequency domain through Fourier transform (fourier transform, FT), for example, discrete Fourier transform (discrete fourier transform, DFT).

In some embodiments, the terminal may divide, through 2N-point DFT, the first input audio signal into first audio signals corresponding to N frequency bins. In the process, N is an integer power of 2, a value of N may be determined by a computing capability of the terminal, and a higher processing speed of the terminal may indicate a larger value of N.

This embodiment of this application is described by using an example in which the terminal divides, through 2048-point DFT, the first input audio signal into first audio signals corresponding to 1024 frequency bins. In this case, the terminal may represent an $i^{th}$ frame of audio signal in the first audio signal by using an array, and the array includes 1024 elements. Any element is used to represent a frequency bin, and includes two values, one value represents a frequency (hz) of an audio signal corresponding to the frequency bin, and the other value represents an amplitude of the audio signal corresponding to the frequency bin. The amplitude is in a unit of decibel (decibel, dB), and may represent a voltage magnitude of the audio signal corresponding to the time, or may represent an energy magnitude or a decibel magnitude of the audio signal.

It should be understood that, other than the array, the terminal may alternatively represent the first audio signal in another manner, for example, a matrix. This is not limited in this embodiment of this application.

S103: The terminal obtains an original image, determines a focus based on the original image, and determines a focus tracking image based on the focus.

The terminal may acquire an original image by using a camera, determine a focus based on the original image, determine a first image region in which the focus in the original image is located, crop the original image to obtain content in the first image region, and generate a focus tracking image based on the content in the first image region. An occasion on which the terminal determines a focus based on an original image includes but is not limited to the following occasions:

Occasion 1: After detecting an operation (for example, a single-tap operation) of a user on a start recording control, the terminal starts to record a video. When recording the video, the terminal may display an original image. When detecting an operation (for example, a single-tap operation) on a first position in the original image, the terminal may determine a focus based on a pixel at the first position in the original image. In this case, a manner of determining a focus includes:

(1) The terminal may use the pixel at the first position in the original image as a focus. For the process, refer to the description of determining the focus C in the original image 530 in FIG. 5D.

(2) The terminal may determine the pixel at the first position in the original image, perform face recognition in a third image region in which the pixel is located, to recognize a face that is the closest to the pixel, and use a pixel at a center position of the face as a focus.

Occasion 2: After operations (for example, single-tap operations) on a focus tracking control and a start recording control are detected, when an operation of selecting a focus for an original image by a user is not detected within a first time threshold, the terminal may automatically determine a focus based on the original image. Alternatively, after a display status of the focus tracking control changes or it is determined to display a focus tracking mode control, when an operation of selecting a focus for an original image by the user is not detected within the first time threshold, the terminal may automatically determine a focus based on the original image. In this case, a manner of determining a focus includes:

(1) A photographed object moving in a center region of the original image is recognized, and a pixel at a center position of the photographed object is determined as a focus. The center region of the original image is a fourth image region in which a center of the original image is located. The center of the original image is a geometric center of the original image.

(2) A pixel at the center position of the original image is used as a focus.

Occasion 3: After detecting operations (for example, single-tap operations) on a focus tracking control and a start recording control, in response to the operations, the terminal may automatically determine a focus based on an original image. Alternatively, after a display status of the focus tracking control changes or it is determined to display a focus tracking mode control, the terminal may automatically determine a focus based on an original image. Manners in which the terminal determines a focus are the same as those of the occasion 2.

(3) A photographed object in a center region of the original image is recognized, and a pixel at a center position of the photographed object is determined as a focus.

It should be understood that, after determining the focus (referred to as a focus 1 below) on the occasion 2 or the occasion 3, when detecting an operation of determining a focus (referred to as a focus 2 below) for an original image by the user, the terminal may update the focus from the focus 1 to the focus 2. In this way, the focus 2 selected by the user may be used as a focus to implement image focus tracking and audio focus tracking.

S104: The terminal determines an audio focus tracking region based on a position of the focus in the original image.

In some possible cases, for example, it can be learned from the description of FIG. 3 that, for the original image, the terminal may divide the original image into three regions according to a specific rule, and then the terminal may determine a region in which the focus is located as an audio focus tracking region. The audio focus tracking region is the second image region in Embodiment 1.

The audio focus tracking region corresponds to a target sound direction. For a correspondence manner, refer to FIG. 4 and the description of FIG. 4. The correspondence between the audio focus tracking region and the target sound direction may be used to determine the target sound direction in the following step S105. For a related description of the process, refer to the following related description of step S105. Details are not described herein.

For a manner of dividing the original image into three regions, refer to the description of FIG. 3. The three regions are a middle region (for example, the region 301 shown in FIG. 3) in the original image, a rightward region (for example, the region 302 shown in FIG. 3) in the original image, and a leftward region (for example, the region 303 shown in FIG. 3) in the original image, respectively.

It should be understood that, in FIG. 3, the original image is divided into three regions that do not overlap. In some other cases, the three regions may overlap.

Figure 9:
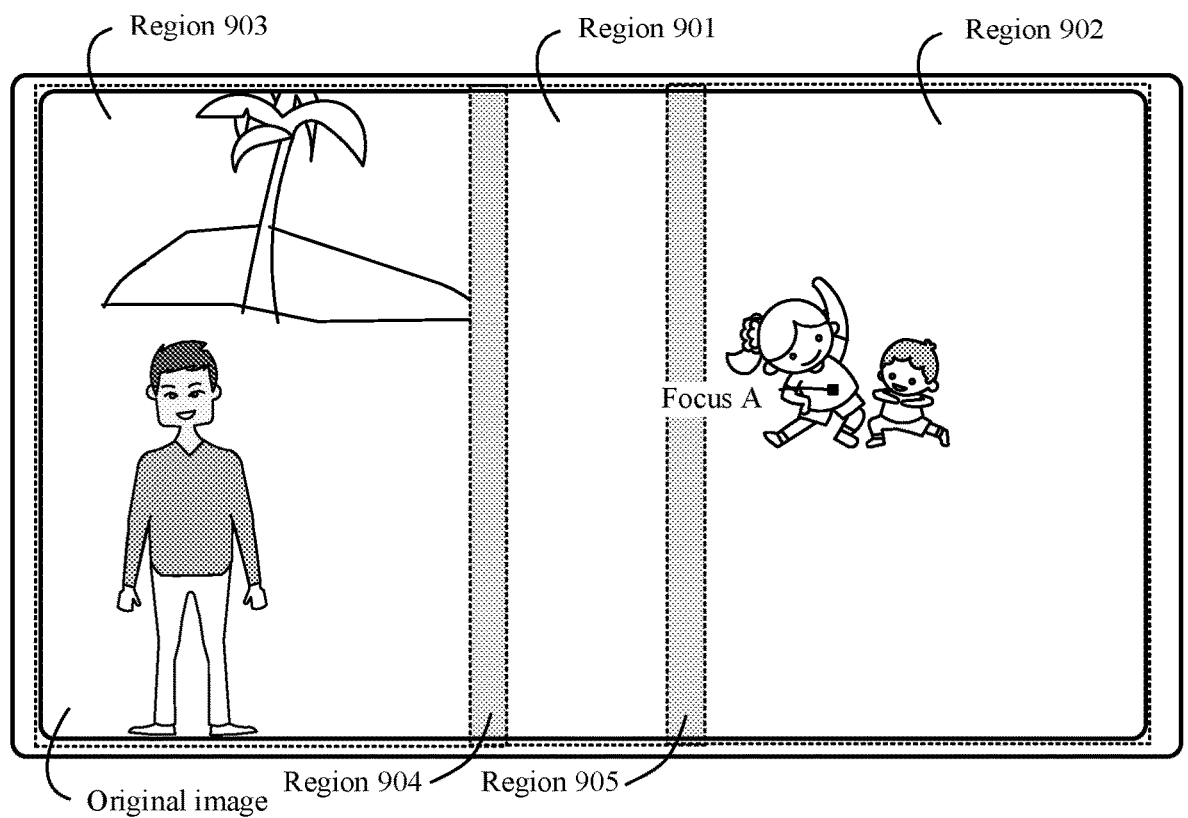
FIG. 9 is another schematic diagram of a middle region, a rightward region, and a leftward region of an original image.

FIG. 9 is another schematic diagram of a middle region, a rightward region, and a leftward region of an original image.

As shown in FIG. 9, the terminal may divide the original image into three regions: a region 901, a region 902, and a region 903. The region 901 is a middle region of the original image, the region 902 is a rightward region in the original image, and the region 903 is a leftward region in the original image. A focus A is in the region 902 (the rightward region), and in this case, the region 902 is a second image region in which the focus in the original image is located, that is, an audio focus tracking region. There is an overlap region (an image region 904) between the middle region (901) of the original image and the leftward region (the region 903) in the original image, and there is an overlap region (an image region 904) between the middle region (the region 901) of the original image and the rightward region (the region 902) in the original image.

It should be further understood that, in FIG. 3 and FIG. 9, the original image is divided into three regions, while in some other cases, the terminal may alternatively divide the original image into more or fewer regions, for example, four regions or five regions. For a division manner, refer to the description of FIG. 3 or FIG. 9. Each region can still correspond to a target sound direction, and a manner of determining the target sound direction corresponding to each region is similar to the manner of determining a target sound direction corresponding to each region when the original image is divided into three regions. For the manner, refer to the description of related content. Details are not described herein again.

This embodiment of this application is described by using an example in which the original image is divided into three regions (a middle region of the original image, a rightward region in the original image, and a leftward region in the original image), which, however, should not constitute a limitation on embodiments of this application.

S105: The terminal generates, based on the N channels of audio signals and the audio focus tracking region, a to-be-processed target audio signal and a to-be-processed noise signal set corresponding to the to-be-processed target audio signal.

Optionally, the to-be-processed target audio signal includes target sound, and may further include a part of noise, the target sound may include sound corresponding to the audio focus tracking region, the to-be-processed noise signal set includes T channels of to-be-processed noise signals, and each channel of to-be-processed noise signal includes noise, and may further include a part of the target sound.

Optionally, the terminal generates, based on the N channels of audio signals and the audio focus tracking region, the to-be-processed target audio signal and the to-be-processed noise signal.

The target sound may include the sound corresponding to the audio focus tracking region, and the sound corresponding to the audio focus tracking region is sound of a photographed object included in the audio focus tracking region. The noise is sound of a photographed object that is not included in the audio focus tracking region.

The terminal may determine a target sound direction corresponding to the audio focus tracking region. Refer to FIG. 4. The target sound direction is any direction in a shooting region (which may be referred to as a focus tracking shooting region below) corresponding to the audio focus tracking region. For example, when the audio focus tracking region is the middle region of the original image, the target sound direction may be any direction in a middle shooting region (within a range clockwise from the 10° direction to the 350° direction in FIG. 4) range in front of the terminal, for example, the right front of the terminal, that is, the 0° direction. When the audio focus tracking region is the leftward region in the original image, the target sound direction may be any direction in a leftward shooting region (within a range counterclockwise from the 10° direction in FIG. 4 to the 90° direction in the figure) range in front of the terminal, for example, the 45° direction in the figure. When the audio focus tracking region is the rightward region in the original image, the target sound direction may be any direction in a leftward shooting region (within a range clockwise from the 10° direction in FIG. 4 to the 270° direction in the figure) range in front of the terminal, for example, the 315° direction in the figure.

The terminal may perform, by using a beamforming technology, filtering and synthesis on the N channels of audio signals based on a filter coefficient corresponding to the target sound direction, to obtain a channel of to-be-processed target audio signal. The to-be-processed target audio signal has H frames of target audio signals. The filter coefficient corresponding to the target sound direction includes filter coefficients corresponding to the N microphones in the target sound direction. A filter coefficient corresponding to an $i^{th}$ microphone in the target sound direction may be used to retain the target sound in an $i^{th}$ channel of audio signal, and suppress noise in the $i^{th}$ channel of audio signal. The $i^{th}$ channel of audio signal is an audio signal converted from an input audio signal acquired by the $i^{th}$ microphone. For a related description of obtaining the to-be-processed target audio signal based on the beamforming technology, refer to the following descriptions of FIG. 10A to FIG. 10C. The filter coefficient corresponding to the target sound direction is predetermined and then set in the terminal. For a process of determining the filter coefficient, refer to the following description of step S202.

Beamforming may be used to describe a correspondence between when the terminal obtains an audio signal by using a microphone and when the audio signal is transmitted to a speaker and played. The correspondence is a group of gain coefficients, and is used to indicate a suppression level of suppressing an audio signal obtained by the microphone in each direction. The suppression is reducing energy of the audio signal so that the audio signal sounds lower or even cannot be heard. The suppression level is used to describe a level at which the audio signal is reduced. A higher suppression level indicates that the energy of the audio signal is reduced more. For example, a gain coefficient of 0.0 indicates that the audio signal is completely filtered out, and again coefficient of 1.0 indicates that the audio signal is not suppressed. Being closer to 0.0 indicates a higher suppression level, and being closer to 1.0 indicates a lower suppression level.

Figure 10A:
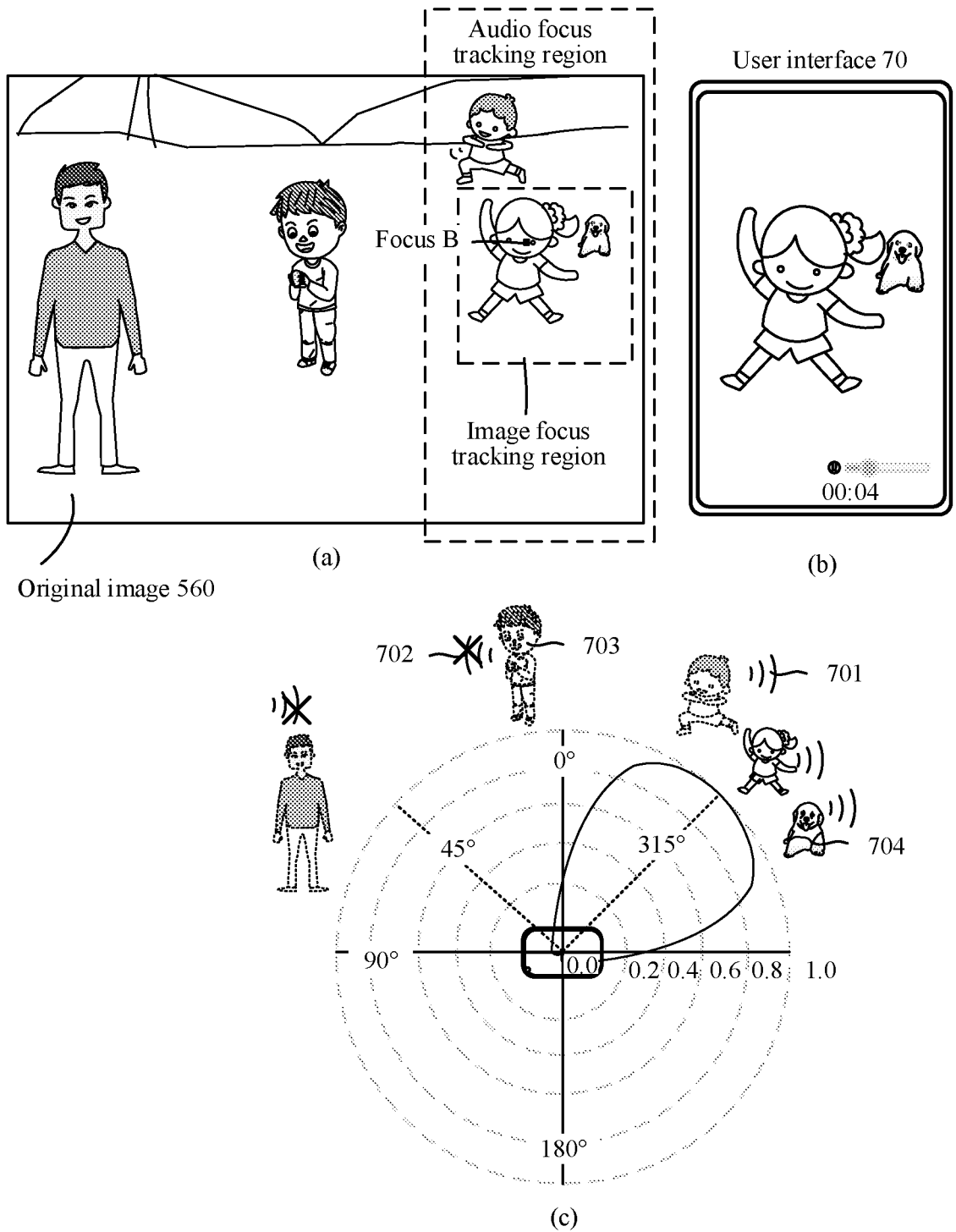
FIG. 10A to FIG. 10C are schematic diagrams of a beamforming technology related to generation of a to-be-processed target audio signal.
Figure 10B:
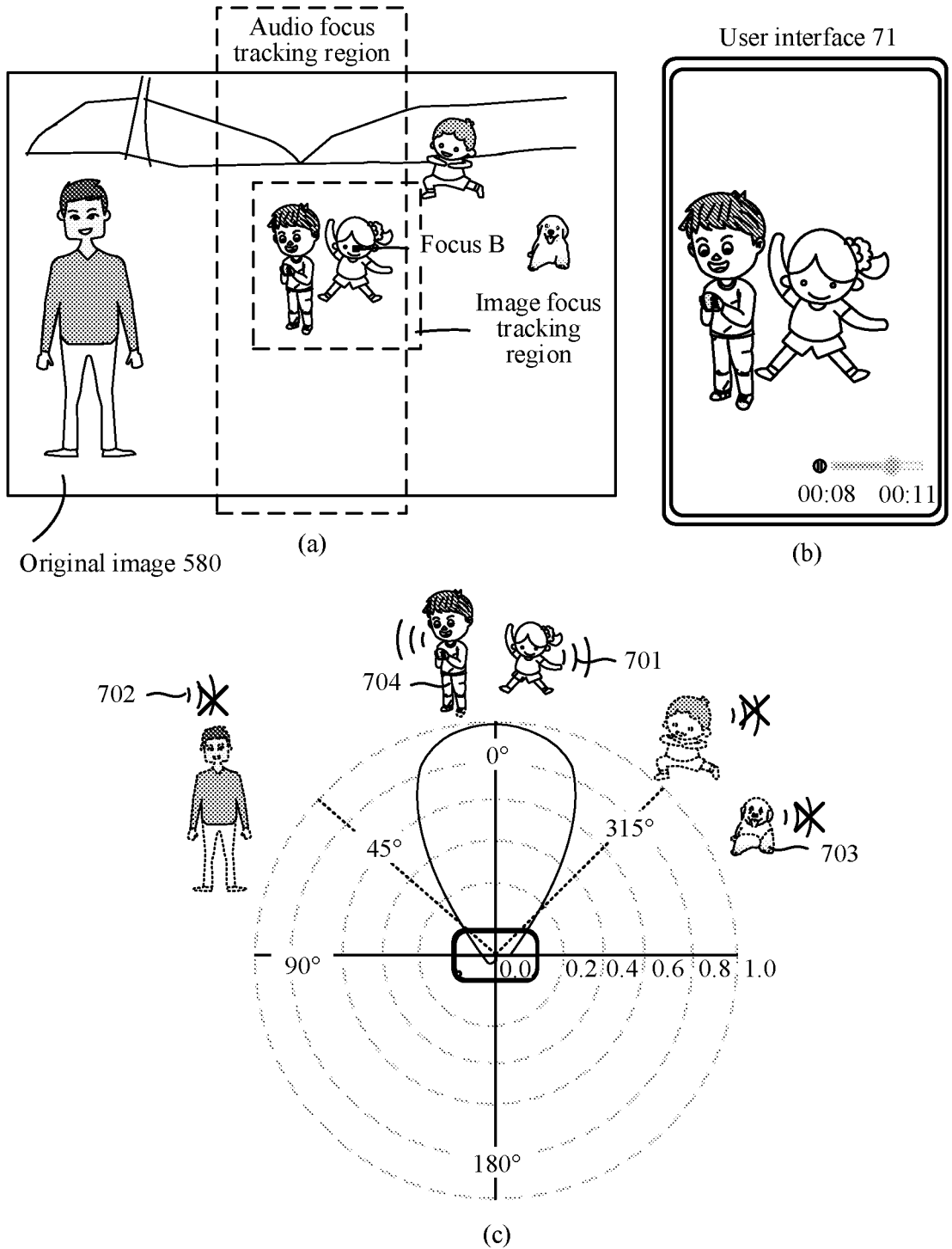
Figure 10C:
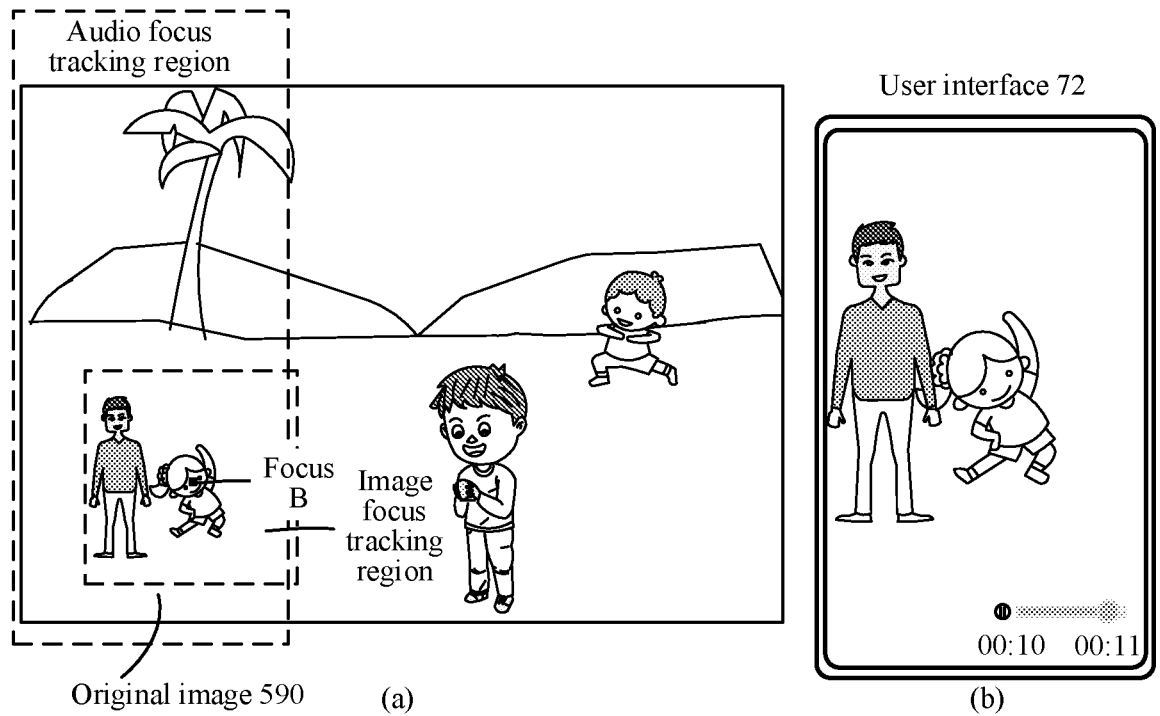
Figure 10C:
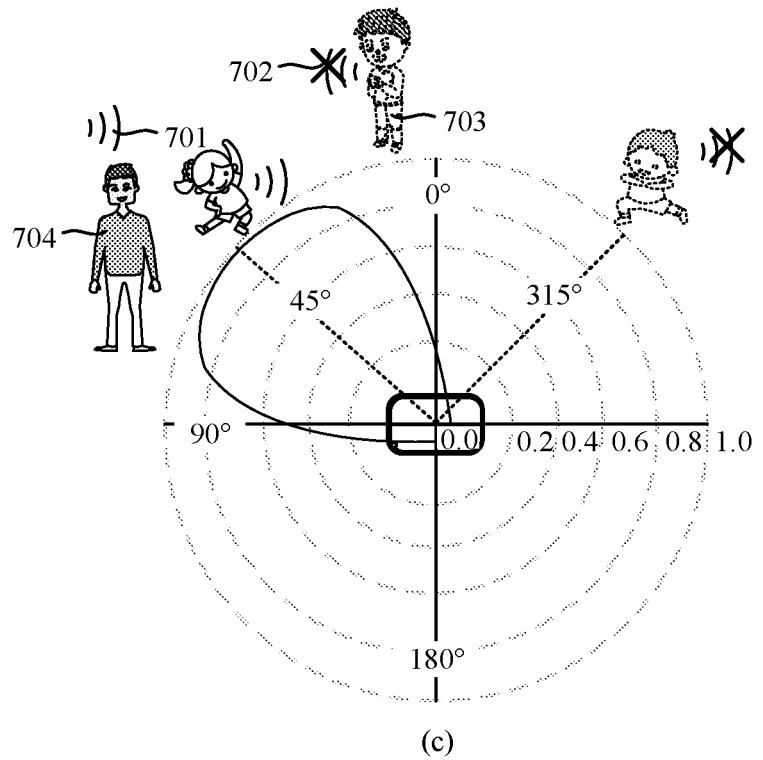

FIG. 10A to FIG. 10C are schematic diagrams of the beamforming technology related to generation of the to-be-processed target audio signal.

Herein, a shooting scenario in Embodiment 1 is used as an example to describe beamforming patterns of the terminal when the audio focus tracking region (the first image region in Embodiment 1) is the middle region of the original image, the leftward region in the original image, and the rightward region in the original image, respectively.

(a) in FIG. 10A to (a) in FIG. 10C respectively represent original images corresponding to a fourth second, an eighth second, and a tenth second. In this case, a focus (a focus B in the figures, that is, the focus B in Embodiment 1) is the same as that in Embodiment 1, and a focus tracking image is a little girl (the photographed object 101). (b) in FIG. 10A to (b) in FIG. 10C respectively represent user interfaces when the terminal plays focus tracking videos corresponding to the fourth second, the eighth second, and the tenth second. (c) in FIG. 10A to (c) in FIG. 10C respectively represent beamforming patterns when to-be-processed target audio signals corresponding to the fourth second, the eighth second, and the tenth second are generated. In an icon 701, a sound signal is a solid line, which indicates in this embodiment of this application that sound of a photographed object belongs to target sound, and is not suppressed. Therefore, in a played focus tracking video, the sound of the photographed object can be heard. In an icon 702, a cross is drawn on a sound signal, which indicates in this embodiment of this application that sound of a photographed object belongs to noise, and is suppressed. Therefore, in a played focus tracking video, the sound of the photographed object cannot be heard. In an icon 703, a photographed object is drawn by a dashed line, which indicates that the photographed object is not a photographed object in an image focus tracking region (the first image region in Embodiment 1), and cannot appear in a focus tracking image during video playing. In an icon 704, a photographed object is drawn by a solid line, which indicates that the photographed object is a photographed object in an image focus tracking region, and can appear in a focus tracking image during video playing. In FIG. 10A to FIG. 10C, icons of a same drawing style represent a same meaning, and are not marked and explained one by one herein.

As shown in (a) in FIG. 10A, an original image 560 is an original image corresponding to a focus tracking image in the focus tracking video of the fourth second. In this case, an audio focus tracking region (the second image region in Embodiment 1) is a rightward region in the original image 560, and a focus (the focus B in the figure) is on the little girl (the photographed object 101) displayed in the original image 560. Therefore, the little girl is a focus tracking object. As shown in (b) in FIG. 10A, a user interface 70 plays the focus tracking video that is recorded in FIG. 5G and that corresponds to the fourth second. In this case, a displayed focus tracking image is the focus tracking image corresponding to the original image 560. The focus tracking image includes the little girl (the photographed object 101) and a puppy (the photographed object 105). Target sound included in the focus tracking video is sound corresponding to the audio focus tracking region, that is, the little girl (the photographed object 101), a little boy A (the photographed object 102), and the puppy (the photographed object 105). Noise includes a little boy B (the photographed object 104) and a man (the photographed object 103), and the noise is suppressed, and cannot be heard or sounds low when the focus tracking video corresponding to the fourth second is played.

An audio signal corresponding to the focus tracking image displayed in the user interface 70 is generated after a to-be-processed target audio signal A is processed through the following step S106 to step S111. The to-be-processed target audio signal A is generated after filtering and synthesis are performed on N channels of audio signals corresponding to the fourth second that are obtained by the terminal. The terminal may generate the to-be-processed target audio signal A based on the beamforming pattern shown in (c) in FIG. 10A.

(c) in FIG. 10A is the beamforming pattern of the to-be-processed target audio signal A when the audio focus tracking region is the rightward region in the original image (a target sound direction is a 315° direction). A symmetry line of the beamforming pattern is on the 315° direction, and the terminal may generate the to-be-processed target audio signal A by using the beamforming pattern of the to-be-processed target audio signal A. It can be learned from the beamforming pattern that in this case, an audio signal obtained by the terminal includes sound of the little girl (the photographed object 101), the little boy A (the photographed object 102), the man (the photographed object 103), the little boy B (the photographed object 104), and the puppy (the photographed object 105). However, it can be learned from the beamforming pattern that, in the to-be-processed target audio signal A generated by the terminal based on the N channels of audio signals by using the beamforming pattern, gain coefficients corresponding to directions in which sound of the little girl, the little boy A, and the puppy is located are all 1 (or close to 1), and therefore, the terminal does not suppress the sound of the little girl, the little boy A, and the puppy (it may be understood that, because the gain coefficients are close to 1, suppression effects are weak, and it may be considered that suppression is not performed, which also applies to another embodiment). It may be understood that the sound of the little girl, the little boy A, and the puppy is target sound. However, gain coefficients corresponding to directions in which sound of the man and the little boy B is located are both 0 (or close to 0), and therefore, the terminal may suppress the sound of the man and the little boy B (it may be understood that, because the gain coefficients are close to 0, suppression effects are strong, which also applies to another embodiment). In this case, although the audio signal obtained by the terminal includes the sound of the little girl, the little boy A, the man, the little boy B, and the puppy, when the audio signal corresponding to the focus tracking image is played, the sound of the man and the little boy B is suppressed, and acoustically, the sound of the man and the little boy B cannot be heard, or the sound of the man and the little boy B sounds lower.

It should be understood that, in addition to the sound of the man and the little boy B, the noise in the content described with reference to FIG. TOA may further include other noise, for example, sound corresponding to a non-shooting region, and the other noise is also suppressed when the audio signal corresponding to the focus tracking image is played.

As shown in (a) in FIG. 10B, an original image 580 is an original image corresponding to a focus tracking image in the focus tracking video of the eighth second. In this case, an audio focus tracking region (the second image region in Embodiment 1) is a middle region of the original image 580, and a focus (the focus B in the figure) is on the little girl (the photographed object 101) displayed in the original image 580. Therefore, the little girl is a focus tracking object. As shown in (b) in FIG. 10B, a user interface 71 plays the focus tracking video that is recorded in FIG. 5I and that corresponds to the eighth second. In this case, a displayed focus tracking image is the focus tracking image corresponding to the original image 580. The focus tracking image includes the little girl (the photographed object 101) and the little boy B (the photographed object 104). Target sound included in the focus tracking video is sound corresponding to the audio focus tracking region, that is, the little girl and the little boy B. Noise includes the little boy A (the photographed object 102), the puppy (the photographed object 105), and the man (the photographed object 103), and the noise is suppressed, and cannot be heard or sounds low when the focus tracking video corresponding to the eighth second is played.

An audio signal corresponding to the focus tracking image displayed in the user interface 71 is generated after a to-be-processed target audio signal B is processed through the following step S106 to step S111. The to-be-processed target audio signal B is generated after filtering and synthesis are performed on N channels of audio signals corresponding to the eighth second that are obtained by the terminal. The terminal may generate the to-be-processed target audio signal B based on the beamforming pattern shown in (c) in FIG. 10B.

(c) in FIG. 10B is the beamforming pattern of the to-be-processed target audio signal B when the audio focus tracking region is the middle region of the original image (a target sound direction is a 0° direction). A symmetry line of the beamforming pattern is on the 0° direction, and the terminal may generate the to-be-processed target audio signal B by using the beamforming pattern of the to-be-processed target audio signal B. It can be learned from the beamforming pattern that in this case, an audio signal obtained by the terminal includes sound of the little girl (the photographed object 101), the little boy A (the photographed object 102), the man (the photographed object 103), the little boy B (the photographed object 104), and the puppy (the photographed object 105). However, it can be learned from the beamforming pattern that, in the to-be-processed target audio signal B generated by the terminal based on the N channels of audio signals by using the beamforming pattern, gain coefficients corresponding to directions in which sound of the little girl and the little boy B is located are both 1 (or close to 1), and therefore, the terminal does not suppress the sound of the little girl and the little boy B (it may be understood that the sound of the little girl and the little boy B is target sound). However, gain coefficients corresponding to directions in which sound of the little boy A, the man, and the puppy is located are all 0 (or close to 0), and therefore, the terminal may suppress the sound of the little boy A, the man, and the puppy. In this case, although the audio signal that is obtained by the terminal and that corresponds to the eighth second includes the sound of the little girl, the little boy A, the man, the little boy B, and the puppy, when the audio signal corresponding to the focus tracking image is played, the sound of the little boy A, the man, and the puppy is suppressed, and acoustically, the sound of the little boy A, the man, and the puppy cannot be heard, or the sound of the little boy A, the man, and the puppy sounds lower.

It should be understood that, in addition to the sound of the little boy A, the man, and the puppy, the noise in the content described with reference to FIG. 10B may further include other noise, for example, sound corresponding to a non-shooting region, and the other noise is also suppressed when the audio signal corresponding to the focus tracking image is played.

As shown in (a) in FIG. 10C, an original image 590 is an original image corresponding to a focus tracking image in the focus tracking video of the tenth second. In this case, an audio focus tracking region (the second image region in Embodiment 1) is a middle region of the original image 590, and a focus (the focus B in the figure) is on the little girl (the photographed object 101) displayed in the original image 590. Therefore, the little girl is a focus tracking object. As shown in (b) in FIG. 10C, a user interface 72 plays the focus tracking video that is recorded in FIG. 5K and that corresponds to the tenth second. In this case, a displayed focus tracking image is the focus tracking image corresponding to the original image 590. The focus tracking image includes the little girl (the photographed object 101) and the man (the photographed object 103). Target sound included in the focus tracking video is sound corresponding to the audio focus tracking region, that is, the little girl and the man. Noise includes the little boy A (the photographed object 102), the puppy (the photographed object 105), and the little boy A (the photographed object 102), and the noise is suppressed, and cannot be heard or sounds low when the focus tracking video corresponding to the tenth second is played.

An audio signal corresponding to the focus tracking image displayed in the user interface 72 is generated after a to-be-processed target audio signal C is processed through the following step S106 to step S111. The to-be-processed target audio signal C is generated after filtering and synthesis are performed on N channels of audio signals corresponding to the tenth second that are obtained by the terminal. The terminal may generate the to-be-processed target audio signal C based on the beamforming pattern shown in (c) in FIG. 10C.

(c) in FIG. 10C is the beamforming pattern of the to-be-processed target audio signal C when the audio focus tracking region is the leftward region in the original image (a target sound direction is a 45° direction). A symmetry line of the beamforming pattern is on the 0° direction, and the terminal may generate the to-be-processed target audio signal C by using the beamforming pattern of the to-be-processed target audio signal C. It can be learned from the beamforming pattern that in this case, an audio signal obtained by the terminal includes sound of the little girl (the photographed object 101), the little boy A (the photographed object 102), the man (the photographed object 103), the little boy B (the photographed object 104), and the puppy (the photographed object 105). However, it can be learned from the beamforming pattern that, in the to-be-processed target audio signal C generated by the terminal based on the N channels of audio signals by using the beamforming pattern, gain coefficients corresponding to directions in which sound of the man and the little girl is located are both 1 (or close to 1), and therefore, the terminal does not suppress the sound of the man and the little girl (it may be understood that the sound of the man and the little girl is target sound). However, gain coefficients corresponding to directions in which sound of the little boy A and the little boy B is located are both 0 (or close to 0), and therefore, the terminal may suppress the sound of the little boy A and the little boy B. In this case, although the audio signal that is obtained by the terminal and that corresponds to the tenth second includes the sound of the little girl, the little boy A, the man, and the little boy B, when the audio signal corresponding to the focus tracking image is played, the sound of the little boy A and the little boy B is suppressed, and acoustically, the sound of the little boy A and the little boy B cannot be heard, or the sound of the little boy A and the little boy B sounds lower.

It should be understood that, in addition to the sound of the little boy A and the little boy B, the noise in the content described with reference to FIG. 10C may further include other noise, for example, sound corresponding to a non-shooting region, and the other noise is also suppressed when the audio signal corresponding to the focus tracking image is played.

In this way, in a to-be-processed target audio signal obtained by the terminal based on the beamforming technology, target sound may be retained, and noise may be suppressed. In the beamforming technology, when an included angle between a noise direction in which noise is located and a target sound direction is small, a noise suppression effect is good. When the included angle between the noise direction in which the noise is located and the target sound direction is large, the noise suppression effect is poor. For example, the noise suppress effect when the included angle between the noise direction and the target sound direction is less than 90° is better than that when the included angle between the noise direction and the target sound direction is greater than 90°.

Due to a limitation of the beamforming technology in obtaining the to-be-processed target audio signal, the to-be-processed target audio signal still includes a part of noise, in addition to the target sound. A larger included angle between a noise direction in which the noise is located and a target sound direction indicates more energy of the noise. Therefore, in some possible cases, the terminal may determine T noise directions corresponding to the target sound direction, and perform, by using the beamforming technology, filtering and synthesis on the N channels of audio signals based on a filter coefficient corresponding to each noise direction, to obtain a to-be-processed noise signal set corresponding to the to-be-processed target audio signal. The to-be-processed noise signal set includes T channels of to-be-processed noise signals, and each channel of to-be-processed noise signal includes noise, and may further include a part of the target sound. An $i^{th}$ channel of to-be-processed noise signal has H frames of noise signals, and noise included in the $i^{th}$ channel of to-be-processed noise signal is generated by using the beamforming technology based on a filter coefficient corresponding to an $i^{th}$ noise direction. Noise closer to the $i^{th}$ noise direction may be more retained in the $i^{th}$ channel of to-be-processed noise signal, and noise farther away from the $i^{th}$ noise direction is suppressed at a higher level. The noise in the $i^{th}$ channel of to-be-processed noise signal may be referred to as an $i^{th}$ channel of noise. A filter coefficient corresponding to each noise direction is predetermined and then set in the terminal. For a process of determining the filter coefficient, refer to the following description of related content in step S202. Details are not described herein.

In a subsequent process (refer to the following step S106), the terminal may filter out the noise in the to-be-processed target audio signal by using the to-be-processed noise signal set corresponding to the to-be-processed target audio signal as a reference, to obtain a processed target audio signal. The processed target audio signal includes the target sound while the noise is filtered out. When the filtering is completed, it may be considered that no noise is included or noise is suppressed (noise is low). For a description of the subsequent process, refer to the following description of step S106. Details are not described herein.

For the T noise directions corresponding to the target sound direction, it should be understood that, T is an integer greater than or equal to 2, and quantities of noise directions corresponding to different target sound directions may be the same or different. Refer to FIG. 4. The target sound direction is any direction in the shooting region (which may be referred to as a focus tracking shooting region below) corresponding to the audio focus tracking region. The noise direction may be any direction in another shooting region or a non-shooting region. The another shooting region is a shooting region other than the focus tracking shooting region in a shooting region of the terminal, and may also be referred to as a non-focus-tracking shooting region below.

In this case, the target sound may include sound corresponding to the audio focus tracking region, and the sound corresponding to the audio focus tracking region is sound of a photographed object included in the audio focus tracking region. The noise is sound of a photographed object that is not included in the audio focus tracking region. Alternatively, it may be understood that the target sound may include sound corresponding to the focus tracking shooting region, and the noise is sound in the non-focus-tracking shooting region.

In some possible cases, a rule for determining at least one noise direction corresponding to the target sound direction may be as follows:

Rule 1: The terminal may determine a direction with a large included angle between the direction and the target sound direction as a noise direction. Generally, an included angle between the noise direction and the target sound direction may be greater than or equal to 90°. When one target sound direction corresponds to only one noise direction (that is, T=1), the noise direction is a direction with a maximum included angle between the direction and the target sound direction. The rule 1 is determined due to the limitation when the terminal uses the beamforming technology. The limitation of the beamforming technology is manifested as follows: When an included angle between a noise direction in which noise is located and a target sound direction is small, a noise suppression effect is good. When the included angle between the noise direction in which the noise is located and the target sound direction is large, the noise suppression effect is poor.

Rule 2: When the rule 1 is met, if included angles between the target sound direction and two directions are the same, either of the directions may be selected as a noise signal corresponding to the target sound direction. For example, one direction is in another shooting region of the terminal, and the other direction is in a non-shooting region of the terminal. If to stress sound in the shooting region, the terminal may determine the direction in the shooting region of the terminal as a noise direction, so that in the following step S106, the terminal may further suppress sound corresponding to the another shooting region. If to stress sound in the non-shooting region, the terminal may determine the direction in the non-shooting region of the terminal as a noise direction, so that in the following step S106, the terminal may further suppress sound corresponding to the shooting region.

Figure 11:
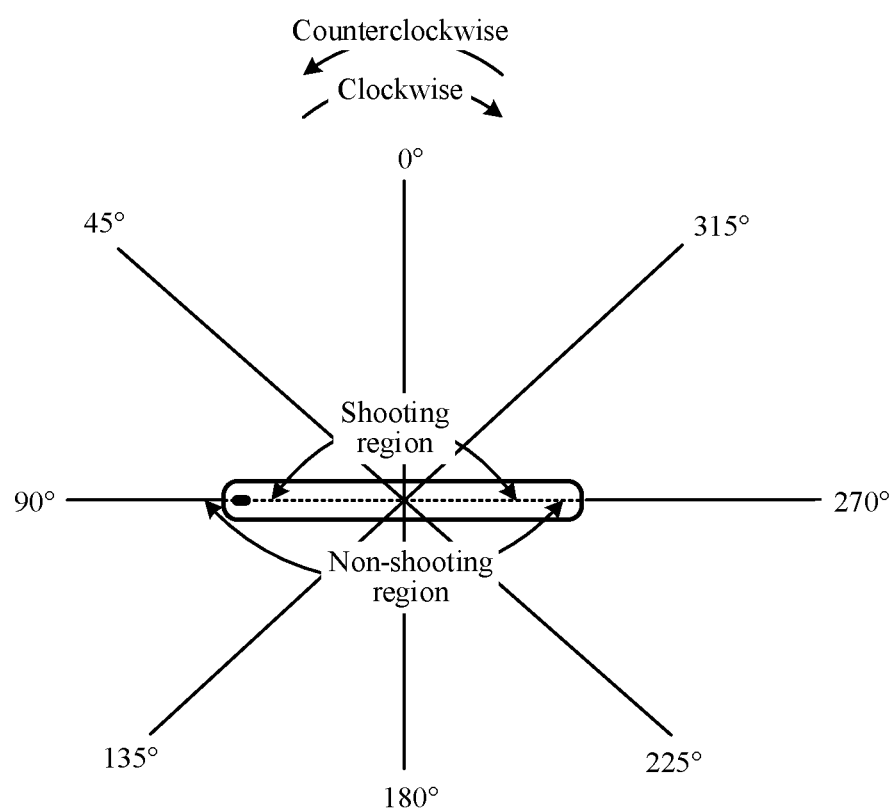
FIG. 11 is a schematic diagram of a target sound direction and a noise direction corresponding to the target sound direction.

FIG. 11 is a schematic diagram of a target sound direction and a noise direction corresponding to the target sound direction.

It should be understood that, any direction in the non-shooting region of the terminal may be a noise direction, the terminal may preset at least one direction in the non-shooting region as a noise direction in the non-shooting region, and subsequently may determine, based on the preset noise direction in the non-shooting region, the T noise directions corresponding to the target sound direction.

In some possible cases, the terminal may provide two directions in the non-shooting region as noise directions in the non-shooting region, for example, a 135° direction and a 225° direction in FIG. 11. Filter coefficients in the 135° direction and the 225° direction may be predetermined by the terminal and then set in the terminal. For a process of determining the filter coefficients, refer to the following description of related content in step S202. Details are not described herein. The filter coefficient in the 135° direction may be used to generate a channel of to-be-processed noise signal (referred to as a to-be-processed noise signal 1 below) based on the N channels of audio signals. In this case, the terminal may perform, by using the beamforming technology, filtering and synthesis on the N channels of audio signals based on the filter coefficient corresponding to the 135° direction, to obtain the to-be-processed noise signal 1. Noise closer to the 135° direction may be more retained in the to-be-processed noise signal 1. For example, noise in a left non-shooting region in the non-shooting region may be retained in the to-be-processed noise signal 1. The left non-shooting region may be a region within a range counterclockwise from a 90° direction in the figure to a 180° direction in the figure. The filter coefficient in the 225° direction may be used to generate another channel of to-be-processed noise signal (a to-be-processed noise signal 2) based on the N channels of audio signals. In this case, the terminal may perform, by using the beamforming technology, filtering and synthesis on the N channels of audio signals based on the filter coefficient corresponding to the 225° direction, to obtain the to-be-processed noise signal 2. Noise closer to the 225° direction may be more retained in the to-be-processed noise signal 2. For example, noise in a right non-shooting region in the non-shooting region may be retained in the to-be-processed noise signal 2. The right non-shooting region may be a region within a range counterclockwise from the 180° direction in the figure to a 270° direction in the figure. That is, noise included in the to-be-processed noise signal 1 and to-be-processed noise signal 2 is sound corresponding to the non-shooting region.

Figure 12:
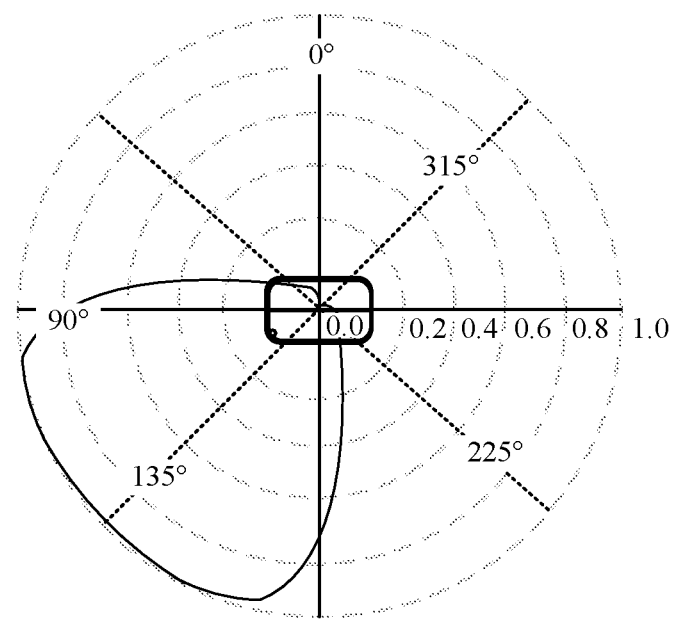
FIG. 12 is a schematic diagram of a beamforming technology related to generation of a to-be-processed noise signal 1 and a to-be-processed noise signal 2.
Figure 12:
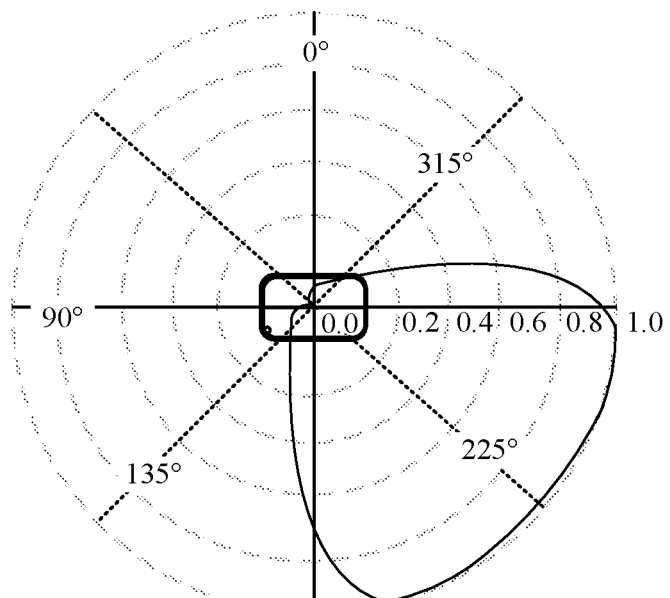

FIG. 12 is a schematic diagram of the beamforming technology related to generation of the to-be-processed noise signal 1 and the to-be-processed noise signal 2.

(a) in FIG. 12 shows a beamforming pattern of the to-be-processed noise signal 1 when the noise direction is the 135° direction. A symmetry line of the beamforming pattern is on the 135° direction, and the terminal may generate the to-be-processed noise signal 1 by using the beamforming pattern of the to-be-processed noise signal 1. It can be learned from the beamforming pattern that, a gain coefficient corresponding to a direction in which noise closer to the 135° direction is located is 1 (or is closer to 1), and therefore, the terminal does not suppress the noise closer to the 135° direction or a suppression level is lower, so that the noise closer to the 135° direction may be more retained in the to-be-processed noise signal 1.

(b) in FIG. 12 shows a beamforming pattern of the to-be-processed noise signal 2 when the noise direction is the 225° direction. A symmetry line of the beamforming pattern is on the 225° direction, and the terminal may generate the to-be-processed noise signal 2 by using the beamforming pattern of the to-be-processed noise signal 2. It can be learned from the beamforming pattern that, a gain coefficient corresponding to a direction in which noise closer to the 225° direction is located is 1 (or is closer to 1), and therefore, the terminal does not suppress the noise closer to the 225° direction or a suppression level is lower, so that the noise closer to the 225° direction may be more retained in the to-be-processed noise signal 2.

For more detailed descriptions of the beamforming patterns shown in FIG. 12, refer to the descriptions of the beamforming patterns in FIG. TOA to FIG. 10C. Details are not described herein again.

In this case, the at least one noise direction corresponding to the target sound direction is described by using an example in which the target sound direction may be one of the 45° direction, the 0° direction, or the 315° direction, the noise direction in the non-shooting region is at least one of the 135° direction and the 225° direction, and the target sound direction may correspond to two (T=2) noise directions. Refer to the following Table 1.

TABLE 1

| Target sound direction | Noise direction |
| --- | --- |
| 45° direction | 225° direction and 315° direction |
| 0° direction | 135° direction and 225° direction |
| 315° direction | 45° direction and 135° direction |

As shown in FIG. 11 and Table 1, when the target sound direction is the 45° direction, it can be learned from the rule 1 that, the terminal may determine that a noise direction corresponding to the target sound direction is the 225° direction, because the 225° direction is a direction with a maximum included angle between the direction and the 45° direction. According to the rule 2, the terminal may determine that another noise direction corresponding to the target sound direction is the 315° direction, because included angles between the 315° direction and the 45° direction and between the 135° direction and the 45° direction are larger and are the same, and the 315° direction is a direction in another shooting region, while the 135° direction is a direction in the non-shooting region. When the target sound direction is the 0° direction, it can be learned from the rule 1 that, the terminal may determine that two noise directions corresponding to the target sound direction are the 135° direction and 225° direction, because the 225° direction is a direction with a maximum included angle between the direction and the 45° direction. When the target sound direction is the 315° direction, it can be learned from the rule 1 that, the terminal may determine that a noise direction corresponding to the target sound direction is the 135° direction, because the 135° direction is a direction with a maximum included angle between the direction and the 315° direction. According to the rule 2, the terminal may determine that another noise direction corresponding to the target sound direction is the 45° direction, because included angles between the 45° direction and the 315° direction and between the 225° direction and the 315° direction are larger and are the same, and the 45° direction is a direction in another shooting region, while the 225° direction is a direction in the non-shooting region.

It can be learned based on Table 1 that, a direction in the shooting region may be a target sound direction in some cases, and may be a noise direction in some other cases.

In the following content, step S105 is described in detail by using an example in which the target sound direction corresponds to two noise directions, the target sound direction may be one of the 45° direction, the 0° direction, or the 315° direction, and noise directions in the non-shooting region are the 135° direction and the 225° direction.

It should be understood that, the 45° direction, the 0° direction, the 315° direction, the 135° direction, and the 225° direction in this embodiment of this application are merely examples for description. For descriptions of the angles, refer to the descriptions of FIG. 4 and FIG. 12. These angles may be adjusted as required, or replaced with other angles, and should not constitute a limitation on embodiments of this application.

Figure 13:
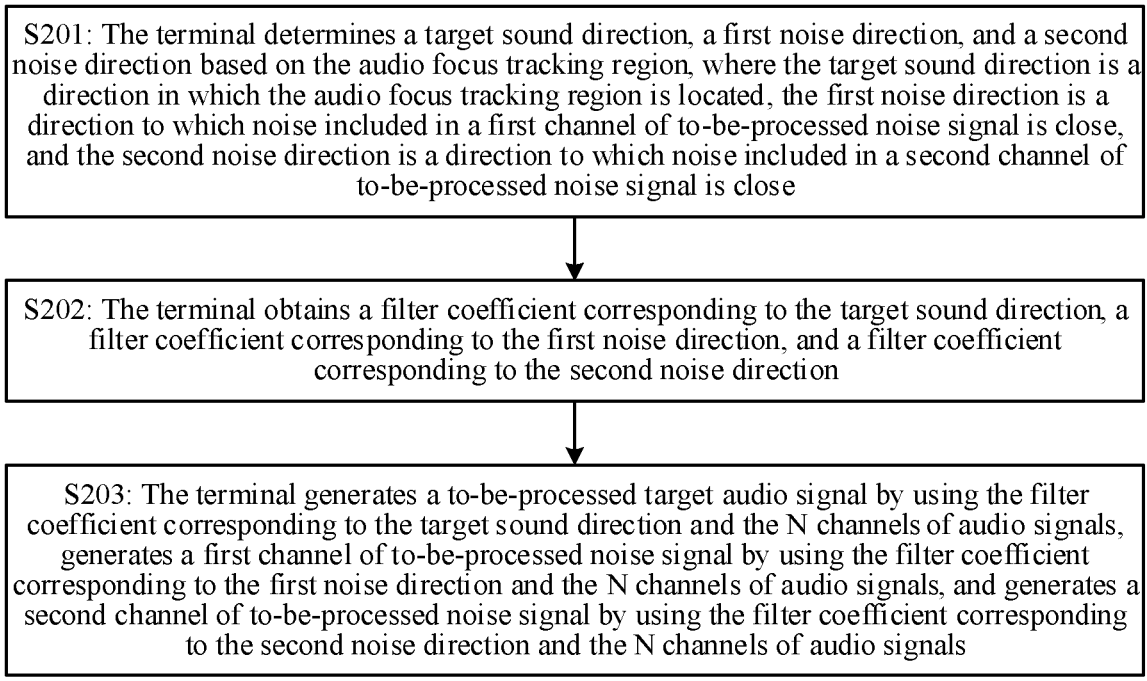
FIG. 13 is an example flowchart in which a terminal generates a to-be-processed target audio signal and a to-be-processed noise signal set corresponding to the to-be-processed target audio signal.

FIG. 13 is an example flowchart in which the terminal generates a to-be-processed target audio signal and a to-be-processed noise signal set corresponding to the to-be-processed target audio signal.

In step S105, for a process in which the terminal generates, based on the N channels of audio signals and the audio focus tracking region, a to-be-processed target audio signal and a to-be-processed noise signal set corresponding to the to-be-processed target audio signal, refer to the following descriptions of step S201 to step S203.

S201: The terminal determines a target sound direction, a first noise direction, and a second noise direction based on the audio focus tracking region, where the target sound direction is a direction in which the audio focus tracking region is located, the first noise direction is a direction to which noise (referred to as a first channel of noise below) included in a first channel of to-be-processed noise signal is close, and the second noise direction is a direction to which noise (referred to as a second channel of noise below) included in a second channel of to-be-processed noise signal is close.

The first noise direction and the second noise direction are noise directions corresponding to the target sound direction. In this case, T=2, and the target sound direction corresponds to two noise directions. For detailed descriptions of the target sound direction and the noise directions, refer to the foregoing content. Details are not described herein again.

The target sound direction corresponding to the audio focus tracking region and the first noise direction and the second noise direction that correspond to the target sound direction are preset in the terminal. For example, when the audio focus tracking region is the middle region of the original image, the target sound direction may be any direction in a middle shooting region (within a range clockwise from the 10° direction to the 350° direction in FIG. 4) range in front of the terminal, for example, the right front of the terminal, that is, the 0° direction. In this case, with reference to Table 1, the first noise direction corresponding to the target sound direction is one of the 135° direction and the 225° direction, and the second noise direction is the other of the 135° direction and the 225° direction. For example, the first noise direction is 1350 (in this case, the first channel of to-be-processed noise signal may be the to-be-processed noise signal 1), and the second noise direction is the 225° direction (in this case, the second channel of to-be-processed noise signal may be the to-be-processed noise signal 2). When the audio focus tracking region is the leftward region in the original image, the target sound direction may be any direction in a leftward shooting region (within a range counterclockwise from the 10° direction in FIG. 4 to the 90° direction in the figure) range in front of the terminal, for example, the 45° direction in the figure. In this case, with reference to Table 1, the first noise direction corresponding to the target sound direction is one of the 225° direction and the 315° direction, and the second noise direction is the other of the 225° direction and the 315° direction. For example, the first noise direction is 225°, and the second noise direction is the 315° direction. When the audio focus tracking region is the rightward region in the original image, the target sound direction may be any direction in a leftward shooting region (within a range clockwise from the 10° direction in FIG. 4 to the 270° direction in the figure) range in front of the terminal, for example, the 315° direction in the figure. In this case, with reference to Table 1, the first noise direction corresponding to the target sound direction is one of the 45° direction and the 135° direction, and the second noise direction is the other of the 45° direction and the 135° direction. For example, the first noise direction is 45°, and the second noise direction is the 135° direction.

S202: The terminal obtains a filter coefficient corresponding to the target sound direction, a filter coefficient corresponding to the first noise direction, and a filter coefficient corresponding to the second noise direction.

The filter coefficient corresponding to the target sound direction, the filter coefficient corresponding to the first noise direction, and the filter coefficient corresponding to the second noise direction are described in details as follows:

The filter coefficient corresponding to the target sound direction may be used to perform filtering and synthesis on the N channels of audio signals, to obtain the to-be-processed target audio signal. For the process, refer to the following description of step S203. Details are not described herein. The filter coefficient corresponding to the target sound direction includes the filter coefficients respectively corresponding to the N microphones in the target sound direction. The filter coefficient corresponding to the $i^{th}$ microphone in the target sound direction may be used to: retain sound (the target sound) that is in the $i^{th}$ channel of audio signal and that is located in the focus tracking shooting region relative to the terminal, and suppress sound (noise) that is in the $i^{th}$ channel of audio signal and that is located in the non-focus-tracking shooting region relative to the terminal. The sound that is located in the focus tracking shooting region relative to the terminal is the sound corresponding to the audio focus tracking region, and the sound corresponding to the audio focus tracking region is sound of a photographed object included in the audio focus tracking region. The sound that is located in the non-focus-tracking shooting region relative to the terminal is sound of a photographed object that is not included in the audio focus tracking region.

The filter coefficient corresponding to the first noise direction may be used to perform filtering and synthesis on the N channels of audio signals, to obtain the first channel of to-be-processed noise signal. For the process, refer to the following description of step S203. Details are not described herein. The filter coefficient corresponding to the first noise direction includes filter coefficients respectively corresponding to the N microphones in the first noise direction. A filter coefficient corresponding to the $i^{th}$ microphone in the first noise direction may be used to: retain sound that is in the $i^{th}$ channel of audio signal and that is close to the first noise direction relative to the terminal, and suppress sound that is in the $i^{th}$ channel of audio signal and that is far away from the first noise direction relative to the terminal. Therefore, in other words, the first noise direction may be a direction to which the noise (the first channel of noise) included in the first channel of to-be-processed noise signal is close. It should be understood that the first noise direction may also be considered as a direction to which the first noise direction is close. For example, when the target sound direction is the 0° direction, the first noise direction may be the 135° direction. Refer to FIG. 12. When the first noise direction is the 135° direction, all noise close to the 135° direction may be retained in the first channel of to-be-processed noise signal. In this case, the first channel of to-be-processed noise signal may be considered as the to-be-processed noise signal 1.

The filter coefficient corresponding to the second noise direction may be used to perform filtering and synthesis on the N channels of audio signals, to obtain the second channel of to-be-processed noise signal. For the process, refer to the following description of step S203. Details are not described herein. The filter coefficient corresponding to the second noise direction includes filter coefficients respectively corresponding to the N microphones in the second noise direction. A filter coefficient corresponding to the $i^{th}$ microphone in the second noise direction may be used to: retain sound that is in the $i^{th}$ channel of audio signal and that is close to the second noise direction relative to the terminal, and suppress sound that is in the $i^{th}$ channel of audio signal and that is far away from the second noise direction relative to the terminal. Therefore, in other words, the second noise direction may be a direction to which the noise (the second channel of noise) included in the second channel of to-be-processed noise signal is close. It should be understood that the second noise direction may also be considered as a direction to which the second noise direction is close. For example, when the target sound direction is the 0° direction, the second noise direction may be the 225° direction. Refer to FIG. 12. When the second noise direction is the 225° direction, all noise close to the 225° direction may be retained in the second channel of to-be-processed noise signal. In this case, the second channel of to-be-processed noise signal may be considered as the to-be-processed noise signal 2.

If the $i^{th}$ channel of audio signal includes N frequency bins, a filter coefficient corresponding to the $i^{th}$ microphone in each direction (the target sound direction, the first noise direction, and the second noise direction) needs to have N elements (coefficients). A $j^{th}$ element represents a suppression level of a $j^{th}$ frequency bin in the N frequency bins corresponding to the $i^{th}$ channel of audio signal. When the $j^{th}$ element is equal to 1 or close to 1, the terminal does not suppress, that is, retains, an audio signal corresponding to the $j^{th}$ frequency bin (being close to 1 indicates that a suppression level is low and suppression is almost not performed, and is considered as being retained). In another case, the audio signal corresponding to the $j^{th}$ frequency bin is suppressed. For example, when the $j^{th}$ element is equal to 0 or close to 0, the terminal has a higher suppression level to, that is, suppresses, the audio signal corresponding to the $j^{th}$ frequency bin.

Figure 14:
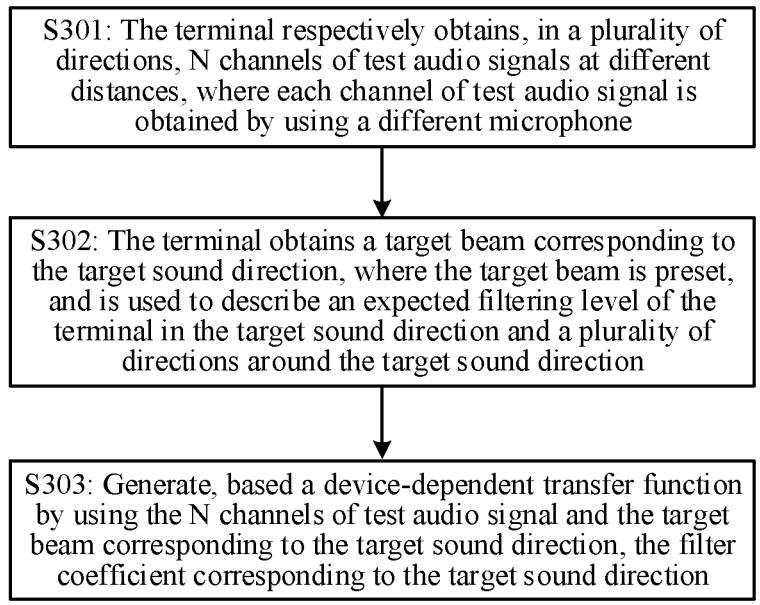
FIG. 14 is an example flowchart in which a terminal generates a filter corresponding to a target sound direction.

FIG. 14 is an example flowchart in which the terminal generates the filter coefficient corresponding to the target sound direction.

The following describes, with reference to FIG. 14, a manner in which the terminal generates the filter coefficient corresponding to the target sound direction. For the process, refer to the following descriptions of step S301 to step S303.

S301: The terminal respectively obtains, in a plurality of directions, N channels of test audio signals at different distances, where each channel of test audio signal is obtained by using a different microphone.

The direction is a horizontal angle between a sound emission object and the terminal, and the distance is a Euclidean distance between the sound emission object and the terminal. There is a single sound emission object.

The respectively obtaining test audio signals at different distances in a plurality of directions allows for universality of the generated filter coefficient corresponding to the target sound direction. That is, after delivery of the terminal, when recording a video, a direction of sound in an $i^{th}$ channel of audio signal obtained by the terminal is the same as or close to one of the plurality of directions. The $i^{th}$ channel of audio signal is an audio signal obtained by the terminal by using the $i^{th}$ microphone. In this case, the filter coefficient corresponding to the target sound direction applies to the audio signal obtained by the terminal.

In some embodiments, the plurality of directions may include 36 directions, that is, around the terminal, there is one direction every 10°. The plurality of distances may include three distances: 1 m, 2 m, and 3 m.

An $i^{th}$ channel of test audio signal is a set of audio signals at different distances that are respectively obtained by the $i^{th}$ microphone of the terminal in a plurality of directions.

S302: The terminal obtains a target beam corresponding to the target sound direction, where the target beam is preset, and is used to describe an expected filtering level of the terminal in the target sound direction and a plurality of directions around the target sound direction.

The target beam corresponding to the target sound direction is used by the terminal to generate the filter coefficient corresponding to the target sound direction, and describes filtering levels of the terminal in a plurality of directions. The target beam corresponding to the target sound direction is a desired beam or a beam expected to be formed, and may be set.

In some embodiments, when the plurality of directions are 36 directions, the target beam corresponding to the target sound direction have 36 gain coefficients. An $i^{th}$ gain coefficient represents a suppression level in an $i^{th}$ direction. Any direction corresponds to a gain coefficient. A gain coefficient corresponding to the target sound direction is 1. Then, for every 10° difference between a direction and the target sound direction, the gain coefficient is subtracted by 1/36. In this case, an element corresponding to a direction closer to the target sound direction is closer to 1, and an element corresponding to a direction farther away from the target sound direction is closer to 0.

S303: Generate, based a device-dependent transfer function by using the N channels of test audio signal and the target beam corresponding to the target sound direction, the filter coefficient corresponding to the target sound direction.

A formula for the terminal to generate the filter coefficient corresponding to the target sound direction is the following Formula (1):

$$w_1(\omega) = \underset{w_1}{\text{argmin}} \|G(H_1(\omega), H_2(\omega) \ldots H_n(\omega))w_1 - H_1\|_2^2 \qquad \text{Formula (1)}$$

In Formula (1), $w_1(\omega)$ is the filter coefficient corresponding to the target sound direction, and includes N elements, an $i^{th}$ element may be represented as $w_{1i}(\omega)$, $w_{1i}(\omega)$ is the filter coefficient corresponding to the $i^{th}$ microphone in the target sound direction, $H_i(\omega)$ represents the $i^{th}$ channel of test audio signal, $G(H_1(\omega), H_2(\omega) \ldots H_n(\omega))$ represents processing the N channels of test audio signals based on the device-dependent transfer function, and may be used to describe a correlation between the N channels of test audio signals, $H_1$ represents the target beam corresponding to the target sound direction, $w_1$ represents a filter coefficient that can be obtained in the target sound direction, and argmin represents using $w_1$ obtained based on a least-squares frequency-invariant fixed-beamforming method as the filter coefficient corresponding to the target sound direction.

It should be understood that, step S301 and step S302 describe a manner in which the terminal generates the filter corresponding to the target sound direction. For a manner in which the terminal generates the filter coefficient corresponding to the first noise direction and the filter coefficient corresponding to the second noise direction, refer to the foregoing process.

A formula for the terminal to generate the filter coefficient corresponding to the first noise direction is the following Formula (2):

$$w_2(\omega) = \underset{w_2}{\mathrm{argmin}} \|G(H_1(\omega), H_2(\omega) \ldots H_3(\omega))w_2 - H_2\|_2^2 \quad \text{Formula (2)}$$

In Formula (2), $w_2(\omega)$ is the filter coefficient corresponding to the first noise direction, and includes N elements, an $i^{th}$ element may be represented as $w_{2i}(\omega)$, $w_{2i}(\omega)$ is the filter coefficient corresponding to the $i^{th}$ microphone in the first noise direction, $H_2$ represents a target beam corresponding to the first noise direction, $w_2$ represents a filter coefficient that can be obtained in the first noise direction, and argmin represents using $w_2$ obtained based on the least-squares frequency-invariant fixed-beamforming method as the filter coefficient corresponding to the first noise direction. For the target beam corresponding to the first noise direction, refer to the related description in step S301 to step S303. A term related to the target sound direction may be replaced with a term related to the first noise direction. For example, the target sound direction may be replaced with the first noise direction.

The target beam corresponding to the first noise direction is used by the terminal to generate the filter coefficient corresponding to the first noise direction, and describes filtering levels of the terminal in a plurality of directions.

In some embodiments, when the plurality of directions are 36 directions, the target beam corresponding to the first noise direction have 36 gain coefficients. An $i^{th}$ gain coefficient represents a filtering level in an $i^{th}$ direction. Any direction corresponds to a gain coefficient. A gain coefficient corresponding to the first noise direction is 1. Then, for every 10° difference between a direction and the first noise direction, the gain coefficient is subtracted by ⅟₃₆. In this case, an element corresponding to a direction closer to the first noise direction is closer to 1, and an element corresponding to a direction farther away from the first noise direction is closer to 0.

A formula for the terminal to generate the filter coefficient corresponding to the second noise direction is the following Formula (3):

$$w_3(\omega) = \underset{w_3}{\mathrm{argmin}} \|G(H_1(\omega), H_2(\omega) \ldots H_3(\omega))w_3 - H_3\|_2^2 \quad \text{Formula (3)}$$

In Formula (3), $w_3(\omega)$ is the filter coefficient corresponding to the second noise direction, and includes N elements, an $i^{th}$, element may be represented as $w_{3i}(\omega)$, $w_{3i}(\omega)$ is the filter coefficient corresponding to the $i^{th}$ microphone in the second noise direction, $H_3$ represents a target beam corresponding to the second noise direction, $w_3$ represents a filter coefficient that can be obtained in the second noise direction, and argmin represents using $w_3$ obtained based on the least-squares frequency-invariant fixed-beamforming method as the filter coefficient corresponding to the second noise direction. For the target beam corresponding to the second noise direction, refer to the related description in step S301 to step S303. A term related to the target sound direction may be replaced with a term related to the second noise direction. For example, the target sound direction may be replaced with the second noise direction.

The target beam corresponding to the second noise direction is used by the terminal to generate the filter coefficient corresponding to the second noise direction, and describes filtering levels of the terminal in a plurality of directions.

In some embodiments, when the plurality of directions are 36 directions, the target beam corresponding to the second noise direction have 36 gain coefficients. An $i^{th}$ gain coefficient represents a filtering level in an $i^{th}$ direction. Any direction corresponds to a gain coefficient. A gain coefficient corresponding to the second noise direction is 1. Then, for every 10° difference between a direction and the second noise direction, the gain coefficient is subtracted by ⅟₃₆. In this case, an element corresponding to a direction closer to the second noise direction is closer to 1, and an element corresponding to a direction farther away from the second noise direction is closer to 0.

S203: The terminal generates a to-be-processed target audio signal by using the filter coefficient corresponding to the target sound direction and the N channels of audio signals, generates a first channel of to-be-processed noise signal by using the filter coefficient corresponding to the first noise direction and the N channels of audio signals, and generates a second channel of to-be-processed noise signal by using the filter coefficient corresponding to the second noise direction and the N channels of audio signals.

The to-be-processed target audio signal is a result of performing, by the terminal, filtering and synthesis on the N channels of audio signals based on the filter coefficient corresponding to the target sound direction. In the process, the terminal may retain sound (the target sound) that is in the N channels of audio signals and that is located in the focus tracking shooting region relative to the terminal, and suppress sound (noise) that is in the N channels of audio signals and that is located in the non-focus-tracking shooting region relative to the terminal.

A formula for the terminal to generate the to-be-processed target audio signal by using the filter coefficient corresponding to the target sound direction and the N channels of audio signals is the following Formula (4):

$$y_1 = \sum_{i=1}^{N} w_{1i}(\omega) x_i(\omega) \quad \text{Formula (4)}$$

$y_1$ represents the to-be-processed target audio signal, and includes N elements. Any element is used to represent a frequency bin. A quantity of frequency bins corresponding to the to-be-processed target audio signal is the same as a quantity of frequency bins corresponding to the $i^{th}$ channel of audio signal. The to-be-processed target audio signal includes H frames of target audio signals, and an $r^{th}$ frame of target audio signal may be represented as yr.

In Formula (4), N represents a quantity of microphones, $w_{1i}(\omega)$ is the filter coefficient corresponding to the $i^{th}$ microphone in the target sound direction, a $j^{th}$ element in $w_{1i}(\omega)$ represents a suppression level of the $j^{th}$ frequency bin in the N frequency bins corresponding to the $i^{th}$ channel of audio signal, $x_i(\omega)$ is the audio signal (the $i^{th}$ channel of audio signal) obtained by the terminal by using the $i^{th}$ microphone, and a $j^{th}$ element in $x_i(\omega)$ represents a complex field of the $j^{th}$ frequency bin, and represents amplitude and phase information of a sound signal corresponding to the $j^{th}$ frequency bin.

It should be understood that, when a $j^{th}$ element in the filter coefficients corresponding to the N microphones in the target sound direction is equal to 1 or close to 1, the terminal does not suppress, that is, retains, an audio signal corresponding to a frequency bin multiplied by the $j^{th}$ element. In this case, it is considered that a direction of the audio signal corresponding to the $j^{th}$ frequency bin is close to the target sound direction. In another case, the audio signal corresponding to the frequency bin multiplied by the $j^{th}$ element is suppressed. For example, when the $j^{th}$ element is equal to 0 or close to 0, the terminal has a higher suppression level to, that is, suppresses, the audio signal corresponding to the $j^{th}$ frequency bin. In this case, it is considered that the direction of the audio signal corresponding to the $j^{th}$ frequency bin is far away from the target sound direction. It indicates that in the filter coefficient corresponding to the target sound direction, a coefficient corresponding to sound in the target sound direction is 1, indicating that the sound in the target sound direction in the audio signal (the N channels of audio signals) is not suppressed. A coefficient corresponding to sound closer to the target sound direction is closer to 1, and a suppression level decreases gradually.

The first channel of to-be-processed noise signal is a result of performing, by the terminal, filtering and synthesis on the N channels of audio signals based on the filter coefficient corresponding to the first noise direction. In the process, the terminal may retain sound that is in the N channels of audio signals and that is close to the first noise direction relative to the terminal, and suppress sound that is in the N channels of audio signals and that is far away from the first noise direction relative to the terminal.

A formula for the terminal to generate the to-be-processed target audio signal by using the filter coefficient corresponding to the first noise direction and the N channels of audio signals is the following Formula (5):

$$y_2 = \sum_{i=1}^{N} w_{2i}(\omega)x_i(\omega) \quad \text{Formula (5)}$$

$y_2$ represents the first channel of to-be-processed noise signal, and includes N elements. Any element is used to represent a frequency bin. A quantity of frequency bins corresponding to the first channel of to-be-processed noise signal is the same as the quantity of frequency bins corresponding to the $i^{th}$ channel of audio signal. The first channel of to-be-processed noise signal includes H frames of noise signals, and an $r^{th}$ frame of noise signal may be represented as $y_{2r}$.

In Formula (5), N represents the quantity of microphones, $w_{2i}(\omega)$ is the filter coefficient corresponding to the $i^{th}$ microphone in the first noise direction, and a $j^{th}$ element in $w_{2i}(\omega)$ represents a suppression level of the $j^{th}$ frequency bin in the N frequency bins corresponding to the $i^{th}$ channel of audio signal.

It should be understood that, when a $j^{th}$ element in filter coefficients corresponding to the N microphones in the first noise direction is equal to 1 or close to 1, the terminal does not suppress, that is, retains, an audio signal corresponding to a frequency bin multiplied by the $j^{th}$ element. In this case, it is considered that a direction of the audio signal corresponding to the $j^{th}$ frequency bin is close to the first noise direction. In another case, the audio signal corresponding to the frequency bin multiplied by the $j^{th}$ element is suppressed. For example, when the $j^{th}$ element is equal to 0 or close to 0, the terminal has a higher suppression level to, that is, suppresses, the audio signal corresponding to the $j^{th}$ frequency bin. In this case, it is considered that the direction of the audio signal corresponding to the $j^{th}$ frequency bin is far away from the first noise direction. It indicates that in the filter coefficient corresponding to the first noise direction, a coefficient corresponding to sound in the first noise direction is 1, indicating that the sound in the first noise direction in the audio signal (the N channels of audio signals) is not suppressed. A coefficient corresponding to sound closer to the first noise direction is closer to 1, and a suppression level decreases gradually.

The second channel of to-be-processed noise signal is a result of performing, by the terminal, filtering and synthesis on the N channels of audio signals based on the filter coefficient corresponding to the second noise direction. In the process, the terminal may retain sound that is in the N channels of audio signals and that is close to the first noise direction relative to the terminal, and suppress sound that is in the N channels of audio signals and that is far away from the second noise direction relative to the terminal.

A formula for the terminal to generate the to-be-processed target audio signal by using the filter coefficient corresponding to the second noise direction and the N channels of audio signals is the following Formula (6):

$$y_3 = \sum_{i=1}^{N} w_{3i}(\omega)x_i(\omega) \quad \text{Formula (6)}$$

$y_3$ represents the second channel of to-be-processed noise signal, and includes N elements. Any element is used to represent a frequency bin. A quantity of frequency bins corresponding to the second channel of to-be-processed noise signal is the same as the quantity of frequency bins corresponding to the $i^{th}$ channel of audio signal. The second channel of to-be-processed noise signal includes H frames of noise signals, and an $r^{th}$ frame of noise signal may be represented as $y_{3r}$.

In Formula (6), N represents the quantity of microphones, $w_{3i}(\omega)$ is the filter coefficient corresponding to the $i^{th}$ microphone in the second noise direction, and a $j^{th}$ element in $w_{3i}(\omega)$ represents a suppression level of the $j^{th}$ frequency bin in the N frequency bins corresponding to the $i^{th}$ channel of audio signal.

It should be understood that, when a $j^{th}$ element in filter coefficients corresponding to the N microphones in the second noise direction is equal to 1 or close to 1, the terminal does not suppress, that is, retains, an audio signal corresponding to a frequency bin multiplied by the $j^{th}$ element. In this case, it is considered that a direction of the audio signal corresponding to the $j^{th}$ frequency bin is close to the second noise direction. In another case, the audio signal corresponding to the frequency bin multiplied by the $j^{th}$ element is suppressed. For example, when the $j^{th}$ element is equal to 0 or close to 0, the terminal has a higher suppression level to, that is, suppresses, the audio signal corresponding to the $j^{th}$ frequency bin. In this case, it is considered that the direction of the audio signal corresponding to the $j^{th}$ frequency bin is far away from the second noise direction. It indicates that in the filter coefficient corresponding to the second noise direction, a coefficient corresponding to sound in the second noise direction is 1, indicating that the sound in the second noise direction in the audio signal (the N channels of audio signals) is not suppressed. A coefficient corresponding to sound closer to the second noise direction is closer to 1, and a suppression level decreases gradually.

S106: The terminal performs processing based on the to-be-processed noise signal set and the to-be-processed target audio signal, to filter out noise in the to-be-processed target audio signal, and obtain a processed target audio signal, where the processed target audio signal includes sound corresponding to the focus tracking region.

In step S106, the terminal may filter the to-be-processed target audio signal based on the to-be-processed noise signal set and the to-be-processed target audio signal, to filter out noise included in the to-be-processed target audio signal and obtain a filtered target audio signal.

In some examples, when the to-be-processed target audio signal is filtered to obtain the filtered target audio signal, because the to-be-processed noise signal set may include the target sound, the terminal may first filter out, by using the to-be-processed target audio signal as a reference, the target sound included in the to-be-processed noise signal set, to obtain a reference noise signal set. That the target sound included in the reference noise signal set is filtered out may be understood as that the target sound is reduced or the target sound is not included but only noise is included. Then, the terminal may filter the to-be-processed target audio signal by using the reference noise signal set as a reference, to filter out the noise included in the to-be-processed target audio signal, and obtain the filtered target audio signal. For a detailed description of this example, refer to the following description of step S401. Details are not described herein.

It should be understood that, in this example, a purpose of filtering out, by the terminal by using the to-be-processed target audio signal as a reference, the target sound included in the to-be-processed noise signal set to obtain the reference noise signal set is to filter out the target sound in the reference noise signal set, which may be understood as reducing the target sound or not including the target sound but including only noise. In this way, when the to-be-processed target audio signal is filtered by using the reference noise signal set as a reference, to filter out the noise included in the to-be-processed target audio signal, a probability of the following error may be reduced: the target sound in the to-be-processed target audio signal is recognized as noise and is filtered out, resulting in that not only the noise in the to-be-processed target audio signal is filtered out, but the target sound is also filtered out. Because the target sound in the reference noise signal set has been filtered out herein, which may be understood as that the target sound is reduced or the target sound is not included but only noise is included, when the noise in the to-be-processed target audio signal is filtered out by using the reference noise signal set as a reference, a probability that the target sound in the to-be-processed target audio signal is also filtered out can be reduced, and filtering accuracy can be improved.

In this example, the reference noise signal set includes T channels of reference noise signals. An $i^{th}$ channel of reference noise signal is an audio signal obtained by the terminal by filtering the $i^{th}$ channel of to-be-processed noise signal by using the to-be-processed target audio signal as a reference, to filter out the target sound included in the $i^{th}$ channel of to-be-processed noise signal. For detailed content of the process, refer to the following description of step S401. Details are not described herein.

In some examples, the filtered target audio signal may still include noise, and therefore, the filtered target audio signal may be further filtered by using a filtered noise signal set as a reference, to filter out the noise included in the filtered target audio signal, and obtain a processed target audio signal. For a detailed description of this example, refer to the following description of step S404. Details are not described herein.

The filtered noise signal set includes T channels of filtered noise signals. An $i^{th}$ channel of filtered noise signal is an audio signal obtained by the terminal by filtering the $i^{th}$ channel of to-be-processed noise signal based on the $i^{th}$ channel of to-be-processed noise signal and the to-be-processed target audio signal, to filter out the target sound included in the $i^{th}$ channel of to-be-processed noise signal. For a process in which the terminal determines the $i^{th}$ channel of filtered noise signal, refer to the following description of step S402 or step S403. Details are not described herein.

In some examples, when the $i^{th}$ channel of to-be-processed noise signal is filtered to obtain the $i^{th}$ channel of filtered noise signal, because the to-be-processed target audio signal may include noise, the terminal may first filter out, by using the $i^{th}$ channel of to-be-processed noise signal as reference (noise included in the $i^{th}$ channel of to-be-processed noise signal is an $i^{th}$ channel of noise), the $i^{th}$ channel of noise included in the to-be-processed target audio signal, to obtain an $i^{th}$ channel of reference target audio signal. That the $i^{th}$ channel of noise included in the $i^{th}$ channel of reference target audio signal is filtered out may be understood as that the $i^{th}$ channel of noise is reduced or the $i^{th}$ channel of noise is not included. Then, the terminal may filter the $i^{th}$ channel of to-be-processed noise signal by using the $i^{th}$ channel of reference target audio signal as a reference, to filter out the target sound included in the $i^{th}$ channel of to-be-processed noise signal, and obtain the $i^{th}$ channel of filtered noise signal.

It should be understood that, in this example, a purpose of filtering out, by the terminal by using the $i^{th}$ channel of to-be-processed noise signal as a reference, the $i^{th}$ channel of noise included in the to-be-processed target audio signal to obtain the $i^{th}$ channel of reference target audio signal is to filter out the $i^{th}$ channel of noise in the $i^{th}$ channel of reference target audio signal, which may be understood as reducing the $i^{th}$ channel of noise or not including the $i^{th}$ channel of noise. In this way, when the $i^{th}$ channel of to-be-processed noise signal is filtered by using the $i^{th}$ channel of reference target audio signal as a reference, to filter out the target sound included in the $i^{th}$ channel of to-be-processed noise signal, a probability of the following error may be reduced: the $i^{th}$ channel of noise in the $i^{th}$ channel of to-be-processed noise signal is recognized as the target sound and is filtered out, resulting in that not only the target sound in the $i^{th}$ channel of to-be-processed noise signal is filtered out, but the $i^{th}$ channel of noise is also filtered out. Because the $i^{th}$ channel of noise included in the $i^{th}$ channel of reference target audio signal has been filtered out herein, it may be understood as that the $i^{th}$ channel of noise is reduced or the $i^{th}$ channel of noise is not included. In this way, when the target sound in the $i^{th}$ channel of to-be-processed noise signal is filtered out by using the $i^{th}$ channel of reference target audio signal as a reference, a probability that the $i^{th}$ channel of noise in the $i^{th}$ channel of to-be-processed noise signal is also filtered out can be reduced, and filtering accuracy can be improved.

The following describes an implementation process of step S106 by using an example in which the to-be-processed noise signal set includes a first channel of to-be-processed noise signal and includes a second channel of to-be-processed noise signal. When the to-be-processed noise signal set includes more or fewer to-be-processed noise signals, refer to the following description. In this case, the filtered noise signal set includes a filtered first channel of noise signal and a filtered second channel of noise signal, and the reference noise signal set includes a first channel of reference noise signal and a second channel of reference noise signal. The first channel of reference noise signal is an audio signal obtained after the first channel of to-be-processed noise signal is filtered to filter out the target sound included in the first channel of to-be-processed noise signal. The second channel of reference noise signal is an audio signal obtained after the second channel of to-be-processed noise signal is filtered to filter out the target sound included in the second channel of to-be-processed noise signal.

It can be learned based on the foregoing description that, when a part of sound (to-be-filtered-out sound) in an audio signal (referred to as a to-be-filtered audio signal below) is filtered out, another audio signal (referred to as a reference audio signal below) may be used as a reference, and then the terminal may determine the to-be-filtered-out sound included in the reference audio signal, and filter out sound that is in the to-be-filtered audio signal and that is the same as the to-be-filtered-out sound, to obtain a filtered audio signal. The reference audio signal may include the to-be-filtered-out sound and includes other sound as little as possible or does not include other sound, to prevent the terminal from determining other sound in the reference audio signal as the to-be-filtered-out sound and causing an error. In this way, a filtering effect can be improved.

Figure 15:
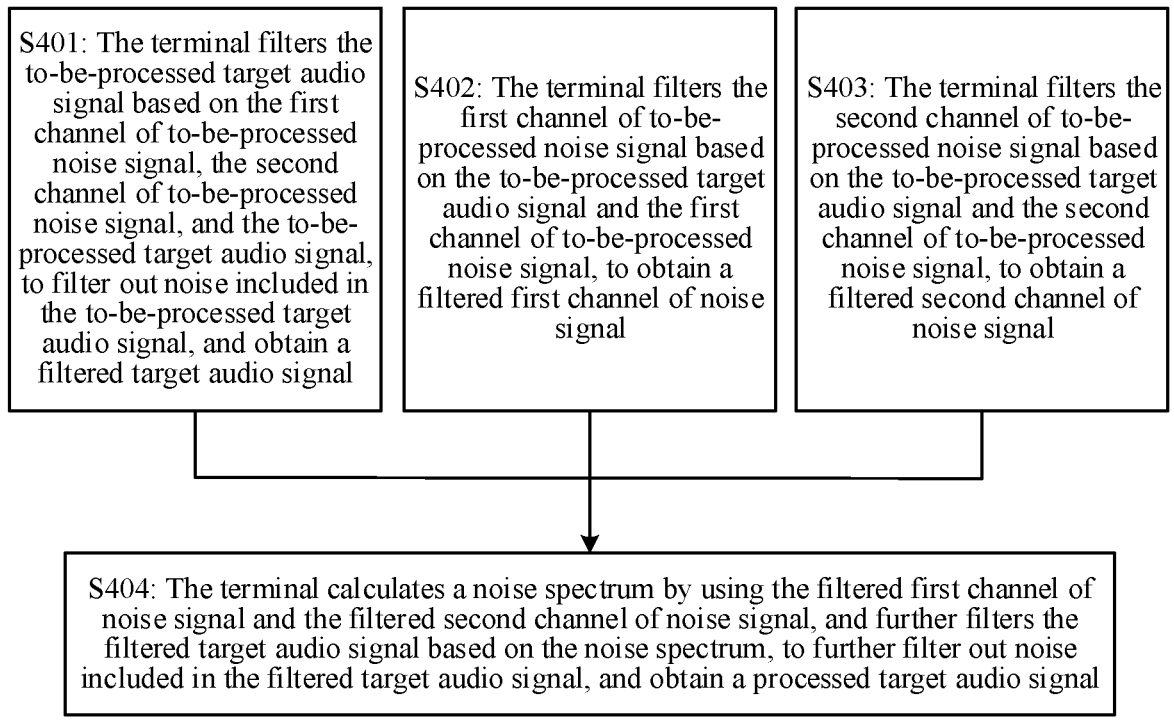
FIG. 15 is an example flowchart in which a terminal obtains a processed target audio signal.

FIG. 15 is an example flowchart in which the terminal obtains the processed target audio signal.

S401: The terminal filters the to-be-processed target audio signal based on the first channel of to-be-processed noise signal, the second channel of to-be-processed noise signal, and the to-be-processed target audio signal, to filter out noise included in the to-be-processed target audio signal, and obtain a filtered target audio signal.

Table 2 shows a use relationship when the terminal obtains the filtered target audio signal.

TABLE 2

| To-be-filtered audio signal | Reference audio signal | To-be-filtered-out sound | Filtered audio signal |
| --- | --- | --- | --- |
| First channel of to-be-processed noise signal | To-be-processed target audio signal | Target sound | First channel of reference noise signal |
| Second channel of to-be-processed noise signal | To-be-processed target audio signal | Target sound | Second channel of reference noise signal |
| To-be-processed target audio signal | First channel of reference noise signal and second channel of reference noise signal | Noise | Filtered target audio signal |

It can be learned with reference to Table 2 that, the terminal may first filter out, by using the to-be-processed target audio signal as a reference, the target sound included in the first channel of to-be-processed noise signal and the second channel of to-be-processed noise signal respectively, to obtain the first channel of reference noise signal and the second channel of reference noise signal. Then, the terminal may filter out, by using the first channel of reference noise signal and the second channel of reference noise signal as a reference, the noise included in the to-be-processed target audio signal, to obtain the filtered target audio signal.

It can be learned based on the foregoing content that, the to-be-processed target audio signal has H frames of target audio signals, and the terminal may filter each frame of target audio signal in the to-be-processed target audio signal, to obtain the filtered target audio signal. A first frame of target audio signal is included, and the first frame of target audio signal may be a $k^{th}$ frame of target audio signal in the to-be-processed target audio signal. A process in which the terminal filters the first frame of target audio signal, to obtain a filtered first frame of target audio signal is as follows: The terminal may first filter out, by using the first frame of target audio signal as a reference, the target sound included in a first frame of noise signal and a second frame of noise signal respectively, to obtain a first frame of reference noise signal and a second frame of reference noise signal. Then, the terminal may filter out, by using the first frame of reference noise signal and the second frame of reference noise signal as a reference, noise included in the first frame of target audio signal, to obtain the filtered first frame of target audio signal. The first channel of to-be-processed noise signal has H frames of noise signals, and the first frame of noise signal may be a $k^{th}$ frame of noise signal in the first channel of to-be-processed noise signal. The second channel of to-be-processed noise signal has H frames of noise signals, and the second frame of noise signal may be a $k^{th}$ frame of noise signal in the second channel of to-be-processed noise signal. $k = \{k \in N + | 1 \leq k \leq H\}$.

Figure 16:
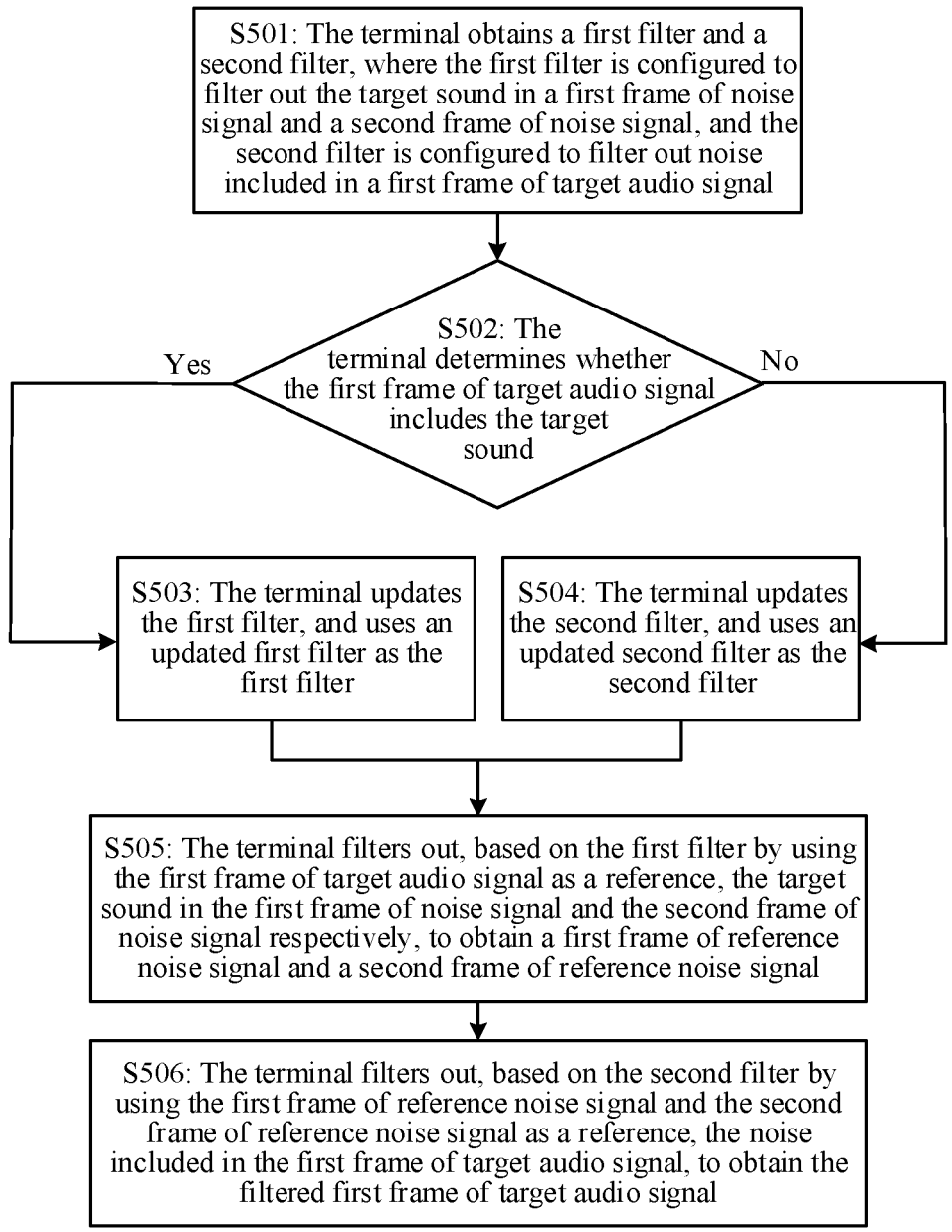
FIG. 16 is an example flowchart in which a terminal generates a filtered first frame of target audio signal.

FIG. 16 is an example flowchart in which the terminal generates the filtered first frame of target audio signal.

For a process in which the terminal filters the first frame of target audio signal, to obtain the filtered first frame of target audio signal, refer to the following descriptions of step S501 to step S506.

S501: The terminal obtains a first filter and a second filter, where the first filter is configured to filter out the target sound in the first frame of noise signal and the second frame of noise signal, and the second filter is configured to filter out noise included in the first frame of target audio signal.

Herein, the terminal obtains the first filter and the second filter without a specific time sequence. Subsequently, a third filter and a fourth filter are obtained, and the third filter and the fourth filter are also obtained without a specific time sequence.

The first filter may be configured to determine, by using the first frame of target audio signal as a reference, the target sound included in the first frame of noise signal and the second frame of noise signal respectively, and filter out the target sound included in the first frame of noise signal and the second frame of noise signal, to obtain the first frame of reference noise signal and the second frame of reference noise signal.

The first filter includes N elements, an $i^{th}$ element is used to determine, by using an $i^{th}$ frequency bin in the first frame of target audio signal as a reference, the target sound included in an $i^{th}$ frequency bin in a noise signal, and then filter out the target sound included in the $i^{th}$ frequency bin in the noise signal. The noise signal includes the first frame of noise signal and the second frame of noise signal.

The second filter may be configured to determine, by using the first frame of reference noise signal and the second frame of reference noise signal as a reference, noise included in the first frame of target audio signal, and filter out the noise in the first frame of target audio signal, to obtain the filtered first frame of target audio signal.

The second filter includes N elements, an $i^{th}$ element is used to determine, by using $i^{th}$ frequency bins in the first frame of reference noise signal and the second frame of reference noise signal as a reference, noise included in the $i^{th}$ frequency bin in the first frame of target audio signal, and then filter out the noise included in the $i^{th}$ frequency bin in the first frame of target audio signal.

In some examples, the terminal may update the first filter, so that the terminal may more accurately determine the target sound included in the first frame of noise signal and the second frame of noise signal, and better filter out the target sound included in the first frame of noise signal and the second frame of noise signal. For an occasion of updating the first filter and a process of updating the first filter, refer to the following descriptions of step S502 and step S503. Details are not described herein.

In some other examples, the terminal may update the second filter, so that the terminal may more accurately determine the noise included in the first frame of target audio signal, and better filter out the noise included in the first frame of target audio signal. For an occasion of updating the second filter and a process of updating the second filter, refer to the following descriptions of step S502 and step S504. Details are not described herein.

S502: The terminal determines whether the first frame of target audio signal includes the target sound.

It can be learned based on the foregoing content that, the to-be-processed target audio signal may include the target sound, and may also include a part of noise.

The first frame of target audio signal is an audio signal in frequency domain, and may be represented as N frequency bins. When the terminal determines that a quantity of frequency bins carrying the target sound in the N frequency bins is greater than or equal to a first threshold, the terminal may determine that the first frame of target audio signal includes the target sound. It may be understood that, in this case, the terminal may determine that the target sound included in the first frame of target audio signal is greater than or equal to the first threshold, and the first frame of target audio signal includes the target sound (noise is little or noise is not included). When the terminal determines that the quantity of frequency bins carrying the target sound in the N frequency bins is less than the first threshold, the terminal may determine that the first frame of target audio signal includes noise. It may be understood that, in this case, the terminal may determine that the target sound included in the first frame of target audio signal is less than the first threshold, and the first frame of target audio signal includes noise (the target sound is little or the target sound is not included).

When the terminal determines that the first frame of target audio signal includes the target sound, the terminal may perform the following step S503. In step S503, the terminal may update the first filter, and use an updated first filter as the first filter. The first filter may determine, by using the first frame of target audio signal as a reference, the target sound included in the first frame of noise signal and the second frame of noise signal, and filter out, based on the determined target sound, the target sound included in the first frame of noise signal and the second frame of noise signal. The first filter is updated so that the terminal may more accurately determine the target sound included in the first frame of noise signal and the second frame of noise signal, and better filter out the target sound included in the first frame of reference noise signal and the second frame of reference noise signal. For a detailed description of updating the first filter by the terminal, refer to the following description of step S503. Details are not described herein.

When the terminal determines that the first frame of target audio signal does not include the target sound, which may be understood as including noise, the terminal may not update the first filter, and performs the following step S504. In step S504, the terminal may update the second filter, and use an updated second filter as the second filter. The second filter may determine, by using the first frame of reference noise signal and the second frame of reference noise signal as a reference, the noise included in the first frame of target audio signal, and filter out the noise in the first frame of target audio signal based on the determined noise, to obtain the filtered first frame of target audio signal. The second filter is updated so that the terminal may more accurately determine the noise included in the first frame of target audio signal, and better filter out the noise included in the filtered first frame of target audio signal. For a detailed description of updating the second filter by the terminal, refer to the following description of step S504. Details are not described herein.

In some examples, the terminal may perform voice activity detection (voice activity detection, VAD) on the first frame of target audio signal, to determine whether each frequency bin carries the target sound. Each frequency bin in the first frame of target audio signal corresponds to a voice activity detection (VAD) value. In this case, a result obtained by the terminal by performing voice activity detection on the first frame of target audio signal are N VAD values. A first frequency bin is included, and the first frequency bin may be any frequency bin in the first frame of target audio signal. When a VAD value of the first frequency bin is 1, it indicates that the first frequency bin carries a target voice. When the VAD value of the first frequency bin is 0, it indicates that the first frequency bin does not carry a target voice, and may carry noise or not carry a voice. For the $i^{th}$ frequency bin in the first frame of target audio signal, the terminal may determine a VAD value of the $i^{th}$ frequency bin based on the following Formula (7):

$$\begin{cases} pow(V_1(i)) > \dfrac{pow(V_2(i)) + pow(V_3(i))}{2} \times \alpha \; VAD(i) = 1 \\ pow(V_1(i)) < \dfrac{pow(V_2(i)) + pow(V_3(i))}{2} \times \alpha \; VAD(i) = 0 \\ pow(V_1(i)) = \dfrac{pow(V_2(i)) + pow(V_3(i))}{2} \times \alpha \; VAD(i) = 0 \text{ or } 1 \end{cases} \quad \text{Formula (7)}$$

In Formula (7), $pow(V_1(i))$ represents energy of the $i^{th}$ frequency bin in the first frame of target audio signal, $pow(V_2(i))$ represents energy of an $i^{th}$ frequency bin in the first frame of noise signal, and $pow(V_3(i))$ represents energy of an $i^{th}$ frequency bin in the second frame of noise signal. $\alpha$ is a coefficient, whose value range is (0.8, 1.2). Formula (7) indicates that when the energy of the $i^{th}$ frequency bin in the first frame of target audio signal is greater than energy obtained after average energy of the $i^{th}$ frequency bin in the first frame of noise signal and the $i^{th}$ frequency bin in the second frame of noise signal is multiplied by the coefficient, the VAD value of the $i^{th}$ frequency bin is 1. When the energy of the $i^{th}$ frequency bin in the first frame of target audio signal is less than the energy obtained after the average energy of the $i^{th}$ frequency bin in the first frame of noise signal and the $i^{th}$ frequency bin in the second frame of noise signal is multiplied by the coefficient, the VAD value of the $i^{th}$ frequency bin is 0. When the energy of the $i^{th}$ frequency bin in the first frame of target audio signal is equal to the energy obtained after the average energy of the $i^{th}$ frequency bin in the first frame of noise signal and the $i^{th}$ frequency bin in the second frame of noise signal is multiplied by the coefficient, the VAD value of the $i^{th}$ frequency bin may be 0, or may be 1. A frequency bin may be expressed as a complex number, and energy of the frequency bin may be expressed as a sum of a square of a real part of the complex number and a square of an imaginary part of the complex number.

It should be understood that, Formula (7) is an example, and in another example, the terminal may alternatively determine the VAD value of the $i^{th}$ frequency bin in another manner, which should not constitute a limitation on embodiments of this application.

S503: The terminal updates the first filter, and uses an updated first filter as the first filter.

When the first frame of target audio signal includes the target sound, the terminal updates the first filter. In this way, the terminal may more accurately determine, by using the first frame of target audio signal as a reference, the target sound included in the first frame of noise signal and the second frame of noise signal, and better filter out the target sound included in the first frame of reference noise signal and the second frame of reference noise signal.

The terminal may update the first filter based on the following Formula (8):

$$W_B^H = W_B^H + \frac{\theta}{\beta + |X_1|^2} X_1 e^*(n) \qquad \text{Formula (8)}$$

In Formula (8), $e(n) = Z_1 - W_B^H X_1$, $e(n)$ represents a residual signal, and $X_1$ represents the first frame of target audio signal. When the terminal filters out, by using the first filter, the target sound included in the first frame of noise signal, $Z_1$ represents the first frame of noise signal. When the terminal filters out, by using the first filter, the target sound included in the second frame of noise signal, $Z_1$ represents the second frame of noise signal. $W_B^H$ represents the first filter before update. In Formula (8), $W_B^H$ on a left side (a side has only $W_B^H$) of the equation represents the updated first filter, $W_B^H$ on a right side of the equation represents the first filter before update, $\theta$ is a coefficient, and may be equal to 0.04, and $\beta$ is a coefficient, and may be equal to 0.001. $|X_1|^2$ represents an energy spectrum of the previous frame of target audio signal, and includes energy of each frequency bin in the previous frame of target audio signal.

S504: The terminal updates the second filter, and uses an updated second filter as the second filter.

When the first frame of target audio signal does not include the target sound, the terminal updates the second filter. In this way, the terminal may more accurately determine, by using the first frame of reference noise signal and the second frame of reference noise signal as a reference, the noise included in the first frame of target sound signal, and better filter out the noise included in the filtered first frame of target sound signal.

The terminal may update the second filter based on the following Formula (9):

$$W_C^H = W_C^H + \frac{\theta}{\beta + |X_1|^2} X_2 e^*(n) \qquad \text{Formula (9)}$$

In Formula (9), $e(n) = Z_2 - W_C^H X_2$, $e(n)$ represents a residual signal, and $Z_2$ represents the first frame of target audio signal. When the terminal filters out, by using the second filter, the first channel of noise included in the first frame of target audio signal, $X_2$ represents the first frame of reference noise signal. When the terminal filters out, by using the second filter, the second channel of noise included in the first frame of target audio signal, $X_2$ represents the second frame of reference noise signal. $W_C^H$ represents the second filter before update. In Formula (8), $W_C^H$ on a left side (a side has only $W_C^H$) of the equation represents the updated second filter, $W_C^H$ on a right side of the equation represents the second filter before update, $\theta$ is a coefficient, and may be equal to 0.04, and $\beta$ is a coefficient, and may be equal to 0.001. $|X_1|^2$ represents an energy spectrum of the previous frame of target audio signal, and includes energy of each frequency bin in the previous frame of target audio signal.

S505: The terminal filters out, based on the first filter by using the first frame of target audio signal as a reference, the target sound in the first frame of noise signal and the second frame of noise signal respectively, to obtain a first frame of reference noise signal and a second frame of reference noise signal.

The terminal may determine, based on the first filter and the first frame of target audio signal by using the first frame of target audio signal as a reference, the target sound included in the first frame of noise signal, and filter out the determined target sound from the first frame of noise signal, to obtain the first frame of reference noise signal. For a formula in the process, refer to the following Formula (10):

$$Yblock_{11} = Yref_1 - W_B^H \cdot Ytarget_1 \qquad \text{Formula (10)}$$

In Formula (10), $Yblock_{11}$ represents the first frame of reference noise signal, $Yref_1$ represents the first frame of noise signal, $Ytarget_1$ represents the first frame of target audio signal, $W_B^H$ represents the first filter, and $W_B^H \cdot Ytarget_1$ represents the target sound that is included in the first frame of noise signal and that is determined based on the first filter and the first frame of target audio signal.

The terminal may determine, based on the first filter and the first frame of target audio signal by using the first frame of target audio signal as a reference, the target sound included in the second frame of noise signal, and filter out the determined target sound from the second frame of reference noise signal, to obtain the second frame of reference noise signal. For a formula in the process, refer to the following Formula (11):

$$Yblock_{12} = Yref_2 - W_B^H \cdot Ytarget_1 \qquad \text{Formula (11)}$$

In Formula (11), $Yblock_{12}$ represents the second frame of reference noise signal, $Yref_2$ represents the second frame of noise signal, $Ytarget_1$ represents the first frame of target audio signal, $W_B^H$ represents the first filter, and $W_B^H \cdot Ytarget_1$ represents the target sound that is included in the second frame of noise signal and that is determined based on the first filter and the first frame of target audio signal.

S506: The terminal filters out, based on the second filter by using the first frame of reference noise signal and the second frame of reference noise signal as a reference, the noise included in the first frame of target audio signal, to obtain the filtered first frame of target audio signal.

The terminal may determine, based on the second filter, the first frame of reference noise signal, and the second frame of reference noise signal by using the first frame of reference noise signal and the second frame of reference noise signal as a reference, the noise included in the first frame of target audio signal, and filter out the determined noise included in the first frame of target audio signal, to obtain the filtered first frame of target audio signal. For a formula in the process, refer to the following Formula (12):

$$Gscount_1 = Ytarget_1 - W_C^H \cdot Yblock_{11} - W_C^H \cdot Yblock_{12} \quad \text{Formula (12)}$$

In Formula (12), $Gscout_1$ represents the filtered first frame of target audio signal, $Ytarget_1$ represents the first frame of target audio signal, $W_C^H$ represents the second filter, $Yblock_{11}$ represents the first frame of reference noise signal, and $Yblock_{12}$ represents the second frame of reference noise signal.

S402: The terminal filters the first channel of to-be-processed noise signal based on the to-be-processed target audio signal and the first channel of to-be-processed noise signal, to obtain a filtered first channel of noise signal.

Table 3 shows a use relationship when the terminal obtains the filtered first channel of noise signal.

TABLE 3

| To-be-filtered audio signal | Reference audio signal | To-be-filtered-out sound | Filtered audio signal |
| --- | --- | --- | --- |
| To-be-processed target audio signal | First channel of to-be-processed noise signal | First channel of noise | First channel of reference target audio signal |
| First channel of to-be-processed noise signal | First channel of reference target audio signal | Target sound | Filtered first channel of noise signal |

It can be learned with reference to Table 3 that, the terminal may first filter out, by using the first channel of to-be-processed noise signal as a reference, the first channel of noise included in the to-be-processed target audio signal, to obtain the first channel of reference target audio signal. Then, the terminal filters out, by using the first channel of reference target audio signal as a reference, the target sound included in the first channel of to-be-processed noise signal, to obtain the filtered first channel of noise signal.

It can be learned based on the foregoing content that, the first channel of to-be-processed noise signal has H frames of noise signals, and the terminal may filter each frame of noise signal in the first channel of to-be-processed noise signal, to obtain the filtered first channel of noise signal. A filtered frame of noise signal may be obtained after each frame of noise signal is filtered. The first channel of to-be-processed noise signal includes a first frame of noise signals, and the first frame of noise signal may be a $k^{th}$ frame of noise signal in the first channel of to-be-processed noise signal. A process in which the terminal filters the first frame of noise signal, to obtain a filtered first frame of noise signal is as follows: The terminal may first filter out, by using the first frame of noise signal as a reference, the first channel of noise included in the first frame of target audio signal, to obtain the first frame of reference target audio signal. Then, the terminal filters out, by using the first frame of reference target audio signal as a reference, the target sound included in the first frame of noise signal, to obtain the filtered first frame of noise signal. The to-be-processed target audio signal has H frames of target audio signals, and the first frame of target audio signal may be a $k^{th}$ frame of target audio signal in the to-be-processed target audio signal. $k=\{k \in N+1 \leq k \leq H\}$.

Figure 17:
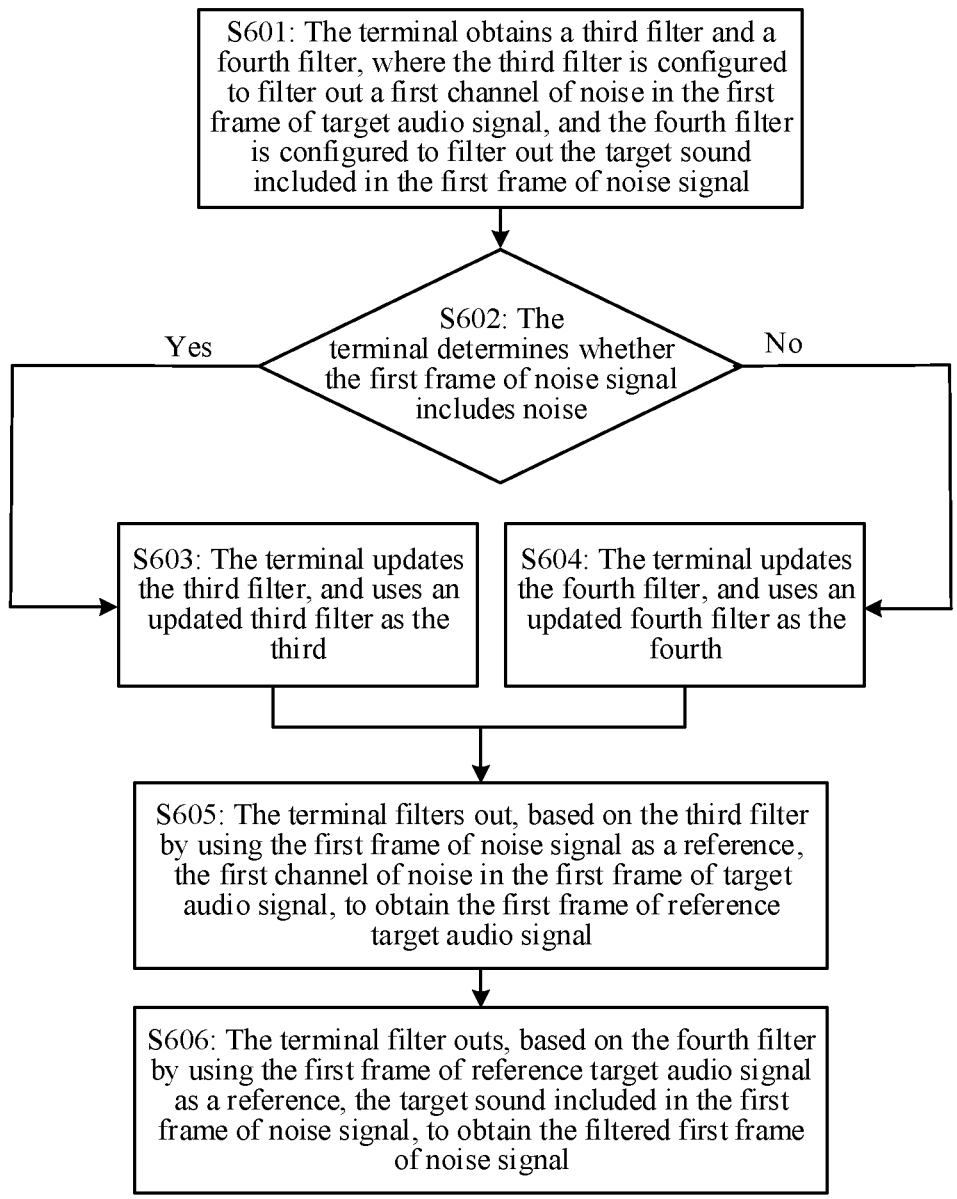
FIG. 17 is an example flowchart in which a terminal generates a filtered first frame of noise signal.

FIG. 17 is an example flowchart in which the terminal generates the filtered first frame of noise signal.

S601: The terminal obtains a third filter and a fourth filter, where the third filter is configured to filter out a first channel of noise in the first frame of target audio signal, and the fourth filter is configured to filter out the target sound included in the first frame of noise signal.

The third filter may be configured to determine, by using the first frame of noise signal as a reference, the first channel of noise included in the first frame of target audio signal, and filter out the first channel of noise included in the first frame of target audio signal, to obtain the first frame of reference target audio signal.

The third filter includes N elements, an $i^{th}$ element is used to determine, by using the $i^{th}$ frequency bin in the first frame of noise signal as a reference, the first channel of noise included in the $i^{th}$ frequency bin in the first frame of target audio signal, and then filter out the first channel of noise included in the $i^{th}$ frequency bin in the first frame of target audio signal.

The fourth filter may be configured to determine, by using the first frame of reference target audio signal as a reference, the target sound included in the first frame of noise signal, and filter out the target sound included in the first frame of noise signal, to obtain the filtered first frame of noise signal.

The fourth filter includes N elements, an $i^{th}$ element is used to determine, by using an $i^{th}$ frequency bin in the first frame of reference target audio signal as a reference, the target sound included in the $i^{th}$ frequency bin in the first frame of noise signal, and then filter out the target sound included in the $i^{th}$ frequency bin in the first frame of noise signal.

In some example, the terminal may update the third filter, so that the terminal may more accurately determine the first channel of noise included in the first frame of target audio signal, and better filter out the first channel of noise included in the first frame of target audio signal. For an occasion of updating the third filter and a process of updating the third filter, refer to the following descriptions of step S602 and step S603. Details are not described herein.

In some other examples, the terminal may update the fourth filter, so that the terminal may more accurately determine the target sound included in the first frame of noise signal, and better filter out the target sound included in the first frame of noise signal. For an occasion of updating the fourth filter and a process of updating the fourth filter, refer to the following descriptions of step S602 and step S604. Details are not described herein.

S602: The terminal determines whether the first frame of noise signal includes noise.

It can be learned based on the foregoing content that, the to-be-processed noise signal may include noise, and may also include a part of the target sound.

The first frame of noise signal is an audio signal in frequency domain, and may be represented as N frequency bins. When the terminal determines that a quantity of frequency bins carrying the first channel of noise in the N frequency bins is greater than or equal to a second threshold, the terminal may determine that the first frame of noise signal includes the first channel of noise. It may be understood that, in this case, the terminal may determine that the first channel of noise included in the first frame of noise signal is greater than or equal to the second threshold, and the first frame of noise signal includes the first channel of noise (the target sound is little or the target sound is not included). When the terminal determines that the quantity of frequency bins carrying the first channel of noise in the N frequency bins is less than the second threshold, the terminal may determine that the first frame of noise signal includes the target sound. It may be understood that, in this case, the terminal may determine that the first channel of noise included in the first frame of noise signal is less than or equal to the second threshold, and the first frame of noise signal includes the target sound (noise is little or noise is not included).

When the terminal determines that the first frame of noise signal includes the first channel of noise, the terminal may perform the following step S603. In step S603, the terminal may update the third filter, and use an updated third filter as the third filter. The third filter may determine, by using the first frame of noise signal as a reference, the first channel of noise included in the first frame of target audio signal, and filter out, based on the determined first channel of noise, the first channel of noise included in the first frame of target audio signal. The third filter is updated so that the terminal may more accurately determine the first channel of noise included in the first frame of target audio signal, and better filter out the first channel of noise included in the first frame of target audio signal. For a detailed description of updating the third filter by the terminal, refer to the following description of step S603. Details are not described herein.

When the terminal determines that the first frame of noise signal does not include the first noise, which may be understood as including the target sound, the terminal may not update the third filter, and performs the following step S604. In step S604, the terminal may update the fourth filter, and use an updated fourth filter as the fourth filter. The fourth filter may determine, by using the first frame of reference target audio signal as a reference, the target sound included in the first frame of noise signal, and filter out, based on the determined target sound, the target sound included in the first frame of noise signal, to obtain the filtered first frame of noise signal. The fourth filter is updated so that the terminal may more accurately determine the target sound included in the first frame of noise signal, and better filter out the target sound included in the filtered first frame of noise signal. For a detailed description of updating the fourth filter by the terminal, refer to the following description of step S604. Details are not described herein.

In some examples, the terminal may perform voice activity detection (voice activity detection, VAD) on the first frame of noise signal, to determine whether each frequency bin carries the first channel of noise. Each frequency bin in the first frame of noise signal corresponds to a voice activity detection (VAD) value. In this case, a result obtained by the terminal by performing voice activity detection on the first frame of noise signal are N VAD values. A second frequency bin is included, and the second frequency bin may be any frequency bin in the first frame of noise signal. When a VAD value of the second frequency bin is 1, it indicates that the second frequency bin carries the first channel of noise. When the VAD value of the second frequency bin is 0, it indicates that the second frequency bin does not carry the first channel of noise, and may carry the target sound or not carry a voice. For the $i^{th}$ frequency bin in the first frame of noise signal, the terminal may determine a VAD value of the $i^{th}$ frequency bin based on the following Formula (13):

$$\begin{cases} pow(V_2(i)) > pow(V_1(i)) \times \alpha & VAD(i) = 1 \\ pow(V_2(i)) < pow(V_1(i)) \times \alpha & VAD(i) = 0 \\ pow(V_2(i)) = pow(V_1(i)) \times \alpha & VAD(i) = 0 \text{ or } 1 \end{cases} \quad \text{Formula (13)}$$

In Formula (13), $pow(V_1(i))$ represents the energy of the $i^{th}$ frequency bin in the first frame of target audio signal, $pow(V_2(i))$ represents the energy of the $i^{th}$ frequency bin in the first frame of noise signal, and a is a coefficient, whose value range is (0.8, 1.2). Formula (13) indicates that when the energy of the $i^{th}$ frequency bin in the first frame of noise signal is greater than energy obtained after the energy of the $i^{th}$ frequency bin in the first frame of target audio signal is multiplied by the coefficient, the VAD value of the $i^{th}$ frequency bin is 1. When the energy of the $i^{th}$ frequency bin in the first frame of noise signal is less than the energy obtained after the energy of the $i^{th}$ frequency bin in the first frame of target audio signal is multiplied by the coefficient, the VAD value of the $i^{th}$ frequency bin is 0. When the energy of the $i^{th}$ frequency bin in the first frame of noise signal is equal to the energy obtained after the energy of the $i^{th}$ frequency bin in the first frame of target audio signal is multiplied by the coefficient, the VAD value of the $i^{th}$ frequency bin may be 0, or may be 1. A frequency bin may be expressed as a complex number, and energy of the frequency bin may be expressed as a sum of a square of a real part of the complex number and a square of an imaginary part of the complex number.

It should be understood that, Formula (13) is an example, and in another example, the terminal may alternatively determine the VAD value of the $i^{th}$ frequency bin in another manner, which should not constitute a limitation on embodiments of this application.

S603: The terminal updates the third filter, and uses an updated third filter as the third filter.

When the first frame of noise signal includes the first channel of noise, the terminal updates the third filter. In this way, the terminal may more accurately determine, by using the first frame of noise signal as a reference, the first channel of noise included in the first frame of target audio signal, and better filter out the first channel of noise included in the first frame of reference target audio signal.

The terminal may update the third filter based on the following Formula (14):

$$W_D^H = W_D^H + \frac{\theta}{\beta + |X_2|^2} X_3 h^*(n) \quad \text{Formula (14)}$$

In Formula (14), $h(n) = Z_3 - W_D^H X_3$, $h(n)$ represents a residual signal, $X_3$ represents the first frame of noise signal, $Z_3$ represents the first frame of target audio signal, and $W_D^H$ represents the third filter before update. In Formula (14), $W_D^H$ on a left side (a side has only $W_D^H$) of the equation represents the updated third filter, $W_D^H$ on a right side of the equation represents the third filter before update, $\theta$ is a coefficient, and may be equal to 0.04, and $\beta$ is a coefficient, and may be equal to 0.001. $|X_2|^2$ represents an energy spectrum of the previous frame of noise signal, and includes energy of each frequency bin in the previous frame of noise signal.

S604: The terminal updates the fourth filter, and uses an updated fourth filter as the fourth filter.

When the first frame of noise signal does not include the first channel of noise, the terminal updates the fourth filter. In this way, the terminal may more accurately determine, by using the first frame of reference target audio signal as a reference, the target sound included in the first frame of noise signal, and better filter out the target sound included in the filtered first frame of noise signal.

The terminal may update the fourth filter based on the following Formula (15):

$$W_E^H = W_E^H + \frac{\theta}{\beta + |X_2|^2} X_4 h^*(n) \quad \text{Formula (15)}$$

In Formula (15), $h(n)=Z_4-W_E^H X_4$, $h(n)$ represents a residual signal, $X_4$ represents the first frame of reference target audio signal, $Z_4$ represents the first frame of noise signal, and $W_E^H$ represents the fourth filter before update. In Formula (15), $W_E^H$ on a left side (a side has only $W_E^H$) of the equation represents the updated fourth filter, $W_E^H$ on a right side of the equation represents the fourth filter before update, θ is a coefficient, and may be equal to 0.04, and β is a coefficient, and may be equal to 0.001. $|X_2|^2$ represents an energy spectrum of the previous frame of noise signal, and includes energy of each frequency bin in the previous frame of noise signal.

S605: The terminal filters out, based on the third filter by using the first frame of noise signal as a reference, the first channel of noise in the first frame of target audio signal, to obtain the first frame of reference target audio signal.

The terminal may determine, by using the first frame of noise signal as a reference, based on the third filter and the first frame of noise signal, the first channel of noise included in the first frame of target audio signal, and filter out the determined first channel of noise from the first frame of target audio signal, to obtain the first frame of reference target audio signal. For a formula in the process, refer to the following Formula (16):

$$Yblock_2 = Yref_2 - W_D^H \cdot Ytarget_2 \quad \text{Formula (16)}$$

In Formula (16), $Yblock_2$ represents the first frame of reference target audio signal, $Yref_2$ represents the first frame of target audio signal, $Ytarget_2$ represents the first frame of noise signal, $W_D^H$ represents the third filter, and $W_D^H \cdot 2$ represents the first channel of noise that is included in the first frame of target audio signal and that is determined based on the third filter and the first frame of noise signal.

S606: The terminal filter outs, based on the fourth filter by using the first frame of reference target audio signal as a reference, the target sound included in the first frame of noise signal, to obtain the filtered first frame of noise signal.

The terminal may determine, based on the fourth filter and the first frame of reference target audio signal by using the first frame of reference target audio signal as a reference, the target sound included in the first frame of noise signal, and filter out the determined target sound from the first frame of noise signal, to obtain the filtered first frame of noise signal. For a formula in the process, refer to the following Formula (17):

$$Gscount_2 = Ytarget_2 - W_E^H \cdot Yblock_2 \quad \text{Formula (17)}$$

In Formula (17), $Gscout_2$ represents the filtered first frame of noise signal, $Ytarget_2$ represents the first frame of noise signal, $W_E^H$ represents the fourth filter, and $Yblock_2$ represents the first frame of reference target audio signal.

S403: The terminal filters the second channel of to-be-processed noise signal based on the to-be-processed target audio signal and the second channel of to-be-processed noise signal, to obtain a filtered second channel of noise signal.

Table 4 shows a use relationship when the terminal obtains the filtered second channel of noise signal.

TABLE 4

| To-be-filtered audio signal | Reference audio signal | To-be-filtered-out sound | Filtered audio signal |
|---|---|---|---|
| To-be-processed target audio signal | Second channel of to-be-processed noise signal | Second channel of noise | Second channel of reference target audio signal |
| Second channel of to-be-processed noise signal | Second channel of reference target audio signal | Target sound | Filtered second channel of noise signal |

It can be learned with reference to Table 4 that, the terminal may first filter out, by using the second channel of to-be-processed noise signal as a reference, the second channel of noise included in the to-be-processed target audio signal, to obtain the second channel of reference target audio signal. Then, the terminal filters out, by using the second channel of reference target audio signal as a reference, the target sound included in the second channel of to-be-processed noise signal, to obtain the filtered second channel of noise signal.

It can be learned based on the foregoing content that, the second channel of to-be-processed noise signal has H frames of noise signals, and the terminal may filter each frame of noise signal in the second channel of to-be-processed noise signal, to obtain the filtered second channel of noise signal. A filtered frame of noise signal may be obtained after each frame of noise signal is filtered. The second channel of to-be-processed noise signal includes a second frame of noise signals, and the second frame of noise signal may be a $k^{th}$ frame of noise signal in the second channel of to-be-processed noise signal. A process in which the terminal filters the second frame of noise signal, to obtain a filtered second frame of noise signal is as follows: The terminal may first filter out, by using the second frame of noise signal as a reference, the second channel of noise included in the first frame of target audio signal, to obtain the second frame of reference target audio signal. Then, the terminal filters out, by using the second frame of reference target audio signal as a reference, the target sound included in the second frame of noise signal, to obtain the filtered second frame of noise signal. The to-be-processed target audio signal has H frames of target audio signals, and the first frame of target audio signal may be a $k^{th}$ frame of target audio signal in the to-be-processed target audio signal. $k=\{k \in N+|1 \leq k \leq H\}$.

Figure 18:
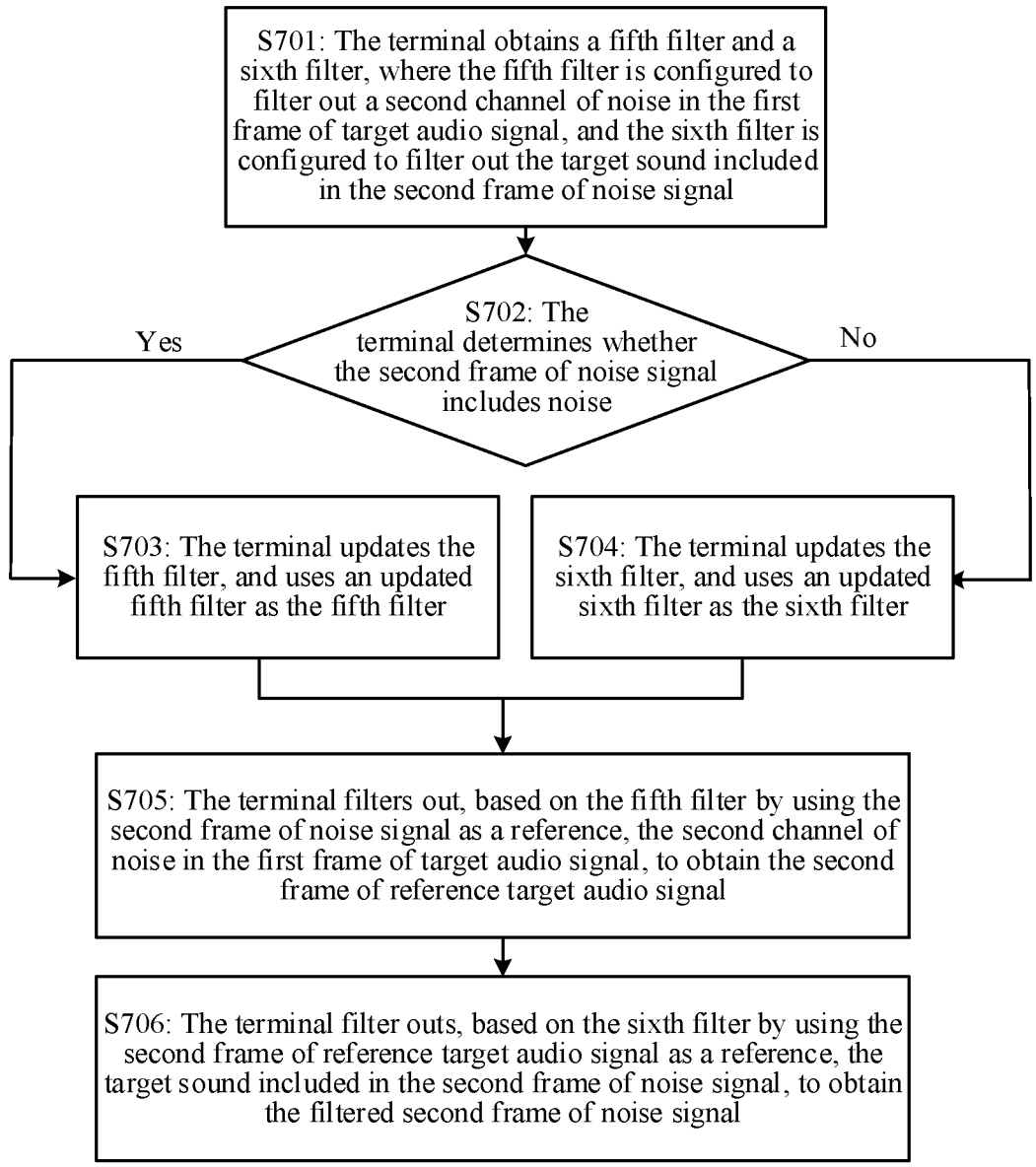
FIG. 18 is an example flowchart in which a terminal generates a filtered second frame of noise signal.

FIG. 18 is an example flowchart in which the terminal generates the filtered second frame of noise signal.

S701: The terminal obtains a fifth filter and a sixth filter, where the fifth filter is configured to filter out a second channel of noise in the first frame of target audio signal, and the sixth filter is configured to filter out the target sound included in the second frame of noise signal.

The third filter may be configured to determine, by using the second frame of noise signal as a reference, the second channel of noise included in the first frame of target audio signal, and filter out the second channel of noise included in the first frame of target audio signal, to obtain the second frame of reference target audio signal.

The sixth filter may be configured to determine, by using the second frame of reference target audio signal as a reference, the target sound included in the second frame of noise signal, and filter out the target sound included in the second frame of noise signal, to obtain the filtered second frame of noise signal.

In some example, the terminal may update the fifth filter, so that the terminal may more accurately determine the second channel of noise included in the first frame of target audio signal, and better filter out the second channel of noise included in the first frame of target audio signal. For an occasion of updating the fifth filter and a process of updating the fifth filter, refer to the following descriptions of step S702 and step S703. Details are not described herein.

In some other examples, the terminal may update the sixth filter, so that the terminal may more accurately determine the target sound included in the second frame of noise signal, and better filter out the target sound included in the second frame of noise signal. For an occasion of updating the sixth filter and a process of updating the sixth filter, refer to the following descriptions of step S702 and step S704. Details are not described herein.

Step S701 is similar to step S601, and an adaptive modification may be made. For example, the first frame of noise signal and content related to the first frame of noise signal in step S601 may be adaptively changed to the second frame of noise signal and content related to the second frame of noise signal, the third filter and content related to the third filter may be updated to the fifth filter and content related to the fifth filter, the fourth filter and content related to the fourth filter may be updated to the sixth filter and content related to the sixth filter, and the first channel of noise and content related to the first channel of noise may be changed to the second channel of noise and content related to the second channel of noise.

S702: The terminal determines whether the second frame of noise signal includes noise.

Step S702 is similar to step S602, and an adaptive modification may be made. For example, the first frame of noise signal and content related to the first frame of noise signal in step S603 may be adaptively changed to the second frame of noise signal and content related to the second frame of noise signal, the third filter and content related to the third filter may be updated to the fifth filter and content related to the fifth filter, the fourth filter and content related to the fourth filter may be updated to the sixth filter and content related to the sixth filter, and the first channel of noise and content related to the first channel of noise may be changed to the second channel of noise and content related to the second channel of noise.

S703: The terminal updates the fifth filter, and uses an updated fifth filter as the fifth filter.

Step S703 is similar to step S603, and an adaptive modification may be made. For example, the first frame of noise signal and content related to the first frame of noise signal in step S603 may be adaptively changed to the second frame of noise signal and content related to the second frame of noise signal, and the third filter and content related to the third filter may be updated to the fifth filter and content related to the fifth filter.

S704: The terminal updates the sixth filter, and uses an updated sixth filter as the sixth filter.

Step S704 is similar to step S604, and an adaptive modification may be made. For example, the first frame of noise signal and content related to the first frame of noise signal in step S604 may be adaptively changed to the second frame of noise signal and content related to the second frame of noise signal, and the fourth filter and content related to the fourth filter may be updated to the sixth filter and content related to the sixth filter.

S705: The terminal filters out, based on the fifth filter by using the second frame of noise signal as a reference, the second channel of noise in the first frame of target audio signal, to obtain the second frame of reference target audio signal.

Step S705 is similar to step S605, and an adaptive modification may be made. For example, the first frame of noise signal and content related to the first frame of noise signal in step S605 may be adaptively changed to the second frame of noise signal and content related to the second frame of noise signal, and the first frame of reference target audio signal and content related to the first frame of reference target audio signal may be changed to the first frame of reference target audio signal and content related to the first frame of reference target audio signal.

S706: The terminal filter outs, based on the sixth filter by using the second frame of reference target audio signal as a reference, the target sound included in the second frame of noise signal, to obtain the filtered second frame of noise signal.

Step S705 is similar to step S605, and an adaptive modification may be made. For example, the first frame of noise signal and content related to the first frame of noise signal in step S605 may be adaptively changed to the second frame of noise signal and content related to the second frame of noise signal, the first frame of reference target audio signal and content related to the first frame of reference target audio signal may be changed to the first frame of reference target audio signal and content related to the first frame of reference target audio signal, and the filtered first frame of noise signal and content related to the filtered first frame of noise signal may be changed to the filtered second frame of noise signal and content related to the filtered second frame of noise signal.

S404: The terminal calculates a noise spectrum by using the filtered first channel of noise signal and the filtered second channel of noise signal, and further filters the filtered target audio signal based on the noise spectrum, to further filter out noise included in the filtered target audio signal, and obtain a processed target audio signal.

Step S404 is optional. In some embodiments, when step S404 is not performed, step S402 and step S403 are not performed, either, and the terminal may use the filtered target audio signal obtained in step S401 as a processed target audio signal.

In some possible examples, the filtered target audio signal may still include noise, and therefore, the filtered target audio signal may be further filtered by using the filtered noise signal set as a reference, to filter out the noise included in the filtered target audio signal, and obtain a processed target audio signal.

A noise spectrum may be used to indicate a status of noise included in the filtered noise signal set. The status of noise includes an energy magnitude of the noise and energy distribution.

Herein, the filtered noise signal set includes the filtered first channel of noise signal and the filtered second channel of noise signal. In this case, the noise included in the filtered target audio signal may be noise included in the filtered first channel of noise signal, and may also be noise included in the filtered second channel of noise signal. The terminal may calculate a noise spectrum based on the filtered first channel of noise signal and the filtered second channel of noise signal, then estimate the noise in the filtered target audio signal based on the noise spectrum, and further filters out the noise included in the filtered target audio signal, to obtain the processed target audio signal.

For a related formula for the terminal to calculate the noise spectrum based on the filtered first channel of noise signal and the filtered second channel of noise signal, refer to the following Formula (18):

$$N_k(m) = \sqrt{X1_{kr}(m)^2 + X1_{ki}(m)^2} + \sqrt{X2_{kr}(m)^2 + X2_{ki}(m)^2} \quad \text{Formula (18)}$$

In Formula (18), $N_k$ (m) represents the noise spectrum, k={k∈N+|1≤k≤H}, m={m∈N+|1≤i≤N}, H represents that the filtered first channel of noise signal and the filtered second channel of noise signal include H frames of filtered noise signals, k represents a $k^{th}$ frame of noise spectrum information in the noise spectrum, and m represents a value corresponding to an $m^{th}$ element in the $k^{th}$ frame of noise spectrum information, which includes N elements in total. N represents that each frame of filtered noise signal includes N frequency bins. For example, the filtered first frame of noise signal and the filtered second frame of noise signal include N frequency bins. The value corresponding to the $m^{th}$ element in the $k^{th}$ frame of noise spectrum signal in the noise spectrum is determined by using $m^{th}$ frequency bins in $k^{th}$ frames of noise signals in the filtered first channel of noise signal and the filtered second channel of noise signal. In some examples, the determining manner is using a sum of amplitudes of the $m^{th}$ frequency bins in the $k^{th}$ frames of noise signals in the filtered first channel of noise signal and the filtered second channel of noise signal as the value corresponding to the $m^{th}$ element in the $k^{th}$ frame of noise spectrum signal in the noise spectrum. In Formula (18), $\sqrt{X2_{kr}(m)^2 + X2_{ki}(m)^2}$ represents the amplitude of the $m^{th}$ frequency bin in the $k^{th}$ frame of noise signal in the filtered second channel of noise signal, and $\sqrt{X1_{kr}(m)^2 + X1_{ki}(m)^2}$ represents the amplitude of the $m^{th}$ frequency bin in the $k^{th}$ frame of noise signal in the filtered first channel of noise signal.

It should be understood that Formula (18) merely provides an example of calculating the noise spectrum, and should not constitute a limitation on embodiments of this application.

In some examples, after determining the noise spectrum, the terminal may estimate the noise in the filtered target audio signal based on the noise spectrum and the filtered target audio signal by using a post filtering algorithm, and then further filter out the noise included in the filtered target audio signal, to obtain the processed target audio signal. A common post filtering algorithm may include an optimally-modified log-spectral amplitude estimation (optimally-modified log-spectral amplitude, OM-LSA) algorithm or a minimum-controlled recursive averaging (minimum-contraled recursive averaging, MCRA) algorithm.

S107: The terminal performs signal separation based on the N channels of audio signals, to obtain N channels of candidate target audio signals.

It should be understood that, each of the N channels of audio signals may include sound of Z photographed objects. The terminal may perform signal separation based on the N channels of audio signals, to obtain N channels of candidate target audio signals. When Z is less than or equal to N, each channel of candidate target audio signal includes sound of one photographed object, and sound of another photographed object is filtered out. When Z is greater than N, each channel of candidate target audio signal includes sound of Q photographed objects. Q is less than Z.

In some embodiments, the terminal may obtain the N channels of candidate target audio signals based on the N channels of audio signals by using a blind source separation (blind source separation, BSS) algorithm. For a related formula in the process, refer to the following Formula (19):

$$D(\omega) = \sum_{i=1}^{N} H_i(\omega) x_i(\omega) \quad \text{Formula (19)}$$

In Formula (19), N represents the quantity of microphones, D(ω) represents the N channels of candidate target audio signals, $x_i$(ω) represents the audio signal (the $i^{th}$ channel of audio signal) obtained by the terminal by using the $i^{th}$ microphone, and $H_i$(ω) represents an unmixing matrix in the signal separation process.

Herein, the N channels of candidate target audio signals obtained through signal separation by using the BSS algorithm may include M channels of candidate target audio signals that include the target sound but do not include noise or whose noise is suppressed (noise is low), audio mixing may be performed on the M channels of candidate audio signals and the processed target audio signal to obtain an audio-mixed target audio signal, and the audio-mixed target audio signal still includes the target sound but does not include noise or noise is suppressed (noise is low). A purpose of this lies as follows: An error may occur when the terminal obtains the processed target audio signal. For example, noise is used as the target sound, or the target sound is filtered out as noise. In this case, audio mixing may be performed on the M channels of candidate target audio signals and the processed target audio signal, to correct a result caused by the error. For the process, refer to the following descriptions of step S108 to step S111.

S108: The terminal determines correlations between the processed target audio signal and the N channels of candidate target audio signals, and obtains M channels of candidate target audio signals whose correlations are greater than a correlation threshold, where M is an integer less than or equal to N and greater than or equal to 0.

A correlation between an $i^{th}$ channel of candidate target audio signal and the processed target audio signal is used to represent a similarity between the $i^{th}$ channel of candidate target audio signal and the processed target audio signal. A larger correlation indicates a higher similarity, and the terminal may determine that the $i^{th}$ channel of candidate target audio signal includes more target sound and less noise.

The terminal may determine, based on the correlations between the processed target audio signal and the N channels of candidate target audio signals, the M channels of candidate target audio signals whose correlations are greater than the correlation threshold. The M channels of candidate target audio signals include the target sound but do not include noise or noise is suppressed (noise is low). A value of the correlation threshold may be adjusted as required, for example, may be 0.95 or 0.9.

For a process in which the terminal determines the correlation between the $i^{th}$ channel of candidate target audio signal and the processed target audio signal, refer to the following description of Formula (20):

$$\gamma_{12}(t, f) = \frac{\phi_{12}(t, f)}{\sqrt{\phi_{11}(t, f)\phi_{22}(t, f)}} \quad \text{Formula (20)}$$

In the formula, $\gamma_{12}$ (t, f) represents the correlation between the $i^{th}$ channel of candidate target audio signal and the processed target audio signal, $\phi_{12}$ (t, f) represents a cross power spectrum between the $i^{th}$ channel of candidate target audio signal and the processed target audio signal, $\phi_{11}$(t, f) represents an auto power spectrum of the processed target audio signal, and $\phi_{22}$ (t, f) represents an auto power spectrum of the $i^{th}$ channel of candidate target audio signal.

Formulas for solving $\phi_{12}$ (t, f), $\phi_{11}$(t, f), and $\phi_{22}$(t, f) are respectively as follows:

$$\phi_{12}(t,f)=E\{X_1\{t,f\}X_2^*\{t,f\}\}$$

$$\phi_{11}(t,f)=E\{X_1\{t,f\}X_1^*\{t,f\}\}$$

$$\phi_{22}(t,f)=E\{X_2\{t,f\}X_2^*\{t,f\}\}$$

In the three formulas, E{ } is an operator, $X_1$\{t, f\} represents amplitude and phase information of the processed target audio signal, and $X_2$\{t, f\} represents amplitude and phase information of the $i^{th}$ channel of candidate target audio signal.

When M is equal to 0, it indicates that there is no channel of candidate target audio signal similar (correlated) to the processed target audio signal, the terminal may not perform the following step S109 and step S110, but use the processed target audio signal as an audio-mixed target audio signal, and perform step S111.

S109: When M is greater than or equal to 2, the terminal performs audio mixing on the M channels of candidate target audio signals, to obtain a separated candidate target audio signal.

Step S109 is optional. When M is equal to 1, it indicates that there is only one channel of candidate target audio signal, and the channel of candidate target audio signal is used as a separated target audio signal.

The terminal performs audio mixing on the M channels of candidate target audio signals, to synthesize the M channels of candidate target audio signals into a channel of audio signal, and uses the channel of audio signal as a separated target audio signal.

In some examples, the terminal may perform audio mixing on the M channels of candidate target audio signals at a ratio of 1:1. In this way, a value of an $i^{th}$ frequency bin in the obtained separated target audio signal is a sum of values of $i^{th}$ frequency bins in the M channels of candidate target audio signals.

S110: The terminal performs audio mixing on the separated candidate target audio signal and the processed target audio signal, to obtain an audio-mixed target audio signal.

In some examples, the terminal may calculate a correlation (denoted as a correlation 1) between the separated candidate target audio signal and the processed target audio signal. An audio mixing ratio used when audio mixing is performed on the separated candidate target audio signal and the processed target audio signal is determined based on the correlation 1, and audio mixing is performed on the separated candidate target audio signal and the processed target audio signal based on the audio mixing ratio, to obtain an audio-mixed target audio signal. For the process, refer to the following description of Formula (21):

$$Y_{gsc}(\omega) = (1-\partial)Y_t(\omega) + \partial Y_s(\omega) \qquad \text{Formula (21)}$$

In Formula (21), $Y_{gsc}(\omega)$, $\partial$ represents the correlation between the separated candidate target audio signal and the processed target audio signal, (1−$\partial$): $\partial$ is the audio mixing ratio, $Y_t$ represents the processed target audio signal, and $Y_S$ represents the separated candidate target audio signal. A larger $\partial$ indicates that the separated candidate target audio signal is more similar to the processed target audio signal. Because a signal separation technology is mature at a current stage, when the separated candidate target audio signal is very similar to the processed target audio signal, it may be considered that a signal separation result is good. When the audio-mixed target audio signal is generated by using the separated candidate target audio signal and the processed target audio signal, the separated candidate target audio signal can make a greater contribution to the audio-mixed target audio signal, that is, accounts for a larger proportion during audio mixing. Therefore, $\partial$ acts on the separated candidate target audio signal.

A process of calculating the correlation 1 is similar to the process in which the terminal determines the correlation between the $i^{th}$ channel of candidate target audio signal and the processed target audio signal. For the process, refer to the foregoing descriptions of Formula (20) and content related to Formula (20). The $i^{th}$ channel of candidate target audio signal and content related to the $i^{th}$ channel of candidate target audio signal may be changed to the separated candidate target audio signal and content related to the separated candidate target audio signal. Details are not described herein again.

The correlation between the separated candidate target audio signal and the processed target audio signal is used to represent a similarity between the separated candidate target audio signal and the processed target audio signal. A higher correlation indicates that the separated candidate target audio signal is more similar to the processed target audio signal. A larger correlation indicates a higher similarity, and the terminal may determine that the separated candidate target audio signal includes more target sound and less noise.

S111: The terminal enhances the audio-mixed target audio signal, to obtain an enhanced target audio signal as an audio signal corresponding to the focus tracking image.

Step S111 is optional. In some embodiments, the audio-mixed target audio signal obtained in step S110 may be used as an audio signal corresponding to the focus tracking image.

The terminal may determine an adjustment parameter. The adjustment parameter is preset in the terminal. The adjustment parameter is used to enhance the audio-mixed target audio signal, so that the audio-mixed target audio has more energy and a larger decibel.

In some embodiments, the terminal may increase an amplitude of the audio-mixed target audio signal to generate the enhanced target audio signal. In this embodiment, the adjustment parameter is a value, whose unit is the same as a unit of the amplitude, and is dB. The adjustment parameter is used to increase the amplitude of the audio-mixed target audio signal. A larger adjustment parameter indicates that the audio-mixed target audio signal is enhanced at a higher level.

It should be understood that, content displayed in a focus tracking image corresponding to each frame of original image is a part of the original image (the part in the image focus tracking region), but when the terminal plays the focus tracking image, a region displaying the focus tracking image is usually greater than the image focus tracking region (the first image region). In this case, the played focus tracking image is usually as large as the original image. It is equivalent to that the focus tracking image is enlarged when played, and usually may be enlarged to be as large as the original image. For example, refer to (a) in FIG. 10A and (a) in FIG. 10B, and (b) in FIG. 10A and (b) in FIG. 10B. Therefore, the terminal may enhance the audio-mixed target audio signal to adapt to the played focus tracking image.

In some possible cases, a value of the adjustment parameter is related to sizes of the image focus tracking region (the first image region in Embodiment 1) and the played focus tracking image. A larger difference between the sizes of the played focus tracking image and the focus tracking image region indicates a larger adjustment parameter. For example, a larger ratio between long sides of the image focus tracking region and the played focus tracking image indicates that the terminal may set the adjustment parameter to be smaller. A smaller ratio between the long sides of the image focus tracking region and the played focus tracking image indicates that the terminal may set the adjustment parameter to be larger. In this way, the enhanced target audio signal can better adapt to the played focus tracking image.

In some embodiments, the terminal may adjust the amplitude of the audio-mixed target audio signal through a method such as automatic gain control (automatic gain control, AGC) or dynamic range compression (dynamic range compression, DRC) by using the adjustment parameter.

A detailed description is provided by using an example in which the terminal adjusts the amplitude of the audio-mixed target audio signal through dynamic range compression by using the adjustment parameter.

In this case, the terminal may enhance the audio-mixed target audio signal in time domain. The terminal may transform the audio-mixed target audio signal from the frequency domain to the time domain through inverse fourier transform (inverse fourier transform, IFT), to obtain a target audio signal in time domain.

The target audio signal in time domain is a digital audio signal, and may be W sampling points of an analog electrical signal. The terminal may represent the target audio signal in time domain by using an array, any element in the array is used to represent a sampling point, any element includes two values, one value represents a time, the other value represents an amplitude of an audio signal corresponding to the time, and a unit of the amplitude is decibel (decibel, dB), and represents a decibel magnitude of the audio signal corresponding to the time.

It should be understood that the target audio signal in time domain is also an audio-mixed target audio signal, which is merely represented in a different form, but carries same voice information.

Then, the terminal may enhance amplitudes of all sampling points in the target audio signal in time domain. A formula for the terminal to enhance, by using the adjustment parameter, the amplitude of the target audio signal in time domain is as follows:

$$A_i' = A_i + |D| i \in (1, M) \quad \text{Formula (22)}$$

In Formula (22), $A_i$ represents an amplitude of an $i^{th}$ sampling point, $A_i'$ represents an adjusted amplitude, D is the adjustment parameter, and M is a total quantity of the sampling points of the target audio signal in time domain.

Then, the terminal transforms the enhanced target audio signal in time domain to the frequency domain, to obtain the enhanced target audio signal, and uses the enhanced target audio signal as the audio signal corresponding to the focus tracking image.

It should be understood that, step S101 to step S111 describe a process in which the terminal processes, in real time when recording a video, obtained images and N channels of audio signals to obtain a focus tracking video. The description of the process also applies to the following Embodiment 2 to Embodiment 4, in addition to Embodiment 1. Embodiment 2 to Embodiment 4 describe other occasions on which the terminal triggers image focus tracking and audio focus tracking. For descriptions of Embodiment 2 to Embodiment 4, refer to the following descriptions.

Embodiment 2: An occasion (which may be referred to as an occasion 2 below) on which the terminal triggers image focus tracking and audio focus tracking is as follows: In a preview process, the terminal first detects an operation on a focus tracking control. In response to the operation, the terminal may change a display status of the focus tracking control to prompt a user that the terminal may perform image focus tracking and audio focus tracking after a focus is determined. After an operation on a start recording control is detected, when an operation of selecting a focus for an original image by the user is not detected within a first time threshold, the terminal may automatically determine a focus based on the original image. After determining the focus, the terminal may perform image focus tracking and audio focus tracking.

For example user interfaces in Embodiment 2, refer to the following descriptions of FIG. 19A to FIG. 19E.

Figure 19A:
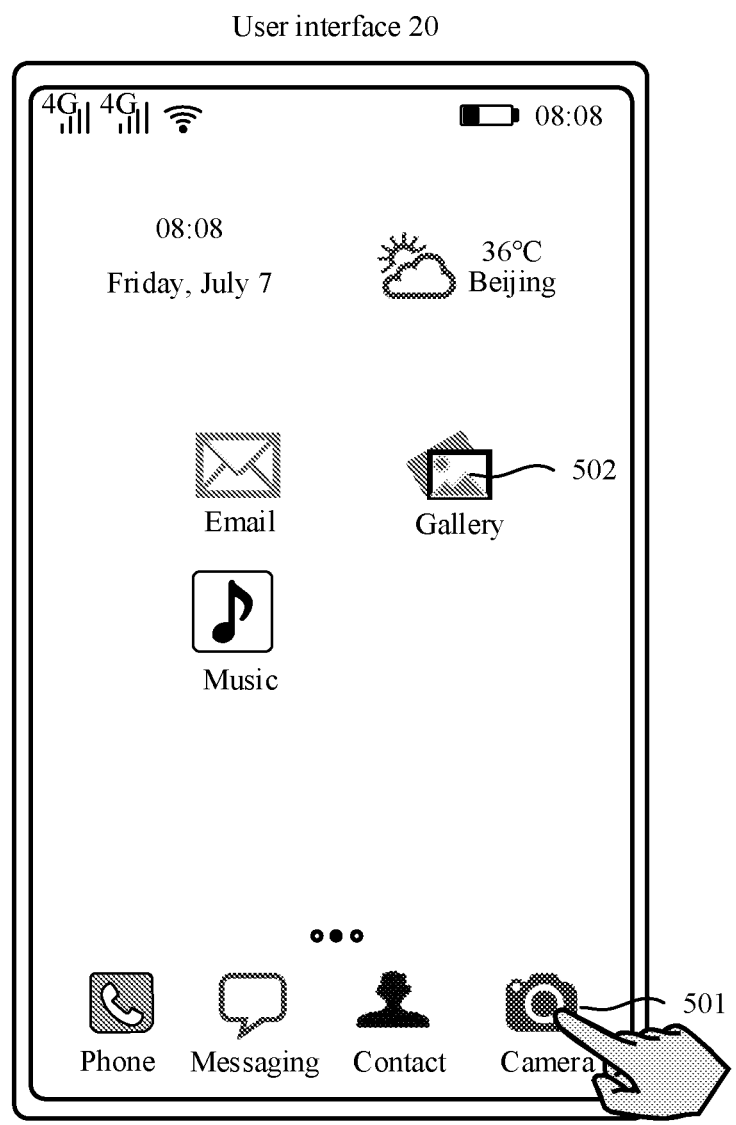
FIG. 19A to FIG. 19E show a group of example user interfaces when a terminal previews a video recorded by the terminal according to Embodiment 2.
Figure 19B:
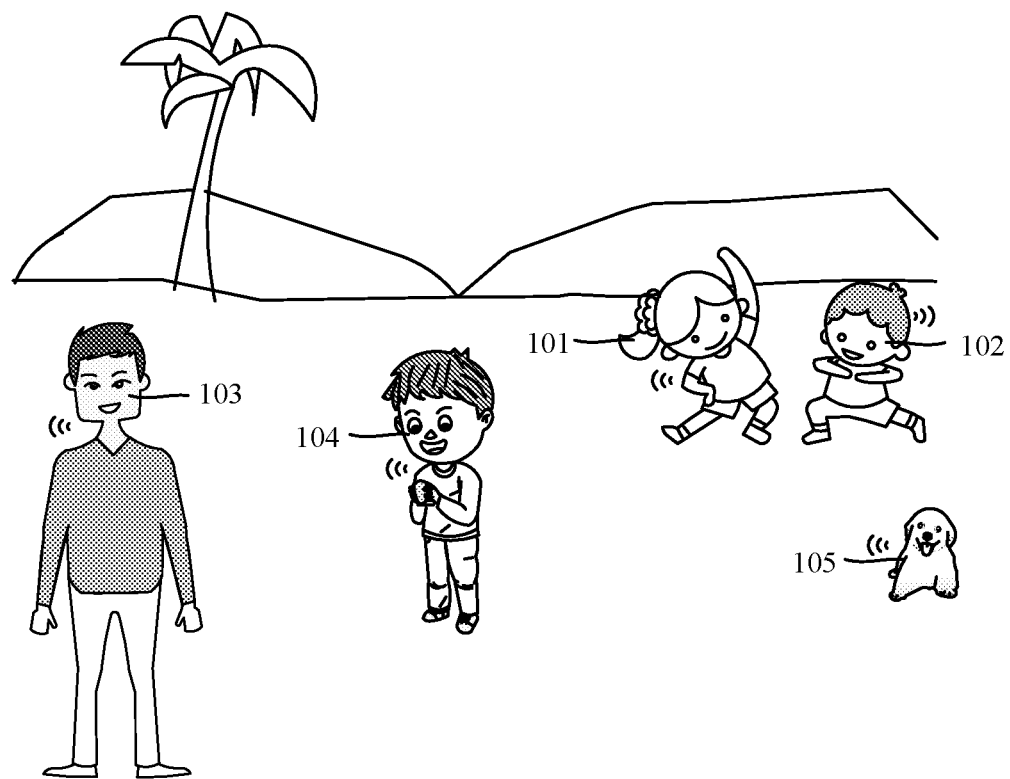
Figure 19B:
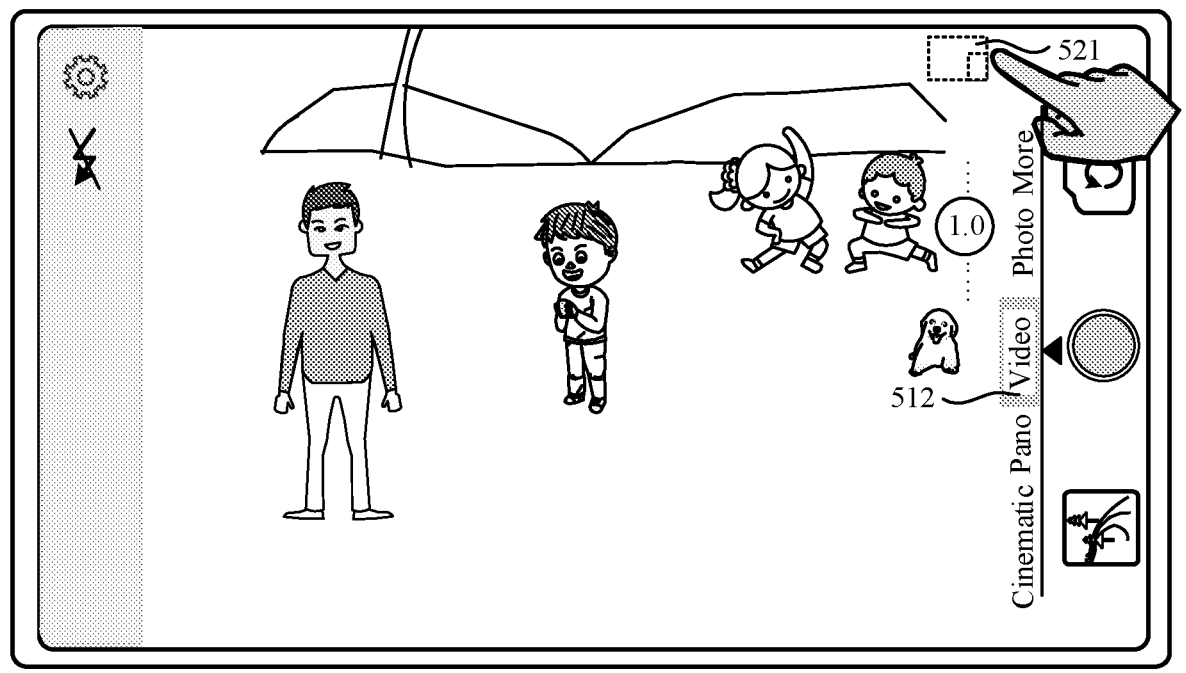
Figure 19C:
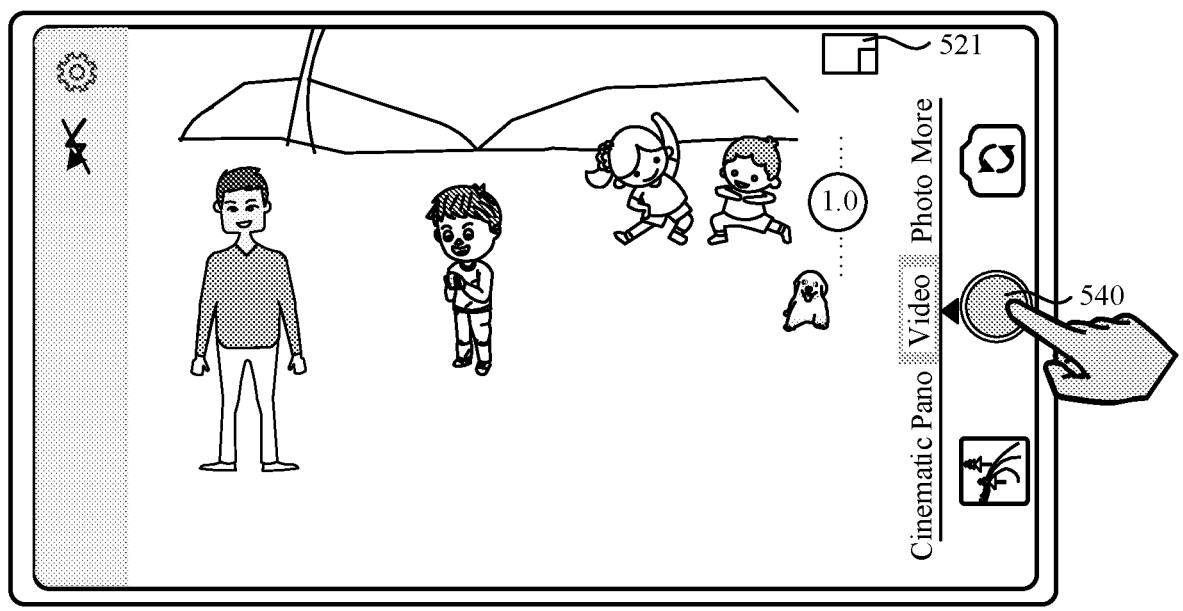
Figure 19D:
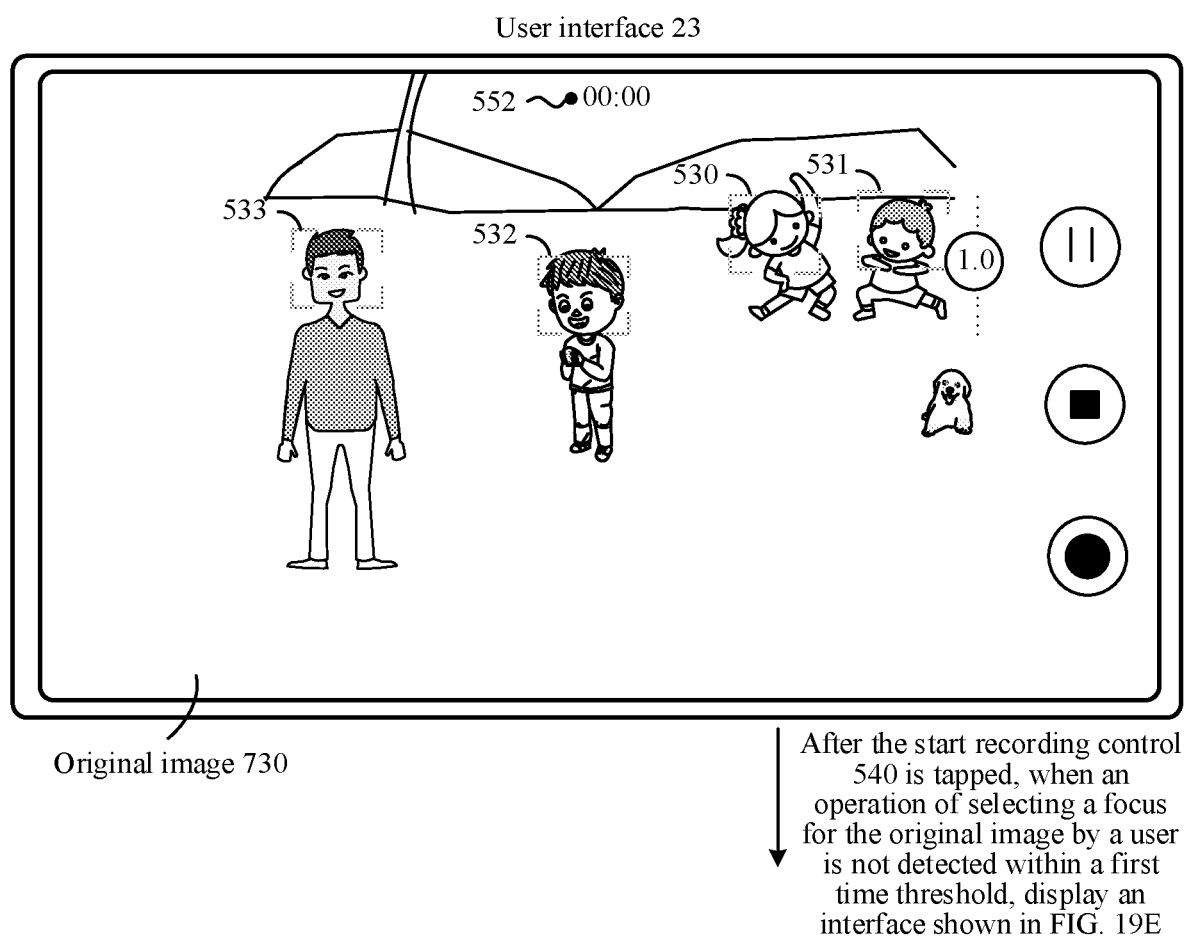
Figure 19E:
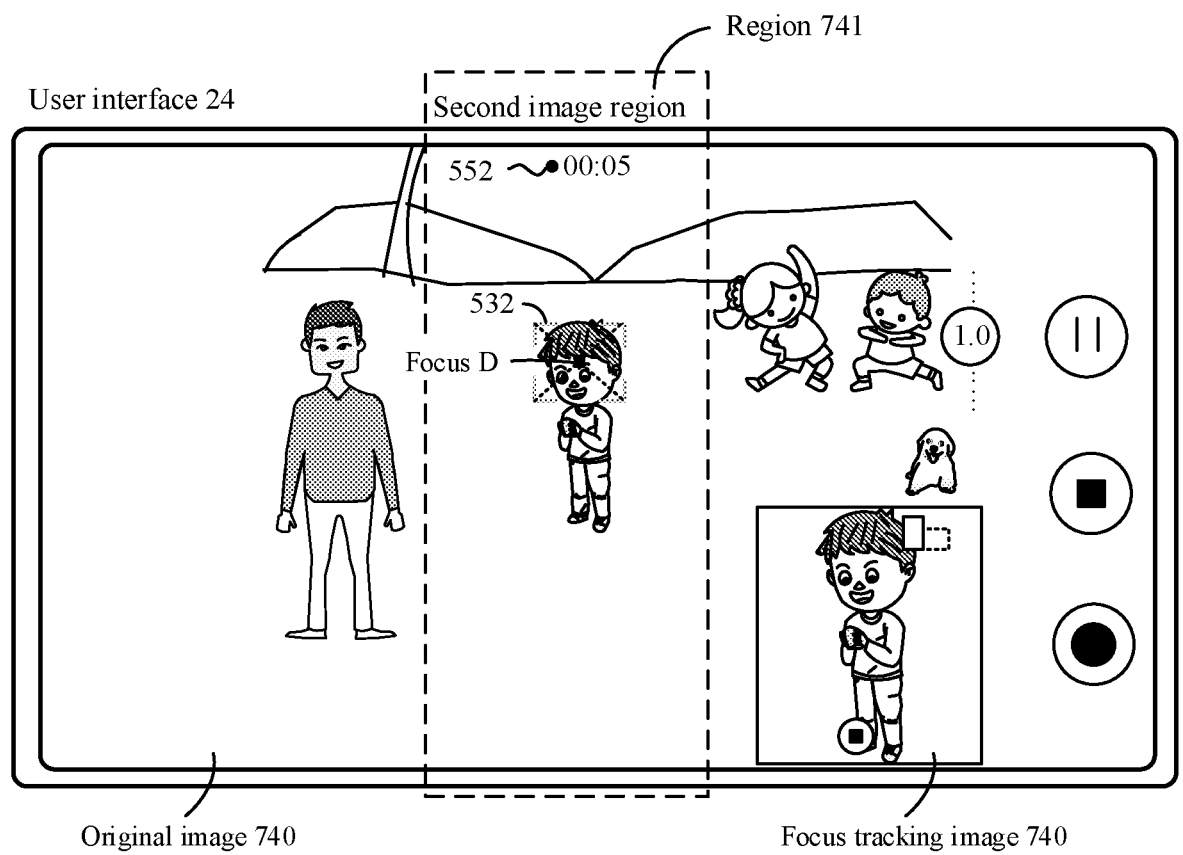

In FIG. 19B to FIG. 19E, the terminal records a video by using a rear-facing camera. In this case, photographed objects may include a photographed object 101 (a little girl), a photographed object 102 (a little boy A), a photographed object 103 (a man), a photographed object 104 (a little boy B), a photographed object 105 (a puppy), and the like. FIG. 19B and FIG. 19C show a group of example user interfaces in a preview process of the terminal. In the preview process, the terminal has not started to record a video. FIG. 19D and FIG. 19E show a group of example user interfaces when the terminal records a video. In this case, in addition to recording an original video, the terminal may further record a focus tracking video by using the video processing method in this application.

As shown in FIG. 19A, the terminal may display a user interface 20. The user interface 20 is a home screen of the terminal. The user interface 20 displays a camera application icon 501 and a gallery application icon 502. The terminal may detect an operation (for example, a single-tap operation) of the user on the camera application icon 501, and in response to the operation, the terminal may display a user interface 21 shown in FIG. 19B.

As shown in FIG. 19B, the user interface 21 is an example preview interface before the terminal starts to record a video, and the user interface 21 may include controls such as a "recording mode" control 512 and a focus tracking control 521. The "recording mode" control 512 may be configured to trigger the terminal to enter a recording mode, and start to record a video.

The user interface 21 further includes the focus tracking control 521. In this case, a display status of the focus tracking control 521 is a first state. In the first state, the focus tracking control 521 is presented in a dashed line form. The focus tracking control 521 may switch the terminal from a common recording mode to a special recording mode (a focus tracking mode), and in the special recording mode, the terminal may record two videos, one is an original video, and the other is a focus tracking video.

When the display status of the focus tracking control 521 is the first state, if an operation (for example, a single-tap operation) on the focus tracking control 521 is detected, the display status of the focus tracking control 521 may switch from the first state to a second state, to prompt the user that after a focus is determined, the terminal may perform image focus tracking and audio focus tracking to obtain a focus tracking video. In this case, the terminal may display a user interface 22 shown in FIG. 19C.

As shown in FIG. 19C, the user interface 22 is another example preview interface after the terminal enters the recording mode. The user interface 22 may further include a start recording control 540. When the terminal detects an operation on the start recording control 540, in response to the operation, the terminal starts to record an original video, and displays a user interface 23 shown in FIG. 19D.

As shown in FIG. 19D, the user interface 23 may include a recording duration prompt 552. In FIG. 19D, the terminal records a video of a zeroth second. In this case, the terminal may obtain an original image 730.

In some possible cases, the terminal may display a plurality of recognition frames in the user interface 23. As shown in FIG. 19D, the user interface 23 may include a recognition frame 530 to a recognition frame 533. The recognition frame 530 to the recognition frame 533 may include content from which the user is most likely to determine a focus. For example, the content may be a face of a photographed object.

In some other possible cases, the terminal may not display a recognition frame in the user interface 23.

After the terminal detects the operation on the start recording control 540, when an operation of selecting a focus for an original image by the user is not detected within a first time threshold, the terminal may automatically determine a focus based on the original image. For example, the first time threshold may be 5s. The terminal may determine a geometric center of a recognition frame in the original image that is the closest to a geometric center of the original image as a focus. In this case, the terminal may display a user interface 24 shown in FIG. 19E.

As shown in FIG. 19E, the terminal may include the recording duration prompt 552. In FIG. 19E, the terminal records a video of a fifth second. In this case, the terminal may obtain an original image 740. In this case, after the terminal detects the operation on the start recording control 540, when an operation of selecting a focus for the original image by the user is not detected within the first time threshold, the terminal may automatically determine a geometric center of a recognition frame 532 in the original image 740 that is the closest to a geometric center of the original image 740 as a focus, for example, a focus D. Then, the terminal may determine a first image region based on the focus D, and generate a focus tracking image 940 based on content in the first image region. In this case, the focus (the focus D in the figure) is in a middle region of the original image 740, and a second image region (a region 741) is also the middle region of the original image 740. An audio signal corresponding to the focus tracking image 940 includes sound of a photographed object displayed in the region 741.

Subsequently, after detecting an operation of determining a focus for an original image by the user, the terminal may determine a new focus, and generate a focus tracking video based on the new focus. When the operation of determining a focus for an original image by the user is not detected, the terminal may generate a focus tracking video based on the focus D. Optionally, a first frame on which audio focus tracking processing is performed is a first frame of audio obtained after the user taps the start recording control and the terminal determines the focus. Optionally, after detecting an operation of tapping an end recording control, the terminal does not perform audio focus tracking processing, but ends recording and generates a focus tracking video. For a process in which the terminal subsequently generates the focus tracking video, refer to the foregoing description of related content in Embodiment 1. Details are not described herein again.

In another embodiment, a manner in which the terminal determines a focus may alternatively include another manner. For details, refer to the foregoing description of related content. Details are not described herein again.

It should be understood that controls in same shapes in user interfaces in Embodiment 2 and user interfaces in Embodiment 1 have same functions and effects. For descriptions of the controls, refer to the foregoing description of related controls in Embodiment 1. Embodiment 2 herein is merely intended to describe a different occasion on which the terminal triggers image focus tracking and video focus tracking, and functions and effects of the controls are not described in detail again.

It should be further understood that, in FIG. 19B and FIG. 19C, the terminal notifies, in a second manner, the user that the terminal enters the special recording mode (the focus tracking mode). In some other cases, the terminal may alternatively notify, in a first manner, the user that the terminal enters the special recording mode (the focus tracking mode). In this case, FIG. 19B and FIG. 19C may be respectively replaced with FIG. 5B and FIG. 5C. Related descriptions of FIG. 19B and FIG. 19C may also be respectively adaptively replaced with related descriptions of FIG. 5B and FIG. 5C.

Embodiment 3: An occasion (which may be referred to as an occasion 3 below) on which the terminal triggers image focus tracking and audio focus tracking is as follows: In a preview process, the terminal first detects an operation on a focus tracking control. In response to the operation, the terminal may change a display status of the focus tracking control to prompt a user that the terminal may perform image focus tracking and audio focus tracking after a focus is determined. After detecting an operation on a start recording control, the terminal may automatically determine a focus based on an original image, and then may perform image focus tracking and audio focus tracking.

For example user interfaces in Embodiment 3, refer to the following descriptions of FIG. 20A to FIG. 20D.

Figure 20A:
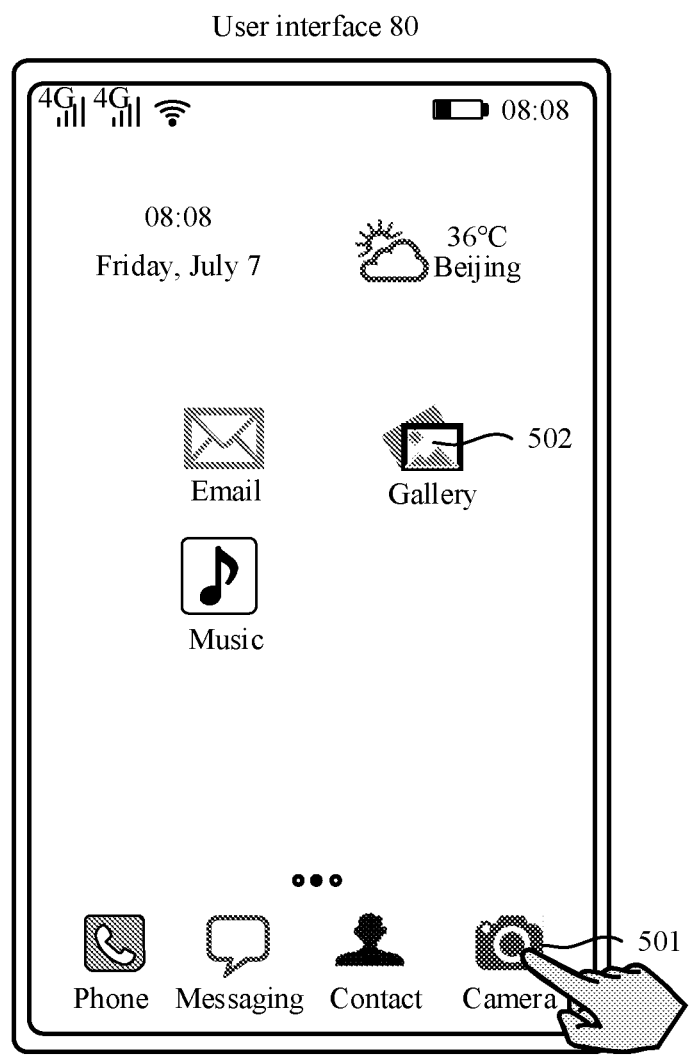
FIG. 20A to FIG. 20D show a group of example user interfaces when a terminal previews a video recorded by the terminal according to Embodiment 3.
Figure 20B:
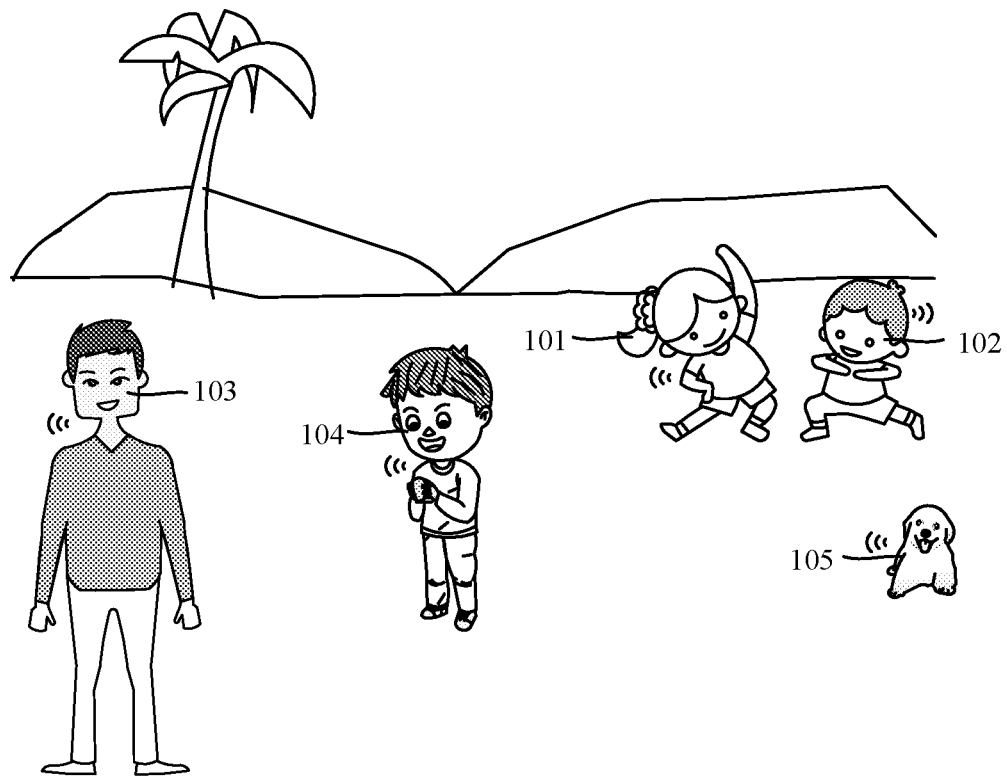
Figure 20B:
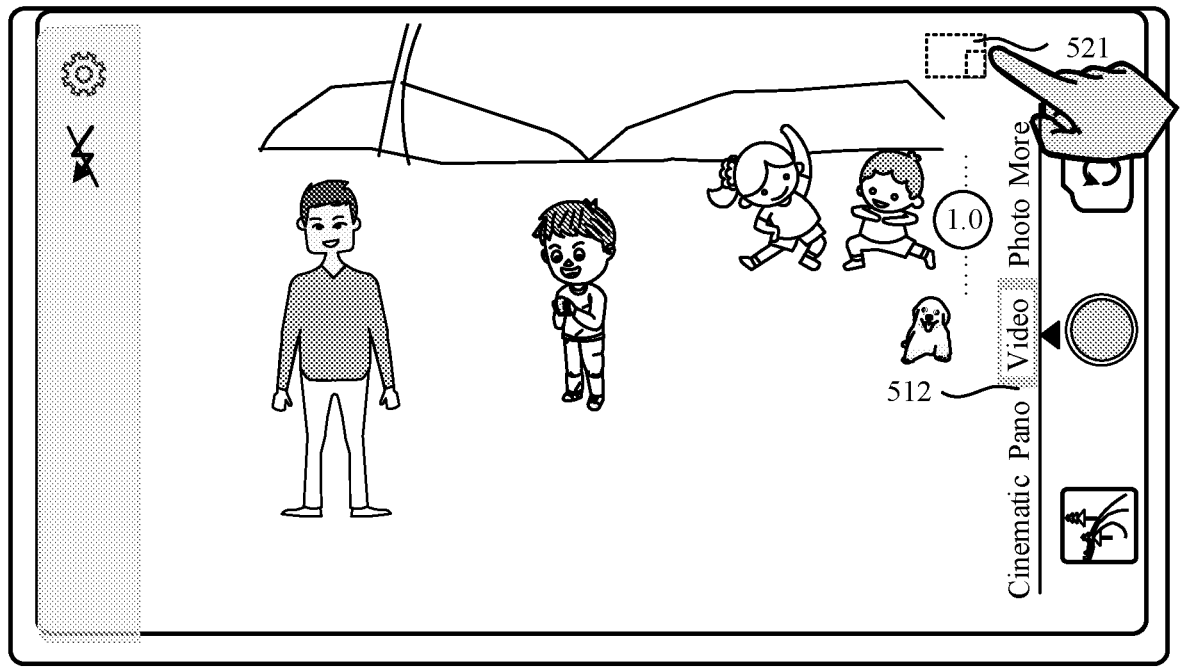
Figure 20C:
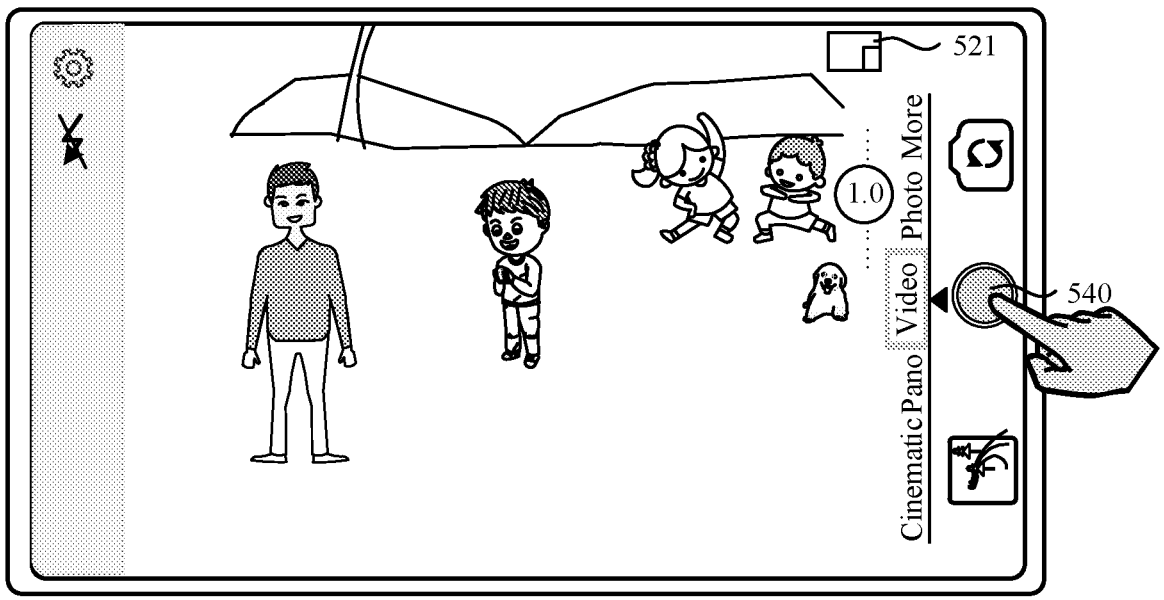
Figure 20D:
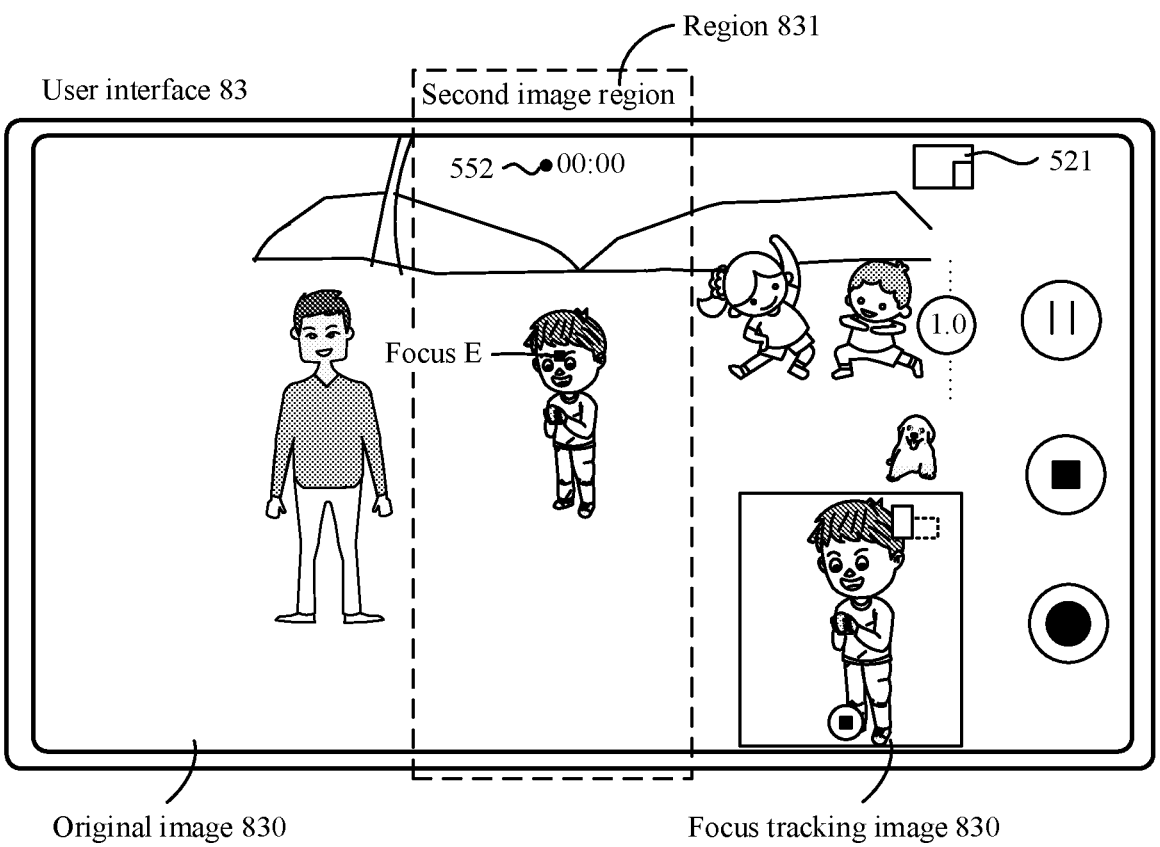

In FIG. 20B to FIG. 20D, the terminal records a video by using a rear-facing camera. In this case, photographed objects may include a photographed object 101 (a little girl), a photographed object 102 (a little boy A), a photographed object 103 (a man), a photographed object 104 (a little boy B), a photographed object 105 (a puppy), and the like. FIG. 20B and FIG. 20C show a group of example user interfaces in a preview process of the terminal. In the preview process, the terminal has not started to record a video. FIG. 20D shows a group of example user interfaces when the terminal records a video. In this case, in addition to recording an original video, the terminal may further record a focus tracking video by using the video processing method in this application.

As shown in FIG. 20A, the terminal may display a user interface 80. The user interface 80 is a home screen of the terminal. The user interface 80 displays a camera application icon 501 and a gallery application icon 502. The terminal may detect an operation (for example, a single-tap operation) of the user on the camera application icon 501, and in response to the operation, the terminal may display a user interface 81 shown in FIG. 20B.

As shown in FIG. 20B, the user interface 81 is an example preview interface before the terminal starts to record a video, and the user interface 81 may include controls such as a "recording mode" control 512 and a focus tracking control 521. The "recording mode" control 512 may be configured to trigger the terminal to enter a recording mode, and start to record a video.

The user interface 81 further includes the focus tracking control 521. In this case, a display status of the focus tracking control 521 is a first state. In the first state, the focus tracking control 521 is presented in a dashed line form. The focus tracking control 521 may switch the terminal from a common recording mode to a special recording mode (a focus tracking mode), and in the special recording mode, the terminal may record two videos, one is an original video, and the other is a focus tracking video.

When the display status of the focus tracking control 521 is the first state, if an operation (for example, a single-tap operation) on the focus tracking control 521 is detected, the display status of the focus tracking control 521 may switch from the first state to a second state, to prompt the user that the terminal enters the focus tracking mode, and after a focus is determined, image focus tracking and audio focus tracking may be performed to obtain a focus tracking video. In this case, the terminal may display a user interface 82 shown in FIG. 20C.

As shown in FIG. 20C, the user interface 82 is another example preview interface after the terminal enters the recording mode. The user interface 82 may further include a start recording control 540. When the terminal detects an operation on the start recording control 540, in response to the operation, the terminal starts to record an original video. In addition, the terminal may automatically determine a focus based on an original image, and start image focus tracking and audio focus tracking based on the focus. In this case, the terminal may display a user interface 83 shown in FIG. 20D.

As shown in FIG. 20D, the user interface 83 includes a recording duration prompt 552. In FIG. 20D, the terminal records a video of a zeroth second. In this case, the terminal may obtain an original image 830. After detecting an operation on the start recording control 540, the terminal may determine a focus based on the original image 830. In some examples, the terminal may perform face recognition on the original image 830, to determine a face center that is the closest to a geometric center of the original image 830 as a focus, for example, a focus E. Then, the terminal may determine a first image region based on the focus E, and generate a focus tracking image 830 based on content in the first image region. In this case, the focus (the focus E in the figure) is in a middle region of the original image 830, and a second image region (a region 831) is also the middle region of the original image 830. An audio signal corresponding to the focus tracking image 830 includes sound of a photographed object displayed in the region 831.

Subsequently, after detecting an operation of determining a focus for an original image by the user, the terminal may determine a new focus, and generate a focus tracking video based on the new focus. When the operation of determining a focus for an original image by the user is not detected, the terminal may generate a focus tracking video based on the focus E. For a process in which the terminal subsequently generates the focus tracking video, refer to the foregoing description of related content in Embodiment 1. Details are not described herein again.

In another embodiment, a manner in which the terminal determines a focus may alternatively include another manner. For details, refer to the foregoing description of related content. Details are not described herein again.

It should be understood that controls in same shapes in user interfaces in Embodiment 3 and user interfaces in Embodiment 1 have same functions and effects. For descriptions of the controls, refer to the foregoing description of related controls in Embodiment 1. Embodiment 3 herein is merely intended to describe a different occasion on which the terminal triggers image focus tracking and video focus tracking, and functions and effects of the controls are not described in detail again.

Optionally, a first frame on which audio focus tracking processing is performed is a first frame of audio obtained after the user taps the start recording control and the terminal determines the focus. Optionally, after detecting an operation of tapping an end recording control, the terminal does not perform audio focus tracking processing, but ends recording and generates a focus tracking video.

It should be further understood that, in FIG. 20B and FIG. 20C, the terminal notifies, in a second manner, the user that the terminal enters the special recording mode (the focus tracking mode). In some other cases, the terminal may alternatively notify, in a first manner, the user that the terminal enters the special recording mode (the focus tracking mode). In this case, FIG. 20B and FIG. 20C may be respectively replaced with FIG. 5B and FIG. 5C. Related descriptions of FIG. 20B and FIG. 20C may also be respectively adaptively replaced with related descriptions of FIG. 5B and FIG. 5C.

Embodiment 4: An occasion (which may be referred to as an occasion 4 below) on which the terminal triggers image focus tracking and audio focus tracking is as follows: After the terminal detects an operation on a start recording control and detects an operation on a focus tracking control, in response to the operations, the terminal may change a display status of the focus tracking control to prompt a user that the terminal may perform image focus tracking and audio focus tracking after a focus is determined. Then, after a focus is determined, the terminal may start image focus tracking and audio focus tracking. A manner in which the terminal determines a focus may be the same as those in Embodiment 1 to Embodiment 3. Herein, an example in which the manner is the same as that in Embodiment 1 is used for description. For the process, refer to the following descriptions of FIG. 21A to FIG. 21E.

Figure 21A:
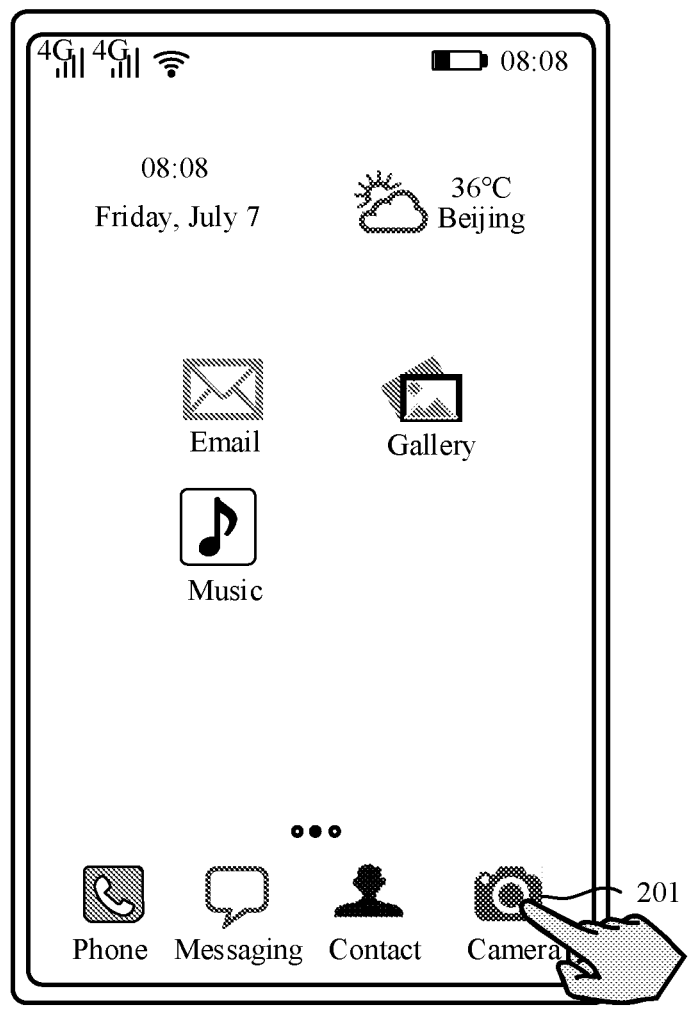
FIG. 21A to FIG. 21E show a group of example user interfaces when a terminal previews a video recorded by the terminal according to Embodiment 3.
Figure 21B:
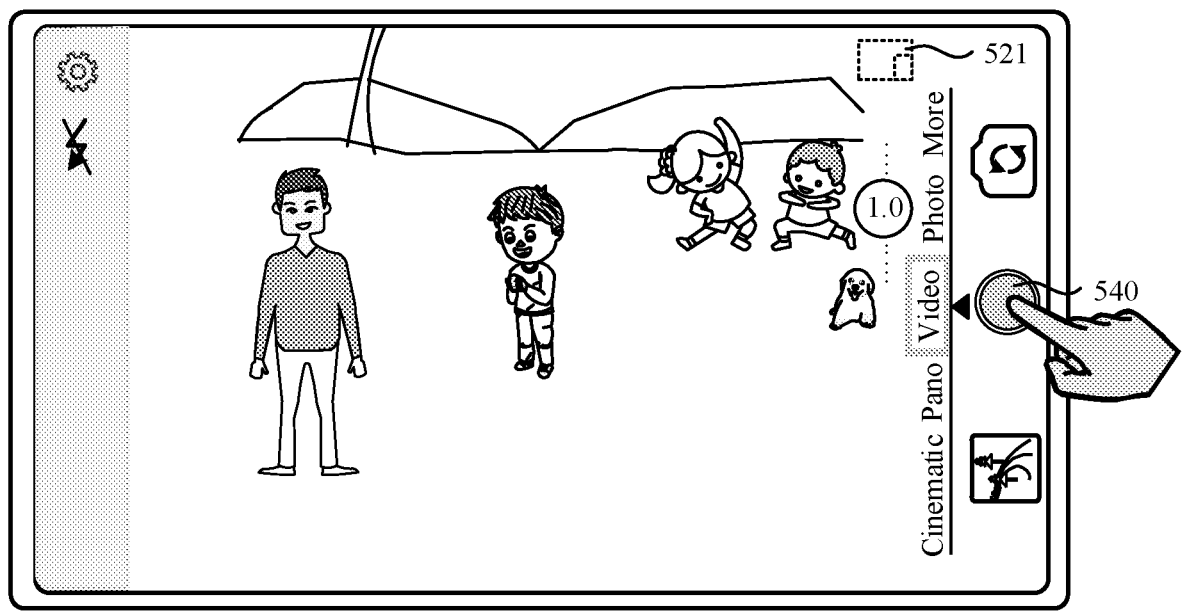
Figure 21C:
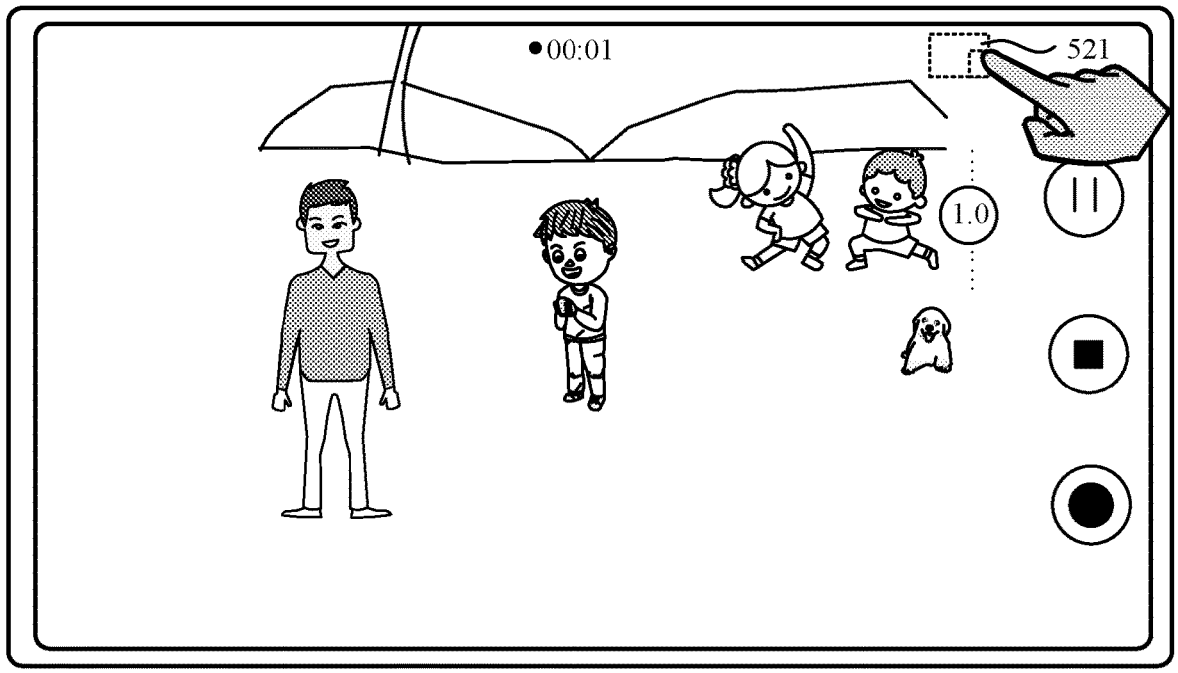
Figure 21D:
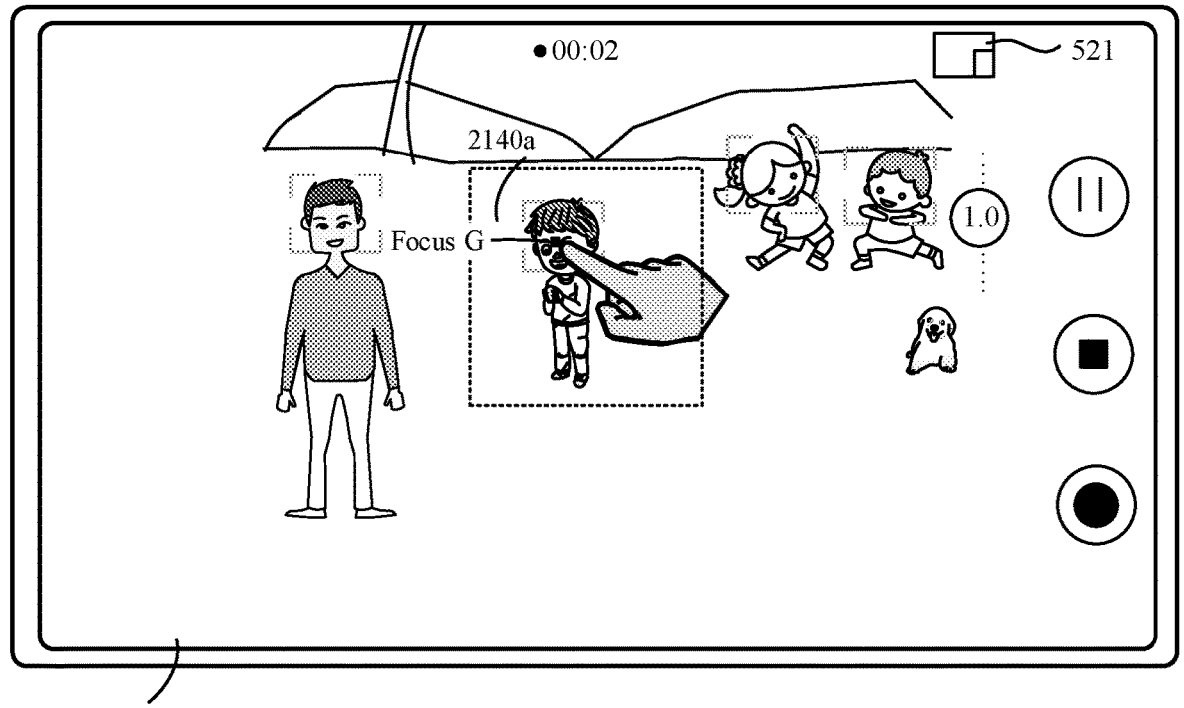
Figure 21E:
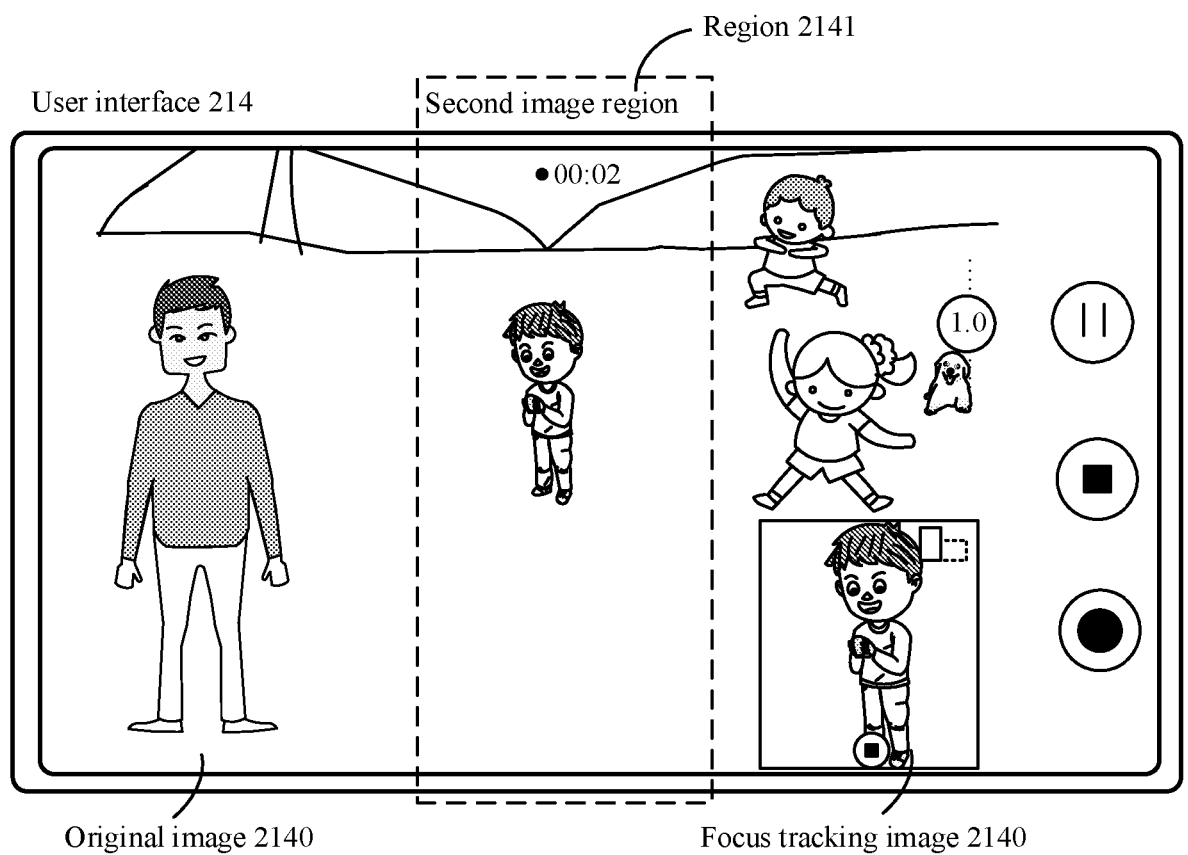

In FIG. 21B to FIG. 21E, the terminal records a video by using a rear-facing camera. In this case, photographed objects may include a photographed object 101 (a little girl), a photographed object 102 (a little boy A), a photographed object 103 (a man), a photographed object 104 (a little boy B), a photographed object 105 (a puppy), and the like. FIG. 21B shows a group of example user interfaces in a preview process of the terminal. In the preview process, the terminal has not started to record a video. FIG. 21C to FIG. 21E show a group of example user interfaces when the terminal records a video. In this case, in addition to recording an original video, the terminal may further record a focus tracking video by using the video processing method in this application.

As shown in FIG. 21A, the terminal may display a user interface 210. The user interface 210 is a home screen of the terminal. The user interface 210 displays a camera application icon 501 and a gallery application icon 502. The terminal may detect an operation (for example, a single-tap operation) of the user on the camera application icon 501, and in response to the operation, the terminal may display a user interface 211 shown in FIG. 21B.

As shown in FIG. 21B, the user interface 211 includes a focus tracking control 521. In this case, a display status of the focus tracking control 521 is a first state. In the first state, the focus tracking control 521 is presented in a dashed line form. The focus tracking control 521 may switch the terminal from a common recording mode to a special recording mode, and in the special recording mode, the terminal may record two videos, one is an original video, and the other is a focus tracking video.

In some embodiments, the user interface 211 may not include the focus tracking control 521, so that the user interface 211 is clearer.

The user interface 211 further includes a start recording control 540. When the terminal detects an operation on the start recording control 540, in response to the operation, the terminal may start to record an original video, but in this case, the terminal has not started to record a focus tracking video. The terminal may display a user interface 212 shown in FIG. 21C.

As shown in FIG. 21C, the user interface 212 includes the focus tracking control 521. In this case, the display status of the focus tracking control 521 is the first state. If an operation (for example, a single-tap operation) on the focus tracking control 521 is detected, the display status of the focus tracking control 521 may switch from the first state to a second state, to prompt the user that after a focus is determined, the terminal may perform image focus tracking and audio focus tracking to obtain a focus tracking video. In this case, the terminal may display a user interface 213 shown in FIG. 21D.

As shown in FIG. 21D, the display status of the focus tracking control 521 in the user interface 213 is the second state. The terminal may obtain an original image 2140. After an operation of determining a focus (a focus G in the figure) for the original image 2140 by the user is detected, in response to the operation, the terminal may determine, in the original image 2140, a first image region 2140a including the focus G, and generate, based on content in the first image region 2140a, a focus tracking image corresponding to the original image 2140. Then, the terminal may display the focus tracking image, and present a user interface 214 shown in FIG. 21E.

As shown in FIG. 21E, the user interface 214 is an example user interface when the terminal performs image focus tracking and audio focus tracking. The terminal may determine, based on the focus, a second image region (a region 2141 in the original image 2140) in which the focus is located. In this case, the focus (the focus G in the figure) is in a rightward region in the original image 2140, and the second image region (the region 2141) is also the rightward region in the original image 2140. An audio signal corresponding to the focus tracking image 2140 includes sound of a photographed object displayed in the region 2141.

Optionally, a first frame of audio on which audio focus tracking processing is performed is a first frame of audio obtained by the terminal after the terminal enters the focus tracking mode and the focus is determined during recording. Optionally, after detecting an operation of tapping an end recording control, the terminal does not perform audio focus tracking processing, but ends recording and generates a focus tracking video.

In another embodiment, a manner in which the terminal determines a focus may alternatively include another manner. For details, refer to the foregoing description of related content. Details are not described herein again.

It should be understood that controls in same shapes in user interfaces in Embodiment 4 and user interfaces in Embodiment 1 have same functions and effects. For descriptions of the controls, refer to the foregoing description of related controls in Embodiment 1. Embodiment 4 herein is merely intended to describe a different occasion on which the terminal triggers image focus tracking and video focus tracking, and functions and effects of the controls are not described in detail again.

Embodiment 5: An occasion (which may be referred to as an occasion 5 below) on which the terminal triggers image focus tracking and audio focus tracking is as follows: After completing recording of an original video, the terminal may trigger image focus tracking and audio focus tracking when playing the original video. On the occasion 5, when playing the original video, after the terminal detects an operation on a focus tracking control and a focus is determined, the terminal may start image focus tracking and audio focus tracking. A manner in which the terminal determines a focus may be the same as those in Embodiment 1 to Embodiment 3. Herein, an example in which the manner is the same as that in Embodiment 1 is used for description. For the process, refer to the following descriptions of FIG. 22A to FIG. 22H.

Figure 22A:
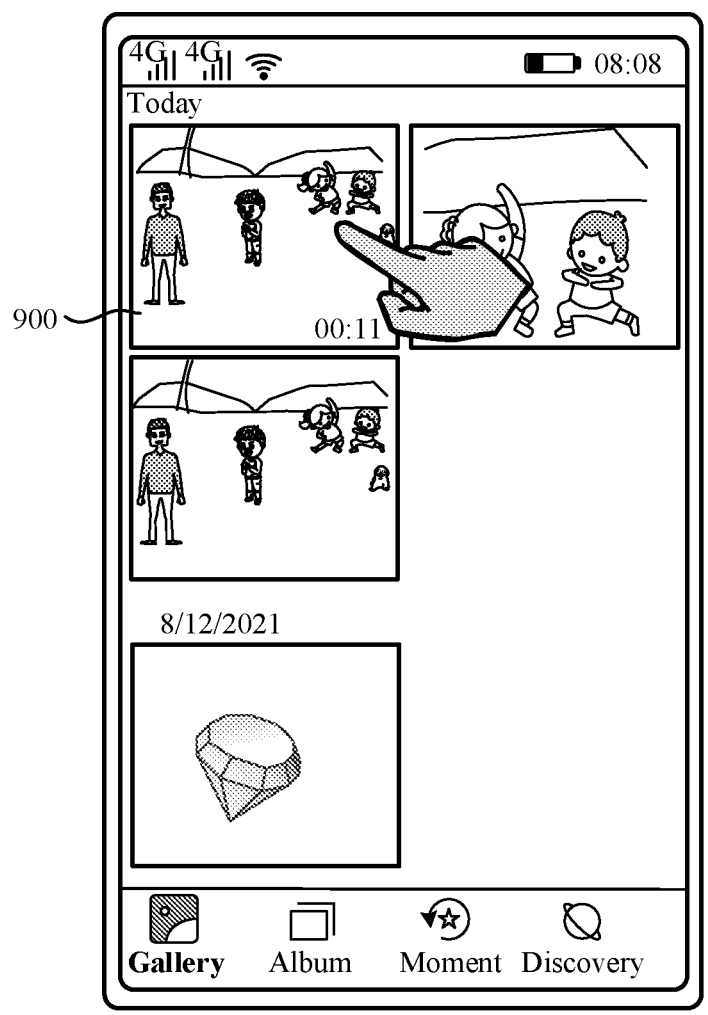
FIG. 22A to FIG. 22H show a group of example user interfaces when a terminal obtains a focus tracking video according to Embodiment 5.

As shown in FIG. 22A, a user interface 90 is an example user interface when the terminal displays an image and a video. The user interface 90 may display a display frame 900 corresponding to the original video. After an operation (for example, a single-tap operation) on the display frame 900 is detected, in response to the operation, the terminal may display a user interface 91 shown in FIG. 22B.

Figure 22B:

As shown in FIG. 22B, the user interface 91 is a user interface in which the terminal sets the original video. The user interface 91 includes a more setting option control 911, and the more setting option control 911 may be configured to display more setting options for the original video. In response to an operation (for example, a tap operation) on the more setting option control 911, the terminal may display a user interface 92 shown in FIG. 22C.

Figure 22C:
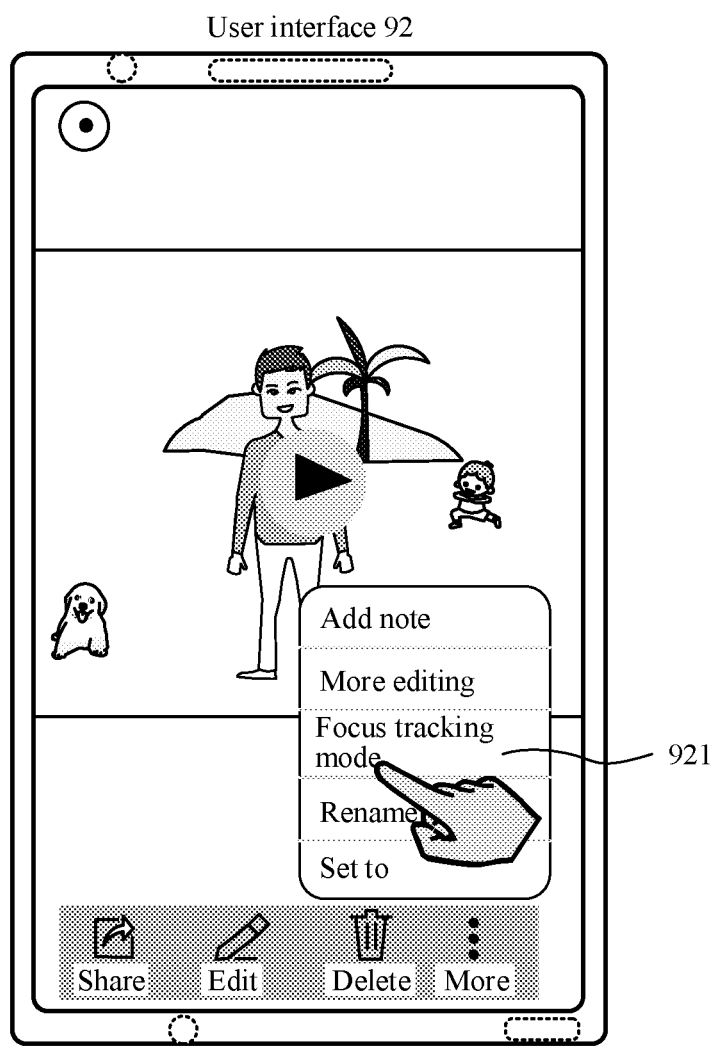

As shown in FIG. 22C, the user interface 92 may display setting options for setting the original video, including a focus tracking mode setting option 921. The focus tracking mode setting option 921 may be configured to receive an instruction of performing image focus tracking and audio focus tracking on the original video. In response to an operation (for example, a tap operation) on the focus tracking mode setting option 921, the terminal may display a user interface 93 shown in FIG. 22D. Subsequently, when playing the original video, the terminal may perform image focus tracking and audio focus tracking to obtain a focus tracking video.

Figure 22D:
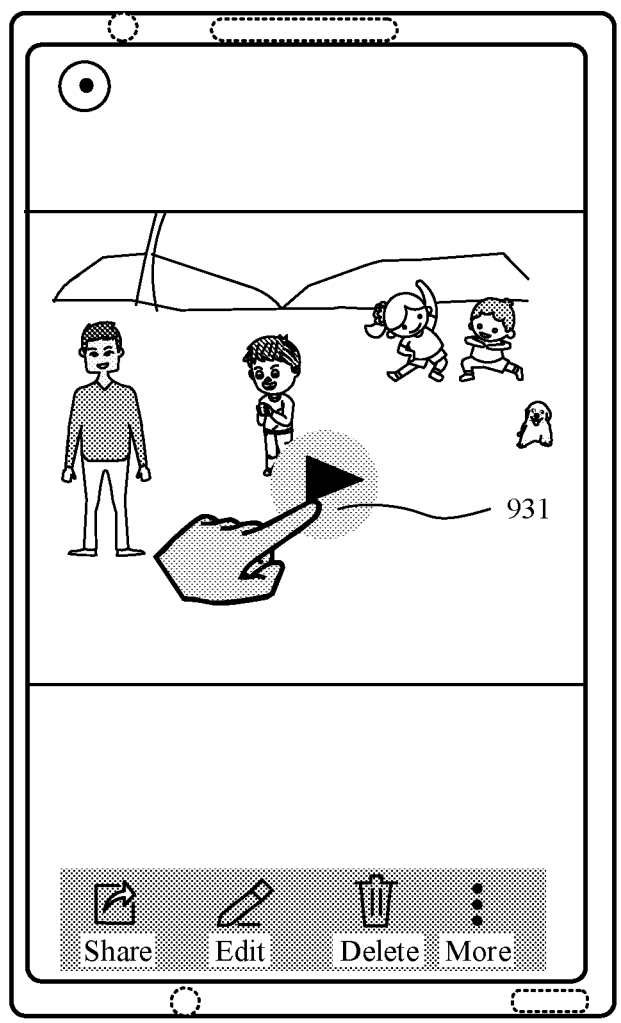

As shown in FIG. 22D, the user interface 93 includes a start play control 931. In response to an operation on the play control 931, the terminal may start to play the original video. When playing the original video, the terminal may perform image focus tracking and audio focus tracking to obtain a focus tracking video.

Figure 22E:
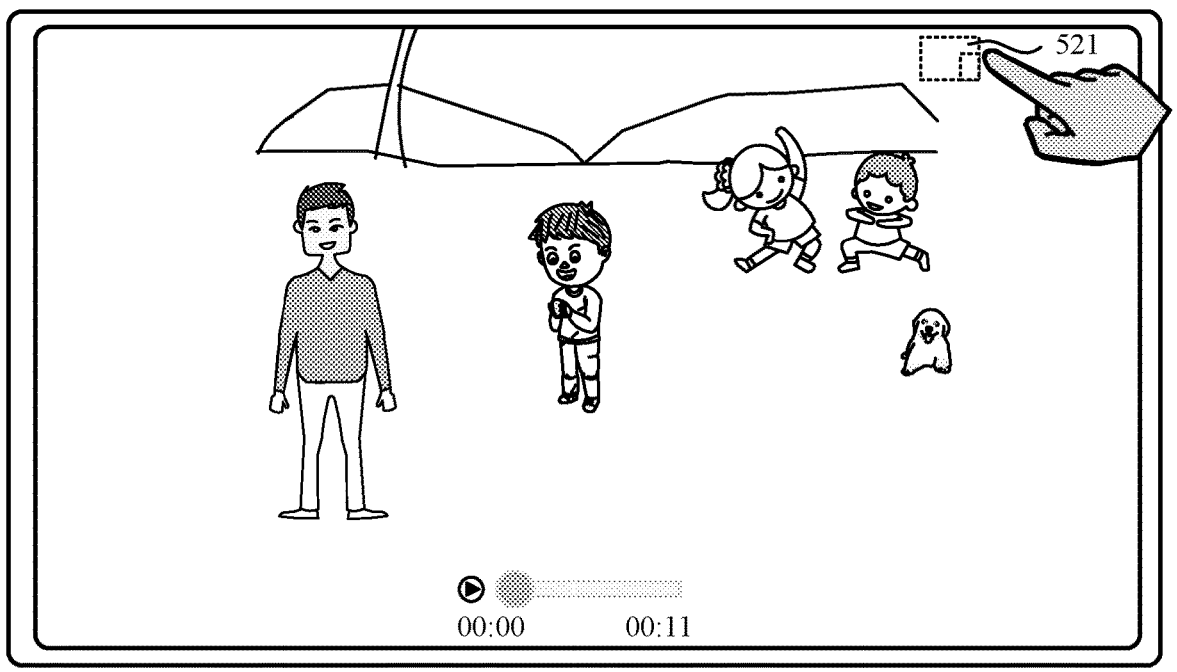

As shown in FIG. 22E, a user interface 94 is an example user interface when the terminal plays the original video. The user interface 94 includes a focus tracking control 521. In this case, a display status of the focus tracking control 521 is a first state. In the first state, the focus tracking control 521 is presented in a dashed line form. When the display status of the focus tracking control 521 is the first state, if an operation (for example, a single-tap operation) on the focus tracking control 521 is detected, the display status of the focus tracking control 521 may switch from the first state to a second state, to prompt a user that after a focus is determined, the terminal may perform image focus tracking and audio focus tracking to obtain a focus tracking video. In this case, the terminal may display a user interface 95 shown in FIG. 22F.

Figure 22F:
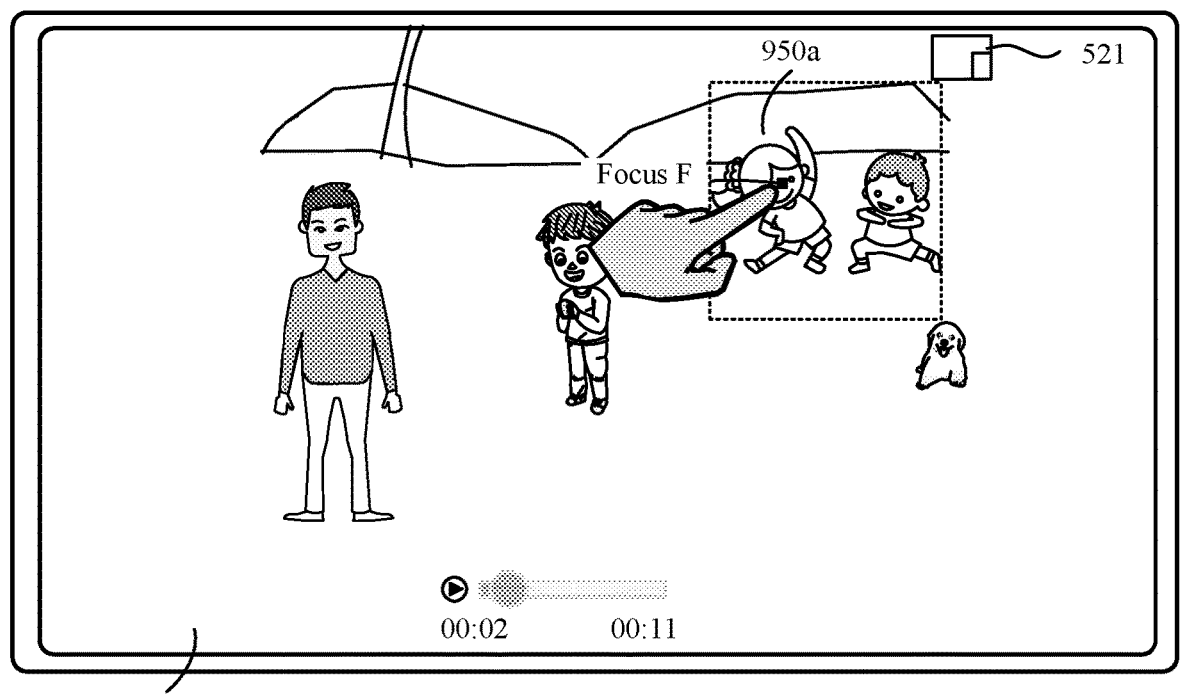

As shown in FIG. 22F, the user interface 95 is another example user interface when the terminal plays the original video. After the terminal detects an operation of determining a focus (a focus F in the figure) for an original image 950 by the user, in response to the operation, the terminal may determine, in the original image 950, a first image region 950a including the focus F, and generate, based on content in the first image region 950a, a focus tracking image corresponding to the original image 950. Then, the terminal may display the focus tracking image, and present a user interface 96 shown in FIG. 22G.

Figure 22G:
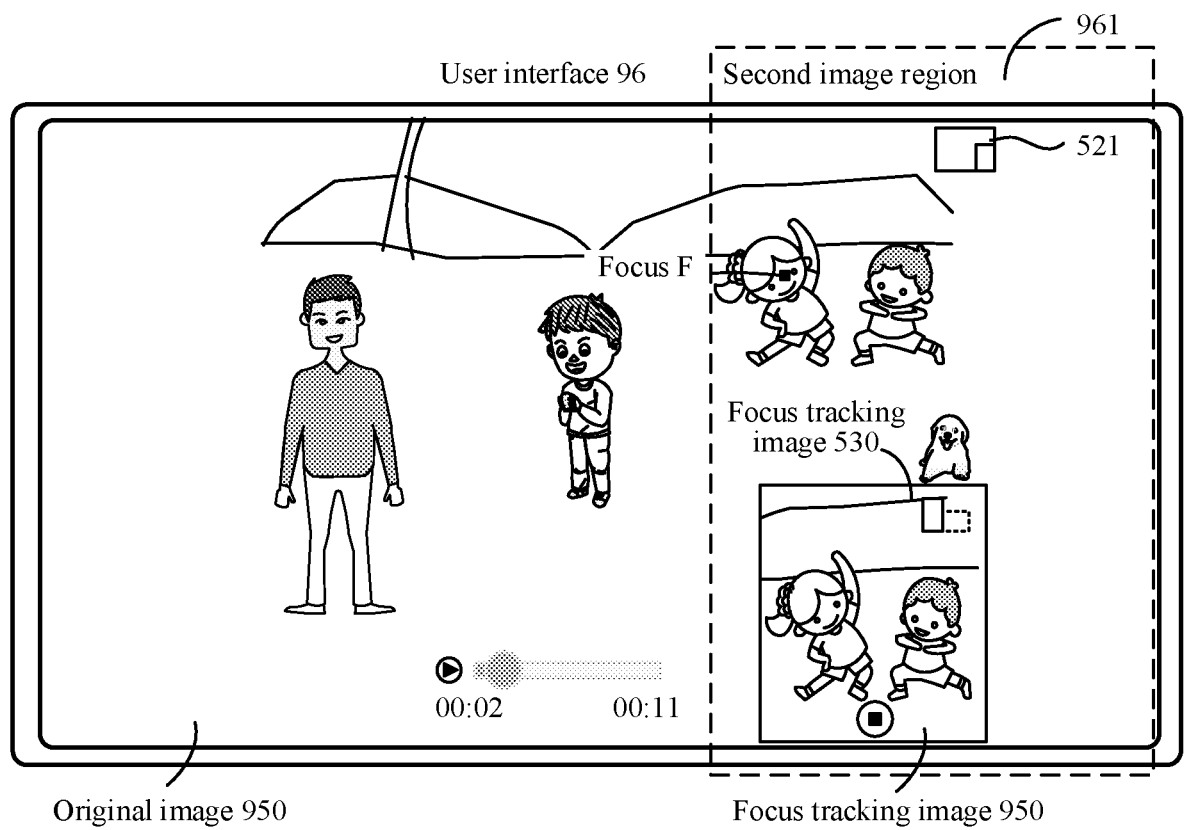

As shown in FIG. 22G, the user interface 96 is an example user interface when the terminal performs image focus tracking and audio focus tracking when playing the original video. The terminal may determine, based on the focus, a second image region (a region 961 in the original image 950) in which the focus is located. In this case, the focus (the focus F in the figure) is in a rightward region in the original image 950, and the second image region (the region 961) is also the rightward region in the original image 950. An audio signal corresponding to the focus tracking image 950 includes sound of a photographed object displayed in the region 961.

Subsequently, after detecting an operation of determining a focus for an original image by the user, the terminal may determine a new focus, and generate a focus tracking video based on the new focus. For a process in which the terminal subsequently generates the focus tracking video, refer to the foregoing description of related content in Embodiment 1. Details are not described herein again.

Figure 22H:
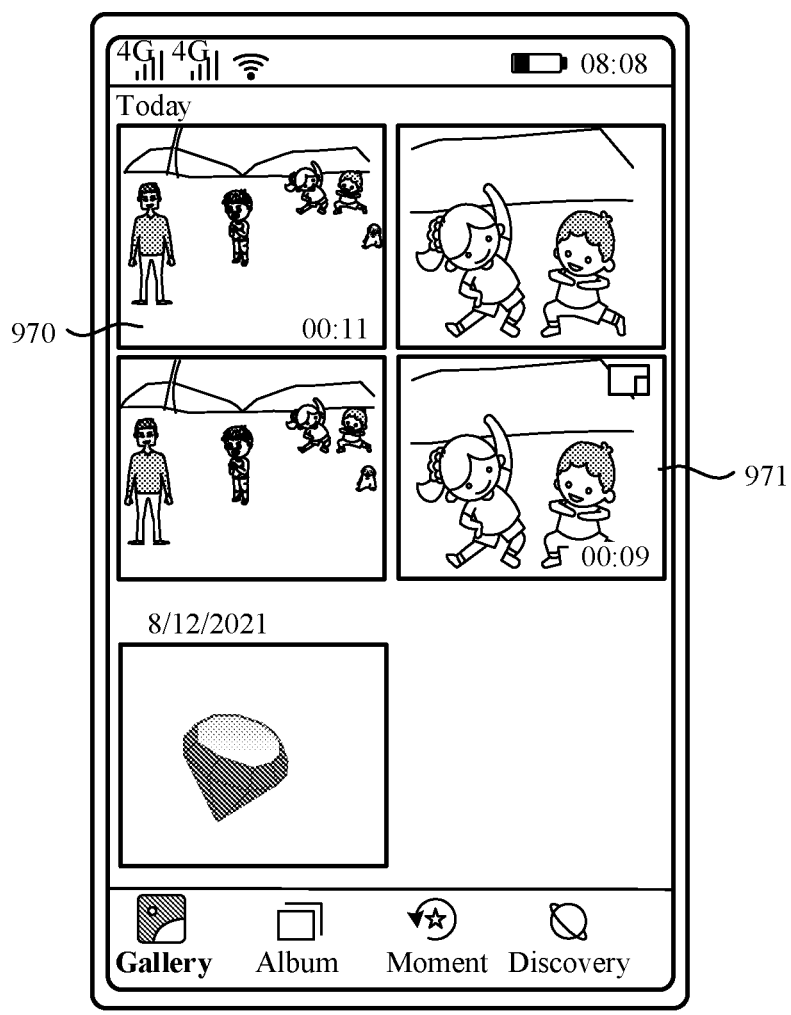

After generating the focus tracking video, the may display a user interface 97 shown in FIG. 22H. The user interface 97 is an example user interface when the terminal displays an image and a video, including a display frame 970 corresponding to the original video and a display frame 971 corresponding to the focus tracking video obtained when the original video is played.

In another embodiment, a manner in which the terminal determines a focus may alternatively include another manner. For details, refer to the foregoing description of related content. Details are not described herein again.

In some other embodiments, after the terminal displays the user interface 91, the focus tracking mode may not be set via the more setting option control, that is, when the original video is played, image focus tracking and audio focus tracking may be directly performed to obtain a focus tracking video.

It should be understood that controls in same shapes in user interfaces in Embodiment 3 and user interfaces in Embodiment 1 have same functions and effects. For descriptions of the controls, refer to the foregoing description of related controls in Embodiment 1. Embodiment 3 herein is merely intended to describe a different occasion on which the terminal triggers image focus tracking and video focus tracking, and functions and effects of the controls are not described in detail again.

It should be understood that, Embodiment 5 is an embodiment in which the terminal performs post-processing based on an original video to obtain a focus tracking video. In the process, for a process in which the terminal generates the focus tracking video, refer to the description of generating a focus tracking video. The only difference lies in an occasion of obtaining an original image to generate a focus tracking image, and an occasion of obtaining N channels of audio signals to generate focus tracking audio. For details, refer to the following descriptions of step S801 to step S811.

Figure 23:
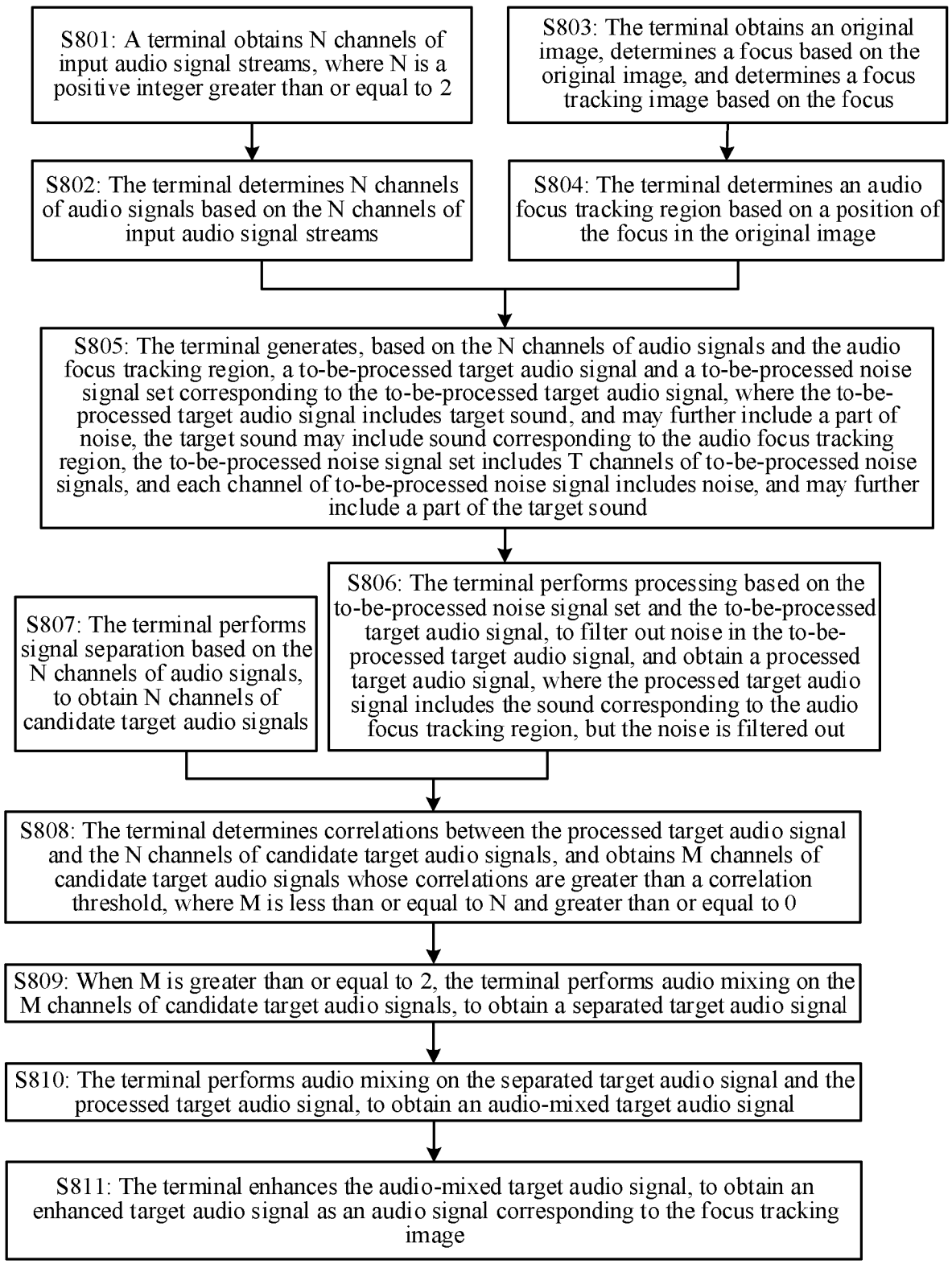
FIG. 23 is another example flowchart of image focus tracking and audio focus tracking according to an embodiment of this application.

FIG. 23 is another example flowchart of image focus tracking and audio focus tracking according to an embodiment of this application.

For a detailed description of the process, refer to the following descriptions of step S801 to step S811.

S801: A terminal obtains N channels of input audio signal streams, where N is a positive integer greater than or equal to 2.

The N channels of input audio signal streams are sound signals of a photographed object acquired by the terminal by using N microphones when the terminal records an original video, including an input audio signal set when the original video is generated. An $i^{th}$ channel of input audio signal stream is a set of input audio signals acquired by an $i^{th}$ microphone of the terminal when the original video is recorded.

S802: The terminal determines N channels of audio signals based on the N channels of input audio signal streams.

The N channels of audio signals are audio signals obtained after one or more frames of input audio signals corresponding to an original image in acquisition time are transformed to a time domain.

S803: The terminal obtains the original image, determines a focus based on the original image, and determines a focus tracking image based on the focus.

The terminal may obtain the original image based on an original image stream in the original video, determines a focus based on the original image, and then determines a focus tracking image based on the focus. For a process in which the terminal determines a focus based on the original image and determines a focus tracking image based on the focus, refer to the related description of step S103. Details are not described herein again.

Step S802 and step S803 are performed without a specific sequence.

S804: The terminal determines an audio focus tracking region based on a position of the focus in the original image.

A process of step S804 is the same as that of step S104. For the process, refer to the description of step S104. Details are not described herein again.

S805: The terminal generates, based on the N channels of audio signals and the audio focus tracking region, a to-be-processed target audio signal and a to-be-processed noise signal set corresponding to the to-be-processed target audio signal, where the to-be-processed target audio signal includes target sound, and may further include a part of noise, the target sound may include sound corresponding to the audio focus tracking region, the to-be-processed noise signal set includes T channels of to-be-processed noise signals, and each channel of to-be-processed noise signal includes noise, and may further include a part of the target sound.

A process of step S805 is the same as that of step S105. For the process, refer to the description of step S105. Details are not described herein again.

S806: The terminal performs processing based on the to-be-processed noise signal set and the to-be-processed target audio signal, to filter out noise in the to-be-processed target audio signal, and obtain a processed target audio signal, where the processed target audio signal includes the sound corresponding to the audio focus tracking region, but the noise is filtered out.

A process of step S806 is the same as that of step S106. For the process, refer to the description of step S106. Details are not described herein again.

S807: The terminal performs signal separation based on the N channels of audio signals, to obtain N channels of candidate target audio signals.

A process of step S807 is the same as that of step S107. For the process, refer to the description of step S107. Details are not described herein again.

S808: The terminal determines correlations between the processed target audio signal and the N channels of candidate target audio signals, and obtains M channels of candidate target audio signals whose correlations are greater than a correlation threshold, where M is less than or equal to N and greater than or equal to 0.

A process of step S808 is the same as that of step S108. For the process, refer to the description of step S108. Details are not described herein again.

S809: When M is greater than or equal to 2, the terminal performs audio mixing on the M channels of candidate target audio signals, to obtain a separated target audio signal.

A process of step S809 is the same as that of step S109. For the process, refer to the description of step S109. Details are not described herein again.

S810: The terminal performs audio mixing on the separated target audio signal and the processed target audio signal, to obtain an audio-mixed target audio signal.

A process of step S810 is the same as that of step S110. For the process, refer to the description of step S110. Details are not described herein again.

S811: The terminal enhances the audio-mixed target audio signal, to obtain an enhanced target audio signal as an audio signal corresponding to the focus tracking image.

A process of step S811 is the same as that of step S111. For the process, refer to the description of step S111. Details are not described herein again.

It should be understood that in the foregoing embodiments, controls included in user interfaces are merely examples for description. The terminal may display more or fewer controls, and forms of the controls may be changed. For example, a region that is in a user interface and that displays a focus tracking image may include fewer controls than the focus tracking pause control 522 and the recording state switching control 523, for example, include only the focus tracking pause control 522 or the recording state switching control; or may include another control, for example, a close control, where the close control may be configured to stop displaying the focus tracking image; or may not include any control; or may include more controls than the focus tracking pause control 522 and the recording state switching control 523, for example, may further include a focus tracking pause control (not shown in the figure, and similar to the pause recording control 554), where the focus tracking pause control provides the user a function of controlling the terminal to pause recording of a focus tracking video. When the terminal detects an operation on the focus tracking pause, in response to the operation, the terminal may pause recording of a focus tracking video. In this case, a region that is in the user interface and that displays the focus tracking pause control may display a restart focus tracking control (not shown in the figure). The restart focus tracking control may be configured for the terminal to restart to record a focus tracking video.

For the foregoing embodiments, after the terminal determines a focus, the focus may move outside a shooting range of the terminal in a subsequent recording process. If the focus moves outside the shooting range and does not reappear within the shooting range of the terminal for a preset time, the terminal may stop image focus tracking or audio focus tracking. Within the preset time, the terminal may set a new focus for image focus tracking or video focus tracking. The preset time may be adjusted as required, for example, to 1s. In this case, the terminal may further display prompt information to prompt the user that "the focus is lost". Content of the prompt information may be "the focus is lost, and the terminal will stop image focus tracking and audio focus tracking". "The focus is lost" means that the focus moves outside the shooting range of the terminal. In some cases, if the focus reappears within the shooting range of the terminal within the preset time, the terminal may perform image focus tracking or audio focus tracking based on the focus.

In addition to the occasions of triggering image focus tracking and audio focus tracking in the foregoing embodiments, other trigger occasions are also included. For example, in a preview process, the terminal first detects an operation on a focus tracking control, then detects an operation of determining a focus for an original image by a user, and after detecting that the user taps a start recording control, the terminal may trigger image focus tracking and audio focus tracking.

In some other embodiments, with reference to the user interface 51 shown in FIG. 5B, the terminal may not display the focus tracking control 521 until an operation of the user on the start recording control 540 is detected. The terminal may detect an operation on the focus tracking control 521. Then, after a focus is determined, the terminal may start image focus tracking and video focus tracking. It indicates that the occasion on which the terminal triggers image focus tracking and audio focus tracking is changed as follows: After the start recording control is detected, and after the operation on the focus tracking control 521 is detected and the focus is determined, image focus tracking and audio focus tracking may be triggered to obtain a focus tracking video.

The following describes a use scenario of obtaining a focus tracking video in the video processing method in embodiments of this application, including but not limited to the following three scenarios.

Scenario 1: A terminal is in a recording mode, and when recording an original video, the terminal may record a focus tracking video by using the video processing method in this application. For the process, refer to the descriptions of Embodiment 1 to Embodiment 4. Details are not described herein again.

Scenario 2: When recording a focus tracking video, a terminal may display a focus tracking image, obtain an input audio signal by using a microphone, then process the input audio signal to obtain an audio signal corresponding to the focus tracking image, and play, through a connected headset, the audio signal corresponding to the focus tracking image.

Figure 24A:
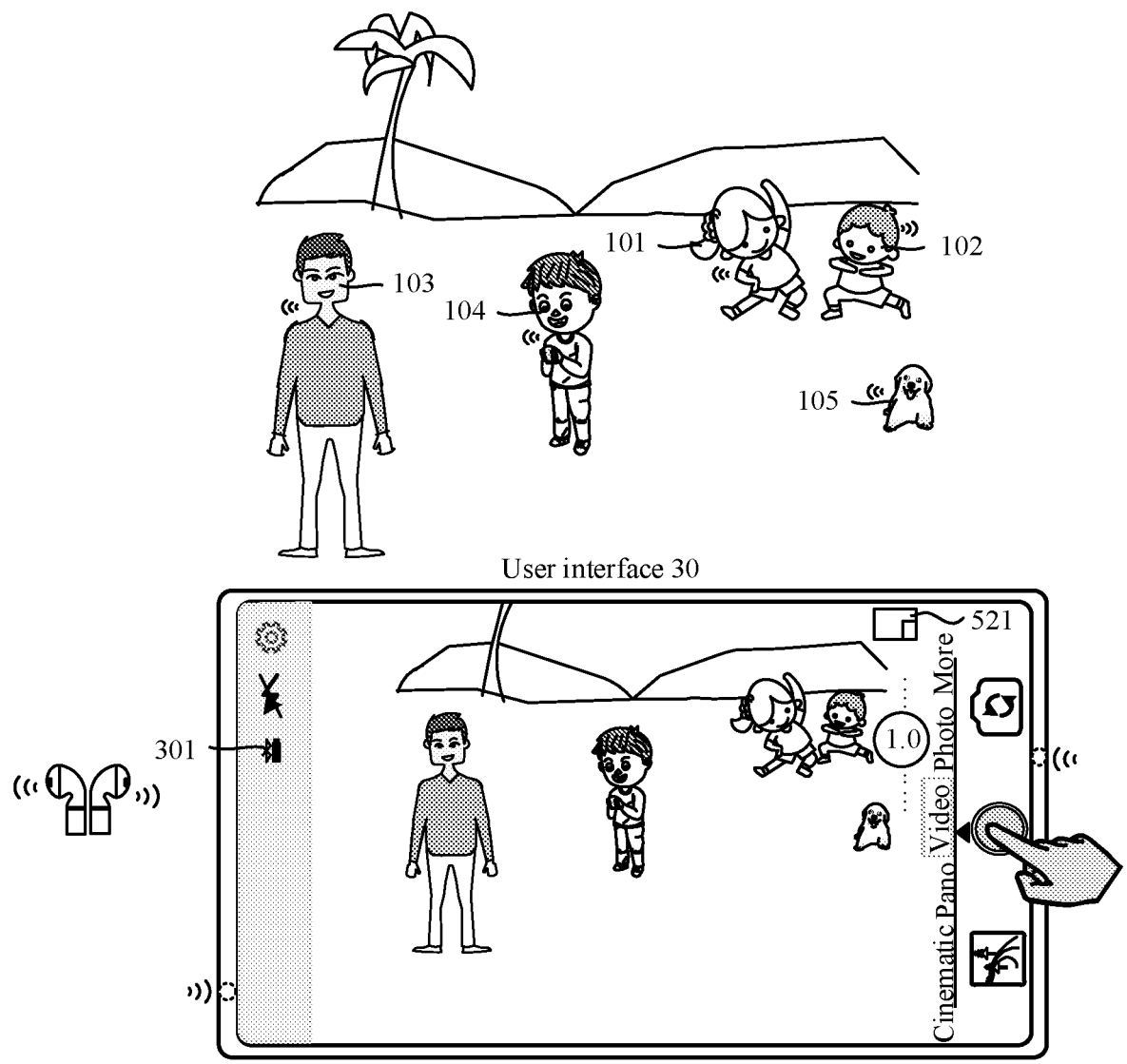
FIG. 24A and FIG. 24B show example user interfaces in Scenario 2.
Figure 24B:
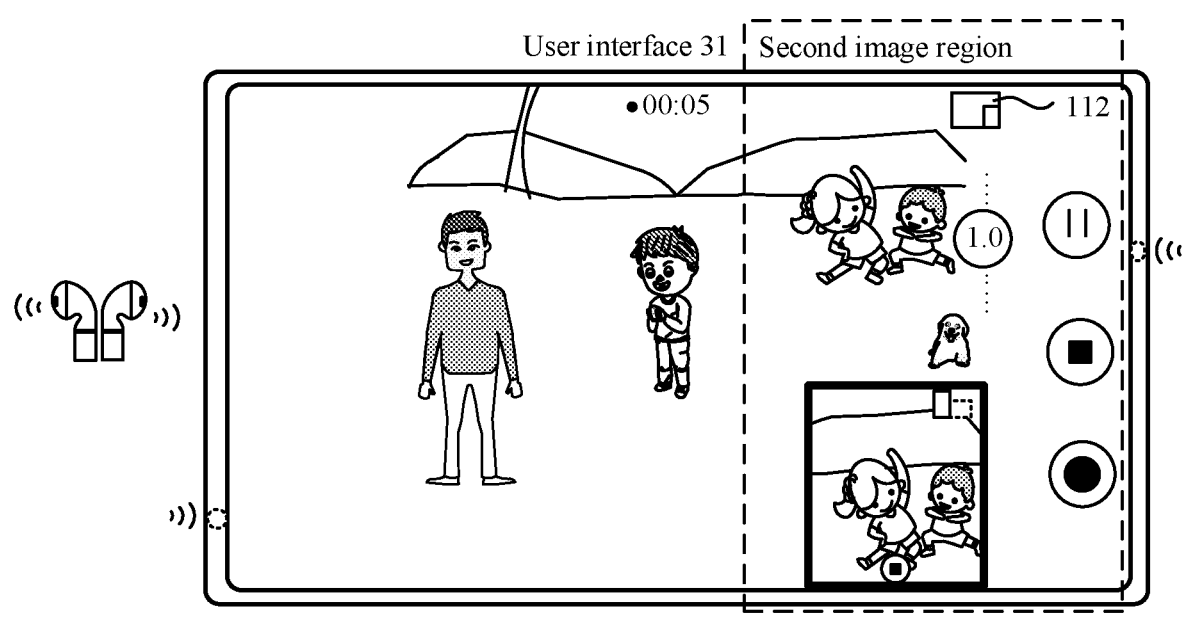

For example user interfaces in Scenario 2, refer to the following descriptions of FIG. 24A and FIG. 24B.

In FIG. 24A and FIG. 24B, a terminal records a video by using a rear-facing camera. In this case, photographed objects may include a photographed object 101 (a little girl), a photographed object 102 (a little boy A), a photographed object 103 (a man), a photographed object 104 (a little boy B), a photographed object 105 (a puppy), and the like.

As shown in FIG. 24A, a user interface 30 is an example user interface when the terminal previews a video. The user interface 30 includes a headset connection indicator 301. In this case, the terminal may have not started image focus tracking and audio focus tracking, and the terminal may play, through a connected headset, an audio signal corresponding to an original image.

In another example, when the terminal displays the user interface 30, alternatively, the terminal may not play, through the connected headset, the audio signal corresponding to the original image.

The user interface 30 includes a focus tracking control 521, and a display status of the focus tracking control 521 is presented in a solid line form, to notify a user that image focus tracking and audio focus tracking may be performed after a focus is determined.

As shown in FIG. 24B, the user interface 31 is an example user interface when the terminal performs image focus tracking and audio focus tracking. In this case, the terminal may display a focus tracking image, and play, through the connected headset, an audio signal corresponding to the focus tracking image.

It should be understood that FIG. 24A and FIG. 24B do not show a user interface when the terminal determines a focus. For details, refer to the foregoing descriptions of determining a focus in Embodiment 1 to Embodiment 4, which are not described herein again.

In some other scenarios, the terminal may not play audio through the headset, but directly play the audio by using a local speaker, and then cancel, through acoustic echo cancellation (acoustic echo cancellation, AEC), the audio played by the speaker of the terminal.

Scenario 3: The video processing method in this application may also be applied to a video live broadcast process. In the live broadcast process, a terminal may generate a focus tracking video, and then send the focus tracking video to another terminal, or send an original video to another terminal.

For example user interfaces in Scenario 2, refer to the following descriptions of FIG. 25A to FIG. 25C(2).

As shown in FIG. 25A, a user interface 40a is an example user interface of a terminal in a live broadcast process. The user interface 40a includes a focus tracking control 521, and a display status of the focus tracking control 521 is presented in a dashed line form. In response to an operation (for example, a tap operation) of a user on the focus tracking control 521, the terminal may display the following user interface 41a.

In a possible case, as shown in FIG. 25B(1), the display status of the focus tracking control 521 switches from the dashed line to a solid line, to notify a user that image focus tracking and audio focus tracking may be performed after a focus is determined. For a process of determining a focus herein, refer to the descriptions of Embodiment 1 to Embodiment 4. Details are not described herein again. The user interface 41a is an example user interface when the terminal performs image focus tracking and video focus tracking in the live broadcast process. The user interface 41a may include an original image 410 and a focus tracking image 410. In response to an operation (for example, a touch and hold operation) on the focus tracking image 410, the terminal may transmit the focus tracking image and an audio signal corresponding to the focus tracking image to another terminal. As shown in FIG. 25B(2), a user interface 41b is an example user interface when the another terminal displays a focus tracking image. In this case, the user interface 41b displays the focus tracking image 410.

In another possible case, as shown in FIG. 25C(1), the display status of the focus tracking control 521 switches from the dashed line to a solid line, to notify the user that image focus tracking and audio focus tracking may be performed after a focus is determined. For a process of determining a focus herein, refer to the descriptions of Embodiment 1 to Embodiment 4. Details are not described herein again. The user interface 41a is an example user interface when the terminal performs image focus tracking and video focus tracking in the live broadcast process. The user interface 41a may include an original image 410 and a focus tracking image 410. In response to an operation (for example, a touch and hold operation) on the original image 410, the terminal may transmit the focus tracking image and an audio signal corresponding to the focus tracking image to another terminal. As shown in FIG. 25C(2), a user interface 42 is an example user interface when the another terminal displays a focus tracking image. In this case, the user interface 42 displays the original image 410.

In addition to the foregoing Scenarios 1 to 3, the terminal may also use, in other scenarios, the video processing method in embodiments of this application. For example, the video processing method in this application may be used to post-process an original video, and when the original video is played, image focus tracking and video focus tracking are performed to obtain a focus tracking video. For some example user interfaces in the process, refer to the foregoing description of Embodiment 5. Details are not described herein again.

In embodiments of this application, the start recording control may be referred to as a first control, the end recording control may be referred to as a second control, the focus tracking pause control may be referred to as a third control, the focus tracking control may be referred to as a fourth control, and the focus tracking mode control may be referred to as a fifth control. The second image region or the audio focus tracking region in the specification may be referred to as a focus region. The processed target audio signal may be referred to as second target audio. The separated target audio signal may be referred to as third target audio. The reference noise signal set in the specification may be referred to as a second noise signal set. The filtered noise signal set may be referred to as a filtered first noise set. The first frame of target audio signal may be referred to as a first frame of target audio.

In embodiments of this application, a region displaying an original image may be referred to as a viewfinder frame, and a region displaying a focus tracking image may be referred to as a first window.

The following describes an example terminal provided in embodiments of this application.

Figure 26:
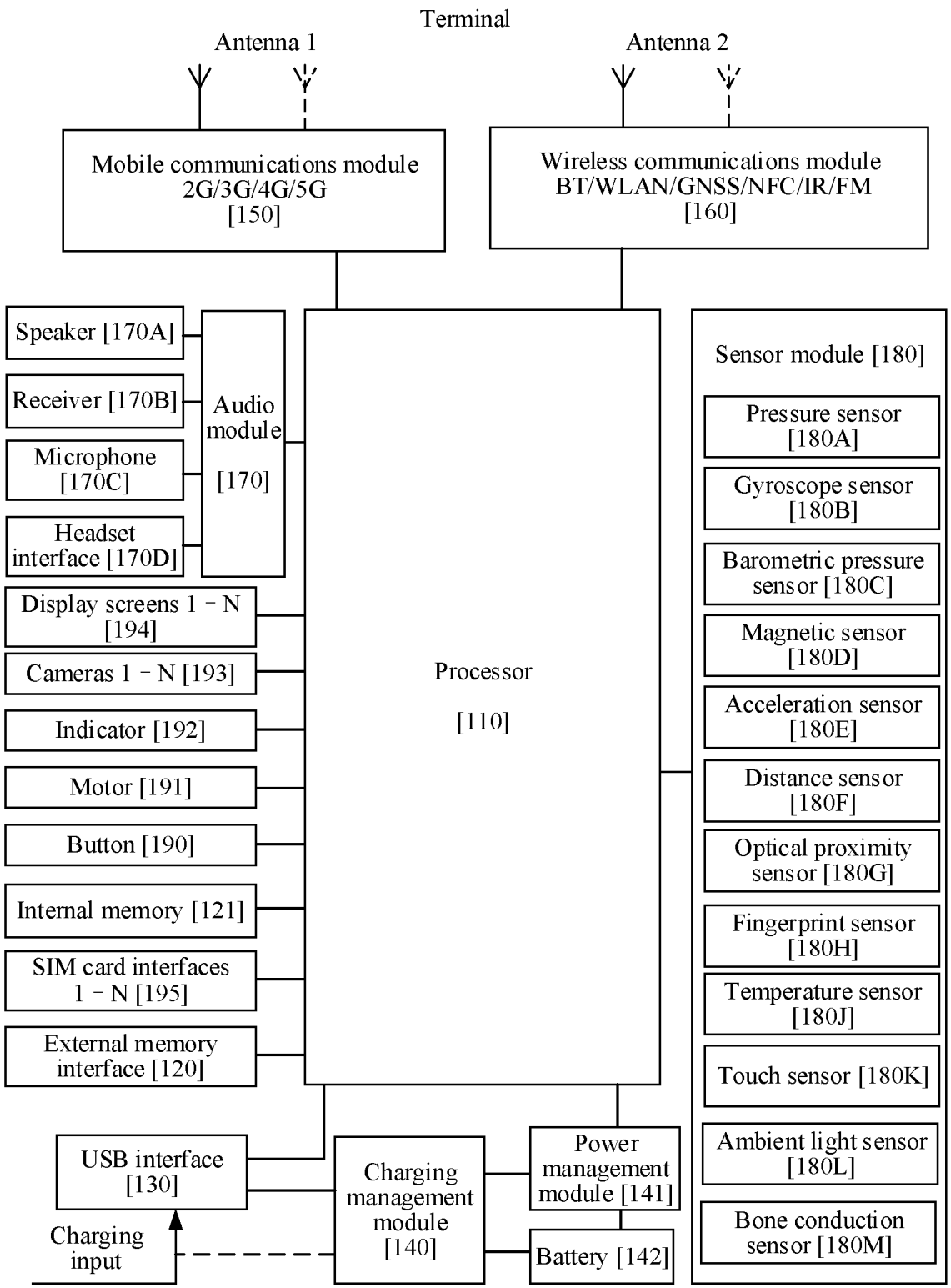
FIG. 26 is a schematic diagram of a structure of a terminal according to an embodiment of this application.

FIG. 26 is a schematic diagram of a structure of a terminal according to an embodiment of this application.

The following embodiment is specifically described by using the terminal as an example. It should be understood that the terminal may have more or fewer components than those shown in the figure, may have two or more components combined, or may have a different component configuration. The components shown in the figure may be implemented in hardware, software, or a combination of hardware and software, including one or more signal processors and/or application-specific integrated circuits.

The terminal may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset interface 170D, a sensor module 180, a button 190, a motor 191, an indicator 192, a camera 193, a display screen 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, a proximity light sensor 180G, a fingerprint sensor 180H, a temperature sensor 180J, a touch sensor 180K, an ambient light sensor 180L, a bone conduction sensor 180M, and the like.

It may be understood that the schematic structure in this embodiment of this application does not constitute a specific limitation on the terminal. In some other embodiments of this application, the terminal may include more or fewer components than those shown in the figure, or have some components combined, or have some components split, or have a different component arrangement. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

A memory may be further disposed in the processor 110, to store instructions and data. In some embodiments, the memory in the processor 110 is a cache. The memory may save an instruction or data that has been just used or is cyclically used by the processor 110. If the processor 110 needs to use the instruction or the data again, the processor may directly invoke the instruction or the data from the memory. This avoids repeated access, and reduces a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, and the like It may be understood that a schematic interfacing relationship between modules in this embodiment of this application is merely an example for description, and do not constitute a limitation on the structure of the terminal. In some other embodiments of this application, the terminal may alternatively use an interfacing manner different from that in the foregoing embodiment, or use a combination of a plurality of interfacing manners.

The terminal implements a display function by using the GPU, the display screen 194, the application processor, and the like. The GPU is a microprocessor for image processing, and is connected to the display screen 194 and the application processor.

The display screen 194 is configured to display an image, a video, and the like. The display screen 194 includes a display panel. The display panel may be a liquid crystal display (liquid crystal display, LCD). Alternatively, the display panel may be manufactured by using an organic light-emitting diode (organic light-emitting diode, OLED) or the like. In some embodiments, the terminal may include one or N display screens 194. N is a positive integer greater than 1.

The terminal may implement a shooting function by using the ISP, the camera 193, the video codec, the GPU, the display screen 194, the application processor, and the like.

The ISP is configured to process data fed back by the camera 193. For example, during photographing, when a shutter is opened, light is transferred to a photosensitive element of the camera through a lens, an optical signal is converted into an electrical signal, and the photosensitive element of the camera transfers the electrical signal to the ISP for processing, to convert the electrical signal into a visible image. The ISP may further optimize an algorithm for noise, brightness, and colors of the image. The ISP may further optimize parameters such as an exposure and a color temperature of a shooting scene. In some embodiments, the ISP may be disposed in the camera 193.

The camera 193 is configured to capture a static image or a video. An optical image of an object is generated through the lens, and projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts the optical signal into an electrical signal, and then transfers the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the terminal may include one or N cameras 193. N is a positive integer greater than 1.

The digital signal processor is configured to process a digital signal. In addition to the digital image signal, the digital signal processor may further process another digital signal. For example, when the terminal selects a frequency bin, the digital signal processor is configured to perform Fourier transform on frequency bin energy.

The video codec is configured to compress or decompress a digital video. The terminal may support one or more video codecs. In this way, the terminal may play or record videos in a plurality of encoding formats, for example, moving picture experts group (moving picture experts group, MPEG)1, MPEG2, MPEG3, and MPEG4.

The NPU is a neural-network (neural-network, NN) computing processor, which quickly processes input information with reference to a biological neural-network structure, for example, a mode of transfer between human brain neurons, and can continuously perform self-learning. Applications such as intelligent cognition of the terminal, for example, image recognition, face recognition, voice recognition, and text understanding, may be implemented by using the NPU.

The internal memory 121 may include one or more random access memories (random access memory, RAM) and one or more non-volatile memories (non-volatile memory, NVM).

The terminal may use the audio module 170, the speaker 170A, the receiver 170B, the microphone 170C, the headset interface 170D, the application processor, and the like to implement an audio function, for example, music playing or sound recording.

The audio module 170 is configured to convert digital audio information into an analog audio signal for output, and convert an analog audio input into a digital audio signal. The audio module 170 may be further configured to encode and decode audio signals. In some embodiments, the audio module 170 may be disposed in the processor 110, or some functional modules of the audio module 170 are disposed in the processor 110.

The speaker 170A, also referred to as a "loudspeaker", is configured to convert an electrical audio signal into a sound signal. With the terminal, a user may listen to music or listen to a hands-free call by using the speaker 170A.

The receiver 170B, also referred to as a "phone receiver", is configured to convert an electrical audio signal into a sound signal. With the terminal, when the user answers a call or receives voice information, the user may place the receiver 170B close to an ear to listen to a voice.

The microphone 170C, also referred to as a "mic" or a "sound transmitter", is configured to convert a sound signal into an electrical signal. When making a call or sending voice information, the user may make a voice with the mouth near the microphone 170C, so that a sound signal is input into the microphone 170C. At least one microphone 170C may be disposed in the terminal. In some other embodiments, two microphones 170C may be disposed in the terminal, to acquire a sound signal and implement a noise reduction function. In some other embodiments, alternatively, three, four, or more microphones 170C may be disposed in the terminal, to acquire a sound signal, reduce noise, recognize a sound source to implement a directional sound recording function, and the like.

The headset interface 170D is configured to connect to a wired headset. The headset interface 170D may be a USB interface 130, or may be a 3.5 mm open mobile terminal platform (open mobile terminal platform, OMTP) standard interface or a US cellular telecommunications industry association (cellular telecommunications industry association of the USA, CTIA) standard interface.

The pressure sensor 180A is configured to sense a pressure signal, and may convert the pressure signal into an electrical signal.

The gyroscope sensor 180B may be configured to determine a motion posture of the terminal.

The acceleration sensor 180E may detect accelerations in various directions (usually on three axes) of the terminal.

The distance sensor 180F is configured to measure a distance.

The optical proximity sensor 180G may include, for example, a light-emitting diode (LED) and an optical detector, for example, a photodiode.

The ambient light sensor 180L is configured to sense intensity of ambient light. The terminal may adaptively adjust luminance of the display screen 194 based on the sensed intensity of the ambient light.

The fingerprint sensor 180H is configured to acquire a fingerprint.

The temperature sensor 180J is configured to detect a temperature.

The touch sensor 180K is also referred to as a "touch panel". The touch sensor 180K may be disposed on the display screen 194. The touch sensor 180K and the display screen 194 constitute a touchscreen, which is also referred to as a "touch control screen". The touch sensor 180K is configured to detect a touch operation acting on or near the touch sensor.

The button 190 includes a power button, a volume button, and the like. The button 190 may be a mechanical button, or may be a touch button. The terminal may receive a button input, and generate a button signal input that is related to user setting and function control of the terminal.

The motor 191 may generate a vibration prompt.

In this embodiment of this application, the processor 110 invokes computer instructions stored in the internal memory 121, to enable the terminal to perform the video processing method provided in embodiments of this application.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

As used in the foregoing embodiments, the term "when . . . " may be interpreted to mean "if . . . ", "after", "in response to determining that . . . ", or "in response to detecting that . . . " depending on a context. Similarly, the phrase "when it is determined that . . . " or "if a (stated condition or event) is detected" may be interpreted to mean "if it is determined that . . . ", "in response to determining that . . . ", "when a (stated condition or event) is detected", or "in response to a detected (stated condition or event)" depending on a context.

All or some of the foregoing embodiments may be implemented by software, hardware, firmware, or any combination thereof. When software is used for implementation, all or some may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid state disk), or the like.

Persons of ordinary skill in the art may understand that all or some of the procedures of the methods in the foregoing embodiments may be implemented by a computer program instructing related hardware. The program may be stored in a computer-readable storage medium. When the program runs, the procedures of the foregoing method embodiments are performed. The storage medium includes any medium that can store program code, such as a ROM, a random access memory RAM, a magnetic disk, or an optical disc.

What is claimed is:

1. A video processing method, wherein the method is applied to a terminal, the terminal comprises a camera, and the method comprises:
   starting, by the terminal, the camera;
   displaying a preview interface, wherein the preview interface comprises a viewfinder frame and a first control;
   displaying, in the viewfinder frame, a first image acquired by the camera, wherein a first region of the first image comprises a first photographed object;

detecting a first operation on the first control;
starting recording and displaying a recording interface in response to the first operation, wherein the recording interface comprises the viewfinder frame and a second control;
displaying a second image in the viewfinder frame, wherein the second image comprises a first region and a second region, and the first region comprises the first photographed object;
determining the first region as a focus region based on a third operation on the first photographed object in the first region;
displaying a first window, wherein the first window displays a third image comprising the first photographed object, and content displayed in the first window is less than content displayed in the viewfinder frame;
at a first moment, displaying a fourth image in the viewfinder frame, displaying a fifth image in the first window, and obtaining first input audio, wherein both the fourth image and the fifth image comprise the first photographed object, and the first input audio comprises sound corresponding to a first region of the fourth image and sound corresponding to a second region of the fourth image; and
detecting a fourth operation on the second control, and stopping recording and saving a first video and a second video in response to the fourth operation, wherein the first video is a video corresponding to the viewfinder frame, and the second video is a video corresponding to the first window, wherein
the second video comprises the fifth image and first audio at the first moment, the first audio is audio obtained after the first input audio is processed, and the first audio comprises sound obtained by enhancing the sound corresponding to the first region of the fourth image and sound obtained by suppressing the sound corresponding to the second region of the fourth image.

2. The method according to claim 1, wherein the first window further comprises a third control, and the method further comprises:
when the fourth operation is not detected, if an operation on the third control is detected, saving the second video in response to the operation on the third control.

3. The method according to claim 1, wherein the preview interface further comprises a fourth control, and before the detecting a first operation on the first control, the method further comprises:
when an operation on the fourth control is detected, changing a display status of the fourth control in response to the operation on the fourth control; or
when an operation on the fourth control is detected, displaying a fifth control in response to the operation on the fourth control, wherein the fifth control is configured to prompt that the terminal can record the first video, and the fifth control is further configured to detect an operation of controlling the terminal not to start recording of the first video.

4. The method according to claim 3, wherein the fourth control is further comprised in the recording interface, and when the fourth operation is not detected, after the displaying a first image, and before the displaying the first image and a second image, the method further comprises:
detecting an operation on the fourth control; and
changing the display status of the fourth control in response to the operation on the fourth control.

5. The method according to claim 1, wherein the determining the first region as a focus region based on a third operation on the first region comprises:
detecting a sixth operation on the first region in the first image, wherein the sixth operation acts on a first position in the first region; and
setting a pixel at the first position as a focus in response to the sixth operation, and determining the first region in which the focus is located as the focus region.

6. The method according to claim 1, wherein the method further comprises:
processing, by the terminal, the first input audio based on the focus region to obtain first target audio and a first noise set, wherein the first noise set comprises T channels of noise, Tis an integer greater than or equal to 1, the first target audio comprises target sound, and further comprises a part of noise, and the target sound is sound corresponding to a region in which a focus is located;
performing filtering based on the first target audio and the first noise set, to filter out noise in the first target audio and obtain second target audio;
when third target audio is obtained through signal separation based on input audio, performing audio mixing based on the second target audio and the third target audio, to obtain fourth target audio, wherein the third target audio comprises the target sound;
when the third target audio is not obtained through signal separation based on the input audio, using the second target audio as the fourth target audio; and
obtaining the first audio based on the fourth target audio.

7. The method according to claim 6, wherein the processing, by the terminal, the first input audio based on the focus region to obtain first target audio and a first noise set specifically comprises:
determining, by the terminal based on the region in which the focus is located, a target sound direction and T noise directions corresponding to the target sound direction, wherein the target sound direction is a direction corresponding to the target sound, and each noise direction is a direction corresponding to noise;
obtaining a filter coefficient corresponding to the target sound direction and a filter coefficient corresponding to each noise direction; and
obtaining the first target audio based on the filter coefficient corresponding to the target sound direction and the input audio, obtaining the T channels of noise respectively based on filter coefficients corresponding to the T noise directions and the input audio, and using the T channels of noise as the first noise set.

8. The method according to claim 6, wherein the performing filtering based on the first target audio and the first noise set, to filter out noise in the first target audio and obtain second target audio specifically comprises:
filtering, by the terminal, the first noise set by using the first target audio as a reference, to filter out a part of the target sound comprised in the first noise set and obtain a second noise set; and
filtering the first target audio by using the second noise set as a reference, to filter out noise comprised in the first target audio and obtain the second target audio.

9. The method according to claim 6, wherein the performing filtering based on the first target audio and the first noise set, to filter out noise in the first target audio and obtain second target audio specifically comprises:

filtering, by the terminal, the first noise set by using the first target audio as a reference, to filter out the target sound comprised in the first noise set and obtain a second noise set;

filtering the first target audio by using the second noise set as a reference, to filter out noise comprised in the first target audio and obtain a filtered first target audio; and further filtering, by the terminal, the filtered first target audio based on a filtered first noise set, to filter out noise comprised in the filtered first target audio and obtain the second target audio, wherein the filtered first noise set comprises at least one channel of filtered noise, comprising a filtered first channel of noise, the filtered first channel of noise is obtained by filtering a first channel of noise based on the first target audio and filtering out the target sound comprised in the first channel of noise, and the first channel of noise is a channel of noise in the first noise set.

10. The method according to claim 6, wherein when the third target audio is obtained through signal separation based on the input audio, the method specifically comprises:

performing, by the terminal, signal separation on the input audio, to obtain N channels of candidate audio, wherein N is a quantity of microphones of the terminal;

respectively determining correlations between the second target audio and different candidate audio, and determining M channels of candidate audio whose correlations are greater than a correlation threshold, wherein M is an integer less than or equal to N and greater than 0; and when M is greater than or equal to 2, performing audio mixing on the M channels of candidate audio to obtain the third target audio; or when M is equal to 1, using the M channel of candidate audio as the third target audio.

11. The method according to claim 6, wherein the performing audio mixing based on the second target audio and the third target audio, to obtain fourth target audio specifically comprises:

determining, by the terminal, a correlation between the second target audio and the third target audio;

determining an audio mixing ratio based on the correlation between the second target audio and the third target audio; and performing audio mixing on the second target audio and the third target audio based on the audio mixing ratio, to obtain the fourth target audio.

12. The method according to claim 6, wherein the obtaining the first audio based on the fourth target audio specifically comprises:

using the fourth target audio as the first audio.

13. The method according to claim 6, wherein the obtaining the first audio based on the fourth target audio specifically comprises:

enhancing the fourth target audio to obtain an enhanced fourth target audio, and using the enhanced fourth target audio as the first audio.

14. The method according to claim 8, wherein the first target audio comprises a first frame of target audio, the first frame of target audio is a $k^{th}$ frame of target audio in the first target audio, the first noise set comprises a first frame of noise set, each frame of noise in the first frame of noise set is a $k^{th}$ frame of noise in a different channel of noise in the first noise set, and the first frame of noise set comprises a $k^{th}$ frame of noise in each channel of noise in the first noise set; and the filtering, by the terminal, the first noise set by using the first target audio as a reference, to filter out the target sound comprised in the first noise set comprises:

obtaining, by the terminal, a first filter;

when the first frame of target audio comprises the target sound, updating the first filter, and using an updated first filter as the first filter; and filtering out, based on the first filter by using the first frame of target audio as a reference, the target sound comprised in each frame of noise in the first frame of noise set; and the filtering the first target audio by using the second noise set as a reference, to filter out noise comprised in the first target audio comprises:

obtaining, by the terminal, a second filter;

when the first frame of target audio does not comprise the target sound, updating the second filter, and using an updated second filter as the second filter; and filtering out noise in the first frame of target audio based on the second filter by using the first frame of noise set as a reference.

15. The method according to claim 7, wherein the filter coefficient corresponding to the target sound direction and the filter coefficient corresponding to each noise direction are preset in the terminal; in the filter coefficient corresponding to the target sound direction, a coefficient corresponding to sound in the target sound direction is 1, indicating that the sound in the target sound direction in the input audio is not suppressed; a coefficient corresponding to sound closer to the target sound direction is closer to 1, and a suppression level decreases gradually; the filter coefficients corresponding to the noise directions comprise a filter coefficient corresponding to a first noise direction, and the first noise direction is one of the T noise directions corresponding to the target sound direction; in the filter coefficient corresponding to the first noise direction, a coefficient corresponding to sound in the first noise direction is 1, indicating that the sound in the first noise direction in the input audio is not suppressed; and a coefficient corresponding to sound closer to the first noise direction is closer to 1, and a suppression level decreases gradually.

16. The method according to claim 7, wherein after the saving a first video, the method further comprises:

displaying, by the terminal, a first interface, wherein the first interface comprises a first display frame, wherein the first display frame comprises a part of or all content of a frame of image in the first video; and further comprises a first indicator, wherein the first indicator is configured to indicate that the first video is a focus tracking video.

17. The method according to claim 1, wherein the first video comprises the fourth image and the first input audio at the first moment.

18. A terminal, wherein the terminal comprises one or more processors and one or more memories, the one or more memories are coupled to the one or more processors, the one or more memories are configured to store computer program code, the computer program code comprises computer instructions, and when the one or more processors execute the computer instructions, the terminal is enabled to perform the following steps:

starting, a camera;

displaying a preview interface, wherein the preview interface comprises a viewfinder frame and a first control;

displaying, in the viewfinder frame, a first image acquired by the camera, wherein a first region of the first image comprises a first photographed object;

detecting a first operation on the first control;
starting recording and displaying a recording interface in response to the first operation, wherein the recording interface comprises the viewfinder frame and a second control;
displaying a second image in the viewfinder frame, wherein the second image comprises a first region and a second region, and the first region comprises the first photographed object;
determining the first region as a focus region based on a third operation on the first photographed object in the first region;
displaying a first window, wherein the first window displays a third image comprising the first photographed object, and content displayed in the first window is less than content displayed in the viewfinder frame;
at a first moment, displaying a fourth image in the viewfinder frame, displaying a fifth image in the first window, and obtaining first input audio, wherein both the fourth image and the fifth image comprise the first photographed object, and the first input audio comprises sound corresponding to a first region of the fourth image and sound corresponding to a second region of the fourth image; and
detecting a fourth operation on the second control, and stopping recording and saving a first video and a second video in response to the fourth operation, wherein the first video is a video corresponding to the viewfinder frame, and the second video is a video corresponding to the first window, wherein
the second video comprises the fifth image and first audio at the first moment, the first audio is audio obtained after the first input audio is processed, and the first audio comprises sound obtained by enhancing the sound corresponding to the first region of the fourth image and sound obtained by suppressing the sound corresponding to the second region of the fourth image.

19. A non-transitory computer-readable storage medium, comprising instructions, wherein when the instructions are run on a terminal, the terminal is enabled to perform the following steps:
starting, a camera;
displaying a preview interface, wherein the preview interface comprises a viewfinder frame and a first control;
displaying, in the viewfinder frame, a first image acquired by the camera, wherein a first region of the first image comprises a first photographed object;
detecting a first operation on the first control;
starting recording and displaying a recording interface in response to the first operation, wherein the recording interface comprises the viewfinder frame and a second control;
displaying a second image in the viewfinder frame, wherein the second image comprises a first region and a second region, and the first region comprises the first photographed object;
determining the first region as a focus region based on a third operation on the first photographed object in the first region;
displaying a first window, wherein the first window displays a third image comprising the first photographed object, and content displayed in the first window is less than content displayed in the viewfinder frame;
at a first moment, displaying a fourth image in the viewfinder frame, displaying a fifth image in the first window, and obtaining first input audio, wherein both the fourth image and the fifth image comprise the first photographed object, and the first input audio comprises sound corresponding to a first region of the fourth image and sound corresponding to a second region of the fourth image; and
detecting a fourth operation on the second control, and stopping recording and saving a first video and a second video in response to the fourth operation, wherein the first video is a video corresponding to the viewfinder frame, and the second video is a video corresponding to the first window, wherein
the second video comprises the fifth image and first audio at the first moment, the first audio is audio obtained after the first input audio is processed, and the first audio comprises sound obtained by enhancing the sound corresponding to the first region of the fourth image and sound obtained by suppressing the sound corresponding to the second region of the fourth image.

20. The terminal according to claim 18, wherein the first window further comprises a third control, and the steps further comprise:
when the fourth operation is not detected and when an operation on the third control is detected, saving the second video in response to the operation on the third control.

* * * * *